(12) United States Patent
Crowley et al.

(10) Patent No.: US 12,511,028 B2
(45) Date of Patent: Dec. 30, 2025

(54) SYSTEM, METHOD AND USER INTERFACE FOR SUPPORTING SCHEDULED MODE CHANGES ON ELECTRONIC DEVICES

(71) Applicant: Apple Inc., Cupertino, CA (US)

(72) Inventors: Matthew W. Crowley, San Francisco, CA (US); Pablo F. Caro, San Francisco, CA (US); Eamon F. Gilravi, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/100,530

(22) Filed: Jan. 23, 2023

(65) Prior Publication Data

US 2023/0161470 A1    May 25, 2023

Related U.S. Application Data

(63) Continuation of application No. 16/948,374, filed on Sep. 15, 2020, now Pat. No. 11,561,688.
(Continued)

(51) Int. Cl.
*G06F 3/04847* (2022.01)
*G04G 13/02* (2006.01)
(Continued)

(52) U.S. Cl.
CPC ........ *G06F 3/04847* (2013.01); *G06F 1/3203* (2013.01); *G06F 1/3287* (2013.01); *G06F 1/3296* (2013.01); *G06F 3/0482* (2013.01); *G06F 3/04845* (2013.01); *G06F 9/451* (2018.02); *G08B 5/22* (2013.01);
(Continued)

(58) Field of Classification Search
None
See application file for complete search history.

(56) References Cited

U.S. PATENT DOCUMENTS

6,717,520 B1 * 4/2004 Dorenbosch ........... G04G 13/02
340/7.37
8,218,403 B2   7/2012 Scott et al.
(Continued)

FOREIGN PATENT DOCUMENTS

AU         2019100493 A4    6/2019
CN         102841755 A     12/2012
(Continued)

OTHER PUBLICATIONS

Patent, dated Jan. 26, 2023, received in Japanese Patent Application No. 2020-160012, which corresponds with U.S. Appl. No. 16/948,370, 3 pages.
(Continued)

*Primary Examiner* — Christopher J Fibbi
(74) *Attorney, Agent, or Firm* — Morgan, Lewis & Bockius LLP

(57) ABSTRACT

An electronic device displays a reminder for increasing the first battery level above a first preset battery level when the a current time is within a first preset time period preceding a scheduled mode change and the first battery level is below a first preset battery level. The electronic device forgoes displaying the reminder for increasing the first battery level above the first preset battery level when the current time is outside of the first preset time period and the first battery level is below a first preset battery level.

27 Claims, 117 Drawing Sheets

Related U.S. Application Data

(60) Provisional application No. 63/023,214, filed on May 11, 2020.

(51) Int. Cl.

| | | |
|---|---|---|
| *G06F 1/3203* | (2019.01) | |
| *G06F 1/3287* | (2019.01) | |
| *G06F 1/3296* | (2019.01) | |
| *G06F 3/0482* | (2013.01) | |
| *G06F 3/04845* | (2022.01) | |
| *G06F 9/451* | (2018.01) | |
| *G08B 5/22* | (2006.01) | |
| *G08B 21/24* | (2006.01) | |
| G04G 21/08 | (2010.01) | |
| G06F 3/0488 | (2022.01) | |
| G09G 5/10 | (2006.01) | |
| H04B 1/3827 | (2015.01) | |

(52) U.S. Cl.
CPC ............ *G08B 21/24* (2013.01); *G04G 13/02* (2013.01); *G04G 21/08* (2013.01); *G06F 3/0488* (2013.01); *G09G 5/10* (2013.01); *G09G 2320/0626* (2013.01); *G09G 2354/00* (2013.01); *H04B 1/3827* (2013.01)

(56) References Cited

U.S. PATENT DOCUMENTS

| | | | |
|---|---|---|---|
| 8,477,566 | B2 | 7/2013 | Lazaridis et al. |
| 8,553,502 | B2 | 10/2013 | Lazaridis et al. |
| 8,768,648 | B2 | 7/2014 | Panther et al. |
| 9,032,013 | B2 | 5/2015 | Nukala et al. |
| 9,406,103 | B1 | 8/2016 | Gray et al. |
| 9,461,833 | B1 | 10/2016 | Marra et al. |
| 9,483,879 | B2 | 11/2016 | Gourlay et al. |
| 9,541,986 | B2 | 1/2017 | Rohrweck |
| 9,590,942 | B1 | 3/2017 | Yeskel et al. |
| 9,693,311 | B2 | 6/2017 | Cardozo et al. |
| 9,808,185 | B2 | 11/2017 | Arnold et al. |
| 9,847,999 | B2 | 12/2017 | Van Os et al. |
| 10,055,634 | B2 | 8/2018 | Han et al. |
| 10,114,534 | B2 | 10/2018 | Kasterstein et al. |
| 10,198,073 | B2 | 2/2019 | Chaudhri et al. |
| 10,228,815 | B2 | 3/2019 | Forstall et al. |
| 10,261,475 | B1 | 4/2019 | Kahn et al. |
| 10,271,283 | B2 | 4/2019 | Mujtaba et al. |
| 10,296,128 | B1 | 5/2019 | Nold et al. |
| 10,311,745 | B2 | 6/2019 | Arnold et al. |
| 10,334,054 | B2 | 6/2019 | Van Os et al. |
| 10,338,773 | B2 | 7/2019 | Murarka et al. |
| 10,410,035 | B2 | 9/2019 | Han et al. |
| 10,521,107 | B2 | 12/2019 | van Os et al. |
| 10,860,207 | B2 | 12/2020 | Van Os et al. |
| 10,943,411 | B1 | 3/2021 | Powers et al. |
| 11,056,902 | B2 * | 7/2021 | Muntes ................ G06F 1/3265 |
| 11,137,904 | B1 | 10/2021 | Tyler et al. |
| 11,354,034 | B2 | 6/2022 | Van Os et al. |
| 11,861,159 | B2 | 1/2024 | Van Os et al. |
| 11,966,315 | B2 * | 4/2024 | De La Cropte De Chanterac ...... G06F 11/327 |
| 2002/0078393 | A1 | 6/2002 | Parker |
| 2003/0236935 | A1 | 12/2003 | Amemiya et al. |
| 2005/0120306 | A1 | 6/2005 | Klassen et al. |
| 2005/0154935 | A1 | 7/2005 | Jin |
| 2005/0249023 | A1 | 11/2005 | Bodlaender |
| 2006/0116178 | A1 | 6/2006 | Vuong et al. |
| 2006/0242651 | A1 | 10/2006 | Zeilinski et al. |
| 2007/0150842 | A1 | 6/2007 | Chaudhri et al. |
| 2007/0211877 | A1 | 9/2007 | Martin et al. |
| 2007/0268784 | A1 | 11/2007 | Xu |
| 2008/0028322 | A1 | 1/2008 | May et al. |
| 2009/0125917 | A1 | 5/2009 | Parker et al. |
| 2009/0143062 | A1 | 6/2009 | Skinner et al. |
| 2009/0143114 | A1 | 6/2009 | Vargas et al. |
| 2009/0284389 | A1 | 11/2009 | Klassen et al. |
| 2009/0284482 | A1 | 11/2009 | Chin |
| 2010/0295789 | A1 | 11/2010 | Shin et al. |
| 2011/0119630 | A1 | 5/2011 | Stroupe et al. |
| 2011/0231499 | A1 | 9/2011 | Stovecek et al. |
| 2011/0283241 | A1 | 11/2011 | Miller et al. |
| 2012/0096392 | A1 | 4/2012 | Ording et al. |
| 2012/0112908 | A1 | 5/2012 | Prykari et al. |
| 2012/0157165 | A1 | 6/2012 | Kim et al. |
| 2012/0233563 | A1 | 9/2012 | Chakra et al. |
| 2012/0252426 | A1 | 10/2012 | Nagaoka et al. |
| 2012/0311466 | A1 | 12/2012 | Kluttz et al. |
| 2012/0315960 | A1 * | 12/2012 | Kim ................ H04W 52/0254 455/574 |
| 2013/0024799 | A1 | 1/2013 | Fadell et al. |
| 2013/0029729 | A1 | 1/2013 | Logan et al. |
| 2013/0096768 | A1 * | 4/2013 | Lovett ................ B60R 16/02 701/29.1 |
| 2013/0100044 | A1 | 4/2013 | Zhao et al. |
| 2013/0190032 | A1 | 7/2013 | Li |
| 2013/0278484 | A1 | 10/2013 | Hwang et al. |
| 2013/0290757 | A1 | 10/2013 | Barlow et al. |
| 2013/0332721 | A1 | 12/2013 | Chaudhri et al. |
| 2013/0346408 | A1 | 12/2013 | Duarte et al. |
| 2014/0055388 | A1 | 2/2014 | Yook et al. |
| 2014/0068755 | A1 | 3/2014 | King et al. |
| 2014/0106821 | A1 | 4/2014 | Nakahara |
| 2014/0115488 | A1 | 4/2014 | Hackborn |
| 2014/0172996 | A1 | 6/2014 | Deeter et al. |
| 2014/0184471 | A1 | 7/2014 | Martynov et al. |
| 2014/0232671 | A1 | 8/2014 | Chaudhri |
| 2014/0241517 | A1 | 8/2014 | Varoglu et al. |
| 2014/0245202 | A1 | 8/2014 | Yoon et al. |
| 2014/0282174 | A1 | 9/2014 | Dempski |
| 2014/0283142 | A1 | 9/2014 | Shepherd et al. |
| 2014/0365919 | A1 | 12/2014 | Shaw et al. |
| 2015/0067365 | A1 | 3/2015 | Nakazima et al. |
| 2015/0072663 | A1 | 3/2015 | Chande et al. |
| 2015/0094120 | A1 | 4/2015 | Suh et al. |
| 2015/0105125 | A1 | 4/2015 | Min et al. |
| 2015/0133098 | A1 | 5/2015 | Warr |
| 2015/0186517 | A1 | 7/2015 | Gilad et al. |
| 2015/0189475 | A1 | 7/2015 | Schillings |
| 2015/0195789 | A1 | 7/2015 | Yoon et al. |
| 2015/0249733 | A1 | 9/2015 | Miura |
| 2015/0253894 | A1 | 9/2015 | McKenzie et al. |
| 2015/0261423 | A1 | 9/2015 | Beaumont et al. |
| 2016/0005290 | A1 | 1/2016 | Takahashi |
| 2016/0022202 | A1 | 1/2016 | Peterson et al. |
| 2016/0034695 | A1 | 2/2016 | Won et al. |
| 2016/0065708 | A1 | 3/2016 | Yang et al. |
| 2016/0077724 | A1 | 3/2016 | Lee et al. |
| 2016/0124579 | A1 | 5/2016 | Tokutake |
| 2016/0154549 | A1 | 6/2016 | Chaudhri et al. |
| 2016/0235359 | A1 | 8/2016 | Cho et al. |
| 2016/0248865 | A1 | 8/2016 | Dotan-Cohen et al. |
| 2016/0255188 | A1 | 9/2016 | Chaudhri et al. |
| 2016/0292989 | A1 * | 10/2016 | Belk ................ H04N 21/41265 |
| 2016/0292994 | A1 * | 10/2016 | Grimme ............ H04M 1/72454 |
| 2016/0337299 | A1 | 11/2016 | Lane et al. |
| 2016/0357358 | A1 | 12/2016 | Forster et al. |
| 2016/0357394 | A1 | 12/2016 | Tae et al. |
| 2017/0011210 | A1 | 1/2017 | Cheong et al. |
| 2017/0035365 | A1 | 2/2017 | Hasegawa et al. |
| 2017/0099602 | A1 | 4/2017 | Joo et al. |
| 2017/0118162 | A1 | 4/2017 | Ratiu et al. |
| 2017/0126609 | A1 | 5/2017 | Sharifi et al. |
| 2017/0127009 | A1 | 5/2017 | Friedrich |
| 2017/0127967 | A1 | 5/2017 | Garcia Molina et al. |
| 2017/0180874 | A1 * | 6/2017 | Goorevich ............ H04R 25/30 |
| 2017/0185275 | A1 | 6/2017 | Ziegler et al. |
| 2017/0189641 | A1 | 7/2017 | Moturu et al. |
| 2017/0228114 | A1 | 8/2017 | Brett et al. |
| 2017/0301215 | A1 | 10/2017 | Charlton |
| 2017/0302609 | A1 | 10/2017 | Vardhan et al. |
| 2017/0346303 | A1 * | 11/2017 | Vanblon ............ G06F 16/2358 |
| 2017/0347946 | A1 | 12/2017 | Arnold et al. |
| 2017/0347949 | A1 | 12/2017 | Arnold et al. |

(56) References Cited

U.S. PATENT DOCUMENTS

| | | |
|---|---|---|
| 2017/0352287 A1 | 12/2017 | Arnold et al. |
| 2017/0357217 A1 | 12/2017 | Raymann et al. |
| 2017/0357408 A1 | 12/2017 | Anglin et al. |
| 2017/0357419 A1 | 12/2017 | Raymann et al. |
| 2017/0357439 A1 | 12/2017 | Lemay et al. |
| 2018/0032220 A1 | 2/2018 | Anzures et al. |
| 2018/0074693 A1 | 3/2018 | Jones et al. |
| 2018/0088787 A1 | 3/2018 | Bereza et al. |
| 2018/0088795 A1 | 3/2018 | van Os et al. |
| 2018/0088797 A1 | 3/2018 | Mcatee et al. |
| 2018/0101297 A1 | 4/2018 | Yang et al. |
| 2018/0109629 A1 | 4/2018 | Van Os et al. |
| 2018/0121409 A1 | 5/2018 | Karunamuni et al. |
| 2018/0164973 A1 | 6/2018 | Kim et al. |
| 2018/0173928 A1 | 6/2018 | Han et al. |
| 2018/0188925 A1 | 7/2018 | Na et al. |
| 2018/0188935 A1 | 7/2018 | Singh et al. |
| 2018/0225945 A1 | 8/2018 | Moravek et al. |
| 2018/0226055 A1 | 8/2018 | Raymann et al. |
| 2018/0227377 A1 | 8/2018 | Trivedi et al. |
| 2018/0247440 A1 | 8/2018 | Heo et al. |
| 2018/0267593 A1 | 9/2018 | Ramasamy et al. |
| 2018/0336530 A1 | 11/2018 | Johnson et al. |
| 2018/0348976 A1 | 12/2018 | Bai |
| 2018/0351373 A1* | 12/2018 | Behzadi .................. G06F 1/26 |
| 2019/0069154 A1* | 2/2019 | Booth .................. H04W 4/90 |
| 2019/0097957 A1 | 3/2019 | Phanshikar et al. |
| 2019/0150854 A1 | 5/2019 | Chung et al. |
| 2019/0179493 A1 | 6/2019 | Goenka et al. |
| 2019/0213060 A1 | 7/2019 | Raymann et al. |
| 2019/0278901 A1 | 9/2019 | Lewis |
| 2019/0289079 A1 | 9/2019 | Van Os et al. |
| 2019/0318608 A1 | 10/2019 | Rao et al. |
| 2019/0339804 A1 | 11/2019 | Gleeson et al. |
| 2019/0342251 A1 | 11/2019 | Dascola et al. |
| 2019/0342252 A1 | 11/2019 | Dascola et al. |
| 2019/0342447 A1 | 11/2019 | Ko et al. |
| 2019/0361714 A1 | 11/2019 | Rothkopf |
| 2020/0012423 A1 | 1/2020 | Cinek et al. |
| 2020/0098300 A1 | 3/2020 | Verma et al. |
| 2020/0120201 A1 | 4/2020 | Siritzky |
| 2020/0133477 A1 | 4/2020 | Van Os et al. |
| 2020/0228616 A1 | 7/2020 | Nishikawa et al. |
| 2021/0019437 A1* | 1/2021 | Neves Creto ............ G09G 5/36 |
| 2021/0019953 A1 | 1/2021 | Pekelny et al. |
| 2021/0048933 A1 | 2/2021 | Shah |
| 2021/0051226 A1 | 2/2021 | Ko et al. |
| 2021/0060429 A1 | 3/2021 | Juenger et al. |
| 2021/0122469 A1 | 4/2021 | Wu |
| 2021/0173664 A1 | 6/2021 | Bai et al. |
| 2021/0216201 A1 | 7/2021 | Van Os et al. |
| 2021/0349617 A1 | 11/2021 | Crowley et al. |
| 2021/0349618 A1 | 11/2021 | Crowley et al. |
| 2021/0349619 A1 | 11/2021 | Crowley et al. |
| 2022/0272420 A1 | 8/2022 | Tucker et al. |
| 2022/0365640 A1 | 11/2022 | Graham et al. |
| 2022/0404963 A1 | 12/2022 | Van Os et al. |
| 2023/0035905 A1 | 2/2023 | Dascola et al. |
| 2023/0303700 A1 | 9/2023 | Lee et al. |
| 2023/0367452 A1 | 11/2023 | Graham et al. |
| 2024/0126429 A1 | 4/2024 | van Os et al. |
| 2024/0406304 A1 | 12/2024 | Foss et al. |
| 2025/0286948 A1 | 9/2025 | Ko et al. |
| 2025/0291462 A1 | 9/2025 | Graham et al. |

FOREIGN PATENT DOCUMENTS

| | | |
|---|---|---|
| CN | 103297939 A | 9/2013 |
| CN | 103514416 A | 1/2014 |
| CN | 105791545 A | 7/2016 |
| CN | 106022062 A | 10/2016 |
| CN | 106027363 A | 10/2016 |
| CN | 106250133 A | 12/2016 |
| CN | 106462358 A | 2/2017 |
| CN | 107491257 A | 12/2017 |
| CN | 107968885 A | 4/2018 |
| EP | 3 312 713 A1 | 4/2018 |
| JP | H10-106344 A | 4/1998 |
| JP | 2011-509541 A | 3/2011 |
| JP | 4860505 B2 | 1/2012 |
| JP | 2013157744 | 8/2013 |
| JP | 2015-045902 A | 3/2015 |
| JP | 2015-188275 A | 10/2015 |
| JP | 2016-105630 A | 6/2016 |
| JP | 2017-126067 A | 7/2017 |
| JP | 2017-208112 A | 11/2017 |
| JP | 2018-185830 A | 11/2018 |
| JP | 2019-111181 A | 7/2019 |
| JP | 2020010511 A | 1/2020 |
| KR | 2012/0037858 A | 4/2012 |
| KR | 2019/0115734 A | 10/2019 |
| WO | WO 2013/184530 A1 | 12/2013 |
| WO | WO 2014/029361 A1 | 2/2014 |
| WO | WO 2016/200584 A1 | 12/2016 |
| WO | WO 2017/027526 A1 | 2/2017 |
| WO | WO 2017/052043 A1 | 3/2017 |
| WO | WO 2018/191972 A1 | 10/2018 |
| WO | WO 2019/217020 A1 | 11/2019 |
| WO | WO 2019/217196 A2 | 11/2019 |
| WO | WO 2020/242882 A1 | 12/2020 |

OTHER PUBLICATIONS

Patent, dated Mar. 24, 2023, received in Korean Patent Application No. 2020-0123967, which corresponds with U.S. Appl. No. 16/948,374, 5 pages.

Office Action, dated Apr. 14, 2023, received in U.S. Appl. No. 17/483,751, 43 pages.

Notice of Allowance, dated Jan. 28, 2023, received in Chinese Patent Application No. 2018111655058, which corresponds with U.S. Appl. No. 16/145,074, 2 pages.

Notice of Allowance, dated Jan. 17, 2023, received in U.S. Appl. No. 16/948,370, 13 pages.

Intention to Grant, dated Nov. 3, 2022, received in Danish Patent Application No. 2020-70595, which corresponds with U.S. Appl. No. 16/948,370, 2 pages.

Notice of Allowance, dated Jan. 6, 2023, received in Japanese Patent Application No. 2020-160012, which corresponds with U.S. Appl. No. 16/948,370, 2 pages.

Patent, dated Oct. 21, 2022, received in Japanese Patent Application No. 2020-160013, which corresponds with U.S. Appl. No. 16/948,374, 2 pages.

Notice of Allowance, dated Dec. 26, 2022, received in Korean Patent Application No. 2020-0123967, which corresponds with U.S. Appl. No. 16/948,374, 2 pages.

Patent, dated Aug. 30, 2022, received in Japanese Patent Application No. 2020-160014, which corresponds with U.S. Appl. No. 16/948,375, 4 pages.

Final Office Action, dated Dec. 20, 2022, received in U.S. Appl. No. 17/483,751, 43 pages.

Office Action, dated Nov. 21, 2022, received in Korean Patent Application No. 2022-7032607, which corresponds with U.S. Appl. No. 17/940,858, 5 pages.

International Search Report and Written Opinion, dated Nov. 2, 2022, received in International Patent Application No. PCT/US2022028806, which corresponds with U.S. Appl. No. 17/483,751, 20 pages.

"Twitter Post [online]", https://twitter.com/ronamadeo/status/972152445848694789, Mar. 9, 2018, 2 pages.

Anonymous, "Create a Group of Notifications / Android Developers", https://web.archive.org/20181028202552/https://devloper.android.com/training/notif-user/group, Oct. 27, 2018, 5 pages.

Apple, "iPhone User Guide for iOS 7.1 Software", https://manuals.info.apple.com/en_US/iphone_ios7_user_guide.pdf, Mar. 10, 2014, 162 pages.

Apple, "Stay Focused While Driving with iPhone", https://support.apple.com/guide/iphone/turn-on-do-not-disturb-while-driving-iphae754533b/ios#:~:text=Send%20an%20auto%2Dreply%20text%20message%20that%20you're%20driving&text=Go%20to%

(56) References Cited

OTHER PUBLICATIONS

20Settings%20%3E%20Do%20Not%20Disturb%20%3E520Auto%2DReply%20To,re%20not%20in%20your%20Contacts, 2022, 2 pages.
Black, "Samsung Galaxy S7 Silent Alarm Fix", https://www.youtube.com/watch?v=35LQtw7ucaw, Jan. 20, 2017, 4 pages.
Bohn, "Why Android Notifications are Better Than The iPhone's", https://www.youtube.com/watch?v=bHtkjHSB5Nw, Apr. 18, 2018, 10 pages.
CNET, "Android Lollipop Lock-Screen Notification Tips", https://www.youtube.com/watch?v=LZTxHBOwzIU, Nov. 13, 2014, 3 pages.
Droid Life, "Android 5.0 Feature: Notification Access and Do Not Disturb", https://www.youtube.com/watch?v=SY2kAqCqOko, Oct. 17, 2014, 2 pages.
Frick, "Automatically Turn on Theater Mode on Android Wear Watch When Sleep Tracking", https://forum.urbandroid.org/t/automatically-turn-on-theater-mode-on-android-wear-watch-when-sleep-tracking/398, Mar. 6, 2018, 2 pages.
Google, "Limit Interruptions with Do Not Disturb on Android", https://support.google.com/android/answer/9069335?hl=en#zippy=%2Cset-what-to-block, 2022, 2 pages.
Hill, "From Oreo to Jelly Bean, Here's How to Turn Off Notifications in Android", https://web.archive.org/web/20180503062117/https://www.ditaltrends.com/android/how-to-turn-off-notifications-in-android, May 3, 2018, 10 pages.
Hill, Here's How to Use Do Not Disturb Mode in Android, https://web.archive.org/web/20180313165228/https://www.digitaltrends.com/mobile/do-not-disturb-mode-in-android, Mar. 13, 2018, 6 pages.
Hill, "How to Turn Off Notifications in Andoid", http://web.archive.org/web/20180203023547/https://www.digitaltrends.com/android/how-to-turn-off-notifications-in-android, Dec. 28, 2017, 16 pages.
IPhoneHacksTV, How to Group Notifications by App in iOS 9 Notification Center—iPhone Hacks, https://www.youtube.com/watch?v=j9kEN1_1yh8, Sep. 16, 2015, 2 pages.
IPhoneTricks.org, "How to Snooze or Stop an iPhone Alarm Without Looking at The Display?", https://www.iphonetricks.org/how-to-snooze-or-stop-an-iphone-alarm-without-looking-at-the-display, Nov. 29, 2016, 5 pages.
Isom, "How to Change iPhone Notification Settings", https://www.youtube.com/watch?v=P2Z4dvieB5k, Mar. 16, 2017, 3 pages.
Jason, "New iOS 8 Features that Apple Didn't Have Time to Tell us About Today", https://web.archive.org/web/20171018064601-features-hidden.html, Jun. 2, 2014, 7 pages.
Klein, "How Manage, Customize, and Block Notifications in Android Lollipop and Marshmellow", http://web.archive.org/web/20171229125502/https:www.howtogeek.com/202404/how-to-tame-notifications-in-android-5.0, Sep. 29, 2016, 11 pages.
Lew, "Correctly Handling Bundled Android Notifications", https://web.archive.org/web/20171210085025/https://blog.danlew.net/20171018064601/http://, Feb. 7, 2017, 5 pages.
MacRumors, "iOS 11: How to Use the Lock Screen and Notification Center", https://www.youtube.com/watch?v=BQDyGNO9oGc, Sep. 19, 2017, 4 pages.
Mcfasa09, "Toggle Theater Mode on Wear 2.0", https://www.reddit.com/r/AndroidWear/comments/64qitr/toggle_theater_mode_on_wear_20, Mar. 18, 2014, 3 pages.
Mediati, "Master Notifications in Android Lollipop with Notification Priority and Downtime", https:/web.archive.org/web/20180503062117/https://www.digitaltrends.com/android/how-to-turn-off-notifications-in-android, Dec. 3, 2014, 7 pages.
Phandroid, "Do Not Disturb" mode will save you from notification hell, https://www.youtube.com/watch?v=R6A2As4VJpl, Jan. 16, 2017, 3 pages.
Raphael, "Oh, Oreo! 8 Things to Try When You Get Andoid 8.0", https://web.archive.org/web/20171224100520/https://www.computerworld.com/article/32191126/android/oreo-android-8, Aug. 24, 2017, 10 pages.
Rosenbaun, "How to Keep your Apple Watch Quiet", https://www.theverge.com/2019/10/24/20930506/how-to-apple-watch-do-not-disturb-iphone-quiet-mute-theater-mode, Oct. 24, 2019, 8 pages.
Samsung, "Samsung Goodnight Mode", https:/www.samsung.com/us/support/answer/ANS00080310, 1995-2021, 2 pages.
Sony Xperia Z, "How to turn off alarm when it sounds", https://www.youtube.com/watch?v=eerWJMN7e5s, May 14, 2015, 3 pages.
Summerson, 'Android's Confusing "Do Not Disturb" Settings, Explained', https://www.howtogeek.com/260225/androids-confusing-do-not-disturb-settings-explained, Jul. 3, 2017, 8 pages.
Tantsissa Holdings, "Autosleep Seep Rings", http://autosleep.tantsissa.com/sleeprings, 2016-2010, 6 pages.
Tropical Tech, How to Set Up Do Not Disturb Mode Rules / Schedule in Android / 2018, http://www.youtube.com/watch?v=DLnGcpKHVyM, Sep. 4, 2017, 3 pages.
VikuBalupura, "[Android] Hands-On With Android P—Is This The Beginning of a New Design Language?", http://en.miui.com/thread-1995365-1-1.html, Mar. 10, 2018, 11 pages.
Wallen, "How to Customize Androlid Oreo Notifications With Categories", http://web.archive.org/web/20171017232141/https://www.techrepublic.com/article/how-to-customize-android-oreo-notifications-with-categories, Oct. 17, 2017, 14 pages.
Wayback Machine, "Nights Keeper", http://nightskeeper.com/?page_id=15, 2013, 9 pages.
Whitwam, Android N Feature Spotlight: Do Not Disturb Automatic Rules Get Option ToEnd DND on Next Alarm, https://www.androidpolice.com/2016/03/11/android-n-feature-spotlight-do-not-disturb-gets-option-to-end-automatically-on-next-alarm/, Mar. 11, 2016, 5 pages.
Whitwarm, "Android P Feature Spotlight: Android Will Offer to Hide Notifications From Apps You Frequently Dismiss", https://www.androidpolice.com/2018/03/12/android-P-feature-spotlight-android-will-offer-hide-notifications-apps-frequently-dismiss, Mar. 12, 2018, 5 pages.
Woodpress, "Features—Lighting Launcher", https://www.lightninglauncher.com/wordpress/features, 2021, 3 pages.
XDA Spotlight, "Lock Me Out", https://www.xda-developers.com/curb-android-smartphone-addiction-lock-me-out, Apr. 16, 2018, 7 pages.
YouTube, "Notification Digest", https://support.google.com/youtube/answer/9012820_at_00:38, Dec. 29, 2018, 1 page.
Office Action, dated Jan. 16, 2020, received in U.S. Appl. No. 16/142,599, 13 pages.
Notice of Allowance, dated Jul. 16, 2020, received in U.S. Appl. No. 16/142,599, 7 pages.
Notice of Allowance, dated Sep. 18, 2020, received in U.S. Appl. No. 16/142,599, 7 pages.
Office Action, dated Nov. 6, 2020, received in Chinese Patent Application No. 202010095124.8, which corresponds with U.S. Appl. No. 16/142,599, 11 pages.
Office Action, dated Jul. 7, 2021, received in Chinese Patent Application No. 202010095124.8, which corresponds with U.S. Appl. No. 16/142,599, 1 page.
Notice of Allowance, dated Aug. 9, 2021, received in Chinese Patent Application No. 202010095124.8, which corresponds with U.S. Appl. No. 16/142,599, 2 pages.
Patent, dated Oct. 29, 2021, received in Chinese Patent Application No. 202010095124.8, which corresponds with U.S. Appl. No. 16/142,599, 5 pages.
Office Action, dated Aug. 27, 2018, received in Danish Patent Application No. 201870333, which corresponds with U.S. Appl. No. 16/142,599, 9 pages.
Office Action, dated Nov. 12, 2018, received in Danish Patent Application No. 201870333, which corresponds with U.S. Appl. No. 16/142,599, 3 pages.
Office Action, dated May 14, 2019, received in Danish Patent Application No. 201870333, which corresponds with U.S. Appl. No. 16/142,599, 6 pages.
Office Action, dated Nov. 15, 2019, received in Danish Patent Application No. 201870333, 2 pages.
Intention to Grant, dated Dec. 19, 2019, received in Danish Patent Application No. 201870333, 2 pages.
Notice of Allowance, dated Apr. 2, 2020, received in Danish Patent Application No. 201870333, 4 pages.

(56) References Cited

OTHER PUBLICATIONS

Patent, dated May 15, 2020, received in Danish Patent Application No. 201870333, which corresponds with U.S. Appl. No. 16/142,599, 5 pages.
Office Action, dated Sep. 9, 2022, received in European Patent Application No. 1972341.6, which corresponds with U.S. Appl. No. 16/142,599, 8 Pages.
Office Action, dated Apr. 3, 2020, received in U.S. Appl. No. 16/145,068, 35 pages.
Final Office Action, dated Nov. 30, 2020, received in U.S. Appl. No. 16/145,068, 44 pages.
Office Action, dated Jul. 12, 2021, received in U.S. Appl. No. 16/145,068, 82 pages.
Notice of Allowance, dated Feb. 28, 2022, received in U.S. Appl. No. 16/145,068, 25 pages.
Notice of Allowance, dated Jul. 12, 2022, received in U.S. Appl. No. 16/145,068, 9 pages.
Office Action, dated Aug. 29, 2018, received in Danish Patent Application No. 201870334, which corresponds with U.S. Appl. No. 16/145,068, 9 pages.
Office Action, dated Mar. 5, 2019, received in Danish Patent Application No. 201870334, which corresponds with U.S. Appl. No. 16/145,068, 6 pages.
Office Action, dated Sep. 6, 2019, received in Danish Patent Application No. 201870334, which corresponds with U.S. Appl. No. 16/145,068, 4 pages.
Office Action, dated Apr. 22, 2020, received in Danish Patent Application No. 201870334, which corresponds with U.S. Appl. No. 16/145,068, 2 pages.
Office Action, dated Apr. 6, 2020, received in U.S. Appl. No. 16/145,074, 22 pages.
Final Office Action, dated Nov. 16, 2020, received in U.S. Appl. No. 16/145,074, 33 pages.
Office Action, dated Jun. 28, 2021, received in U.S. Appl. No. 16/145,074, 39 pages.
Notice of Allowance, dated Mar. 11, 2022, received in U.S. Appl. No. 16/145,074, 27 pages.
Notice of Allowance, dated Jul. 28, 2022, received in U.S. Appl. No. 16/145,074, 27 pages.
Office Action, dated Apr. 16, 2021, received in Australian Patent Application No. 2019265367, U.S. Appl. No. 16/145,074, 3 pages.
Notice of Allowance, dated Jan. 18, 2022, received in Australian Patent Application No. 2019265367, U.S. Appl. No. 16/145,074, 3 pages.
Certificate of Grant, dated May 19, 2022, received in Australian Patent Application No. 2019265367, U.S. Appl. No. 16/145,074, 3 pages.
Office Action, dated Jan. 24, 2022, received in Chinese Patent Application No. 201811165505.8, which corresponds with U.S. Appl. No. 16/145,074, 1 page.
Office Action, dated Oct. 19, 2022, received in Chinese Patent Application No. 201811165505.8, which corresponds with U.S. Appl. No. 16/145,074, 2 pages.
Office Action, dated Aug. 31, 2018, received in Danish Patent Application No. 201870335, which corresponds with U.S. Appl. No. 16/145,074, 9 pages.
Office Action, dated Dec. 20, 2018, received in Danish Patent Application No. 201870335, which corresponds with U.S. Appl. No. 16/145,074, 4 pages.
Office Action, dated Aug. 28, 2019, received in Danish Patent Application No. 201870335, which corresponds with U.S. Appl. No. 16/145,074, 5 pages.
Office Action, dated Apr. 20, 2020, received in Danish Patent Application No. 201870335, which corresponds with U.S. Appl. No. 16/145,074, 4 pages.
Office Action, dated Dec. 10, 2021, received in Japanese Patent Application No. 2020-557940, which corresponds with U.S. Appl. No. 16/145,074, 2 pages.
Notice of Allowance, dated Aug. 8, 2022, received in Japanese Patent Application No. 2020-557940, which corresponds with U.S. Appl. No. 16/145,074, 1 page.
Patent, dated Sep. 9, 2022, received in Japanese Patent Application No. 2020-557940, which corresponds with U.S. Appl. No. 16/145,074, 3 pages.
Office Action, dated Nov. 30, 2021, received in Korean Patent Application No. 2020-7037439, which corresponds with U.S. Appl. No. 16/145,074, 3 pages.
Notice of Allowance, dated Jul. 28, 2022, received in Korean Patent Application No. 2020-7037439, which corresponds with U.S. Appl. No. 16/145,074, 3 pages.
Office Action, dated Aug. 12, 2021, received in U.S. Appl. No. 16/948,370, 35 pages.
Final Office Action, dated Apr. 5, 2022, received in U.S. Appl. No. 16/948,370, 44 pages.
Notice of Allowance, dated Sep. 7, 2022, received in U.S. Appl. No. 16/948,370, 12 pages.
Office Action, dated Jun. 25, 2021, received in Australian Patent Application No. 2020233622, which corresponds with U.S. Appl. No. 16/948,370, 8 pages.
Notice of Allowance, dated Feb. 22, 2022, received in Australian Patent Application No. 2020233622, which corresponds with U.S. Appl. No. 16/948,370, 3 pages.
Office Action, dated Dec. 18, 2020, received in Danish Patent Application No. 2020-70595, which corresponds with U.S. Appl. No. 16/948,370, 9 pages.
Office Action, dated Sep. 30, 2021, received in Danish Patent Application No. 2020-70595, which corresponds with U.S. Appl. No. 16/948,370, 5 pages.
Office Action, dated May 19, 2022, received in Danish Patent Application No. 2020-70595, which corresponds with U.S. Appl. No. 16/948,370, 2 pages.
Office Action, dated Dec. 2, 2021, received in Indian Patent Application No. 202014040025, which corresponds with U.S. Appl. No. 16/948,370, 8 pages.
Office Action, dated Mar. 4, 2022, received in Japanese Patent Application No. 2020-160012, which corresponds with U.S. Appl. No. 16/948,370, 2 pages.
Office Action, dated Feb. 1, 2021, received in U.S. Appl. No. 16/948,374, 27 pages.
Final Office Action, dated Jun. 11, 2021, received in U.S. Appl. No. 16/948,374, 29 pages.
Office Action, dated Dec. 29, 2021, received in U.S. Appl. No. 16/948,374, 29 pages.
Final Office Action, dated May 6, 2022, received in U.S. Appl. No. 16/948,374, 27 pages.
Notice of Allowance, dated Sep. 28, 2022, received in U.S. Appl. No. 16/948,374, 13 pages.
Office Action, dated May 11, 2021, received in Australian Patent Application No. 2020239686, which corresponds with U.S. Appl. No. 16/948,374, 4 pages.
Notice of Allowance, dated Oct. 7, 2021, received in Australian Patent Application No. 2020239686, which corresponds with U.S. Appl. No. 16/948,374, 3 pages.
Patent, dated Feb. 10, 2022, received in Australian Patent Application No. 2020239686, which corresponds with U.S. Appl. No. 16/948,374, 3 pages.
Innovation Patent, dated Jun. 9, 2021, received in Australian Patent Application No. 2021102471, which corresponds with U.S. Appl. No. 16/948,374, 5 pages.
Office Action, dated Jul. 30, 2021, received in Australian Patent Application No. 2021102471, which corresponds with U.S. Appl. No. 16/948,374, 4 pages.
Innovation Patent, dated Jan. 31, 2022, received in Australian Patent Application No. 2021102471, which corresponds with U.S. Appl. No. 16/948,374, 3 pages.
Office Action, dated Dec. 21, 2020, received in Danish Patent Application No. 2020-70599, which corresponds with U.S. Appl. No. 16/948,374, 8 pages.
Office Action, dated Oct. 4, 2021, received in Danish Patent Application No. 2020-70599, which corresponds with U.S. Appl. No. 16/948,374, 2 pages.

(56) References Cited

OTHER PUBLICATIONS

Office Action, dated Jun. 2, 2022, received in Danish Patent Application No. 2020-70599, which corresponds with U.S. Appl. No. 16/948,374, 2 pages.
Office Action, dated Dec. 1, 2021, received in Indian Patent Application No. 202014040935, which corresponds with U.S. Appl. No. 16/948,374, 9 pages.
Office Action, dated Nov. 30, 2021, received in Japanese Patent Application No. 2020-160013, which corresponds with U.S. Appl. No. 16/948,374, 2 pages.
Notice of Allowance, dated Sep. 22, 2022, received in Japanese Patent Application No. 2020-160013, which corresponds with U.S. Appl. No. 16/948,374, 2 pages.
Office Action, dated May 29, 2022, received in Korean Patent Application No. 2020-0123967, which corresponds with U.S. Appl. No. 16/948,374, 3 pages.
Office Action, dated Jan. 8, 2021, received in U.S. Appl. No. 16/948,375, 19 pages.
Final Office Action, dated Mar. 9, 2021, received in U.S. Appl. No. 16/948,375, 19 pages.
Notice of Allowance, dated Jun. 24, 2021, received in U.S. Appl. No. 16/948,375, 6 pages.
Notice of Allowance, dated Oct. 26, 2021, received in U.S. Appl. No. 16/948,375, 5 pages.
Office Action, dated Apr. 13, 2021, received in Australian Patent Application No. 2020239689, which corresponds with U.S. Appl. No. 16/948,375, 8 pages.
Notice of Allowance, dated Oct. 5, 2021, received in Australian Patent Application No. 2020239689, which corresponds with U.S. Appl. No. 16/948,375, 3 pages.
Patent, dated Feb. 10, 2022, received in Australian Patent Application No. 2020239689, which corresponds with U.S. Appl. No. 16/948,375, 3 pages.
Office Action, dated Jan. 11, 2021, received in Danish Patent Application No. 2020-70629, which corresponds with U.S. Appl. No. 16/948,375, 10 pages.
Office Action, dated Sep. 15, 2022, received in Danish Patent Application No. 2020-70629, which corresponds with U.S. Appl. No. 16/948,375, 5 pages.
Office Action, dated Dec. 1, 2021, received in Indian Patent Application No. 202014040936, which corresponds with U.S. Appl. No. 16/948,375, 10 pages.
Office Action, dated Dec. 6, 2021, received in Japanese Patent Application No. 2020-160014, which corresponds with U.S. Appl. No. 16/948,375, 2 pages.
Notice of Allowance, dated Jul. 29, 2022, received in Japanese Patent Application No. 2020-160014, which corresponds with U.S. Appl. No. 16/948,375, 2 pages.
Office Action, dated Apr. 22, 2022, received in U.S. Appl. No. 17/084,579, 10 pages.
Office Action, dated May 5, 2022, received in U.S. Appl. No. 17/084,579, 11 pages.
Final Office Action, dated Oct. 11, 2022, received in U.S. Appl. No. 17/084,579, 12 pages.
Office Action, dated Jul. 27, 2022, received in U.S. Appl. No. 17/483,751, 30 pages.
Notice of Allowance, dated Feb. 2, 2022, received in U.S. Appl. No. 17/483,757, 35 pages.
Notice of Allowance, dated Mar. 30, 2022, received in U.S. Appl. No. 17/483,757, 5 pages.
Invitation to Pay Additional Fees, dated Jun. 17, 2019, received in International Patent Application No. PCT/US2019/026353, which corresponds with U.S. Appl. No. 16/142,599, 19 pages.
International Search Report and Written Opinion, dated Aug. 7, 2019, received in International Patent Application No. PCT/US2019/026353, which corresponds with U.S. Appl. No. 16/142,599, 26 pages.
International Search Report and Written Opinion, dated May 28, 2019, received in International Patent Application No. PCT/US2019/026349, which corresponds with U.S. Appl. No. 16/145,068, 16 pages.
Invitation to Pay Additional Fees, dated Aug. 6, 2021, received in International Patent Application No. PCT/US2021/031131, which corresponds with U.S. Appl. No. 16/948,370, 5 pages.
Notice of Allowance, dated Apr. 19, 2019, received in U.S. Appl. No. 15/707,757, 8 pages.
Notice of Allowance, dated Aug. 6, 2019, received in U.S. Appl. No. 15/707,757, 8 pages.
Patent, dated Jun. 27, 2023, received in Chinese Patent Application No. 201811165505.8, which corresponds with U.S. Appl. No. 16/145,074, 5 pages.
Office Action, dated Jul. 13, 2020, received in U.S. Appl. No. 16/730,921, 7 pages.
Notice of Allowance, dated Jul. 29, 2020, received in U.S. Appl. No. 16/730,921, 8 pages.
Patent, dated Jun. 20, 2023, received in Danish Patent Application No. 2020-70595, which corresponds with U.S. Appl. No. 16/948,370, 8 pages.
Office Action, dated Apr. 20, 2023, received in Korean Patent Application No. 2020-0123965, which corresponds with U.S. Appl. No. 16/948,370, 4 pages.
Office Action, dated Jul. 26, 2021, received in U.S. Appl. No. 17/112,883, 9 pages.
Notice of Allowance, dated Feb. 4, 2022, received in U.S. Appl. No. 17/112,883, 8 pages.
Office Action, dated May 18, 2023, received in Australian Patent Application No. 2022203663, which corresponds with U.S. Appl. No. 18/100,530, 3 pages.
Office Action, dated Sep. 7, 2023, received in Australian Patent Application No. 2022203663, which corresponds with U.S. Appl. No. 18/100,530, 4 pages.
Office Action, dated Feb. 7, 2023, received in U.S. Appl. No. 17/831,384, 9 pages.
Office Action, dated Oct. 10, 2023, received in U.S. Appl. No. 17/940,858, 32 pages.
Notice of Allowance, dated May 30, 2023, received in Korean Patent Application No. 2022-7032607, which corresponds with U.S. Appl. No. 17/940,858, 2 pages.
Patent, dated Aug. 29, 2023, received in Korean Patent Application No. 2022-7032607, which corresponds with U.S. Appl. No. 17/940,858, 4 pages.
Office Action, dated Sep. 19, 2023, received in Korean Patent Application No. 2023-7029431, 9 pages.
Invitation to Pay Additional Fees, dated Sep. 20, 2023, received in International Patent Application No. PCT/US2023/021750, 10 pages.
Invitation to Pay Additional Fees, dated Oct. 2, 2023, received in International Patent Application No. PCT/US2023/024363, 15 pages.
Office Action, dated Jan. 5, 2024, received in Korean Patent Application No. 2020-0123965, which corresponds with U.S. Appl. No. 16/948,370, 3 pages.
Office Action, dated Apr. 20, 2023, received in Korean Patent Application No. 2020-0123973, which corresponds with U.S. Appl. No. 16/948,375, 5 pages.
Final Office Action, dated Jan. 12, 2024, received in Korean Patent Application No. 2020-0123973, which corresponds with U.S. Appl. No. 16/948,375, 5 pages.
Final Office Action, dated Oct. 19, 2023, received in U.S. Appl. No. 17/483,751, 51 pages.
Office Action, dated Jan. 12, 2024, received in U.S. Appl. No. 18/199,331, 19 pages.
Office Action, dated Dec. 4, 2023, received in Japanese Patent Application No. 2022-135135, which corresponds with U.S. Appl. No. 18/100,530, 6 pages.
Notice of Allowance, dated Apr. 8, 2024, received in Japanese Patent Application No. 2022-135135, which corresponds with U.S. Appl. No. 18/100,530, 2 pages.
Notice of Allowance, dated Aug. 4, 2023, received in U.S. Appl. No. 17/831,384, 8 pages.
Notice of Allowance, dated Apr. 8, 2024, received in U.S. Appl. No. 17/940,858, 9 pages.

(56) References Cited

OTHER PUBLICATIONS

Notice of Allowance, dated Jan. 5, 2024, received in Japanese Patent Application No. 2020-142215, which corresponds with U.S. Appl. No. 17/940,858, 2 pages.
Patent, dated Jan. 25, 2024, received in Japanese Patent Application No. 2020-142215, which corresponds with U.S. Appl. No. 17/940,858, 3 pages.
International Search Report and Written Opinion, dated Nov. 23, 2023, received in International Patent Application No. PCT/US2023/024363, which corresponds with U.S. Appl. No. 18/199,331, 20 pages.
Notice of Allowance, dated Jan. 22, 2025, received in U.S. Appl. No. 17/483,751, 11 pages.
Office Action, dated Jan. 14, 2025, received in U.S. Appl. No. 18/199,331, 20 pages.
Notice of Allowance, dated Jan. 15, 2025, received in U.S. Appl. No. 18/398,059, 8 pages.
Notice of Allowance, dated Nov. 21, 2024, received in Korean Patent Application No. 2020-0123965, which corresponds with U.S. Appl. No. 16/948,370, 3 pages.
Office Action, dated Nov. 12, 2024, received in Chinese Patent Application No. 202111351532.6, 1 page.
7Labs, "How to Change Wallpaper Automatically on iPhone or iPad", https://7lads.io/mobile/iphone/change-wallpaper-automatically-on-ios-or-ipados.html, Dec. 6, 2020, 9 pages.
Amadeo, "Google Pixel 3 hands-on Not the best first impression", https://arstechnica.com/gadgets/2028/10/scratching-the-surface-of-googles-newest-smartphone-hands-on-with-the-pixel-3#h1, 16 pages.
Android, Ambient Mode: Android's Proactive Google Assistant, https://www.youtube.com/watch?v=vaRzJo_19nY, 2 pages.
Johnson, "Google Pixel Stand (2nd gen) review: nice but not a must-have", https://www.theverge.com/22894924/google-pixel-stand-2nd_gen_review_price-specs, 11 pages.
MGT—Max Games Tech, How to Change Watch faces on Apple Watch 6 (Use Swipe or Digital Crown), https://www.youtube.com/watch?v=N2YmeYy4Z9c, 2021, 2 pages.
Samsung, "How to Use the Focus Mode Feature in Android Q with One UI 2.0?", http://www.samsung.com/ae/support/mobile-devices/how-to-use-the-focus-mode-feature-in-android-q-with-one-ui-20/, Nov. 22, 2021, 4 pages.
Wells, "Google Assistant's Ambient Mode: What it is and How to Use it", https://www.lifewire.com/ambient-mode-in-google-assistant-5191407, 8 pages.
Office Action, dated Jul. 1, 2024, received in Korean Patent Application No. 2020-0123973, which corresponds with U.S. Appl. No. 16/948,375, 5 pages.
Notice of Allowance, dated Sep. 13, 2024, received in Korean Patent Application No. 2020-0123973, which corresponds with U.S. Appl. No. 16/948,375, 2 pages.
Notice of Allowance, dated Sep. 16, 2024, received in U.S. Appl. No. 17/483,751, 11 pages.
Office Action, dated Jul. 24, 2024, received in U.S. Appl. No. 18/144,749, 31 pages.
Final Office Action, dated Sep. 13, 2024, received in U.S. Appl. No. 18/199,331, 18 pages.
Notice of Allowance, dated May 29, 2024, received in Korean Patent Application No. 2023-7029431, 3 pages.
Patent, dated Jul. 23, 2024, received in Korean Patent Application No. 2023-7029431, 6 pages.
Office Action, dated Jul. 9, 2024, received in U.S. Appl. No. 18/398,059, 10 pages.
Office Action, dated Jul. 31, 2024, received in Korean Patent Application No. 2024-7024732, 7 pages.
Notice of Allowance, dated Feb. 24, 2025, received in U.S. Appl. No. 17/084,579, 7 pages.
Notice of Allowance, dated Mar. 7, 2025, received in Japanese Patent Application No. 2023-567948, which corresponds with U.S. Appl. No. 17/483,751, 2 pages.
Patent, dated Apr. 9, 2025, received in Japanese Patent Application No. 2023-567948, which corresponds with U.S. Appl. No. 17/483,751, 5 pages.
Final Office Action, dated Feb. 3, 2025, received in U.S. Appl. No. 18/144,749, 30 pages.
Notice of Allowance, dated Apr. 25, 2025, received in U.S. Appl. No. 18/144,749, 7 pages.
Office Action, dated Mar. 19, 2025, received in Indian Patent Application No. 202217070342, which corresponds with U.S. Appl. No. 18/100,530, 9 pages.
Notice of Allowance, dated Jan. 31, 2025, received in Japanese Patent Application No. 2024-008169, 2 pages.
Patent, dated Feb. 26, 2025, received in Japanese Patent Application No. 2024-008169, 6 pages.
Choe, et al., "SleepTight: Low-burden, Self-monitoring Technology for Capturing and Reflecting on Seep Behaviors", Human Factors in Computing Systems, ACM, 2 Penn Plaza, Suite701 New York, NY 10121-0701 USA, Sep. 7, 2015, 12 pages.
Office Action, dated Jul. 15, 2025, received in European U.S. Appl. No. 16/948,374, which corresponds with U.S. Appl. No. 16/948,374, 13 pages.
Office Action, dated Aug. 21, 2025, received in Korean Patent Application No. 2023-7040024, which corresponds with U.S. Appl. No. 17/483,751, 8 pages.
Patent, dated Jul. 24, 2025, received in Korean Patent Application No. 2024-7024732, 6 pages.
Office Action, dated May 30, 2025, received in Chinese Patent Application No. 202111351532.6, 2 pages.
Notice of Allowance, dated Jun. 4, 2025, received in U.S. Appl. No. 18/398,059, 8 pages.
Notice of Allowance, dated Apr. 30, 2025, received in Korean Patent Application No. 2024-7024732, 2 pages.

\* cited by examiner

6016 In response to detecting the first input that is directed to the respective user interface:
in accordance with a determination that the first input meets the first criteria and does not meet second criteria different from the first criteria, and that the second user interface was displayed when the first input was detected, forgo replacing display of the second user interface with the third user interface 6018 After replacing display of the second user interface with display of the first user interface, detect a second input directed to the first user interface; and in response to detecting the second input directed to the first user interface, in accordance with a determination that the second input meets the first criteria, replace display of the first user interface with the third user interface 6020 The scheduled mode change starts at a first scheduled start time and ends at a first scheduled end time that is different from the first scheduled start time, and during the scheduled mode change, the computer system operates with settings that correspond to a reduced level of user interactions with the computer system.

6022 The second user interface includes one or more selectable options corresponding to preset application functions of one or more applications, wherein activation of a respective selectable option corresponding to a first preset application function of the preset application functions of the one or more applications causes performance of the first preset application function 6024 The second user interface includes a selectable user interface object that, when activated, causes display of an editing user interface that includes selectable options for configuring the preset application functions to be included on the second user interface 6026 The one or more selectable options corresponding to preset application functions of one or more applications include:
a first selectable option corresponding to a first preset application function of a first application, wherein the first selectable option, when selected, causes the computer system to display the first application; and
a second selectable option corresponding to a second preset application function of a second application, wherein the second selectable option, when selected, causes the computer system to perform a preset operation of the second application

Figure 6B

6028 In accordance with a determination the current time is within the first preset time period of the scheduled mode change, operating the computer system with an activated Do-Not-Disturb mode of the computer system 6030 After replacing the second user interface with the third user interface, detect that the computer system has reentered the restricted state of the computer system;
    after the computer system has reentered the restricted state of the computer system and while the computer system is in the restricted state, receive a third input; and
    in response to receiving the third input, in accordance with a determination that the current time is within the first preset time period, redisplay the second user interface 6032 The first preset time period preceding or following the scheduled mode change has a duration that is preselected by a user 6034 The second user interface includes a selectable option that corresponds to an alarm for an end time of the scheduled mode change, and the method further includes:
    detecting a fourth input that is directed to the selectable option that corresponds to the alarm for the end time of the scheduled mode change; and
    in response to detecting the fourth input, displaying a fourth user interface that includes user selectable options for modifying one or more aspects of an upcoming occurrence of the scheduled mode change 6036 In accordance with a determination that the second user interface is displayed and that the current time corresponds to a start time of the scheduled mode change, replace display of the second user interface with a fifth user interface that corresponds to the restricted state, wherein the fifth user interface includes a reduced amount of user interface objects as compared to the second user interface that corresponds to the restricted state 6038 Replacing the second user interface with the fifth user interface includes gradually reducing luminance of the display generation component from a first luminance level to a second luminance level that is lower than the first luminance level 6040 The first user interface and the second user interface display the current time, and the fifth user interface does not display the current time

Figure 6C

6042 The second user interface includes a selectable user interface object that, when activated, causes a container user interface object that includes one or more selectable options corresponding to preset application functions of one or more applications to be displayed, wherein the one or more selectable options corresponding to the preset application functions, when activated, cause performance of the corresponding preset application functions 6044 At a first time, in accordance with a determination that the current time corresponds to an end time of the scheduled mode change:
  output an indication that the end time of the scheduled mode change has been reached;
  display a first selectable option to adjust the end time of the scheduled mode change to a later time and a second selectable option to stop outputting the indication without adjusting the end time of the scheduled mode change;
at a second time later than the first time, detect a user input selecting a respective one of the first selectable option and the second selectable option; and
in response to detecting the user input selecting the respective one of the first and second selectable options:
  in accordance with a determination that the first selectable option was selected:
    maintain display of the fifth user interface; and
    after a predefined delay, output the indication that the adjusted end time of the scheduled mode change has been reached; and
  in accordance with a determination that the second selectable option was selected:
    display a sixth user interface that corresponds to the restricted state of the computer system, wherein the sixth user interface is different from the fifth user interface and the second user interface

Figure 6D

8010 The reminder for increasing the first battery level above the first preset battery level is displayed concurrently with a reminder that the scheduled mode change is about to start 8012 The reminder for increasing the first battery level above the first preset battery level is displayed concurrently with a reminder that the scheduled mode change is about to start on a first user interface that corresponds to a restricted state of the first computer system, and the method includes:

while displaying the first user interface that corresponds to the restricted state of the first computer system, detect a first user input directed to the first user interface; and in response to detecting the first user input directed to the first user interface:

in accordance with a determination that the first input meets first criteria, replace display of the first user interface with a second user interface that corresponds to the restricted state of the first computer system, wherein the second user interface is different from the first user interface 8014 The reminder for increasing the first battery level and the reminder that the scheduled mode change is about to start are displayed, via the first display generation component, in a notification that overlays a first user interface that corresponds to a restricted state of the computer system 8016 The first battery level is a battery level of a second computer system distinct from the first computer system, and wherein the first computer system displays the reminder increasing the first battery level above the first preset battery level in a user interface that corresponds to a restricted mode of the first computer system 8018 At a time after displaying the reminder, in accordance with a determination that the current time is within the first preset time period preceding the scheduled mode change and in accordance with a determination that a third battery level is at or above a third preset battery level, display, via the display generation component, a notification of the third battery level 8020 The first computer system is paired with a second computer system, the first battery level is a battery level of the second computer system, and the method includes:

at a time after displaying the reminder, in accordance with a determination that a fourth battery level of the second computer system is at or above a fourth preset battery level, display, via the display generation component, a notification of the third battery level

Figure 8B

10012 The first user interface includes one or more user interface objects that are configured to receive user inputs that specify one or more days corresponding to the first scheduled sleep period, and the method includes:
receive a second user input, via the first user interface, selecting a plurality of days for the first scheduled sleep period, wherein the first scheduled sleep period for the sleep schedule is applied for each day of the selected plurality of days 10014 Display in a second user interface for modifying the first scheduled sleep period for a respective day of the selected plurality of days, wherein the second user interface includes one or more user interface objects that are configured to receive user inputs that specify at least one of the start time and the end time of the first scheduled sleep period for the respective day;

Receive, via the first user interface, a third user input that specifies a second time value, different from the first time value, that specifies at least one of the start time and the end time of the first scheduled sleep period for the respective day; and In response to receiving the third user input, modify the first scheduled sleep period for the respective day of the selected plurality of days in accordance with the second time value, without modifying the first scheduled sleep period for other days of the selected plurality of days 10016 the computer system is a first electronic device that is communicatively coupled with a second electronic device, and the method includes:

in accordance with a determination that a current time matches the end time of the first scheduled sleep period for the sleep schedule, provide a first alert at the first electronic device after a second alert is provided at the second electronic device

Figure 10B

10018 Display a second user interface that includes a first portion that displays:

the start time and the end time of the first scheduled sleep period; and an indication of a type of notification to be presented at the end time of the first scheduled sleep period 10020 The sleep schedule includes the first scheduled sleep period and a second scheduled sleep period;

the first scheduled sleep period is applied to a first set of days of a week; and the second scheduled sleep period is applied to one or more days of the week that is not included in the first set of days of the week; and the second user interface displays:

a start time and an end time of the second scheduled sleep period; and an indication of a type of notification to be presented at the end time of the second scheduled sleep period 10022 After the first scheduled sleep period for a respective day of the sleep schedule has ended, determine whether an actual sleep duration of a user meets the preset threshold duration; and in accordance with a determination that the actual sleep duration of the user meets the preset threshold duration, display a third visual indication regarding satisfaction of the preset threshold duration; and in accordance with a determination that the actual sleep duration of the user does not meet the preset threshold duration, forgo displaying a fourth visual indication regarding failure to meet the preset threshold duration

Figure 10C

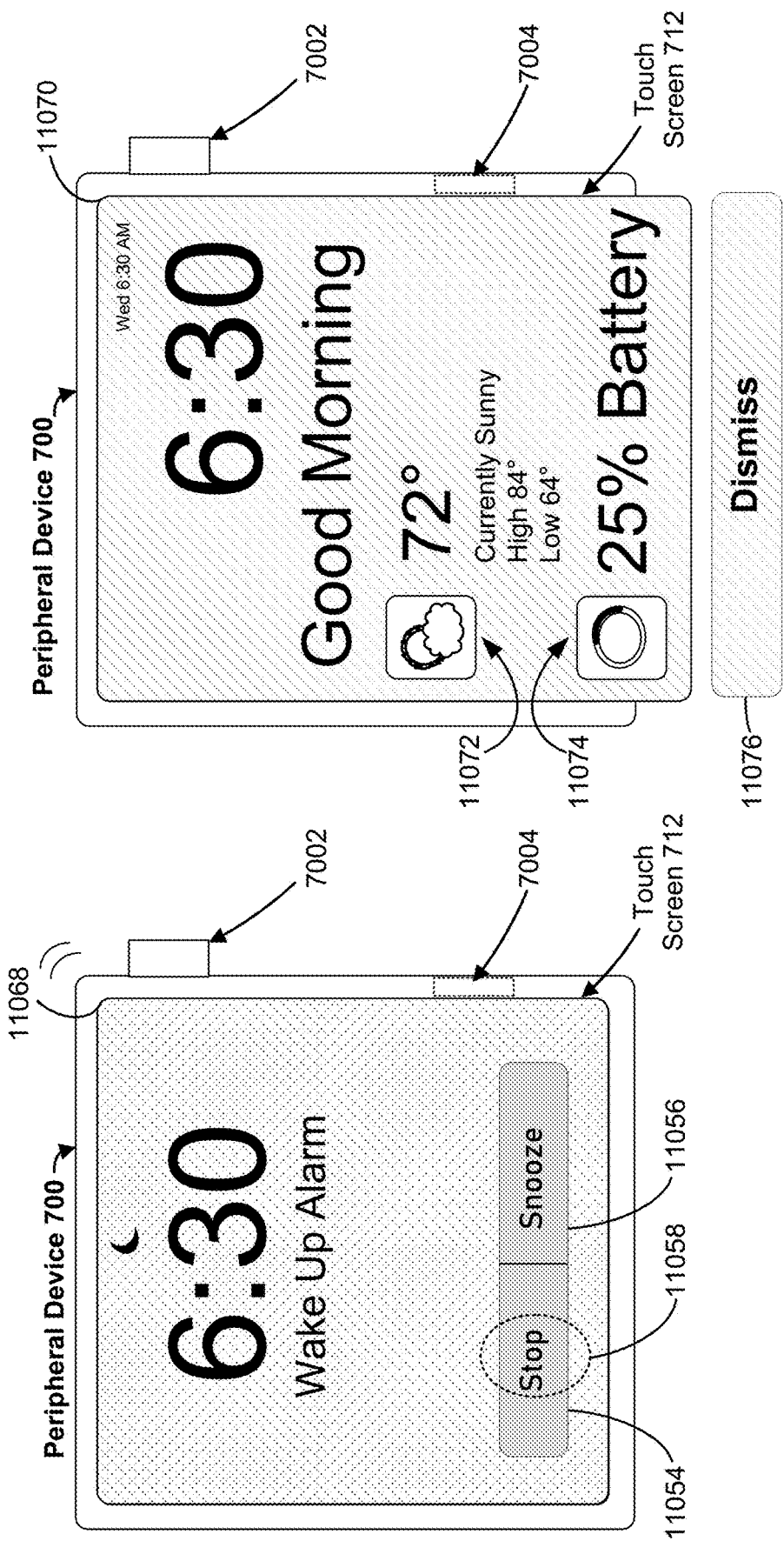

12010 Configuring the computer system to operate in the first mode includes at least partially disabling multiple input mechanisms in communication with the computer system, except the second input mechanism 12012 Configuring the computer system to operate in the first mode includes maintaining a display generation component of the computer system in an inactive or low power state while the computer system remains in the first mode 12014 The set of one or more predefined criteria includes a requirement for a characteristic movement of the second input mechanism 12016 While detecting, via the second input mechanism, the first user input, in accordance with a determination that a current progress of the first user input at least partially meets the set of one or more predefined criteria, output an indication that the second input mechanism is engaged on a display generation component in communication with the computer system 12018 Detect termination of the first user input; and in response to detecting the termination of the first user input, in accordance with a determination that the one or more characteristics of the first user input do not meet the set of one or more predefined criteria, cease to output the indication that the second input mechanism is engaged on the display generation component 12020 Transition the computer system into the second mode includes outputting an indication that the computer system has transitioned into the second mode 12022 In accordance with a determination that the current time is within a first scheduled sleep time period of an active sleep schedule and that one or more relocking criteria are met, transition the computer system into the first mode

Figure 12B

12024 In accordance with a determination that the current time is within a preset time period preceding the first scheduled sleep time period of the active sleep schedule, display a reminder to charge the computer system 12026 While the computer system is in the first mode, and in accordance with a determination that the current time is an end time of the first scheduled sleep time period of the active sleep schedule, generate an alarm output indicating that the end time of the first scheduled sleep time period has been reached, wherein another alarm output indicating that the end time of the first scheduled sleep time period has been reached is provided on a companion device of the computer system with a delayed relative to the alarm output generated at the computer system 12028 Activating a snooze function associated with the alarm output on either one of the computer system and the companion device causes a snooze function for the other of the computer system and the companion device 12030 Dismissing the alarm output on either one of the computer system and the companion device causes dismissal of the alarm output on the other of the computer system and the companion device 12032 If the alarm output on either one of the computer system and the companion device is not generated due to low battery level at said one of the computer system and the companion device, the alarm output is still generated at the other of the computer system and the companion device 12034 If the computer system ceases to be coupled to the companion device before the end time of the first scheduled sleep time period is reached, the alarm output is generated at the companion device without the delay

Figure 12C

12036 In accordance with a determination that the current time is after an end time of the first scheduled sleep time period of the active sleep schedule and that the computer system has transitioned into the second mode, display a reminder for charging the computer system 12038 In accordance with a determination that the current time is after an end time of the first scheduled sleep time period of the active sleep schedule and that the computer system has transitioned into the second mode, display one or more notifications based on recorded sleep data for multiple consecutive days of the active sleep schedule that indicate satisfaction of a preset sleep goal 12040 In accordance with a determination that the current time is after an end time of the first scheduled sleep time period of the active sleep schedule and that the computer system has transitioned into the second mode, display one or more notifications based on recorded sleep data for the previous day that indicate satisfaction of a preset sleep goal 12042 Configuring the computer system to operate in the first mode includes maintaining a Do Not Disturb mode of the computer system and displaying, on a display generation component in communication with the computer system, a visual indicator of the Do Not Disturb mode 12044 Detect inputs indicative of an activity level of a user of the computer system during the first scheduled sleep time period of the active sleep schedule; and in accordance with a determination that the inputs correspond to a wake state of the user, and that the current time is before an end time of the first scheduled sleep time period of the active sleep schedule, display a user interface through which selecting an affordance using the first input mechanism is temporarily enabled, wherein the user interface provides a first affordance, when activated through the first input mechanism, preemptively cancels an alarm output scheduled to go off at the end time of the first scheduled sleep time period 12046 The user interface provides a second affordance, when activated through the first input mechanism, dismisses the user interface without canceling the alarm output scheduled to go off at the end time of the first scheduled sleep time period

Figure 12D

SYSTEM, METHOD AND USER INTERFACE FOR SUPPORTING SCHEDULED MODE CHANGES ON ELECTRONIC DEVICES

RELATED APPLICATIONS

This application is a continuation of U.S. application Ser. No. 16/948,374, filed Sep. 15, 2020, which claims priority to U.S. Provisional Application Ser. No. 63/023,214, filed May 11, 2020, both of which are incorporated herein by reference in its entirety.

FIELD

The present disclosure relates generally to computer user interfaces, and more specifically to techniques for supporting scheduled mode changes on electronic devices, such as scheduled mode changes that correspond to a sleep schedule established on the electronic devices.

BACKGROUND

The use of portable electronic devices has increased significantly in recent years, with many applications typically residing in the memory of such devices. Example applications include communications applications (e.g., messaging and telephone), calendar applications, news applications, media playback applications (e.g., podcast, music, and video), payment applications, reminder applications, social media applications, and service delivery applications. These applications generate events, which contain information of varying degrees of importance to users. Notifications that correspond to the generated events may be displayed. Example notifications include digital images, video, text, icons, control elements (such as buttons) and/or other graphics to notify users of events. Example applications that generate notifications include messaging applications (e.g., iMessage or Messages from Apple Inc. of Cupertino, California), calendar applications (e.g., iCal or Calendar from Apple Inc. of Cupertino, California), news applications (e.g., Apple News from Apple Inc. of Cupertino, California), media playback applications (e.g., Podcasts, Apple Music and iTunes from Apple Inc. of Cupertino, California), payment applications (e.g., Apple Pay from Apple Inc. of Cupertino, California), reminder applications (e.g., Reminders from Apple Inc. of Cupertino, California), social media applications, and service delivery applications.

BRIEF SUMMARY

Conventionally, a user may utilize an electronic device to set up a wake time alarm using an alarm application, manually enabling a Do Not Disturb (DND) mode of the electronic device using a settings application, and/or enable sleep quality tracking using a health application, etc. But current user interfaces for establishing a sleep schedule and related functions are cumbersome and inefficient. For example, to enable the different functions related to sleep, the device requires the user to use different applications that do not coordinate their operations. To establish or modify some sleep-related functions, some devices require the user to navigate to obscure, hard-to-find settings user interfaces of the devices' operating systems. At the present, there is no simple way for a user to easily establish and/or adjust the functions related to a user's sleep schedule. Existing methods take longer than necessary, thereby wasting energy. This latter consideration is particularly important in battery-operated devices.

As described above, some techniques for establishing and adjusting functions related to a sleep schedule using electronic devices are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique may provide electronic devices with faster, more efficient methods and interfaces for establishing and adjusting functions related to a sleep schedule. In addition, the present technique may enable additional functions that promotes user's compliance of an established sleep schedule and improve the user's experience when using the electronic device to support his/her sleep schedule. Such methods and interfaces optionally complement or replace other methods for establishing and adjusting functions related to a sleep schedule, promoting user's compliance of the established sleep schedule, and improving the user's experience when using the electronic device to support his/her sleep schedule. Such methods and interfaces may reduce the cognitive burden on a user and produce a more efficient human-machine interface. For battery-operated computing devices, such methods and interfaces may conserve power and increase the time between battery charges.

In some embodiments, a device implementing the present techniques is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, a user interacts with the touch screen GUI primarily through stylus and/or finger contacts and gestures on the touch-sensitive surface. In some embodiments, a user interacts with the touch screen GUI of the device to perform or enable functions that optionally include image editing, drawing, presenting, word processing, spreadsheet making, game playing, telephoning, video conferencing, e-mailing, instant messaging, workout support, digital photographing, digital videoing, web browsing, digital music playing, note taking, digital video playing, and system level operations, such as displaying a home screen, locking a device, displaying a system-level notification screen, displaying a system-level control panel user interface, etc. Executable instructions for performing these functions are, optionally, included in a non-transitory computer readable storage medium or other computer program product configured for execution by one or more processors.

In accordance with some embodiments, a method is performed at an electronic device including a display generation component and one or more input devices. The method includes, displaying, via the display generation component, a respective user interface that corresponds to a restricted state of the computer system, including: in accordance with a determination that a current time is outside of a first preset time period preceding or following a scheduled mode change for the computer system, displaying a first user interface that corresponds to the restricted state of the computer system; and in accordance with a determination that the current time is within the first preset time period preceding or following the scheduled mode change, displaying a second user interface that corresponds to the restricted state of the computer system, the second user interface being different from the first user interface. The method further includes, while displaying the respective user interface that corresponds to the restricted state of the computer system, detecting a first input directed to the respective user interface; in response to detecting the first input directed to the respective user interface: in accordance with a determination that the first input meets first criteria, and that the first user interface was displayed when the first input was detected, replacing display of the first user interface with a third user interface that is different from the first user interface and the second user interface; and in accordance with a determination that the first input meets second criteria different from the first criteria, and that second user interface was displayed when the first input was detected, replacing display of the second user interface with display of the first user interface.

In accordance with some embodiments, a method is performed at an electronic device including a display generation component and one or more input devices. The method includes, in accordance with a determination that a current time is within a first preset time period preceding a scheduled mode change and in accordance with a determination that a first battery level is below a first preset battery level, displaying, via the first display generation component, a reminder for increasing the first battery level above the first preset battery level; and in accordance with a determination that the current time is outside of the first preset time period preceding the scheduled mode change and in accordance with a determination that the first battery level is below the first preset battery level, forgoing display of the reminder for increasing the first battery level above the first preset battery level.

In accordance with some embodiments, a method is performed at an electronic device including a display generation component and one or more input devices. The method includes, displaying a first user interface for specifying a sleep schedule, the first user interface including one or more user interface objects that are configured to receive user inputs that specify at least one of a start time and an end time of a first scheduled sleep period for the sleep schedule. The method further includes receiving, via the first user interface, a first user input that specifies a first time value that specifies at least one of the start time and the end time of the first scheduled sleep period for the sleep schedule; in response to receiving the first user input: in accordance with a determination that a duration of the first scheduled sleep period that is determined based on the first time value is below a preset threshold duration, displaying a first visual indication that the duration of the first scheduled time period is below the preset threshold duration, wherein a first value is selected for a first display property of the first visual indication while the duration remains below the preset threshold duration; and in accordance with a determination that the duration of the first scheduled time period that is determined based on the first time value is at or above the preset threshold duration, displaying, a second visual indication that the duration of the first scheduled time period is meets the preset threshold duration, wherein a second value, different from the first value, is selected for the first display property of the second visual indication while the duration remains at or above the preset threshold duration.

In accordance with some embodiments, a method is performed at an electronic device including a display generation component and one or more input devices. The method includes, in accordance with a determination that a current time is within a first scheduled sleep time period of an active sleep schedule, configuring the computer system to operate in a first mode, wherein user input selecting an affordance using the first input mechanism is disabled in the first mode. The method further includes, while the electronic system is in the first mode, detecting, via the second input mechanism, first user input; and in accordance with a determination that one or more characteristics of the first user input meet a set of one or more predefined criteria, transitioning the computer system into a second mode different from the first mode, wherein user input selecting an affordance using the first input mechanism is enabled in the second mode; and in accordance with a determination that the one or more characteristics of the first user input do not meet the set of one or more predefined criteria, remaining in the first mode and foregoing transitioning the computer system into the second mode.

In accordance with some embodiments, an electronic device includes a display, a touch-sensitive surface, optionally one or more sensors to detect intensities of contacts with the touch-sensitive surface, optionally one or more tactile output generators, one or more processors, and memory storing one or more programs; the one or more programs are configured to be executed by the one or more processors and the one or more programs include instructions for performing or causing performance of the operations of any of the methods described herein. In accordance with some embodiments, a non-transitory computer readable storage medium has stored therein instructions, which, when executed by an electronic device with a display, a touch-sensitive surface, optionally one or more sensors to detect intensities of contacts with the touch-sensitive surface, and optionally one or more tactile output generators, cause the device to perform or cause performance of the operations of any of the methods described herein. In accordance with some embodiments, a graphical user interface on an electronic device with a display, a touch-sensitive surface, optionally one or more sensors to detect intensities of contacts with the touch-sensitive surface, optionally one or more tactile output generators, a memory, and one or more processors to execute one or more programs stored in the memory includes one or more of the elements displayed in any of the methods described herein, which are updated in response to inputs, as described in any of the methods described herein. In accordance with some embodiments, an electronic device includes: a display, a touch-sensitive surface, optionally one or more sensors to detect intensities of contacts with the touch-sensitive surface, and optionally one or more tactile output generators; and means for performing or causing performance of the operations of any of the methods described herein. In accordance with some embodiments, an information processing apparatus, for use in an electronic device with a display, a touch-sensitive surface, optionally one or more sensors to detect intensities of contacts with the touch-sensitive surface, and optionally one or more tactile output generators, includes means for performing or causing performance of the operations of any of the methods described herein.

Thus, electronic devices with displays, touch-sensitive surfaces, optionally one or more sensors to detect intensities of contacts with the touch-sensitive surface, optionally one or more tactile output generators, optionally one or more device orientation sensors, and optionally an audio system, are provided with improved methods and interfaces for navigating between user interfaces and interacting with control objects thereby increasing the effectiveness, efficiency, and user satisfaction with such devices. Such methods and interfaces may complement or replace conventional methods for establishing and adjusting functions related to a sleep schedule.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 6A-6D are flowchart diagrams of a method of providing enhanced access restriction during a preset time period before and/or after a scheduled mode change, in accordance with some embodiments.

FIGS. 8A-8B are flowchart diagrams of a method of generating battery charging alerts during a preset time period before the start of the scheduled mode change, in accordance with some embodiments.

FIGS. 10A-10C are flowchart diagrams of a method of providing a visual alert when a duration of a sleep time period is adjusted by a user below an established sleep goal, in accordance with some embodiments.

FIGS. 12A-12D are flowchart diagrams of a method of disabling and enabling an input mechanism of an electronic device during a scheduled restricted mode, in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing sleep schedules and related functions, promoting user's adherence to the established sleep schedules, and improving user's experience using the electronic device to manage his/her sleep quality. Such techniques can reduce the cognitive burden on a user who accesses event notifications, thereby enhancing productivity. Further, such techniques can reduce processor and battery power otherwise wasted on redundant user inputs.

Figure 8A:
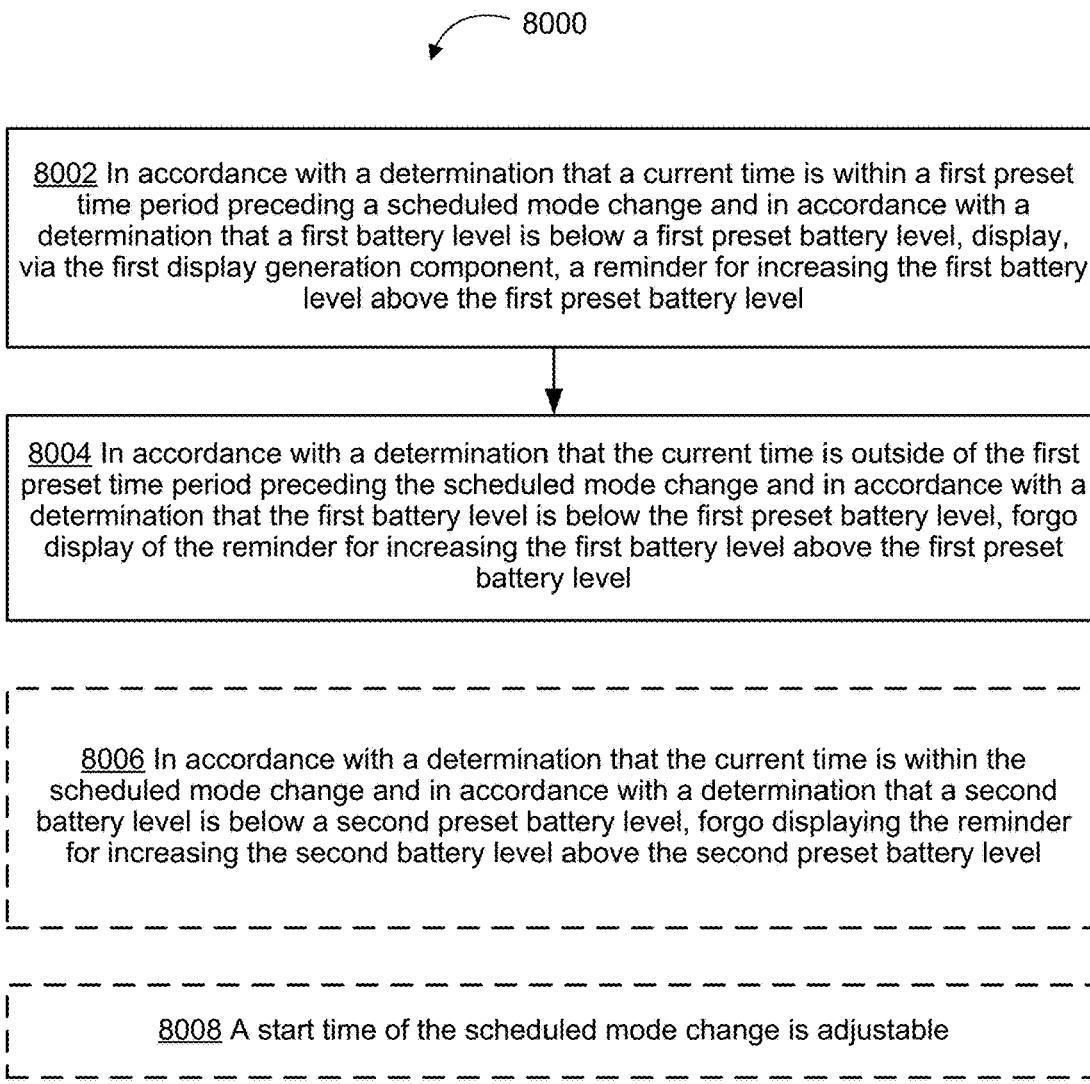
Figure 9A:
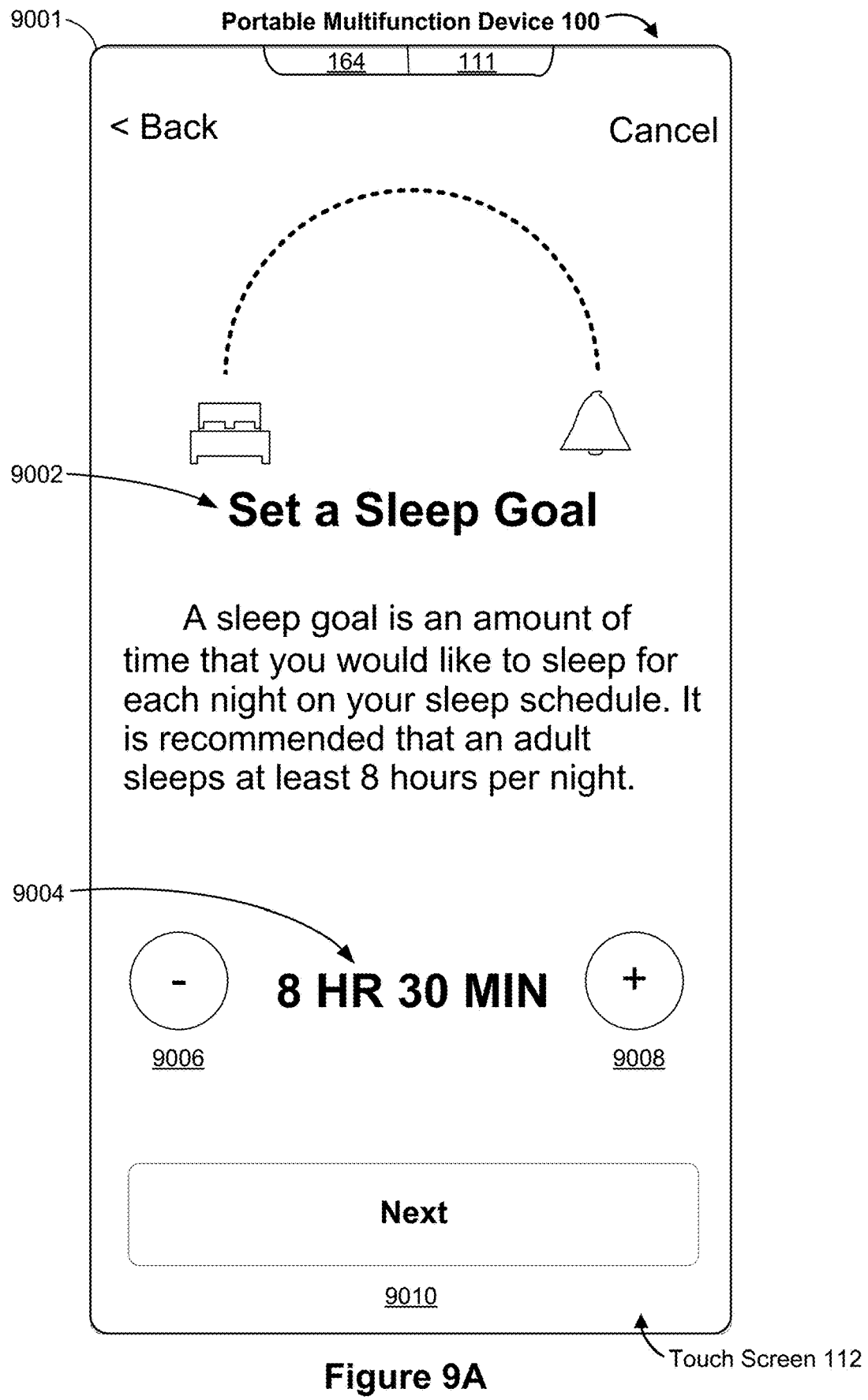
FIGS. 9A-9AG illustrate example user interfaces for providing a visual alert when a duration of a sleep time period is adjusted by a user below an established sleep goal, in accordance with some embodiments.
Figure 10A:
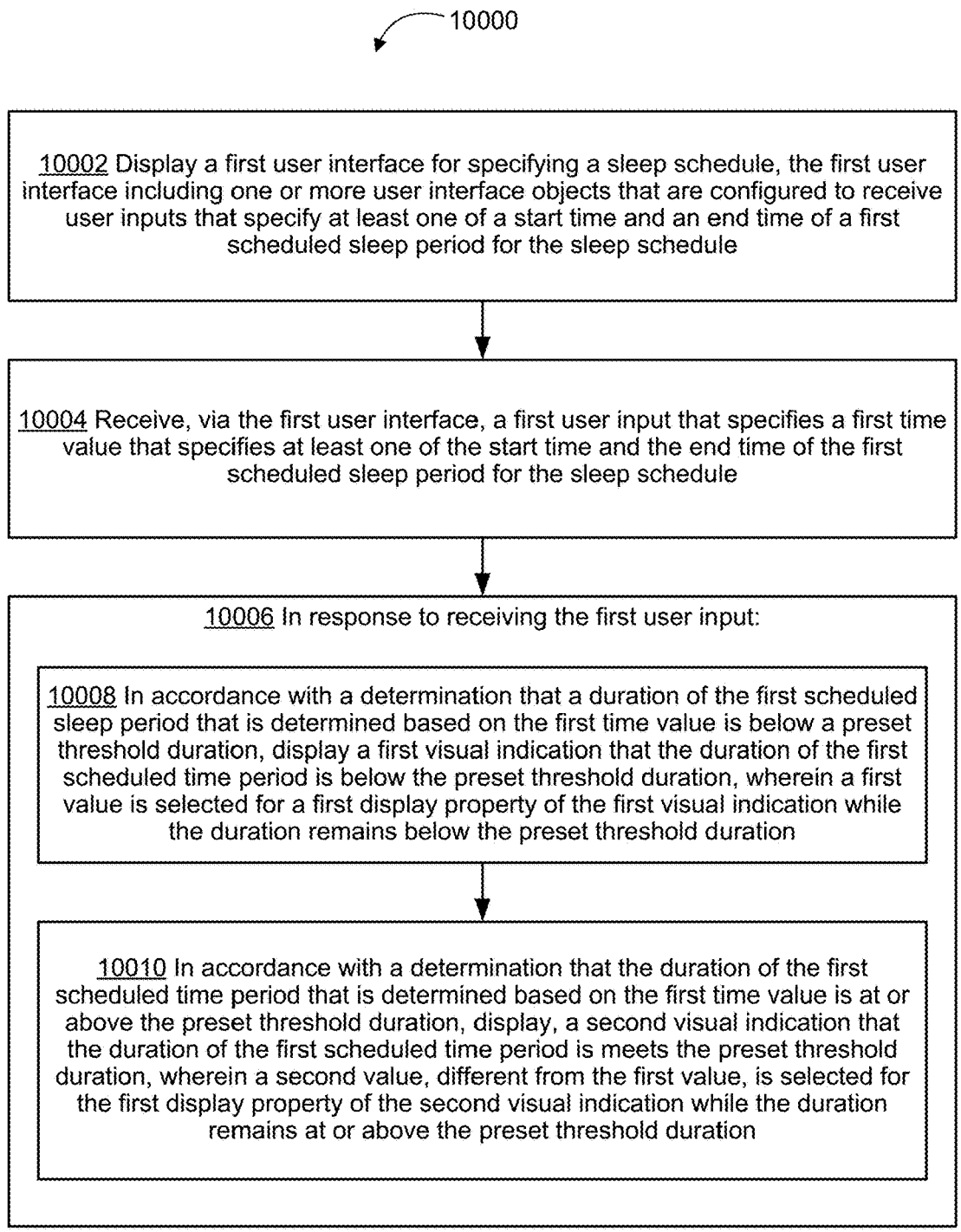

Below, FIGS. 1A-1B, 2, 3, 4A-4B, and 4C-4J provide a description of exemplary devices for performing the techniques for managing event notifications. FIGS. 5A-5AE illustrate example user interfaces for providing enhanced access restriction during a preset time period before and/or after a scheduled mode change, in accordance with some embodiments. FIGS. 6A-6D are flowchart diagrams of a method of providing enhanced access restriction during a preset time period before and/or after a scheduled mode change, in accordance with some embodiments. The user interfaces in FIGS. 5A-5AE are used to illustrate the processes described below, including the processes in FIGS. 6A-6D. FIGS. 7A-7J illustrate example user interfaces for generating battery charging alerts during a preset time period before the start of the scheduled mode change, in accordance with some embodiments. FIGS. 8A-8B are flowchart diagrams of a method of generating battery charging alerts during a preset time period before the start of the scheduled mode change, in accordance with some embodiments. The user interfaces in FIGS. 7A-7J are used to illustrate the processes described below, including the processes in FIGS. 8A-8B. FIGS. 9A-9AG illustrate example user interfaces for providing a visual alert when a duration of a sleep time period is adjusted by a user below an established sleep goal, in accordance with some embodiments. FIGS. 10A-10C are flowchart diagrams of a method of providing a visual alert when a duration of a sleep time period is adjusted by a user below an established sleep goal, in accordance with some embodiments. The user interfaces in FIGS. 9A-9AG are used to illustrate the processes described below, including the processes in FIGS. 10A-10C. FIGS. 11A-11AF illustrate example user interfaces for disabling and enabling an input mechanism of an electronic device during a scheduled restricted mode, in accordance with some embodiments. FIGS. 12A-12D are flowchart diagrams of a method of disabling and enabling an input mechanism of an electronic device during a scheduled restricted mode, in accordance with some embodiments. The user interfaces in FIGS. 11A-11AF are used to illustrate the processes described below, including the processes in FIGS. 12A-12D.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
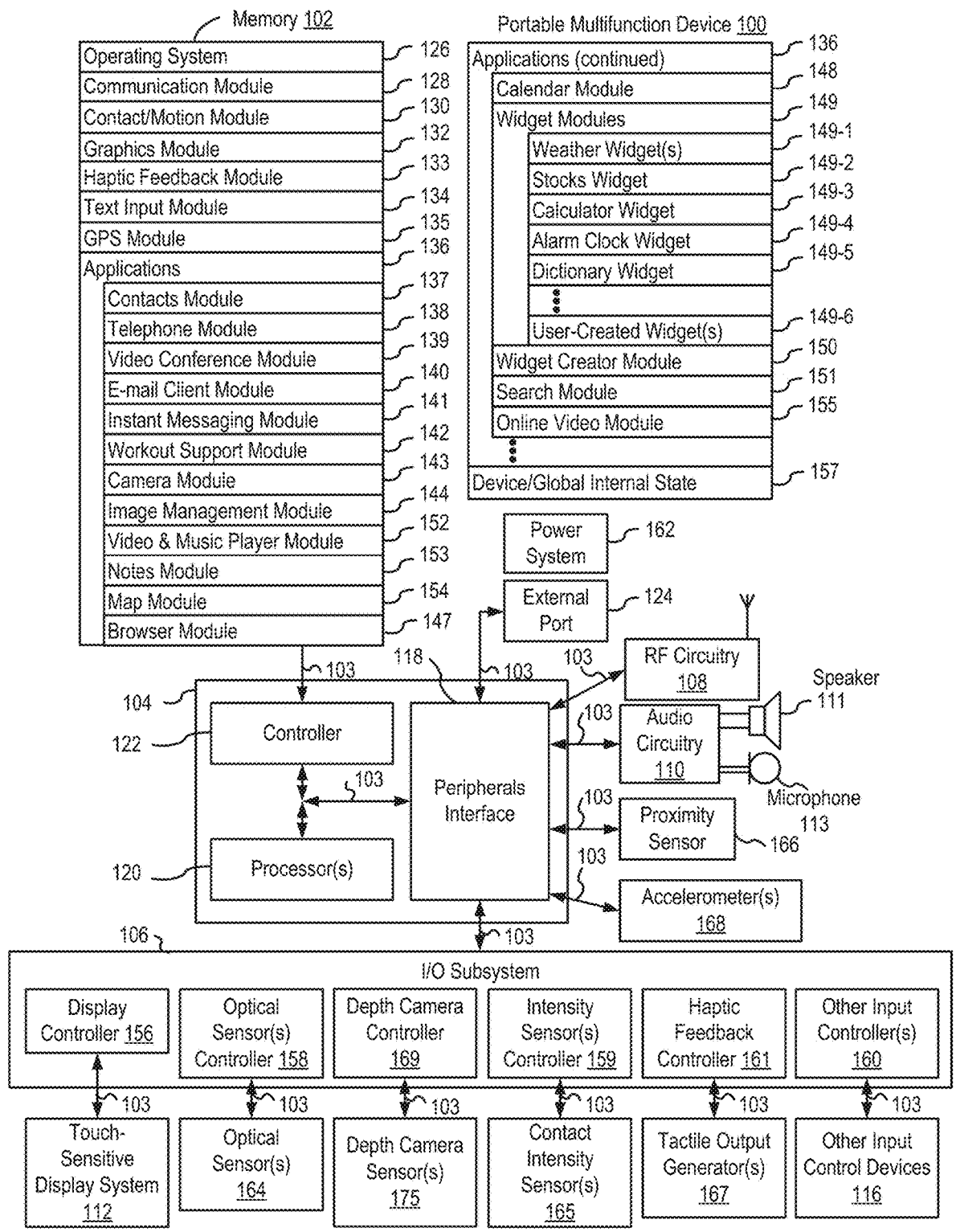
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSDPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. Nos. 6,323,846 (Westerman et al.), 6,570,557 (Westerman et al.), and/or 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

In some embodiments, a depth map (e.g., depth map image) contains information (e.g., values) that relates to the distance of objects in a scene from a viewpoint (e.g., a camera, an optical sensor, a depth camera sensor). In one embodiment of a depth map, each depth pixel defines the position in the viewpoint's Z-axis where its corresponding two-dimensional pixel is located. In some embodiments, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., a camera, an optical sensor, a depth camera sensor) in the "three dimensional" scene. In other embodiments, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; U.S. patent application Ser. No. 11/240,788, "Proximity Detector In Handheld Device"; U.S. patent application Ser. No. 11/620,702, "Using Ambient Light Sensor To Augment Proximity Sensor Output"; U.S. patent application Ser. No. 11/586,862, "Automated Response To And Sensing Of User Activity In Portable Devices"; and U.S. patent application Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
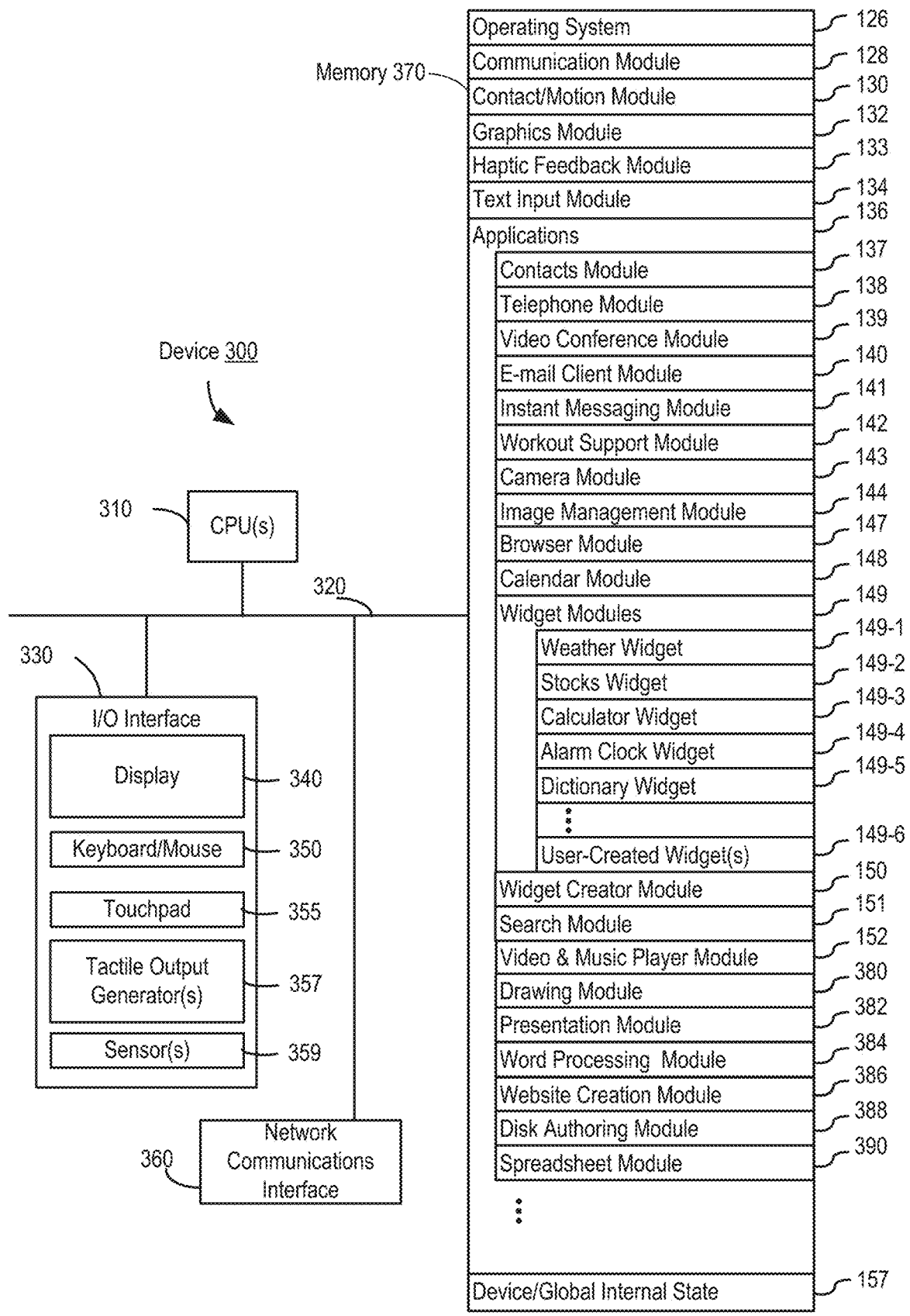
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:
   Contacts module 137 (sometimes called an address book or contact list);
   Telephone module 138;
   Video conference module 139;
   E-mail client module 140;
   Instant messaging (IM) module 141;
   Workout support module 142;
   Camera module 143 for still and/or video images;
   Image management module 144;
   Video player module;
   Music player module;
   Browser module 147;
   Calendar module 148;
   Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
   Widget creator module 150 for making user-created widgets 149-6;
   Search module 151;
   Video and music player module 152, which merges video player module and music player module;
   Notes module 153;
   Map module 154; and/or
   Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
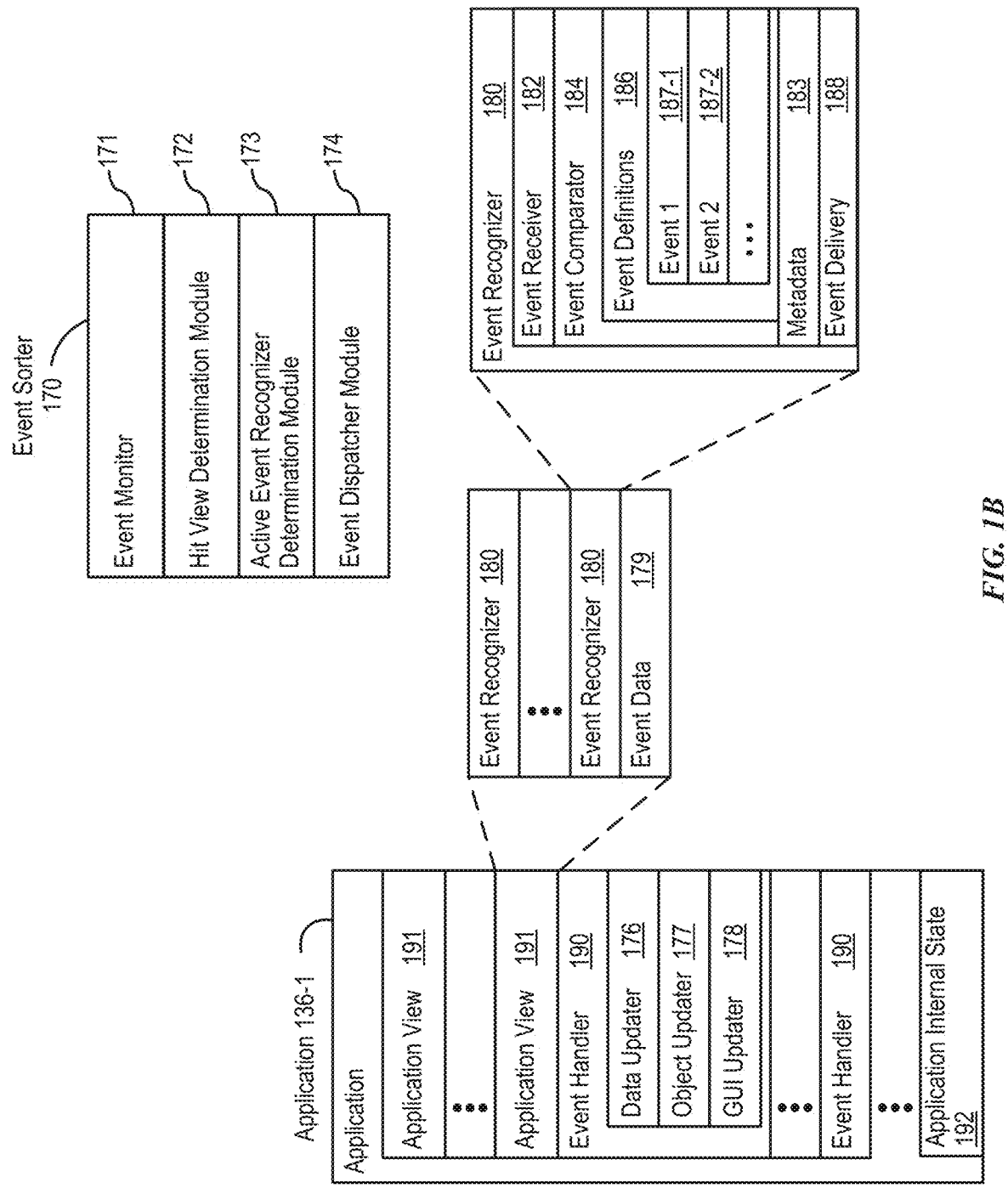
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
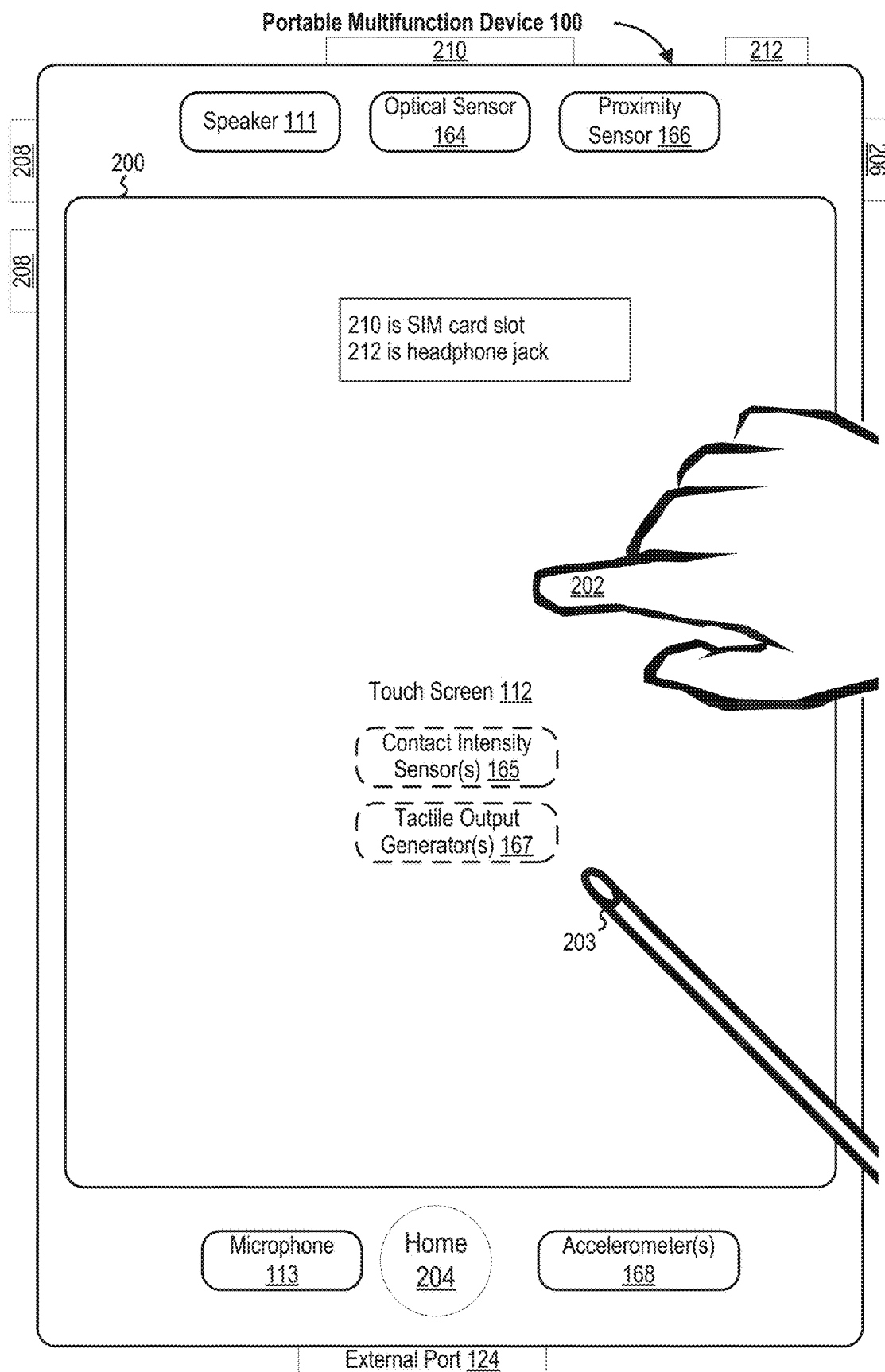
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
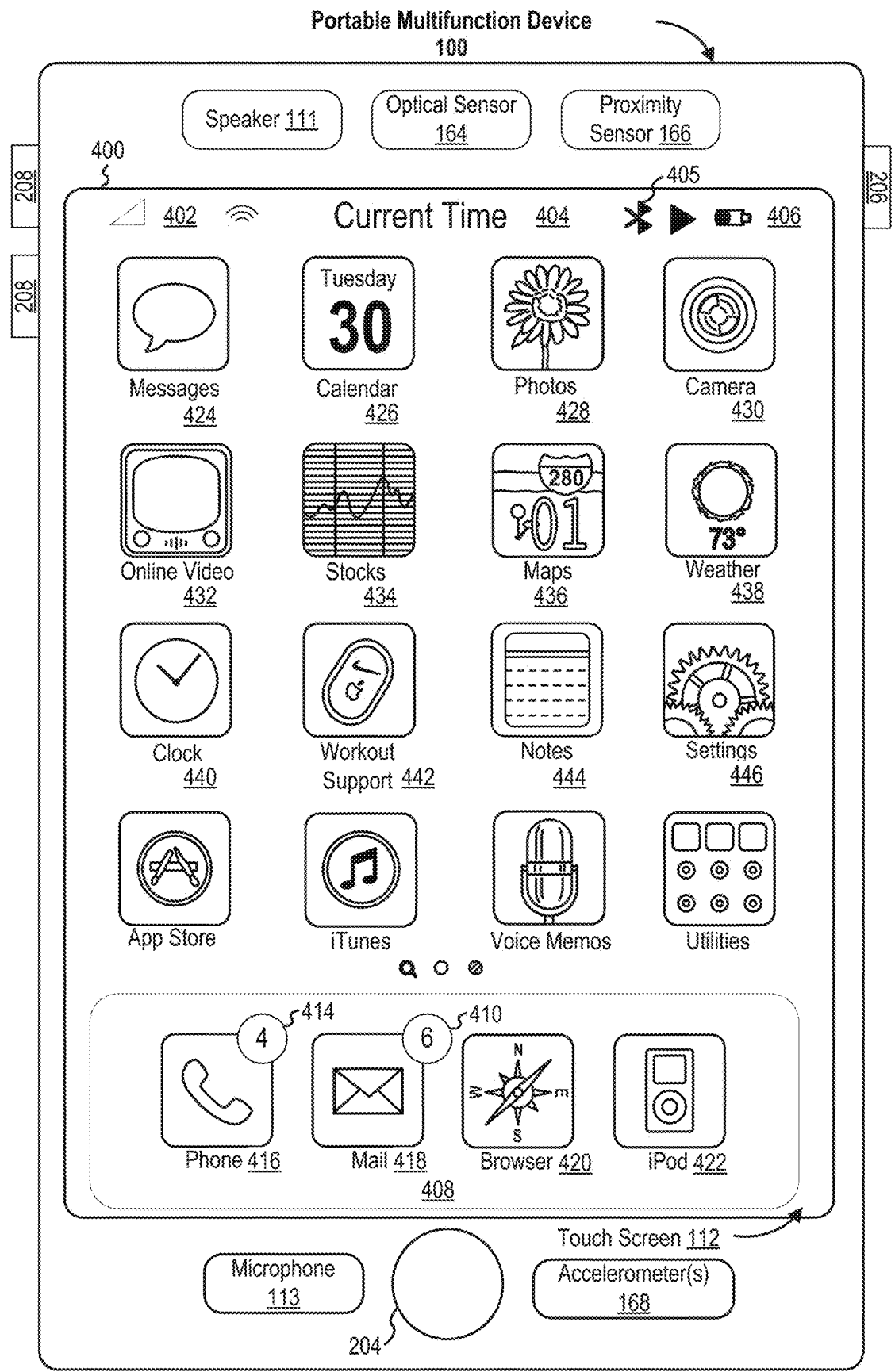
FIG. 4A illustrates an exemplary user interface for a menu of applications on a portable multifunction device in accordance with some embodiments.
Figure 5A:
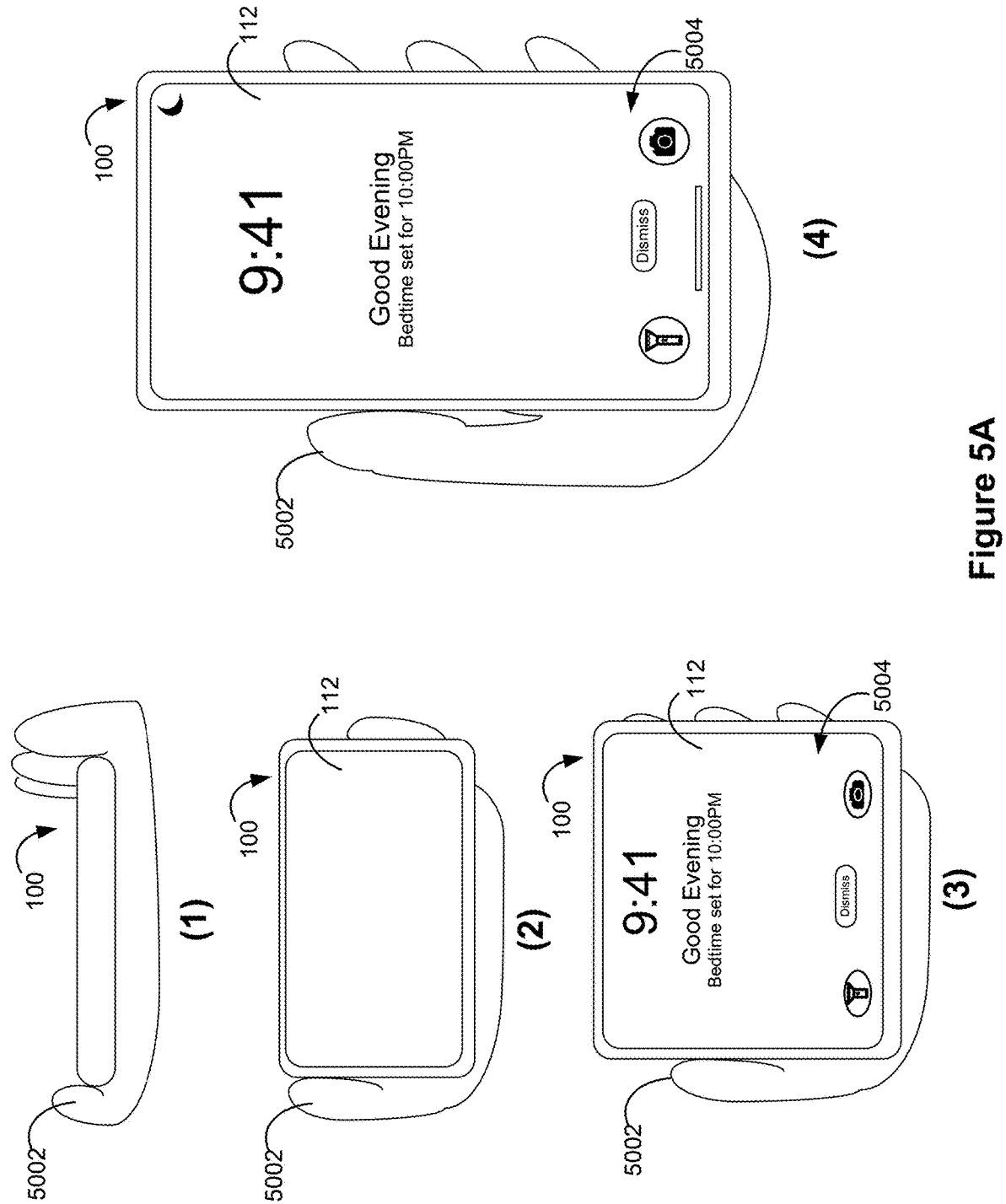
FIGS. 5A-5AE illustrate example user interfaces for providing enhanced access restriction during a preset time period before and/or after a scheduled mode change, in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and Icon 422 for video and music player module 152, also referred to as iPod (trademark of Apple Inc.) module 152, labeled "iPod;" and Icons for other applications, such as:
- Icon 424 for IM module 141, labeled "Messages;"
- Icon 426 for calendar module 148, labeled "Calendar;"
- Icon 428 for image management module 144, labeled "Photos;"
- Icon 430 for camera module 143, labeled "Camera;"
- Icon 432 for online video module 155, labeled "Online Video;"
- Icon 434 for stocks widget 149-2, labeled "Stocks;"
- Icon 436 for map module 154, labeled "Maps;"
- Icon 438 for weather widget 149-1, labeled "Weather;"
- Icon 440 for alarm clock widget 149-4, labeled "Clock;"
- Icon 442 for workout support module 142, labeled "Workout Support;"
- Icon 444 for notes module 153, labeled "Notes;" and
- Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
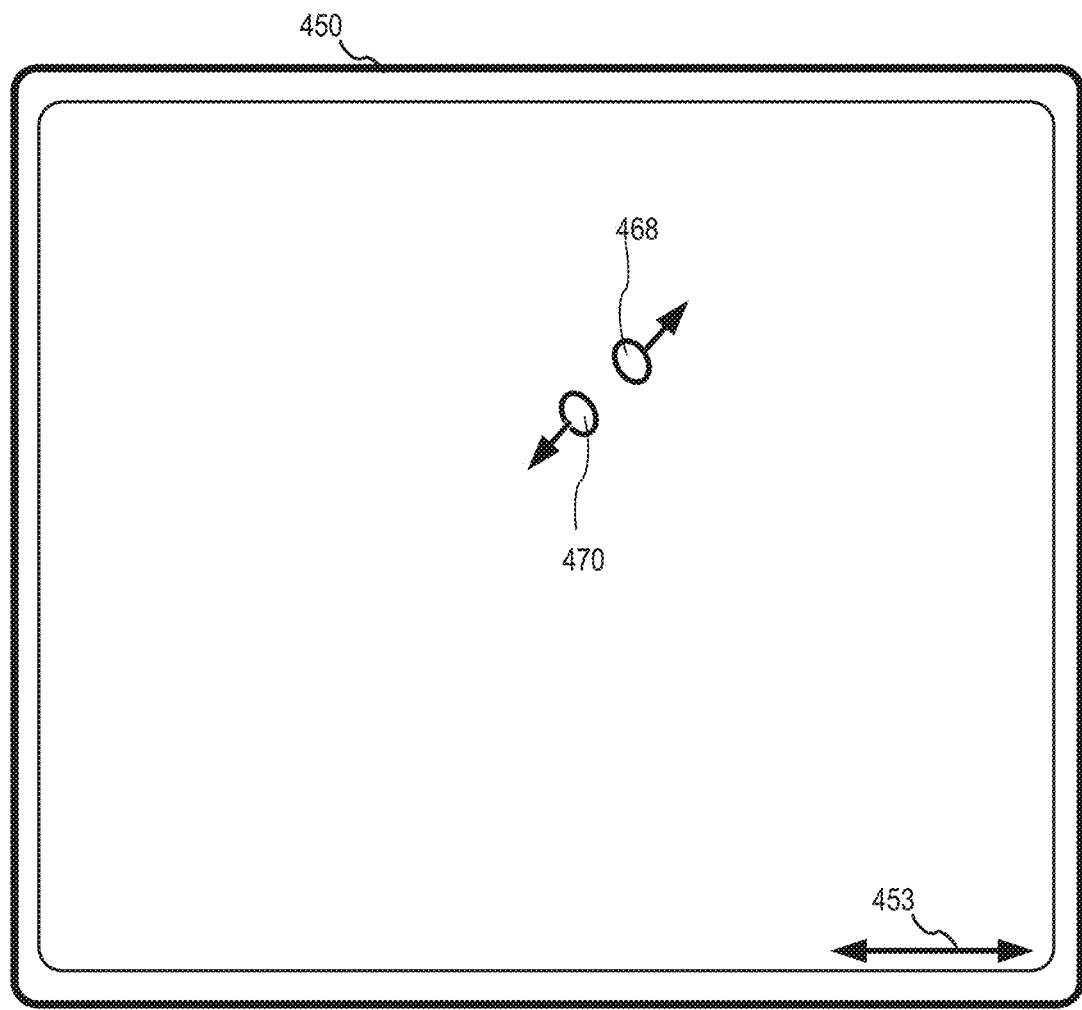
FIG. 4B illustrates an exemplary user interface for a multifunction device with a touch-sensitive surface that is separate from the display in accordance with some embodiments.
Figure 4B:
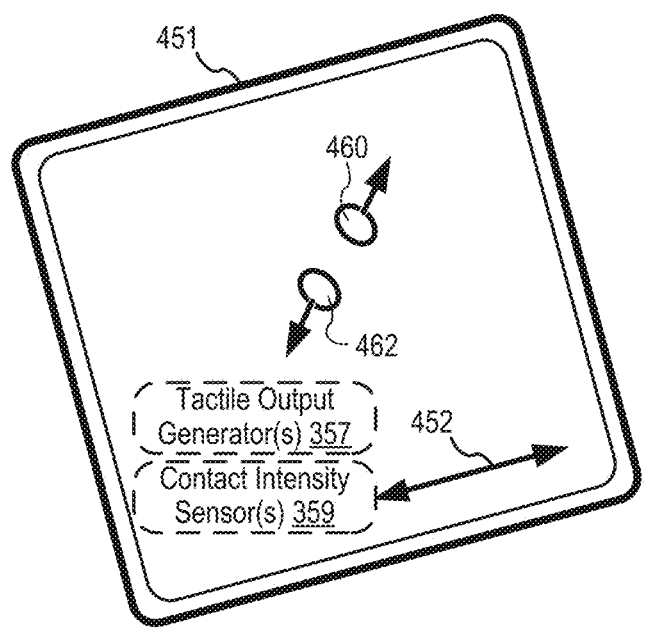

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, contact 460 corresponds to 468 and contact 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 4C:
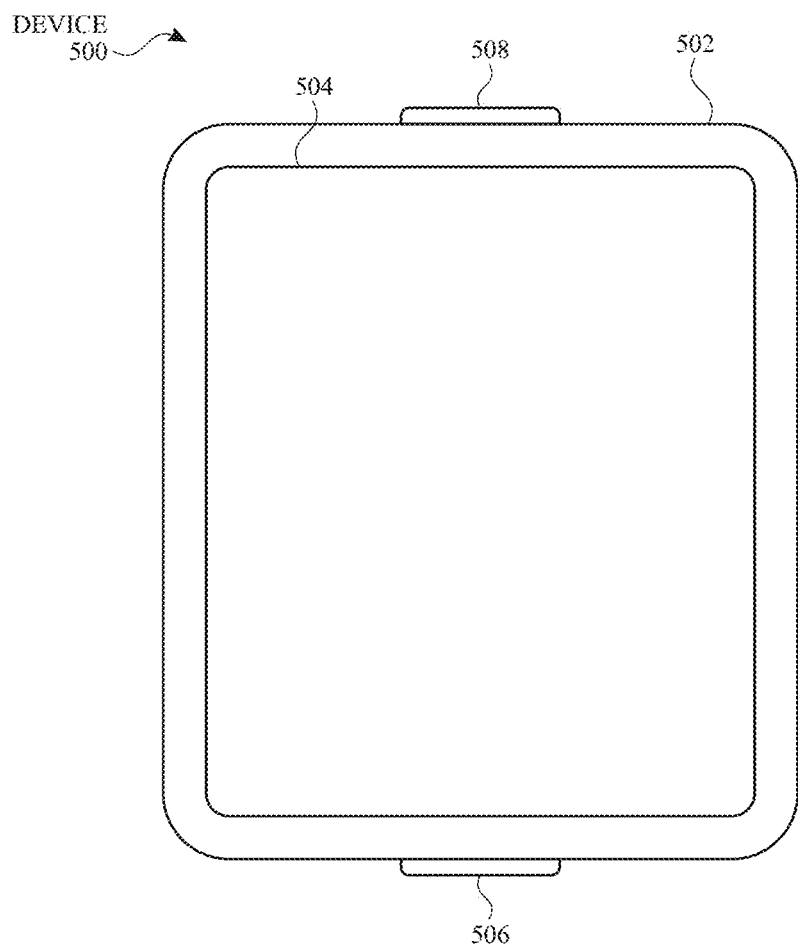
FIG. 4C illustrates a personal electronic device in accordance with some embodiments.

FIG. 4C illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 4D:
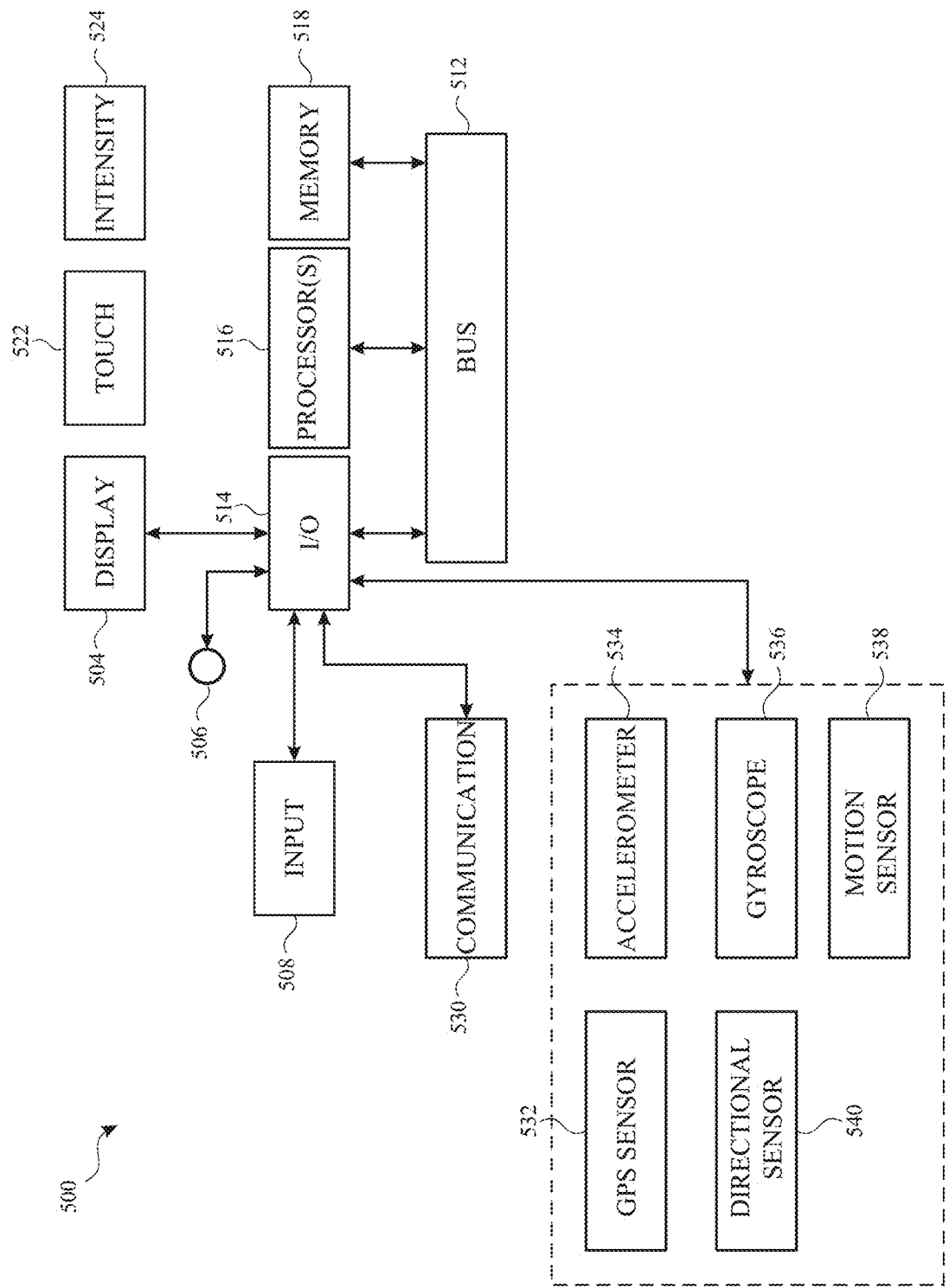
FIG. 4D is a block diagram illustrating a personal electronic device in accordance with some embodiments.

FIG. 4D depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 2200-2500 (FIGS. 22-25). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 4D, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 4C-4D). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 4E:
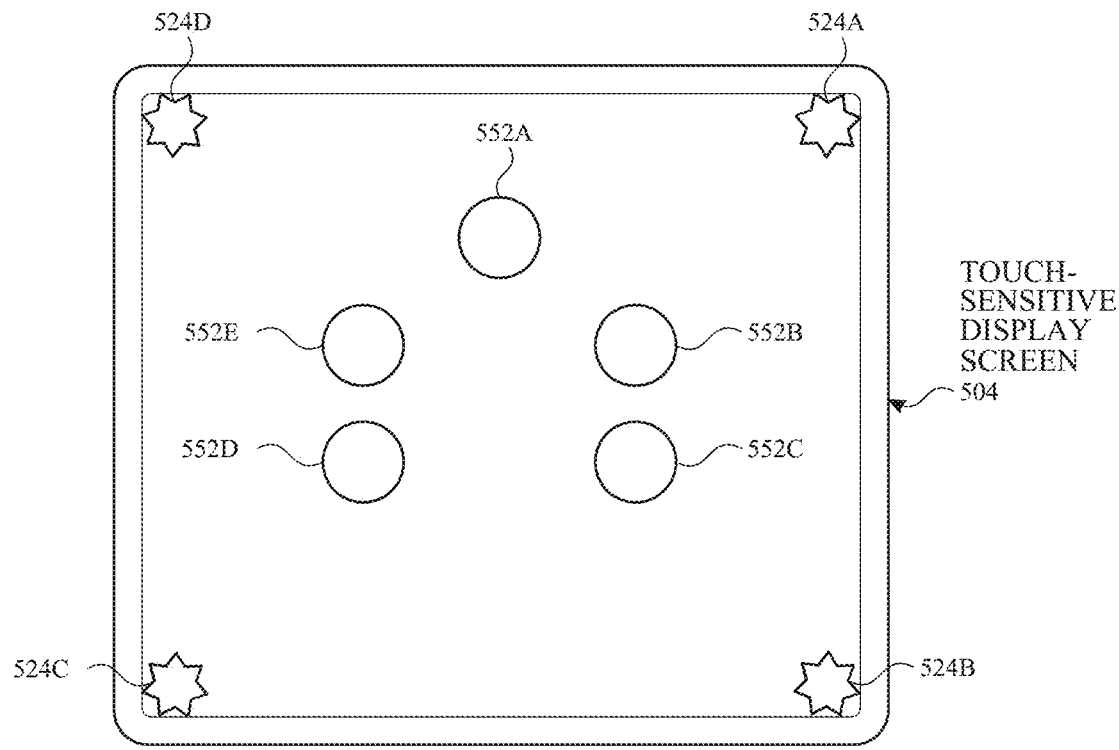
FIGS. 4E-4F illustrate exemplary components of a personal electronic device having a touch-sensitive display and intensity sensors in accordance with some embodiments.
Figure 4E:
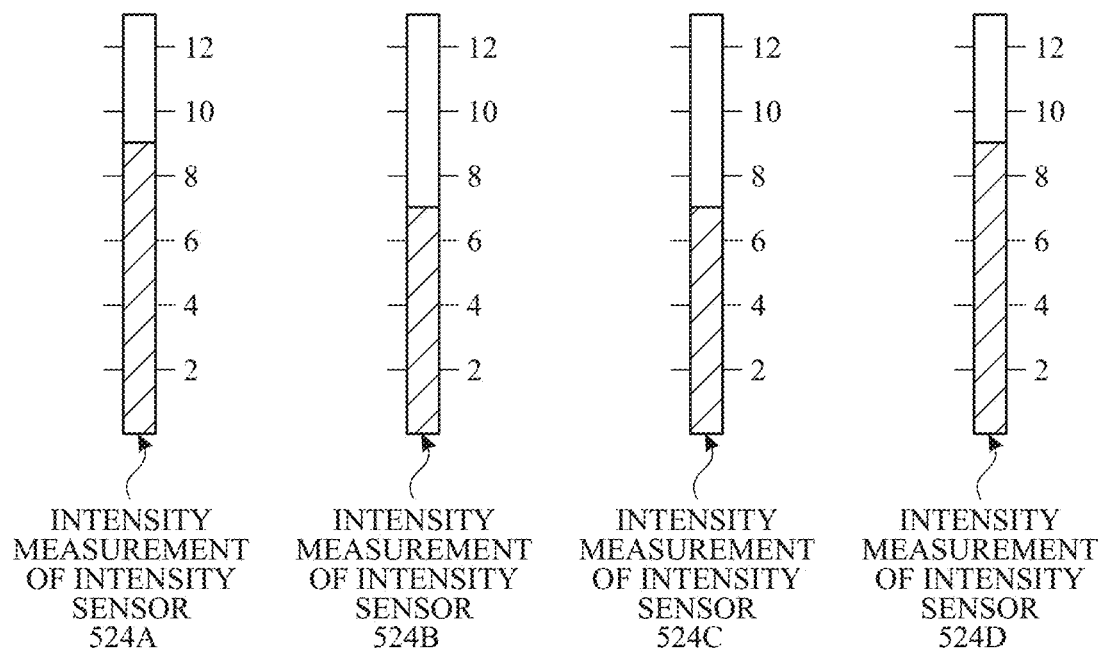
Figure 4F:
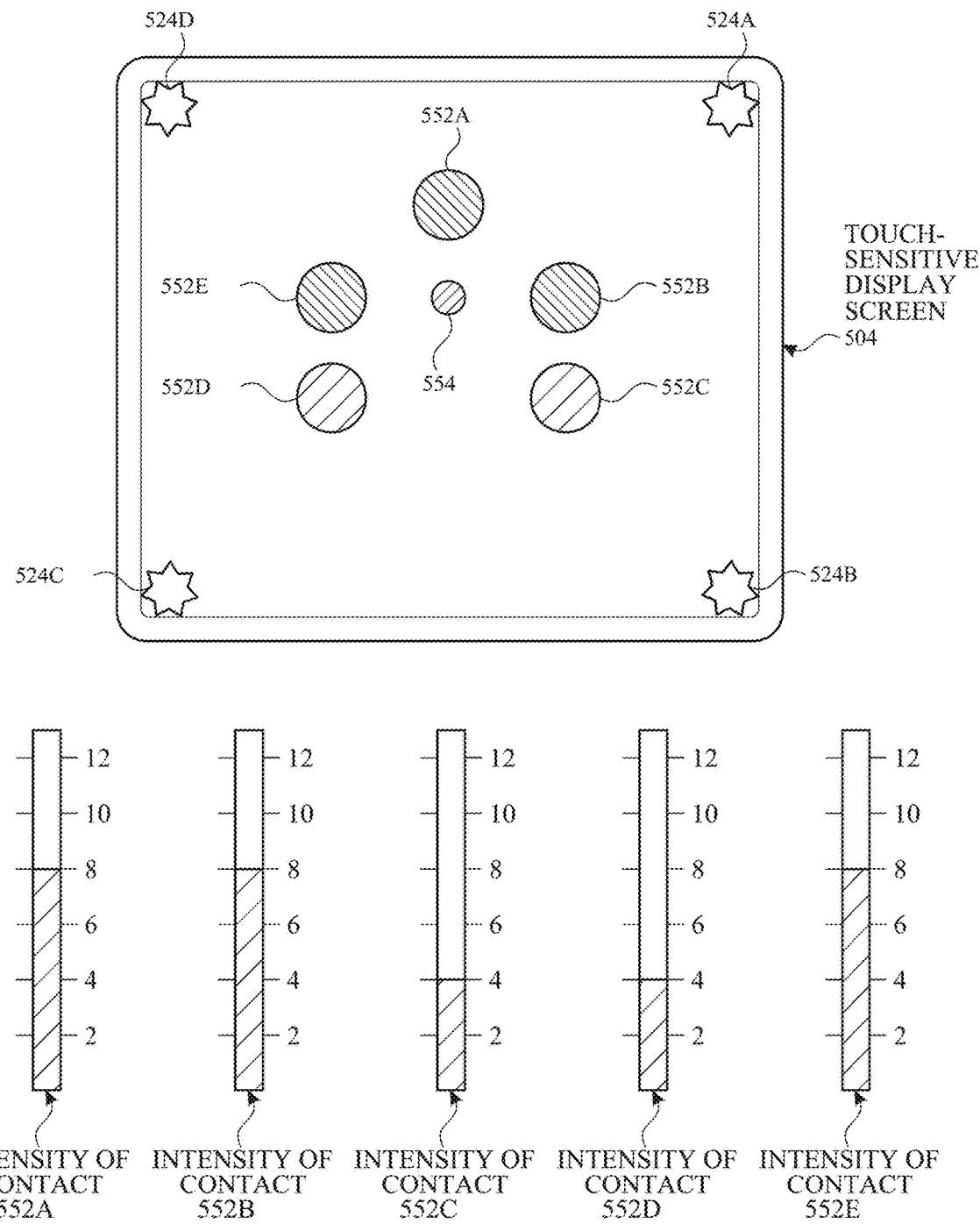

FIG. 4E illustrates detecting a plurality of contacts 552A-552E on touch-sensitive display screen 504 with a plurality of intensity sensors 524A-524D. FIG. 4E additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 4F illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A \cdot (Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 4E-4F can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 4E-4F to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 4G:
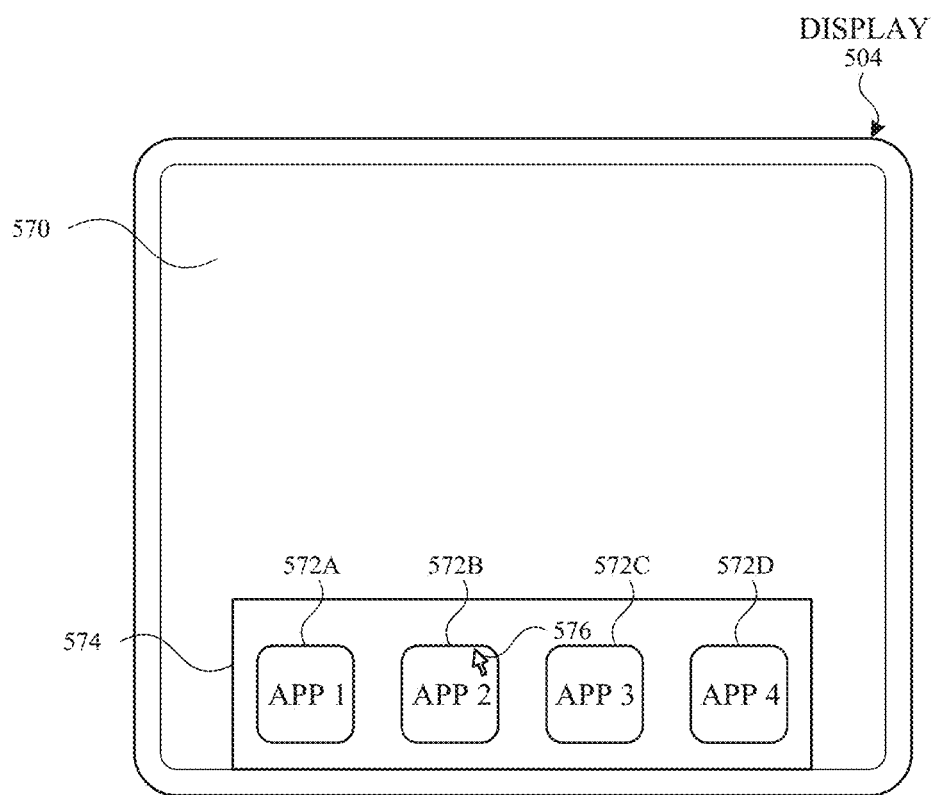
FIGS. 4G-4J illustrate exemplary components and user interfaces of a personal electronic device in accordance with some embodiments.
Figure 4G:
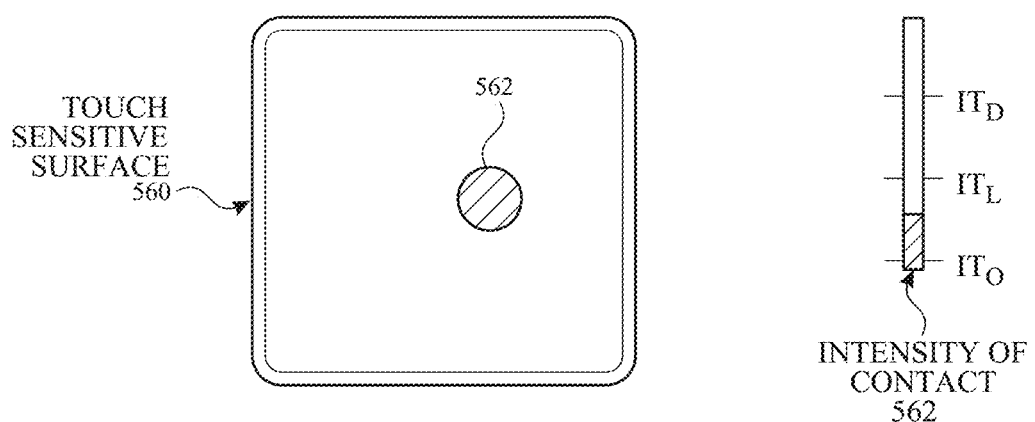
Figure 4H:
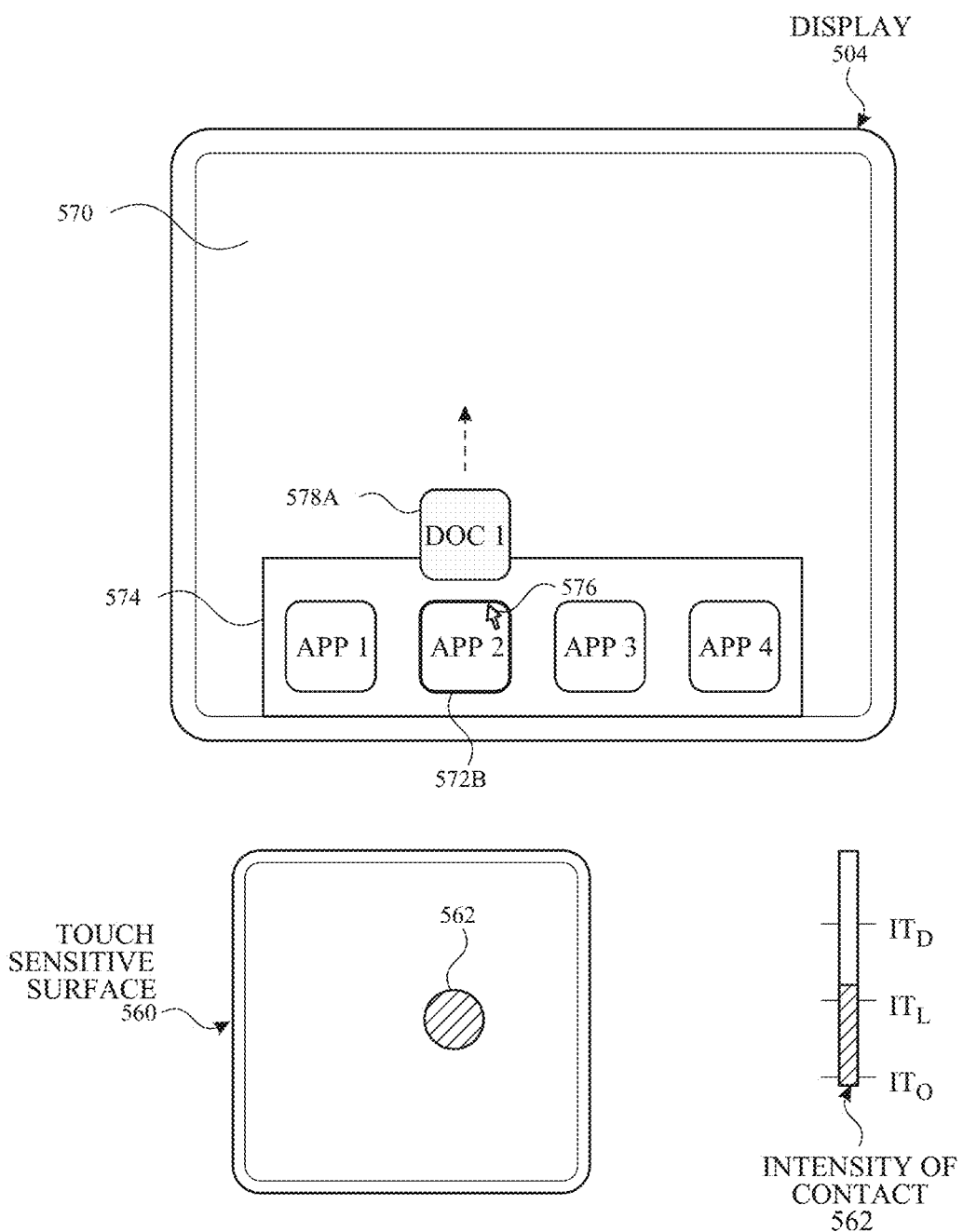
Figure 4I:
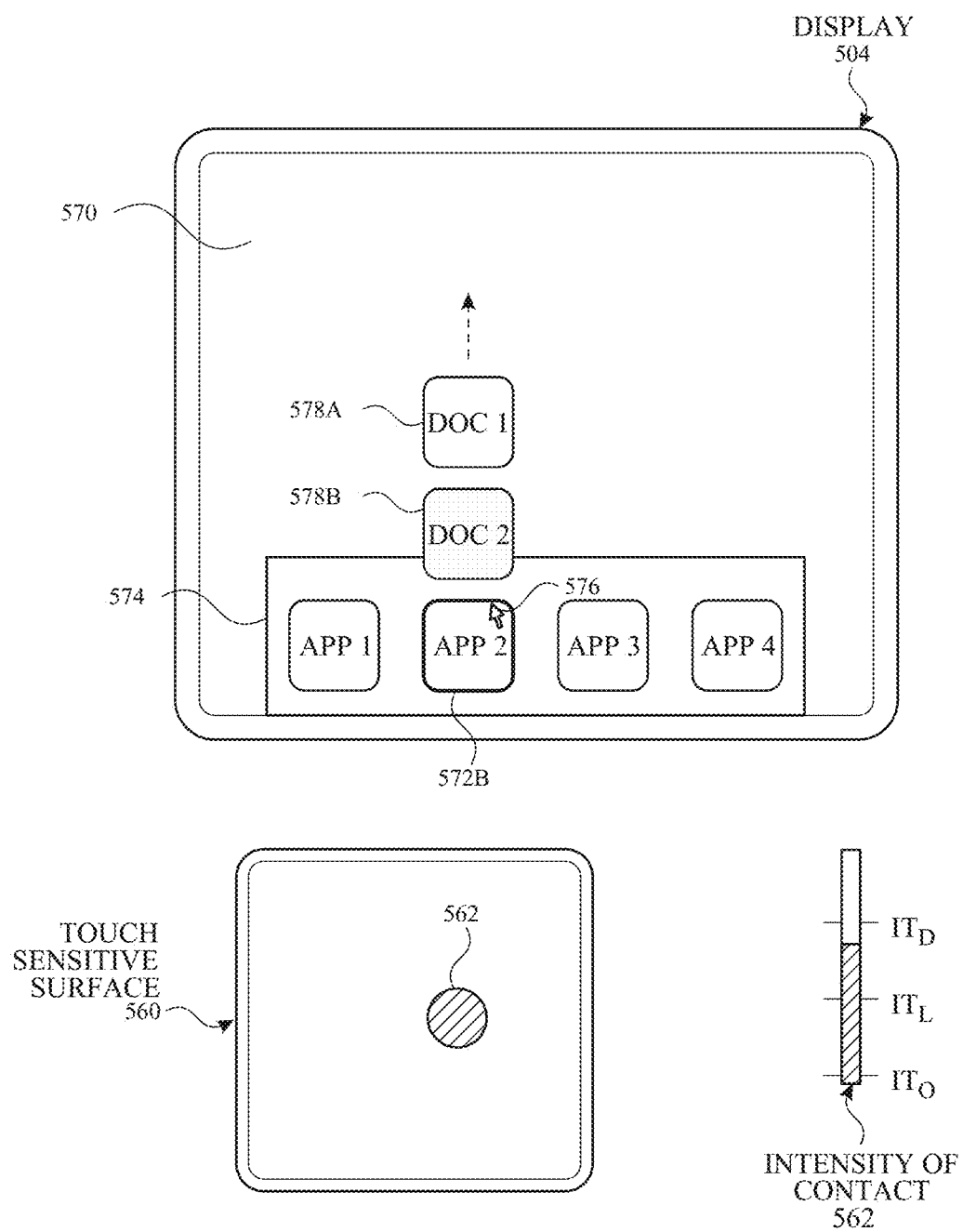
Figure 4J:
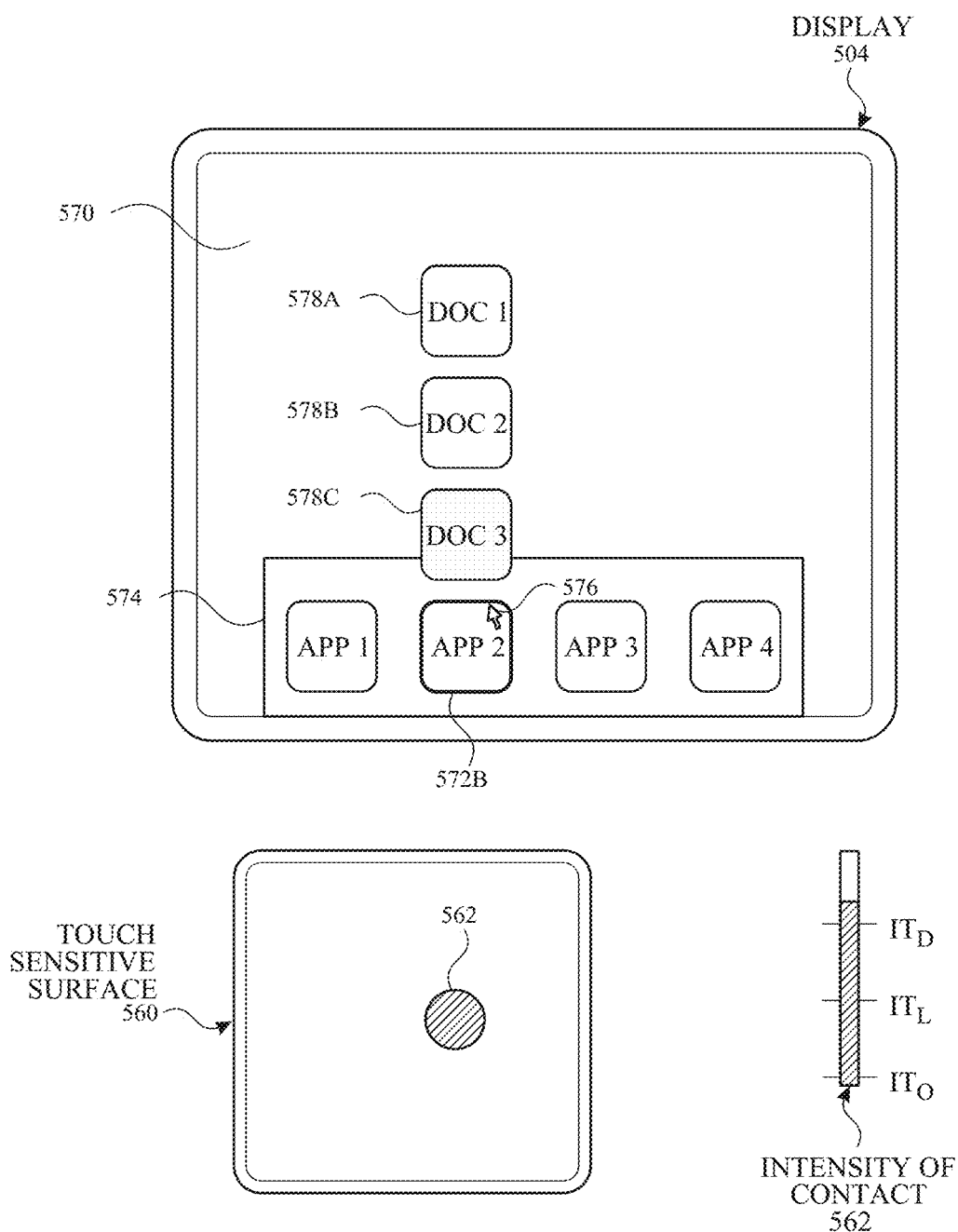

FIGS. 4G-4J illustrate detection of a gesture that includes a press input that corresponds to an increase in intensity of a contact 562 from an intensity below a light press intensity threshold (e.g., "$IT_L$") in FIG. 4G, to an intensity above a deep press intensity threshold (e.g., "$IT_D$") in FIG. 4J. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 4H-4J. In some embodiments, the intensity, which is compared to the one or more intensity thresholds, is the characteristic intensity of a contact. It should be noted that the intensity diagram for contact 562 is not part of a displayed user interface, but is included in FIGS. 4G-4J to aid the reader.

In some embodiments, the display of representations 578A-578C includes an animation. For example, representation 578A is initially displayed in proximity of application icon 572B, as shown in FIG. 4H. As the animation proceeds, representation 578A moves upward and representation 578B is displayed in proximity of application icon 572B, as shown in FIG. 4I. Then, representations 578A moves upward, 578B moves upward toward representation 578A, and representation 578C is displayed in proximity of application icon 572B, as shown in FIG. 4J. Representations 578A-578C form an array above icon 572B. In some embodiments, the animation progresses in accordance with an intensity of contact 562, as shown in FIGS. 4H-4I, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 4G-4J can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

FIGS. 5A-5AE illustrate example user interfaces for providing enhanced access restriction (e.g., providing an additional screen-restricted user interface (e.g., a wind down screen, a good morning screen, etc.) that, when dismissed by a predefined gesture, navigates to another screen-restricted user interface (e.g., a wake screen, lock screen, etc.)) during a preset time period before and/or after a scheduled mode change (e.g., during a preset wind down period immediately preceding a scheduled sleep time period, or a preset time period immediately succeeding the scheduled sleep time period, etc.), in accordance with some embodiments.

FIGS. 5A-5L illustrate exemplary interactions with user interfaces for a restricted state of a computer system, e.g., electronic device 100 with a touch-screen display 112. In the restricted state, the computer system prevents access to the home screen and user interfaces of applications by displaying a respective user interface that corresponds to the restricted state (e.g., a wake screen in either the authenticated state or the unauthenticated state, a lock screen, etc.). In some embodiments, during a preset period before or after a scheduled mode change (e.g., a wind down period or a wind up period for a preset sleep time period), a special user interface that corresponds to the restricted state (e.g., a wind down screen, a good morning screen, etc.) is displayed, where the special user interface that corresponds to the restricted state requires a dismissal input that is different from the input used to dismiss a regular user interface that corresponds to the restricted state (e.g., a wake screen or lock screen that is displayed outside of the wind down period, wind up period, or sleep period); and, upon dismissal of the special user interface that corresponds to the restricted state, the computer system displays the regular user interface that corresponds to the restricted state. In some embodiments, if the computer system is locked again after the regular user interface that corresponds to the restricted state was dismissed and access to the home screen and/or application user interfaces were obtained, the computer system redisplays the special user interface that corresponds to the restricted state when the display is woken again. In some embodiments, automatically (e.g., without user input) providing a wind down screen and/or a good morning screen during a preset time period before and/or after a scheduled sleep period helps to reduce distractions caused by the computer system, and to promote better compliance with the sleep schedule and improve users' sleep quality during the sleep period. In some embodiments, the computer system maintains a Do Not Disturb mode during the preset time period before the scheduled sleep time period, during the scheduled sleep time period, during a preset time period after the scheduled sleep time period, or any combination thereof, to help the user relax and enjoy better sleep. In the following illustrated example, the user has established a sleep schedule for the current day (e.g., Tuesday) that has a sleep time period with a start time of Tuesday 10:00 PM and an end time of Wednesday 6:30 AM, and that has a wind down mode enabled for a time period that begins at 9:00 PM and ends at the start of the sleep time period. In this example, a good morning period or wind up period is also enabled that starts from the wake time of Wednesday 6:30 AM and ends at Wednesday 9:30 AM.

FIG. 5A illustrates an exemplary input for waking a display generation component of a computer system from a low power or dormant state during a wind down period (e.g., a preset time period) that immediately precedes an upcoming scheduled sleep period for a sleep schedule. In some embodiments, the computer system is a device 100 with a touch screen 112. In some embodiments, the wind down period is enabled by a user during a set up process for a sleep schedule. In FIGS. 5A(1)-5A(2), a user raises the device 100 (e.g., with the user's hand 5002) while the device 100 is in a low power or dormant state (e.g., with a dark screen or dimmed always-on screen). As illustrated, before the criteria for waking the device is met, the touch screen 112 remains in the low power or display-off state. As the device is raised more toward the user, as shown in FIGS. 5A(3) and 5A(4), the touch screen 112 is no longer in the low power of display-off state. Instead, the wake screen user interface for the wind down mode (e.g., the wind down screen 5013) is displayed when the touch screen 112 is in a regular display-on state. In some embodiments, the wind down screen 5013 is optionally displayed when the touch screen 112 is in an unauthenticated state and subsequently transitions into an authenticated state (e.g., with authentication information obtained through fingerprint sensors or facial recognition, etc.) while the user is raising the device 100 or holding the device 100. In some embodiments, the wind down screen 5013 is a lock screen, requiring authentication information to be provided once the wind down screen 5013 is dismissed in order to dismiss the regular lock screen and put the touch screen 112 in an unlocked state.

Figure 5B:
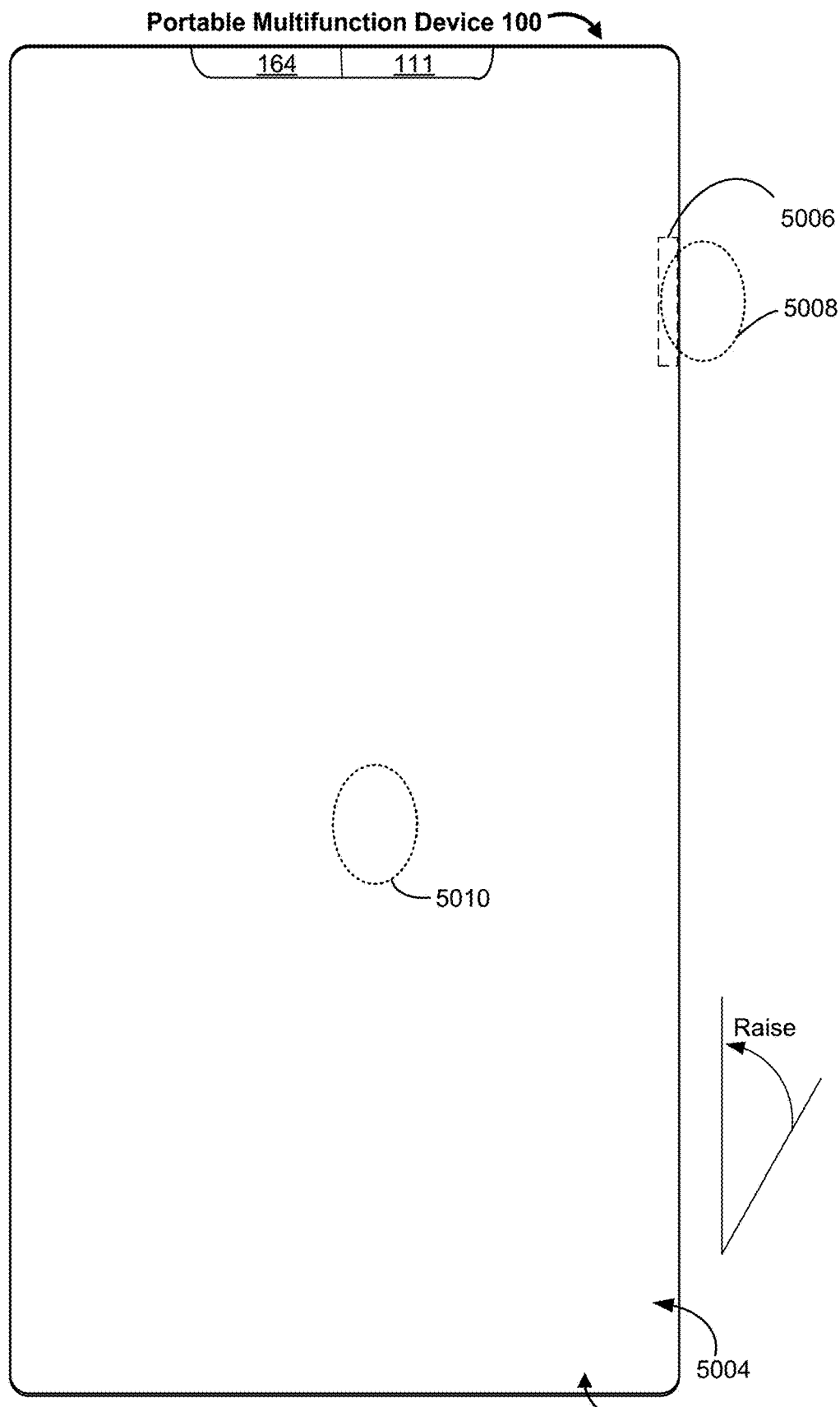

FIG. 5B shows the device 100 in a low power or dormant state during a wind down period (e.g., a preset time period) that immediately precedes an upcoming scheduled sleep period for a sleep schedule. The touch-screen of the device 100 is in a display-off state or a low-power always-on state. FIG. 5B illustrates alternative ways of waking the display generation component of the computer system during the preset wind down period immediately preceding the upcoming scheduled sleep period. For example, the device 100 detects a tap input by a contact 5010 on the touch-screen 112, a button press input by a contact 5008 on a power button or screen-lock button 5006 of the device 100, or movement of the device toward a user (e.g., detected based on a determined orientation of the device or an image captured by a front-facing camera of the device); and in response, the touch-screen transitions out of the low power or dormant and displays the wind down screen 5013 on the touch screen 112, as shown in FIG. 5C.

Figure 5C:
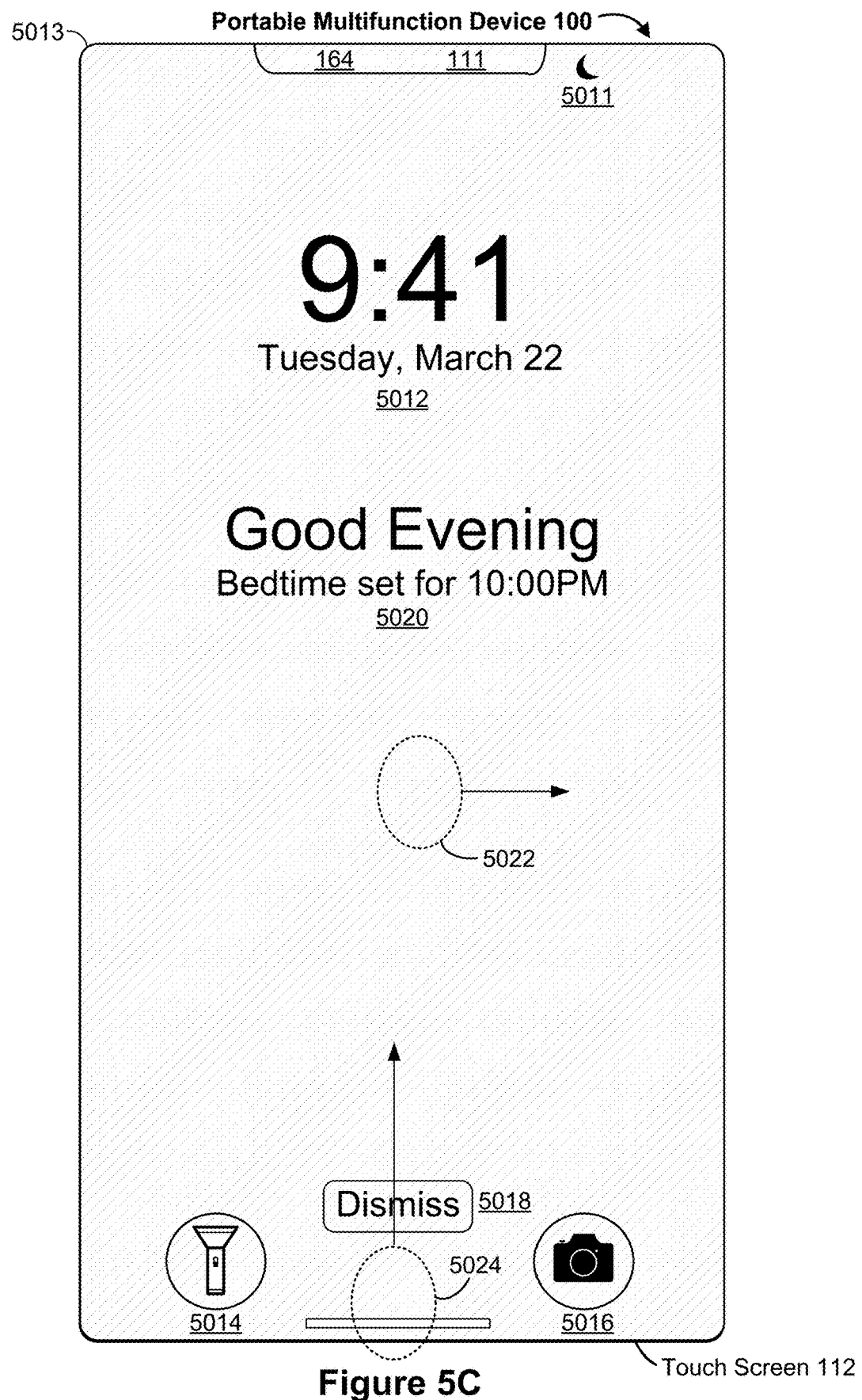

FIG. 5C illustrates an exemplary wind down screen 5013 on device 100 that is displayed during a wind down period (e.g., between 9:00 PM and 10:00 PM on Tuesday) preceding a scheduled sleep period (e.g., a scheduled time period from Tuesday night at 10:00 PM to Wednesday morning at 6:30 AM). On the wind down screen 5013, a set of user interface objects are displayed, including a time and date element 5012 showing the current time (e.g., 9:41 PM) and the current date (e.g., Tuesday, March 22). The wind down screen 5013 also displays a bedtime reminder 5020 that displays the start time of the upcoming sleep period (e.g., a textual or graphic indicating the bedtime of 10:00 PM). In some embodiments, the wind down screen 5013 displays an indicator 5011 indicating that Do Not Disturb mode is currently active during the wind down period. In some embodiments, when Do Not Disturb mode is active, various types of alerts and notifications that are generated by applications and the operating system during a normal operation mode are suppressed. In some embodiments, a small set of critical alerts are still permitted and generated during the Do Not Disturb mode, such as wake alarms, emergency alerts, etc. In some embodiments, certain types of output modes (e.g., audio outputs, vibration outputs, etc.) are optionally disabled during the Do Not Disturb mode, allowing only low impact output modes (e.g., tactile outputs, low-volume audio alerts, etc.) to be generated for the small set of critical alerts that are permitted during the Do Not Disturb mode. In some embodiments, the device 100 displays a visual DND indicator persistently on the display during a time period that that the Do Not Disturb mode is active. Optionally, minimal affordances for activating one or more functions of the device 1000 are provided on the wind down screen, e.g., affordance 5014 for activating a flashlight function and affordance 5016 for activating a camera application may be provided on the wind down screen. In some embodiments, no other actions are made available on the wake screen user interface (e.g., in the case where no shortcuts to application functions (e.g., actions) are enabled for the wind down period).

Gestures that are usually used to dismiss a regular wake screen or lock screen of the device 100 (e.g., regular gestures for navigating from the regular wake screen or lock screen to a user interface that displays received notifications, a user interface that displays widgets, or a home screen user interface, a last displayed application user interface, etc.) may be ignored by the device 100. As shown in FIG. 5C, a rightward swipe input by a contact 5022 on the touch screen 112 that normally causes navigation from a regularly wake screen to a widget screen that lists widgets for applications on the device is ignored and does not cause navigation away from the wind down screen 5013. An upward edge swipe gesture by a contact 5024 on the touch screen 112 that normally causes dismissal of the regular wake screen user interface and navigation to the home screen user interface or a last displayed application user interface (and optionally an authentication user interface (e.g., a password entry user interface) before the home screen user interface or last displayed application user interface, if the wake screen is in an unauthenticated state (e.g., a lock screen)) is ignored and does not cause navigation to the home screen or last displayed application user interface (and optionally does not cause display of the authentication user interface).

In some embodiments, a predefined input is required to dismiss the wind down screen 5013. In the example user interface of FIG. 5D, a dismiss button 5018 is included on the wind down screen 5013. A tap gesture 5026 on the dismiss button is required to dismiss the wind down screen and navigate to the regular wake screen. In some embodiments, other types of predefined inputs (e.g., a predefined movement pattern, a touch-hold input followed by the upward edge swipe input, etc.) are required to dismiss the wind down screen to navigate to the regular wake screen or lock screen user interface 5025, as shown in FIG. 5E.

Figure 5D:
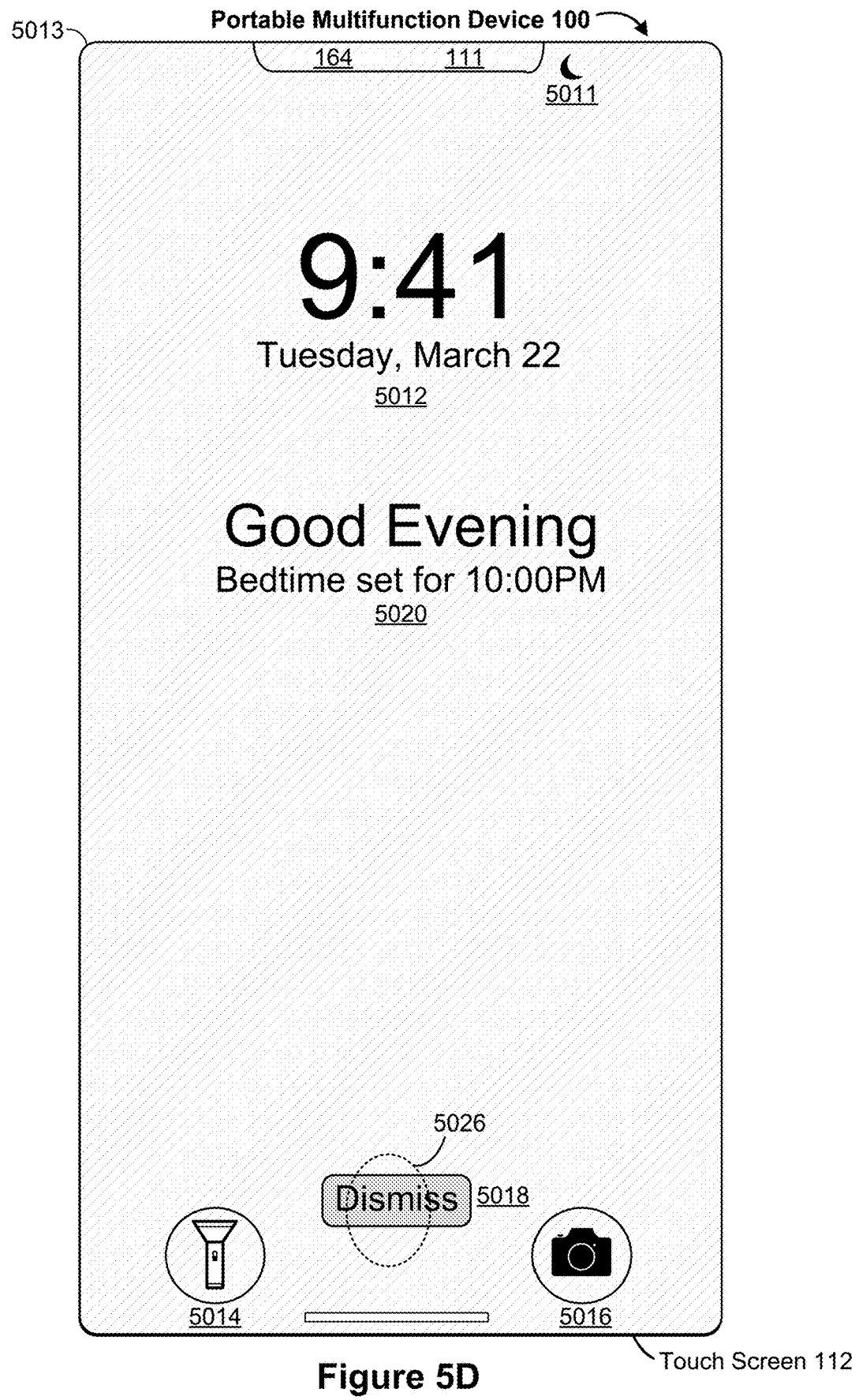
Figure 5E:
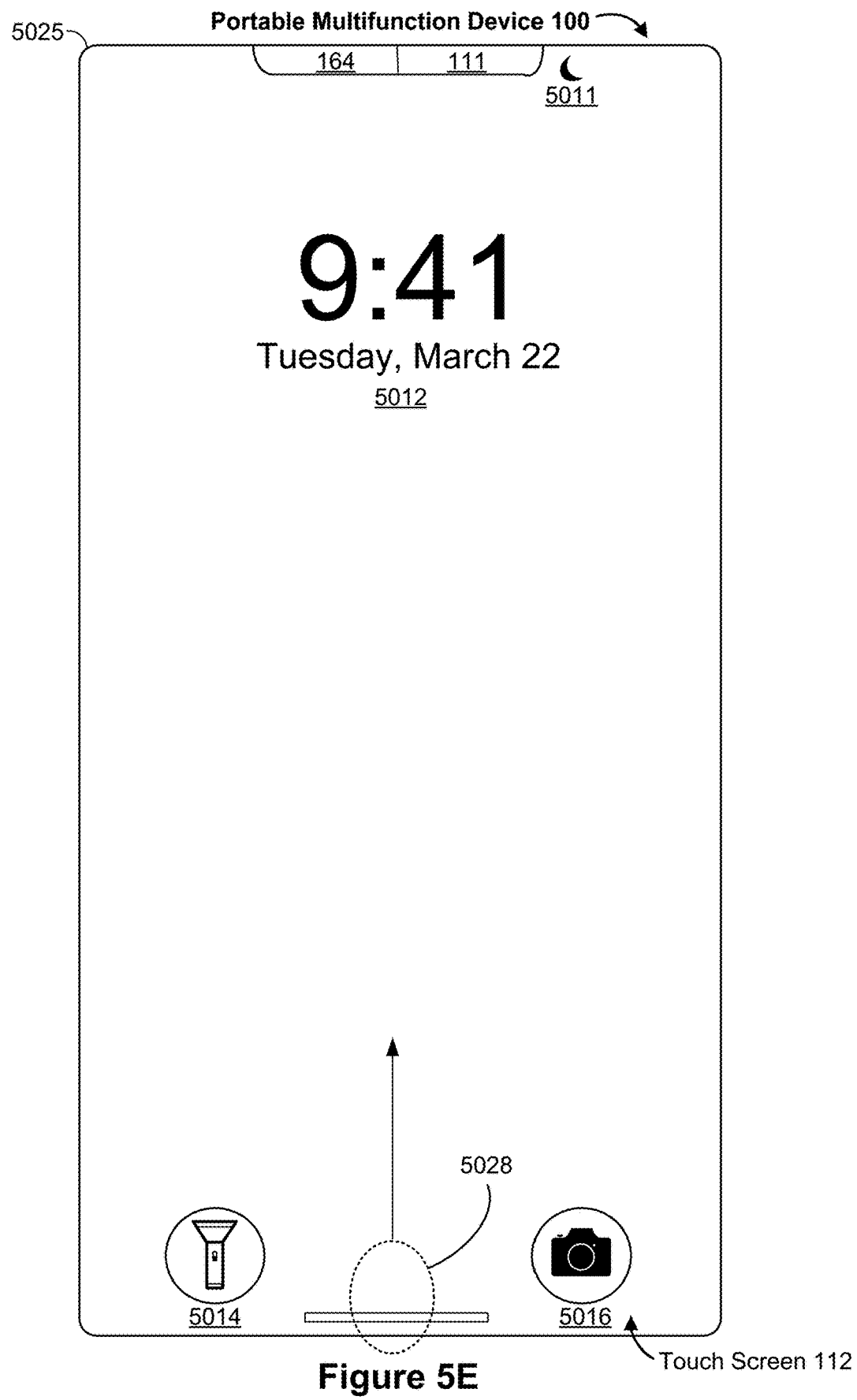
Figure 5F:
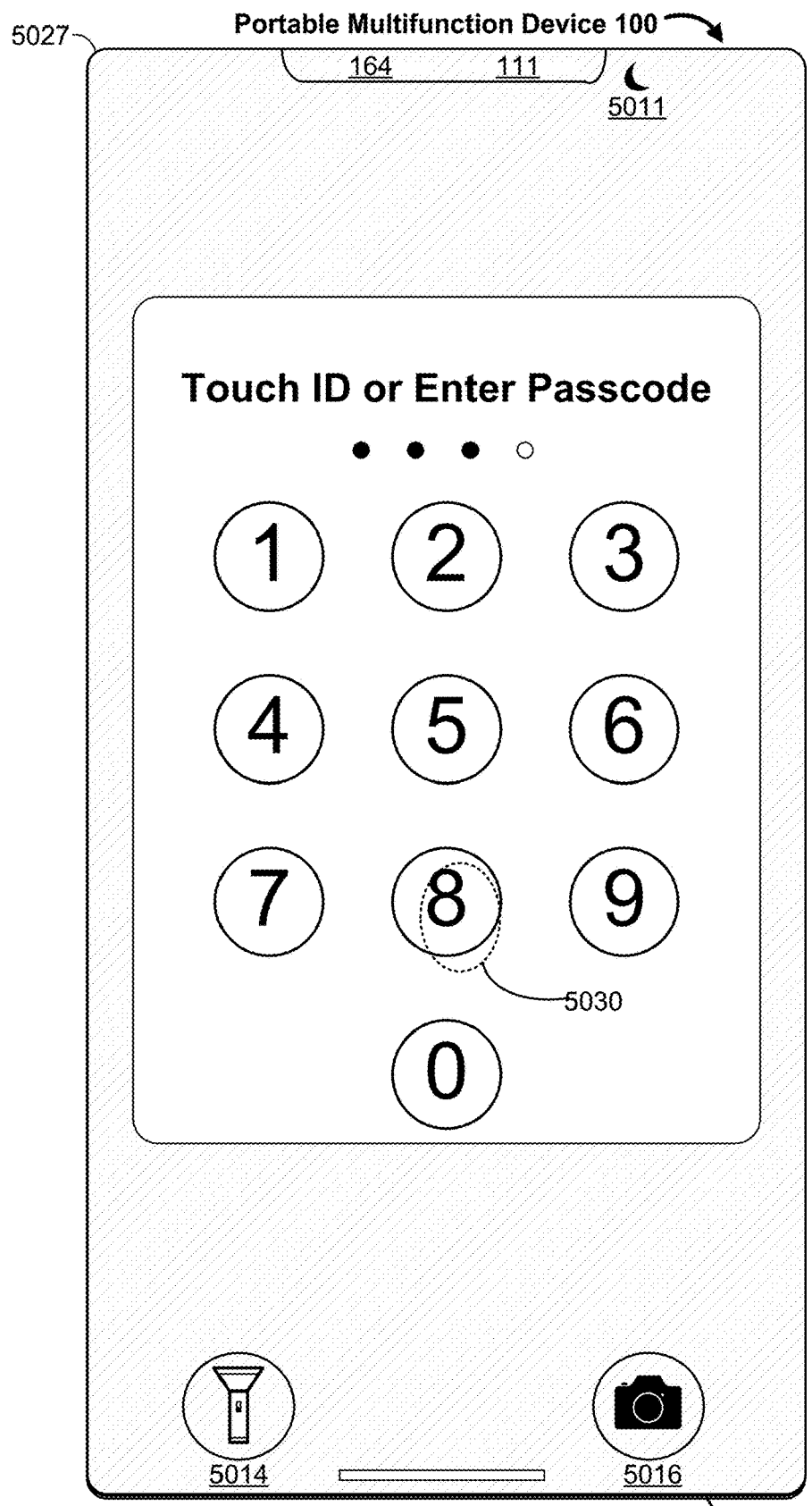
Figure 5G:

In FIG. 5E, while the device 100 displays a regular wake screen or lock screen 5025 during the wind down period, the device 100 detects a gesture that is normally used to dismiss the regular wake screen or lock screen 5025 to navigate to the home screen or last displayed application user interface. For example, the device 100 detects an upward edge swipe input by a contact 5028 while the regular wake screen or lock screen 5025 is displayed (e.g., while the current time is still within the wind down period, and the wind down mode is still active (e.g., as indicated by the DND indicator 5011)), as shown in FIG. 5E, and in response to the upward edge swipe gesture by the contact 5028, the device 100 dismisses the regular wake screen or lock screen 5025 and navigates to an authentication user interface 5027 (e.g., because the device is in an unauthenticated state), as shown in FIG. 5F. In FIG. 5F, authentication information (e.g., passcode entered by contact 5030) is provided through the authentication user interface 5027, and the device 100 verifies the received authentication information, changing the device state to authenticated and navigates to the home screen user interface 5029, as shown in FIG. 5G. In some embodiments, the authentication user interface 5027 is not displayed, and the device 100 directly navigates from the regular wake screen 5025 to the home screen 5029, if authentication is automatically obtained by the device 100 through other mechanisms (e.g., facial recognition, fingerprint, retina scan, etc.).

Figure 5H:
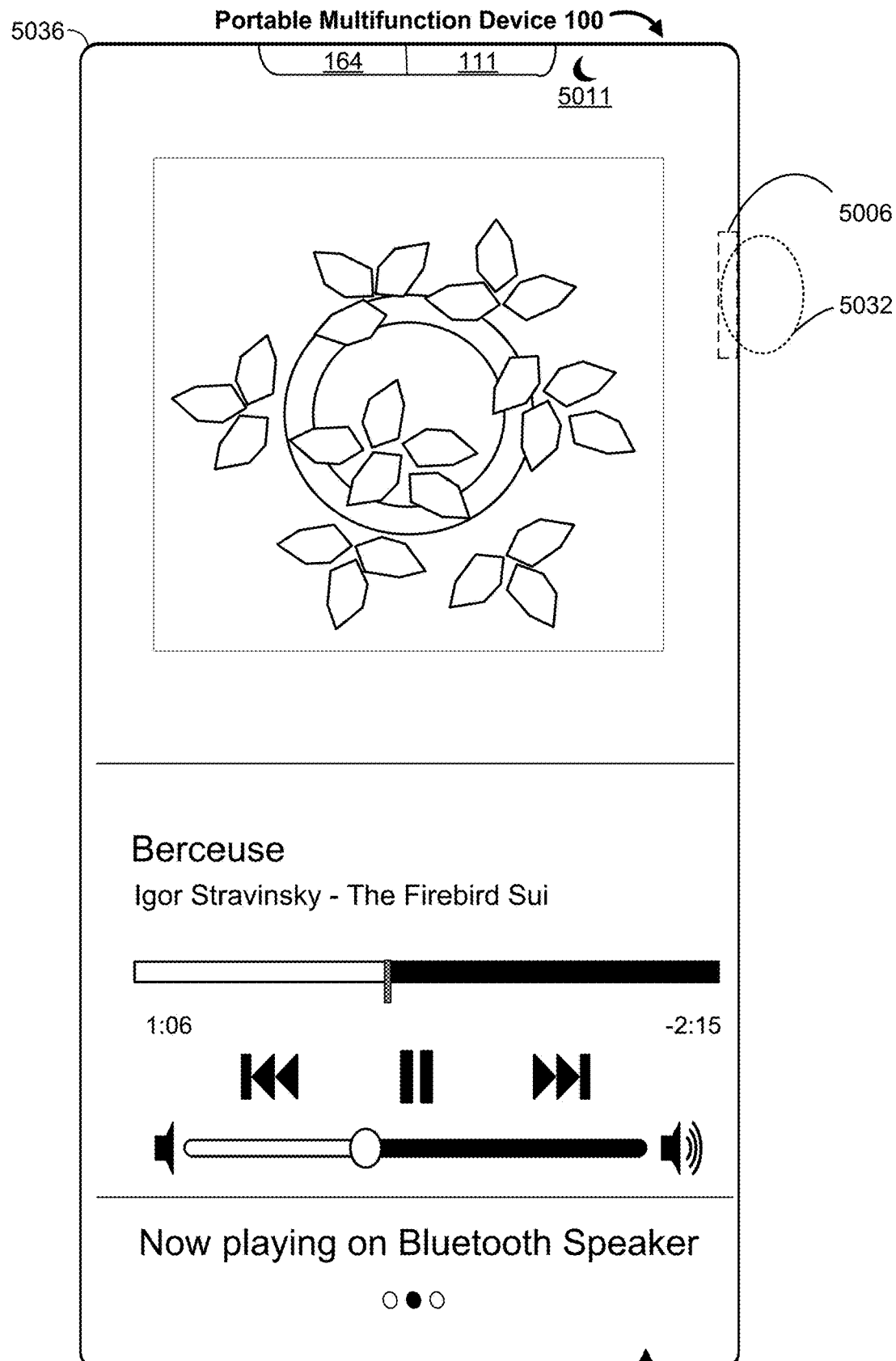
Figure 5I:
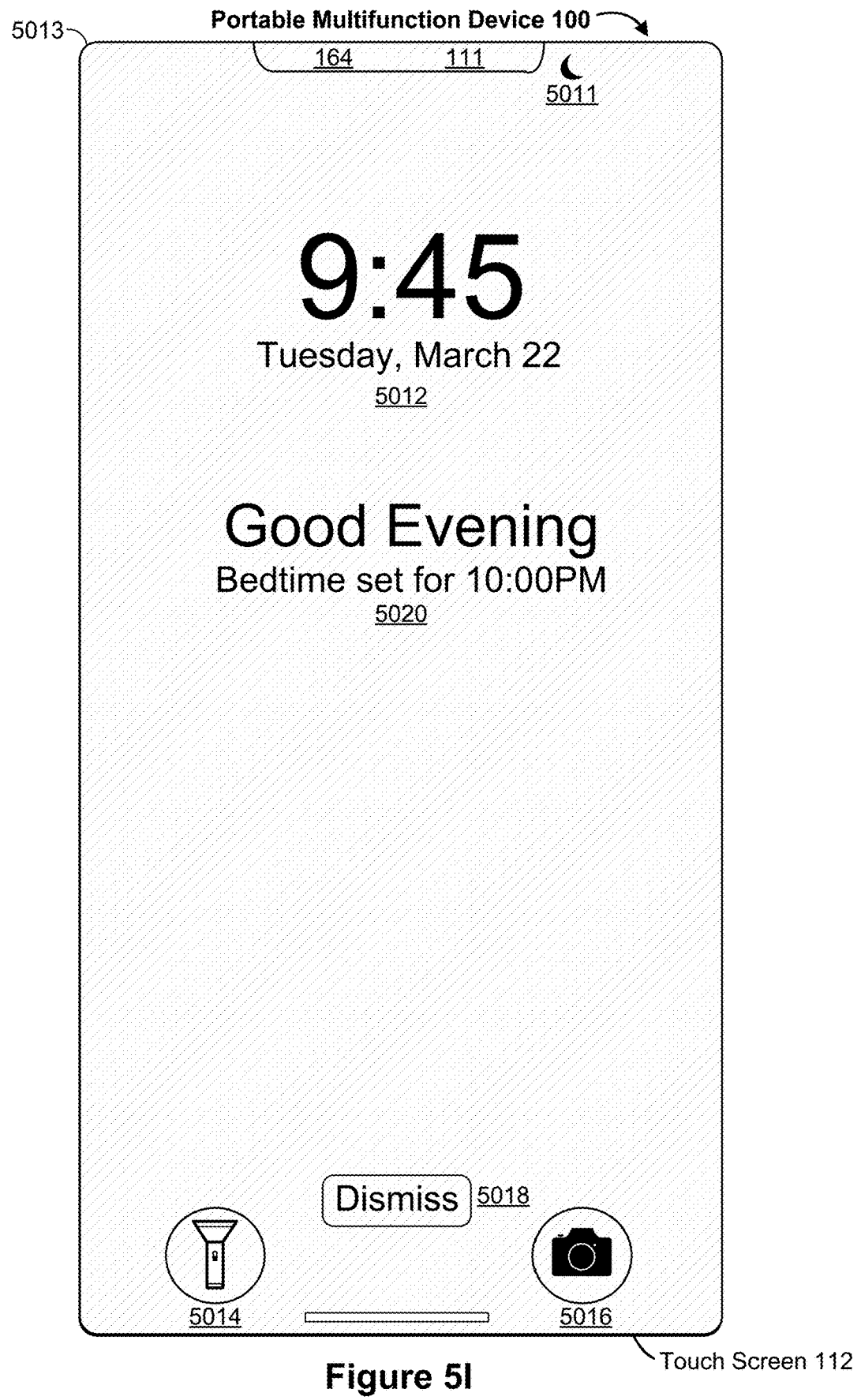

From the home screen user interface 5029 shown on FIG. 5G, the user can interact with the device 100 as normal. For example, the device 100 detects a user input by a contact 5031 on the application icon 480 of a music application in FIG. 5G. In response, as shown in FIG. 5H, the device 100 replaces display of the home screen user interface 5029 with an application user interface 5036 of the music application. While displaying the music application user interface 5036, the device 100 detects a press input by a contact 5032 on the button 5006. In some embodiments, the button 5006 is a lock button that locks the device 100 and optionally causes the touch screen 112 to transition into a low power or dormant state. In some embodiments, a different user input is detected that locks the device 100. In the example shown in FIG. 5I, the current time is still during the wind down period preceding the upcoming sleep period. As shown in FIGS. 5G-5I, the Do Not Disturb indicator 5011 is persistently displayed on the touch screen indicating that the wind down mode is still active during this time.

In FIG. 5I, after the device 100 has returned to a restricted state during the wind down period (e.g., in response to the press input by contact 5032 on the lock button 5006), or woken from the low power or dormant state (e.g., in response to a tap input on the display, another press input on the button 5006, movement of the device toward the user, etc., detected after the press input by contact 5032 on the lock button 5006, etc.), the device 100 displays the wind down screen 5013 again. To subsequently regain access to the home screen 5029 and/or the music application user interface 5036, the user is required to go through the sequence of steps shown in FIGS. 5D-5F again. In some embodiments, if the user, after gaining access to the home screen and/or application user interfaces during the wind down period, does not lock the device 100 until the scheduled sleep period is reached, the device transitions into sleep mode at the scheduled sleep time and displays a sleep screen (e.g., a darker and simplified wake screen as compared to the wind down screen) when the user locks and wakes the device again.

Figure 5J:
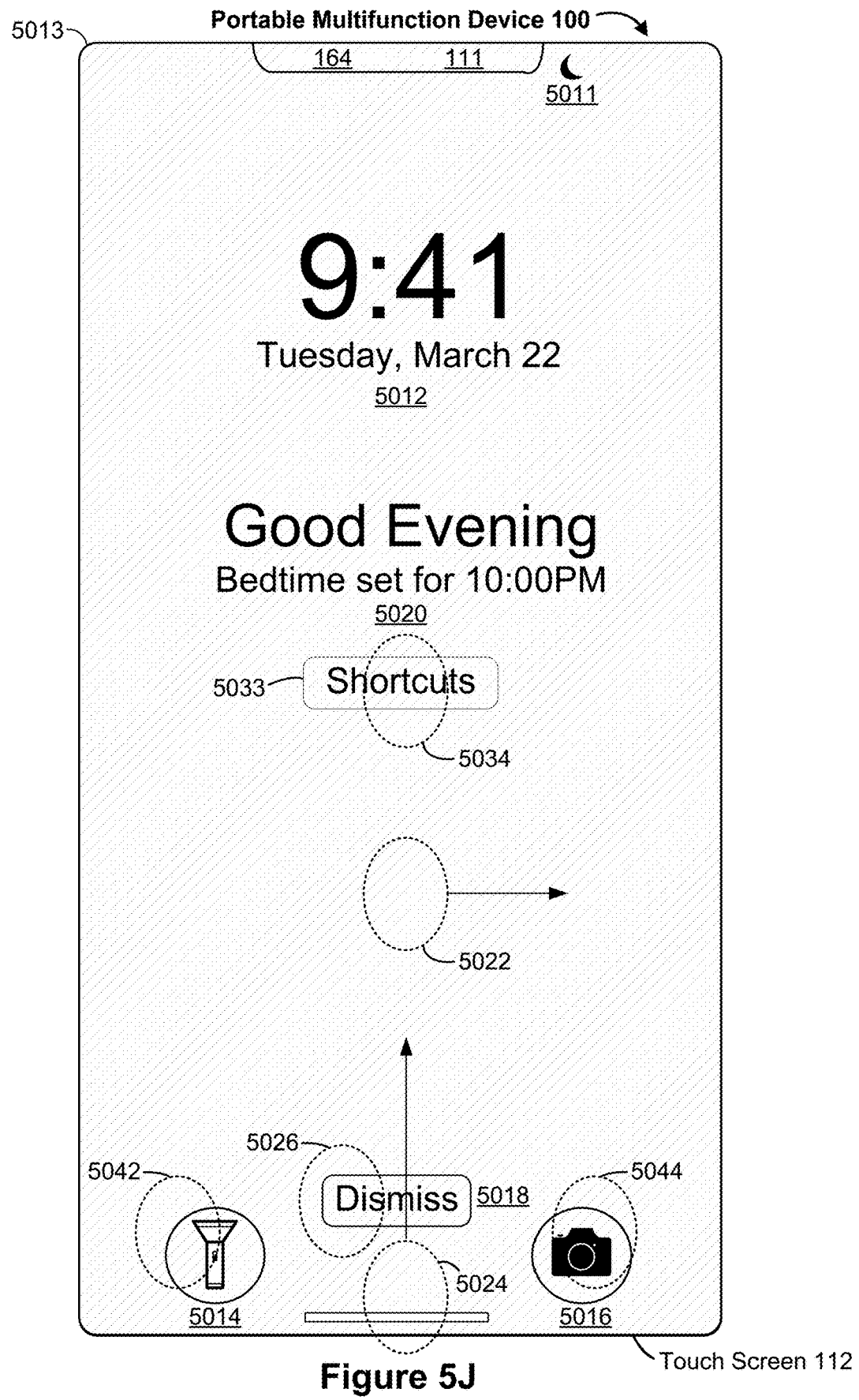

FIG. 5J illustrates an exemplary wind down screen 5013 with one or more selectable options corresponding to preset application functions of one or more applications. In some embodiments, the user can set up a limited set of application functions that remains directly accessible on the wind down screen without requiring the user to dismiss the wind down screen and/or unlock the device to use the application functions. In some embodiments, as shown in FIG. 5K, an action platter 5047 including the one or more selectable options for the application functions is displayed on the wind down screen 5013 in addition to other user interface objects (e.g., time and date element 5012, bedtime reminder 5020, dismiss button 5018, affordances 5014 and 5016, etc.) available on the wind down screen 5013.

In some embodiments, as shown in FIG. 5J, the device 100 displays the wind down screen 5013 that includes a shortcuts affordance 5033. In response to detecting a tap input by a contact 5034 on the shortcut affordance 5033, the device 100 displays the one or more selectable options corresponding to the preset application functions of one or more applications (e.g., in a platter that expanded from affordance 5033, a drop down menu, or a pop up window, etc.), as shown in FIG. 5K. In some embodiments, the one or more selectable options corresponding to the preset application functions, when activated, cause performance of the corresponding preset application functions. In some embodiments, performance of a preset application function includes displaying an authentication user interface, and performing the preset application function after receiving valid authentication information through the authentication user interface. In some embodiments, the shortcut affordance 5033 is optionally displayed on the sleep screen and/or good morning screen, and optionally displays a different set of application functions from those shown on the wind down screen. In some embodiments, the wind down screen 5013 that includes the action platter 5047 or shortcut affordance 5033 cannot be dismissed using the regular dismissal gestures (e.g., upward edge swipe input by contact 5024, rightward swipe input by contact 5022, etc.) to cause navigation to the home screen and/or application user interfaces that are displayed beyond a regular wake screen or lock screen 5025. In some embodiments, a tap hold input by a contact 5042 on the affordance 5014 causes the flash function to be activated without unlocking the device, and a tap input by a contact 5044 on the affordance 5016 causes the camera function to be activated without unlocking the device. In some embodiments, the affordances 5014 and 5016 are not available on the wind down screen 5013.

Figure 5K:
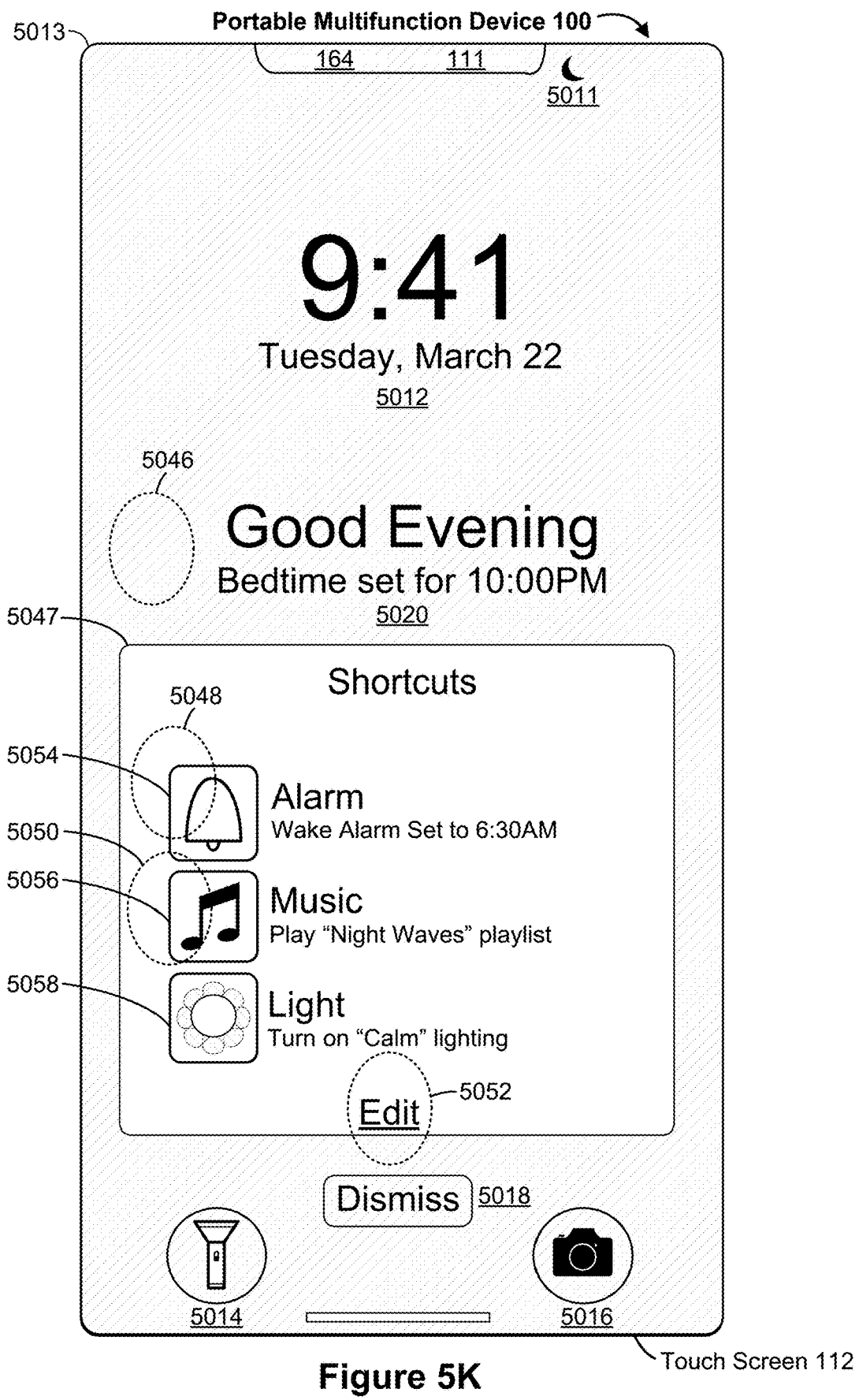

As shown in FIG. 5K, in response to the tap input by the contact 5034 on the shortcut affordance 5033, the device 100 displays the action platter 5047. The action platter 5047 displays one or more selectable options corresponding to preset application functions of one or more applications. For example, the action platter 5047 (e.g., expanded or popped up from shortcuts affordance 5033) displays an alarm option 5054 for adjusting a wake alarm set for the current sleep period, a music option 5056 for starting playing a preset playlist using a selected music applications (e.g., the music application 480), and a light option 5048 for turning on "Calm" lighting using a smart home application. A tap input by a contact 5052 on the alarm option 5054 causes display of an alarm user interface 9041 (FIG. 9K) from which wake alarm settings for the current sleep time period can be adjusted. A tap input by contact 5050 on the music option 5056 causes playback of the preselected playlist to be started using the music application, while the wind down screen remain displayed and while the display is in the low power or dormant state. In some embodiments, a tap input by a contact 5046 outside of the action platter 5047 (FIG. 5K) causes the platter to collapse and the shortcut affordance 5033 to be displayed again (e.g., as shown in FIG. 5J). In some embodiments, the options include an option to launch a preselected application. In response to a tap input on an option to launch a preselected application, the device 100 displays the application (e.g., without requiring the user to navigate passed the wind down screen or regular wake screen in the usual manner described above), and allow user to interact with the application in the normal manner. When the user exits (e.g., navigates away from) the application, the device redisplays the wind down screen 5031.

Figure 5L:
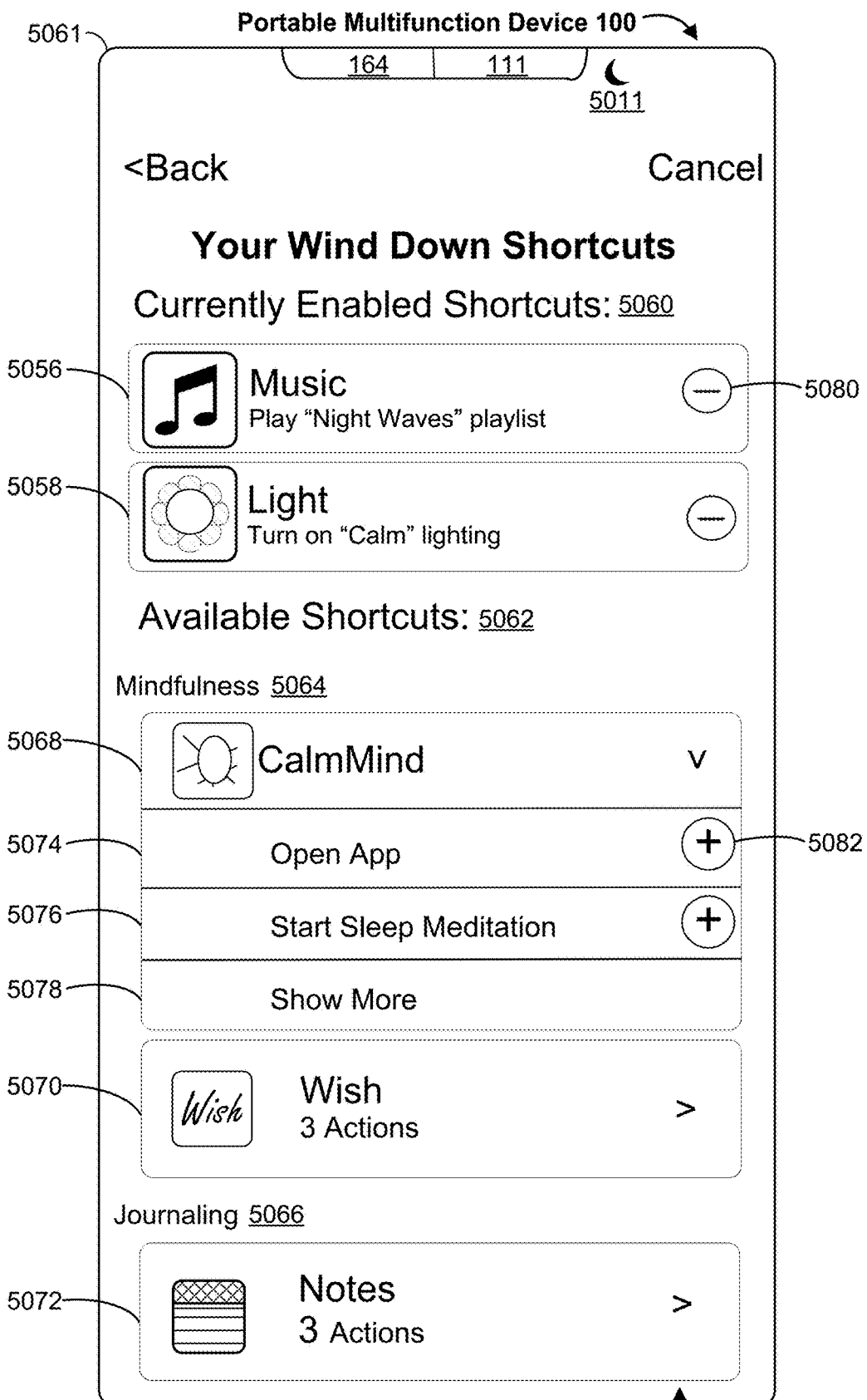

In some embodiments, an edit button 5052 is included in the action platter 5047 (FIG. 5K), and a tap input on the edit button 5052 causes an action or shortcut configuration user interface 5061 (FIG. 5L). The action or shortcut configuration user interface 5061 allows a user to configure the preset application functions to be included on the wind down screen, and optionally, the sleep screen and/or the good morning screen. In some embodiments, the shortcut configuration user interface 5061 displays currently selected application functions in a first portion (e.g., under an enabled shortcuts header 5060). The currently selected application functions can be removed (e.g., via a minus button 5080 displayed for each currently selected application function). In some embodiments, the shortcut configuration user interface 5061 displays a plurality of application categories (e.g., a mindfulness category 5064, a journaling category 5066, etc.), each including one or more suggested applications (e.g., under the mindfulness category 5064, two applications 5068 and 5070 are displayed). In some embodiments, the displayed applications and functions are pre-selected based on the scheduled mode change. For example, the action or shortcut configuration user interface 5061 displays applications that are preselected in preparation for bedtime. In some embodiments, one or more application functions are displayed under each application (e.g., an option 5074 for opening the application, and an option 5076 for starting a sleep mediation function of the application are displayed for the application 5068). In some embodiments, a maximum number of functions for a specific application is displayed (e.g., to conserve space on the display) and additional functions can be displayed (e.g., by selected a show more option 5078). In some embodiments, the displayed functions are ordered based on specific criteria (e.g., popularity with respect to one or more other devices or relevance to a particular condition and/or a user account associated with the device 100). In some embodiments, a plus button 5082 is displayed next to each application function to add the function to the set of currently selected application functions. In some embodiments, the actions available for selection is displayed in response to a tap input on an expand affordance displayed next to the application (e.g., application 5070).

Figure 5M:
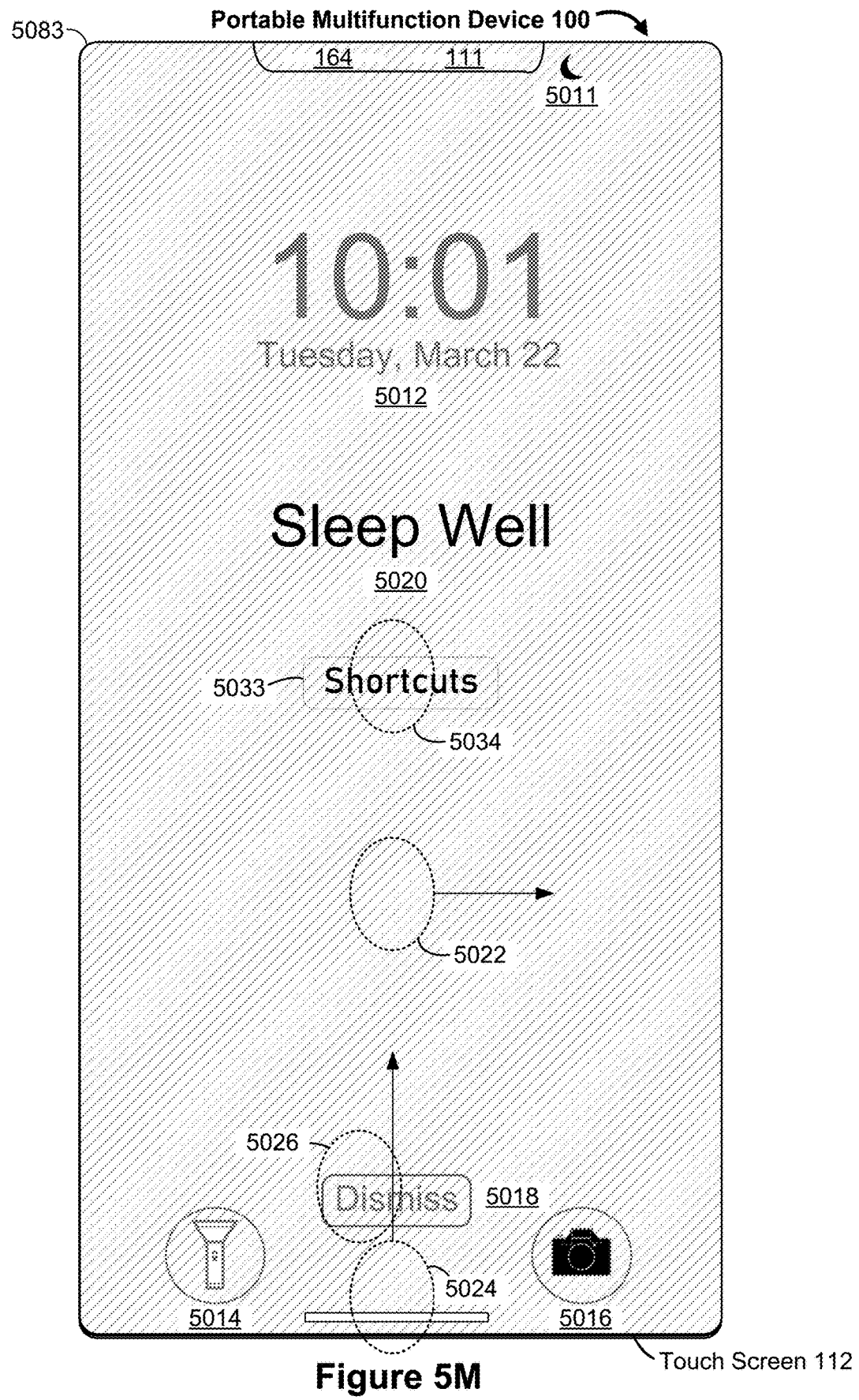
Figure 5N:
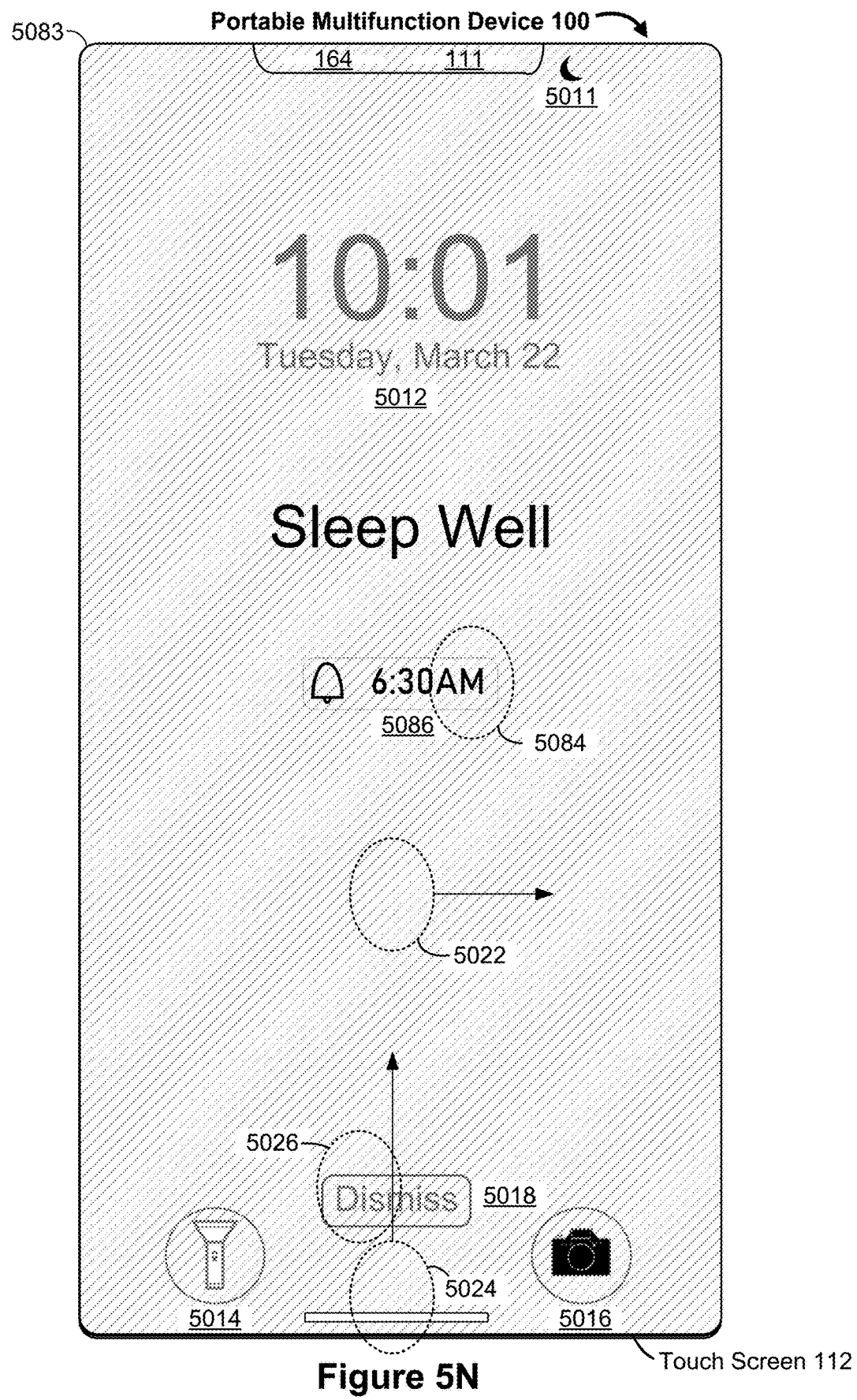
Figure 5O:
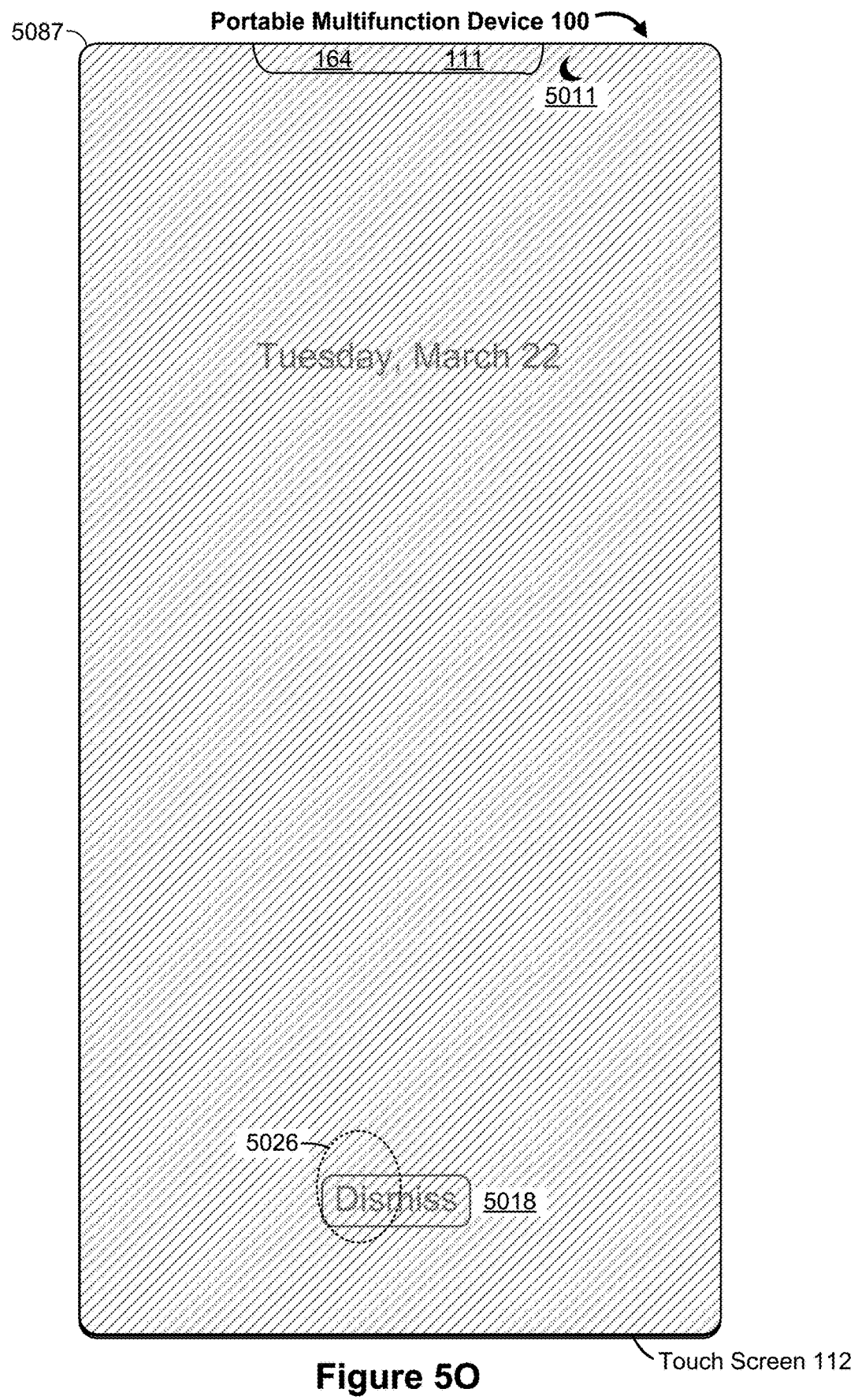

FIGS. 5M-5O illustrate exemplary user interfaces that correspond to a restricted mode that is displayed during a scheduled mode (e.g., a sleep mode during a sleep period). In some embodiments, during the scheduled mode, the device 100 operates with settings that correspond to (e.g., designed to promote or enable) a reduced level of user interactions with the device (e.g., displaying a simplified screen-lock user interface, locking certain user interface features, lowering screen brightness, suppressing notifications, turning on Do-Not-Disturb mode, etc.). For example, the device 100 displays a sleep screen 5083 in response to an input that wakes the display (e.g., a tap input on the touch-screen 112, movement of the device toward the user, etc.), after the device 100 has transitioned into the sleep mode (e.g., from the wind down mode) at the start of the scheduled sleep time period (e.g., 10:00 PM). Similar to the wind down screen 5013, the device 100 does not respond to the rightward swipe gesture by a contact 5022 or the upward edge swipe gesture by a contact 5024, and does not dismiss the sleep screen 5083. Additionally, the sleep screen 5083 is displayed with a reduced luminosity (e.g., as compared to the wind down screen 5013 and regular wake screen 5025). During the sleep mode, the device 100 is also operated with the Do Not Disturb mode activated, as indicated by the DND indicator 5011 on the sleep screen. In some embodiments, similar to the wind down screen 5013, the sleep screen 5083 is provided with a shortcut button 5033 that, when activated by a tap input by a contact 5034, causes display of an action platter with selectable options corresponding to a limited set of application functions that are preselected to be available during the scheduled sleep time period. In some embodiments, a different set of application functions are made available during the sleep period from those available during the wind down period. In some embodiments, similar to the wind down screen 5013, the sleep screen 5083 requires a predefined input (e.g., a tap input by a contact 5026 on the dismiss button 5018) in order to be dismissed, and once dismissed, the device navigates to the regular wake screen user interface 5025 (optionally with a reduced luminosity as well). FIG. 5N shows the sleep screen 5083 that is displayed when no action is preselected to be available during the sleep period, and only a wake alarm is set for the sleep period. In FIG. 5N, instead of the shortcut button 5033, an alarm indicator 5086 showing the wake time of 6:30 AM is displayed. In some embodiments, a tap input on the alarm button 5086, causes display of the alarm user interface 9041 (FIG. 9K) from which wake alarm settings for the current sleep time period can be adjusted.

FIG. 5O illustrates an exemplary simplified sleep screen 5087 that is displayed in place of the sleep screen 5083 or that is displayed during the sleep period after a prolonged period of inactivity (e.g., during actual sleep of the user as detected by the device 100 or a companion device such as a watch or other wearable devices) during the scheduled sleep period. In some embodiments, the simplified sleep screen 5087 is further dimmed relative to the wind down screen 5013 or sleep screen 5083, and has only the current date and no current time and no wake time indicator displayed. In some embodiments, no shortcut affordance is displayed on the simplified sleep screen 5087. In some embodiments, when the sleep screen 5087 is displayed during the sleep period in response to user input waking the device, the device ignores all inputs that normally dismisses a regular wake screen or lock screen, and only dismisses the sleep screen when a predefined input (e.g., a tap input by a contact 5026 on the dismiss button 5018) is detected. In some embodiments, upon dismissing the sleep screen 5087, the device 100 displays the regular wake screen 5025. The sleep mode remains active after the sleep screen 5087 is dismissed, and the device displays the sleep screen 5087 again whenever the device is woken during the sleep period. In some embodiments, a sleep screen that is completely dark except for a dim DND indicator is displayed when the device is woken during the sleep period. In some embodiments, the sleep screen 5087 does not include affordances 5014 and 5016 for triggering the flashlight and camera functions. In some embodiments, the animated transition between the wind down screen and the sleep screen is triggered when the start time of the scheduled sleep time period is reached.

Figure 5P:
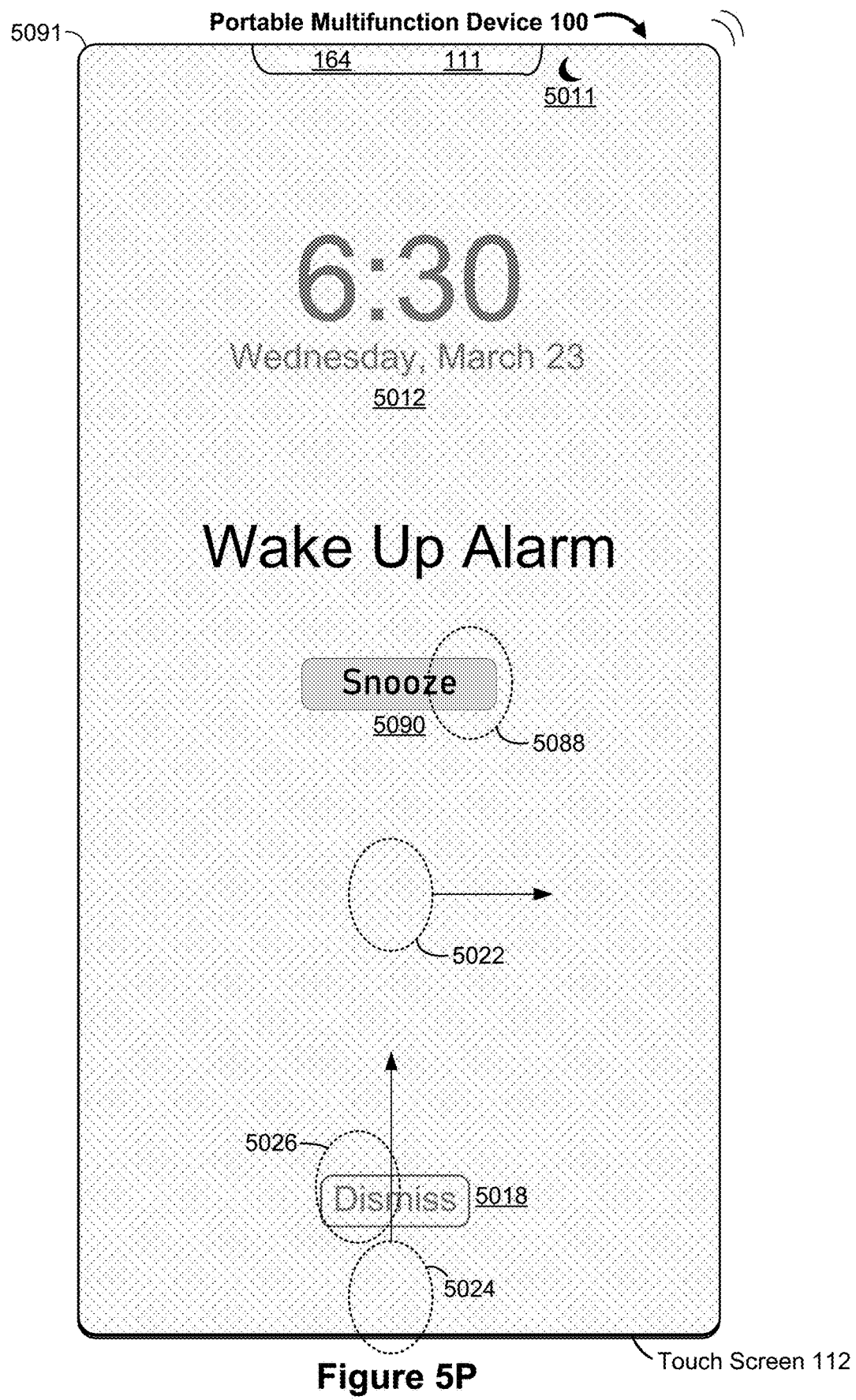
Figure 5Q:
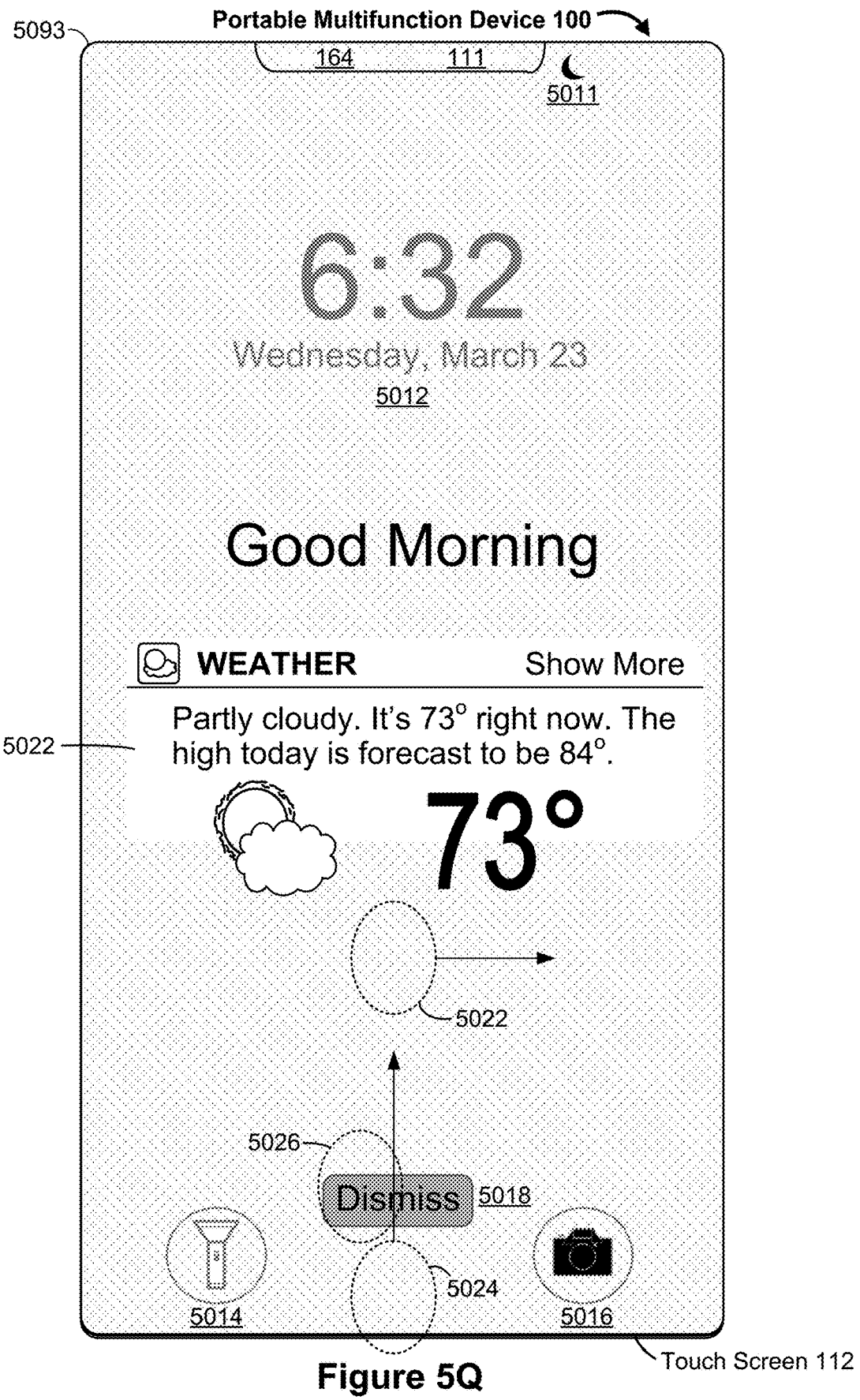

FIG. 5P illustrates an exemplary alarm notification screen 5091 that is displayed at or proximate to (e.g., slightly delayed after the companion device generates the alarm first) the end time of the sleep period (e.g., at 6:30 AM the next day). In some embodiments, the wake alarm user interface is displayed in conjunction with another non-visual alarm output (e.g., a tactile output and/or an audio output). In some embodiments, the alarm notification screen is similar to a wind down screen, except that the shortcut button or alarm button is replaced with a snooze button 5090. In some embodiments, a tap input by a contact 5088 on the snooze button 5090 causes the device 100 to adjust the end time of the sleep period to a later time (e.g., snooze, temporarily stopping outputting the non-visual alarm output). In some embodiments, the alarm notification screen 5091 also includes the dismiss button 5018 that, when activated by a tap input by a contact 5026, causes the alarm notification screen 5091 to be dismissed and the non-visual alarm output to be stopped. The device exits the sleep mode upon dismissing the alarm notification screen 5091. In some embodiments, upon dismissal of the alarm notification screen 5091, the device displays a good morning screen 5093, as shown in FIG. 5Q. In some embodiments, if a wind up period after a sleep period is not enabled, the device displays the regular wake screen 5025 instead of a good morning screen. In some embodiments, the normal inputs that dismisses a regular wake screen or lock screen (e.g., upward edge swipe input by a contact 5024, a rightward swipe input by a contact 5022) does not dismiss the alarm notification screen 5091.

Figure 5R:
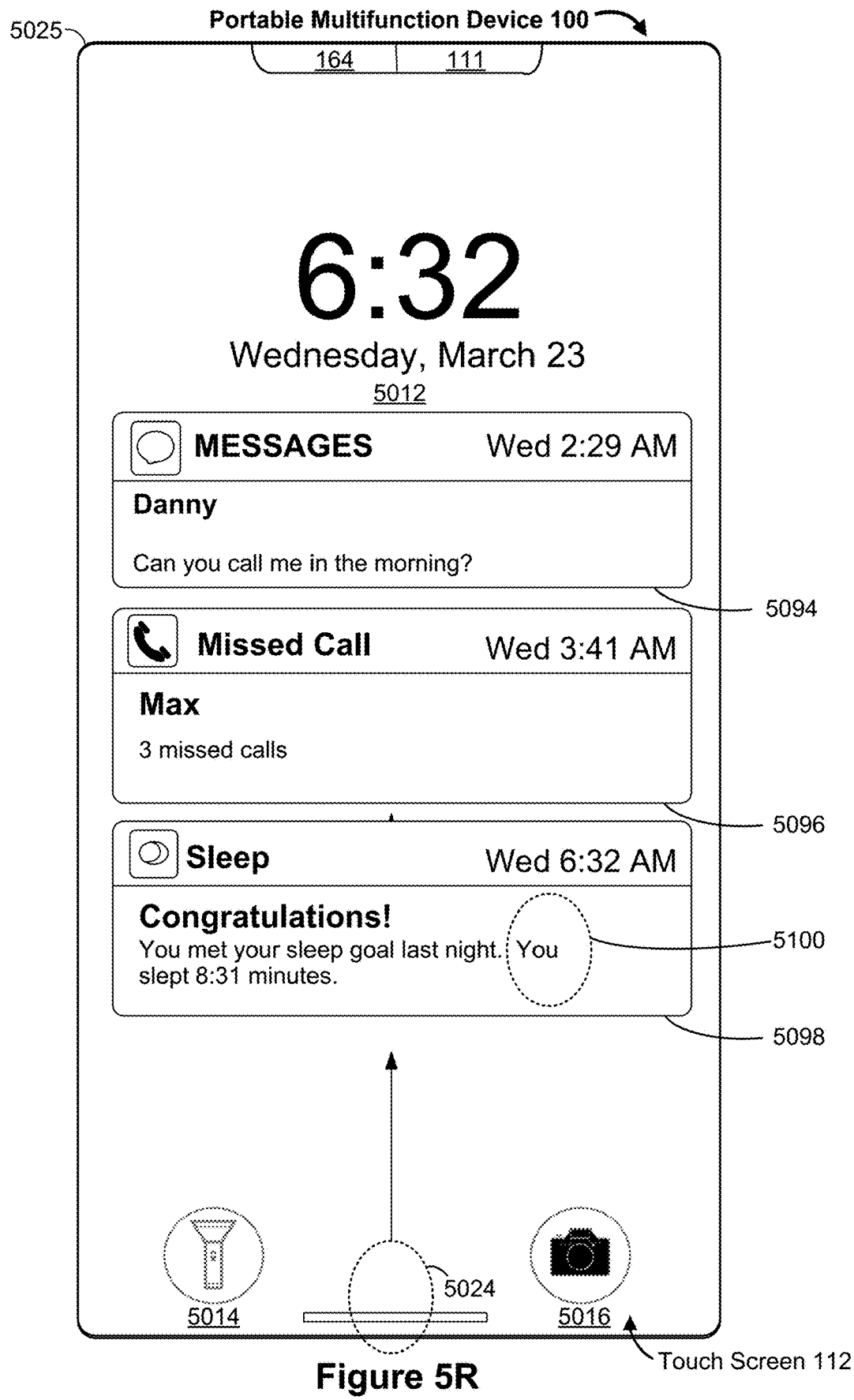
Figure 5S:
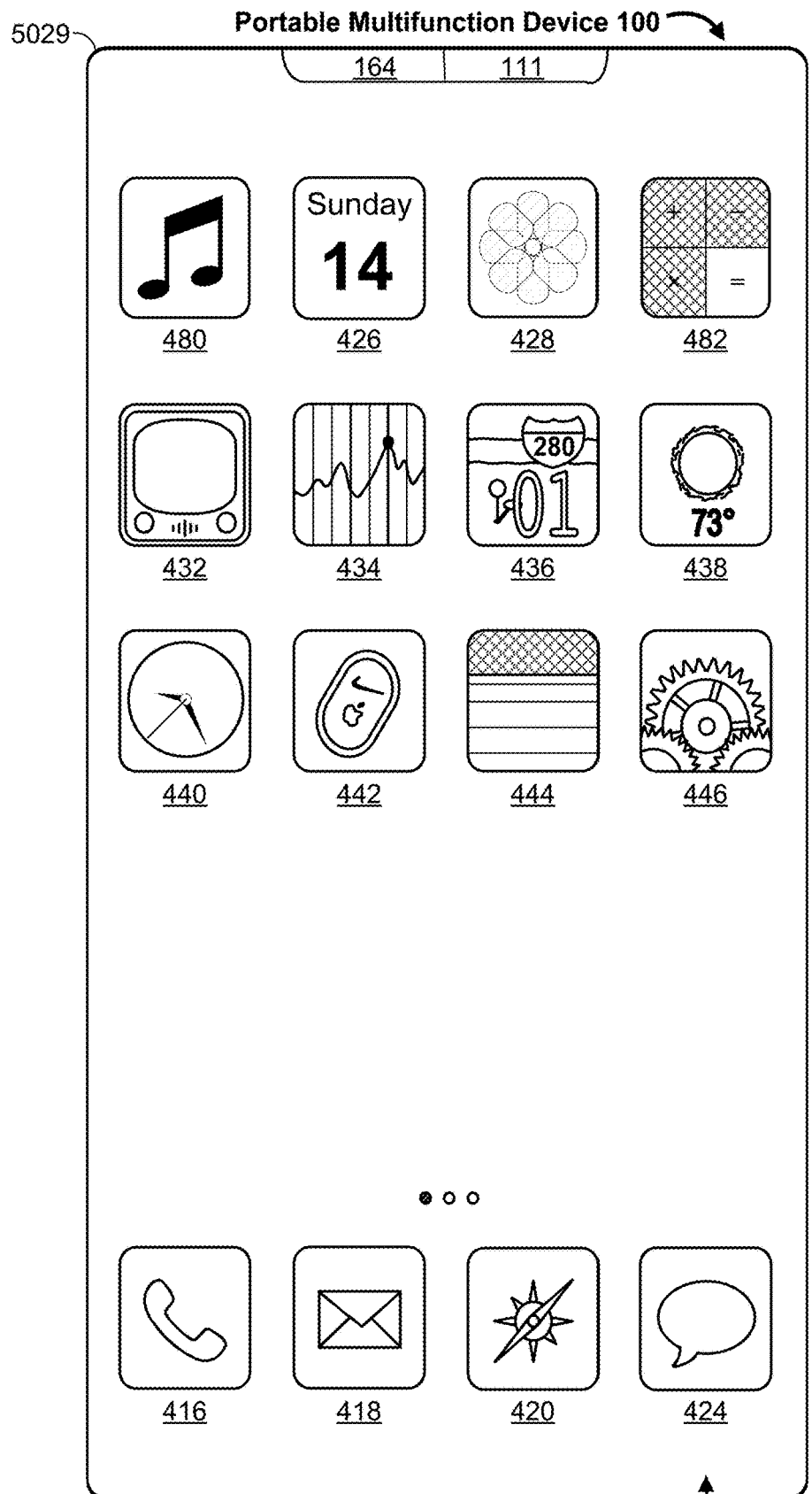

In some embodiments, a good morning screen 5093 is displayed in response to a user input that wakes the device from a low power or dormant state during a preset wind up period (also referred to as a good morning period) succeeding the recently completed sleep period. During the wind up period, the Do Not Disturb mode is still turned on, and most notifications are still suppressed. Scheduled alarms are not suppressed during the good morning period, the sleep period, the wind down period, or any combination thereof. In some embodiments, the good morning screen 5093 displays the date and time element 5012, a good morning message, and has a brighter screen luminosity as compared to the sleep screen and the wind down screen. In some embodiments, the good morning screen 5093 displays some low impact information such as the weather in a notification or platter 5022. In some embodiments, the normal inputs that dismisses a regular wake screen or lock screen (e.g., upward edge swipe input by a contact 5024, a rightward swipe input by a contact 5022) does not dismiss the good morning screen 5093. In some embodiments, the good morning screen 5093 also includes the dismiss button 5018 that, when activated by a tap input by a contact 5026, causes the good morning screen 5093 to be dismissed. The device exits the wind up mode upon dismissing the good morning screen 5093. In some embodiments, upon dismissal of the good morning screen 5093, the device displays the regular wake screen 5025, as shown in FIG. 5R. In some embodiments, as shown in FIG. 5R, notifications that were received and suppressed during the wind down period, the sleep period, the wind up period, or any combination thereof (e.g., a missed messages notification 5094, a missed calls notification 5096, etc.) are displayed on the wake screen user interface 5025. In some embodiments, upon becoming available, a notification 5098 regarding the sleep quality of the recently completed sleep period is displayed. In some embodiments, the device only displays the notification 5098 when the user has adhered to the sleep schedule (e.g., did not skip wind down, did not wake or interact with the device during the sleep period, etc.). In some embodiments, a tap input by a contact 5100 on the notification 5098 causes the device to display a user interface 5101 of an application that manages the sleep schedule. In some embodiments, the regular wake screen 5025 shown in FIG. 5R is dismissed by a regular input used to dismiss a regular wake screen user interface (e.g., an upward swipe gesture by a contact 5024, optionally combined with authentication inputs, etc.). Upon dismissal of the regular wake screen user interface 5025, the home screen user interface 5029 is displayed, as shown in FIG. 5S.

Figure 5T:
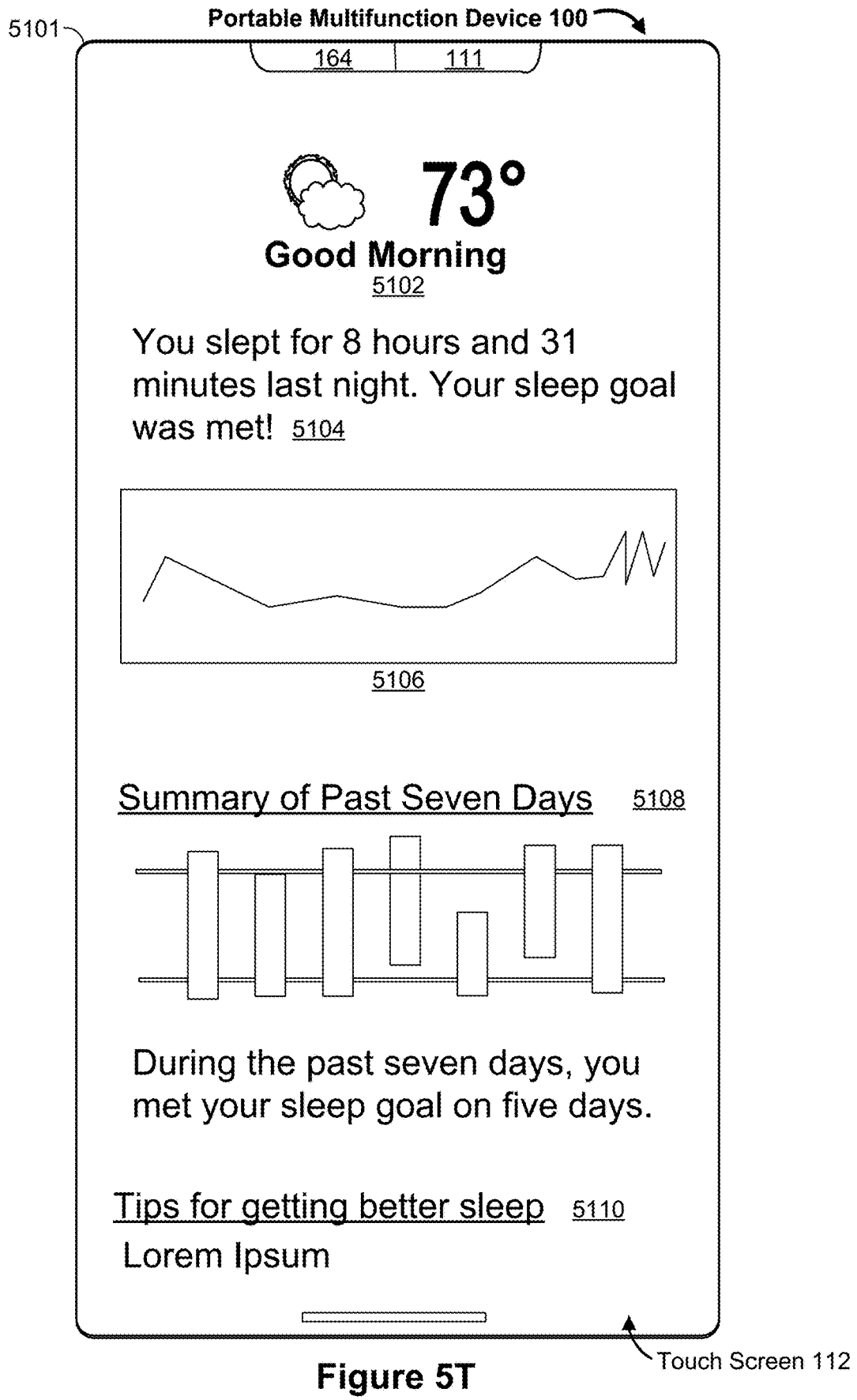

FIG. 5T illustrates an exemplary sleep data user interface 5101 in accordance with some embodiments. The sleep data user interface 5101 optionally includes a weather section 5102 showing the weather forecast for the day, a summary 5104 of the recently completed sleep period, sleep quality data 5106 showing the quality of sleep monitored by the electronic device or a companion device of the electronic device, weekly summary data 5108 that shows the sleep data for a sequence of multiple days (e.g., showing whether the user has consistently missed or met the sleep goal, or adhered to the sleep schedule for a number of days), and a sleep tips section 5110 offering additional information about how the user's sleep quality can be improved. In some embodiments, the sleep data user interface 5101 includes additional or fewer sections than those shown in FIG. 5T. In some embodiments, the sleep data user interface 5101 displays data for a period different from a week. In some embodiments, the sleep data user interface 5101 displays positive coaching messages (e.g., does not display summary of the sleep period if the user does not meet his/her established sleep goal).

Figure 5U:
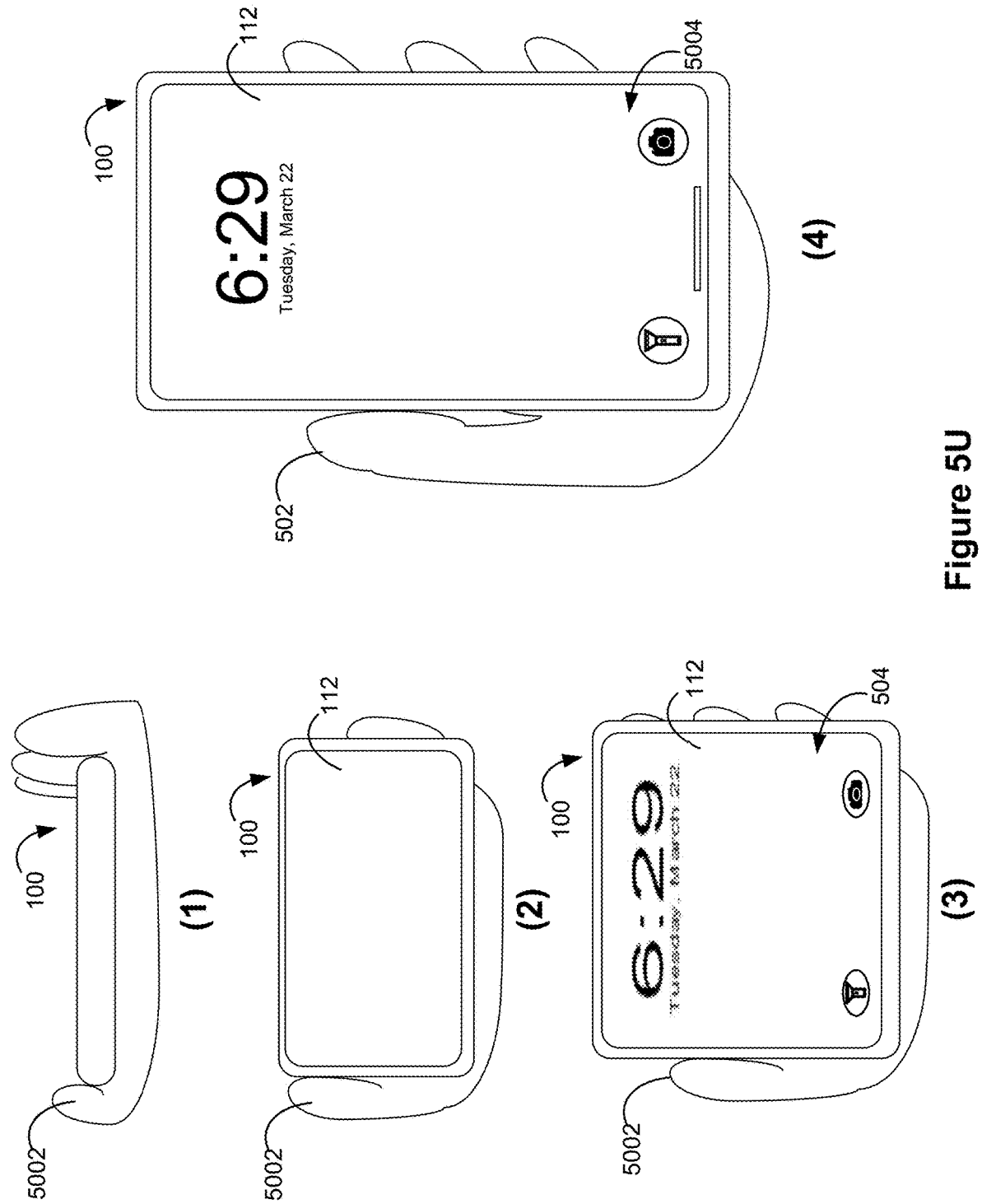
Figure 5V:
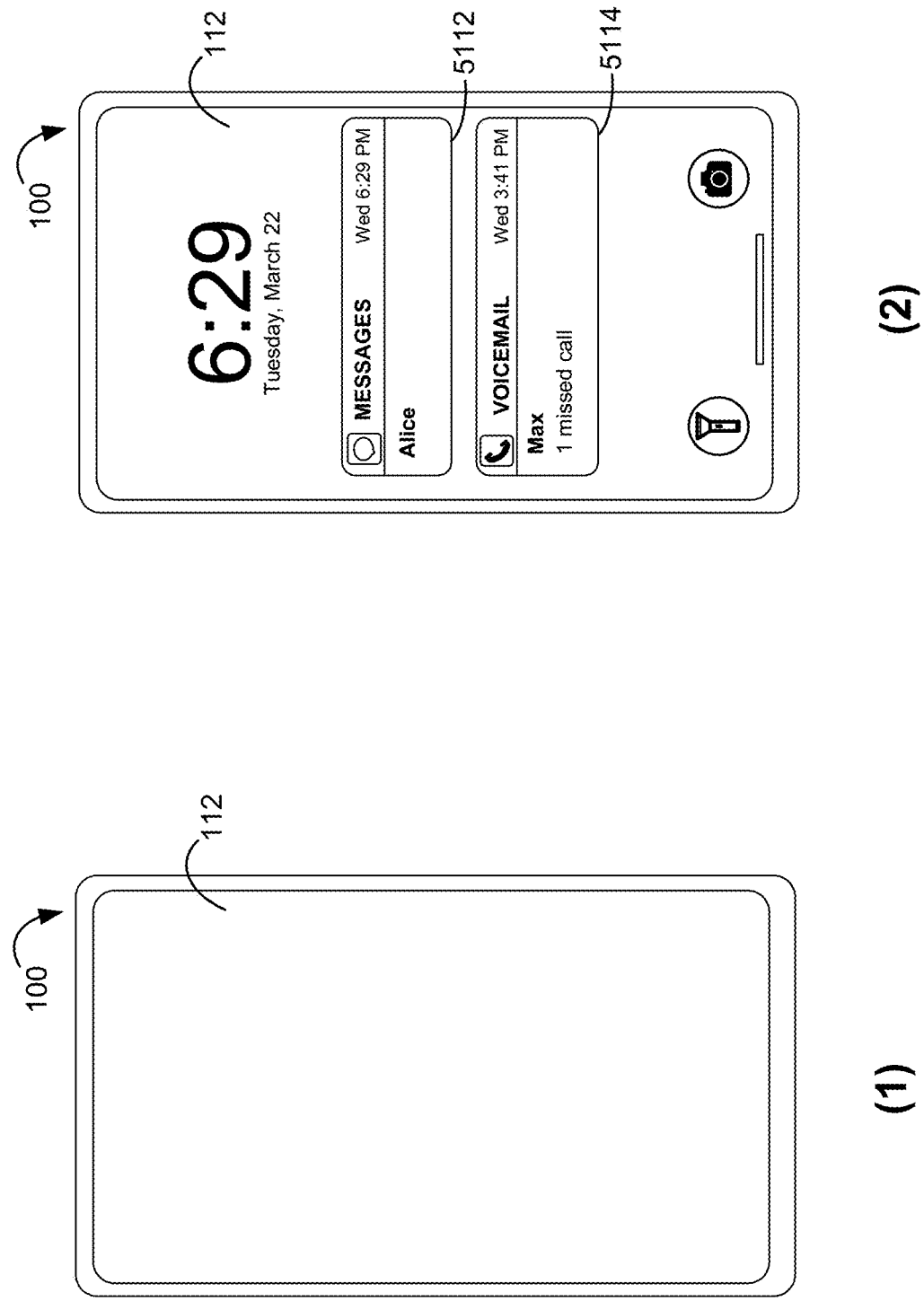
Figure 5W:
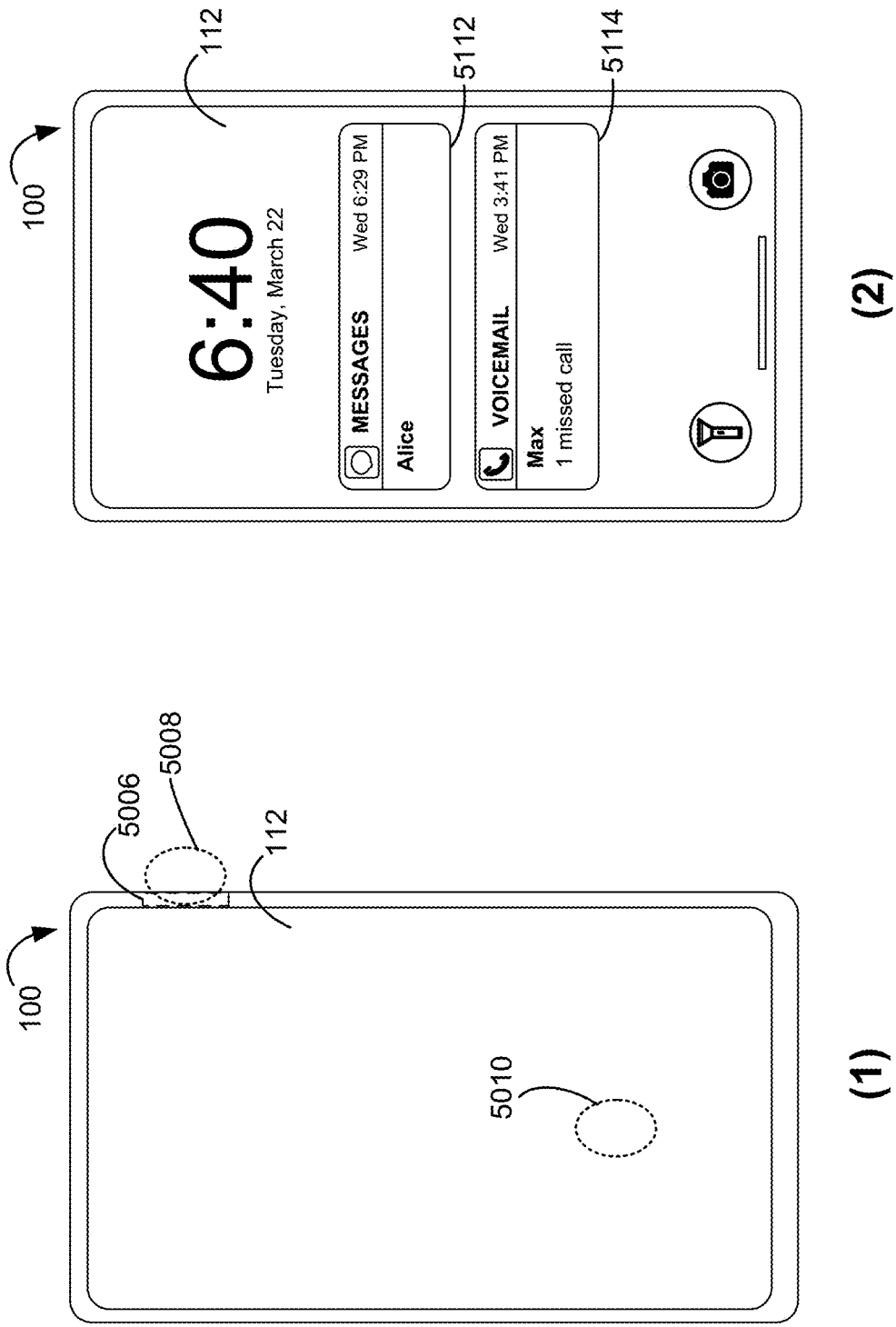

FIGS. 5U-5V illustrate displaying a regular wake screen 5025 in response to various wake inputs while the current time is outside of the preset time period preceding and/or after the scheduled mode change (the current time (e.g., 6:29 PM on Tuesday, 6:40 PM on Tuesday, etc.) is outside of the wind down period and the good morning period, and also outside of the sleep period). For example, as shown in FIG. 5U, in contrast to the scenario shown in FIG. 5A, the device displays a regular wake screen 5025 in response to the user raising the device toward the user when the current time is 6:29 PM on Tuesday. In FIG. 5V, in response to arrival of a new notification, the device displays a regular wake screen 5025 with the new notifications 5112 and an unread notification 5114 received earlier when the current time is 6:29 PM on Tuesday. In FIG. 5W, in response to a tap input by a contact 5010 or a press input by a contact 5008 on the lock button 5006, the device displays the wake screen user interface 5025 that optionally includes missed notifications 5112 and 5114, when the current time is 6:40 PM on Tuesday.

Figure 5X:
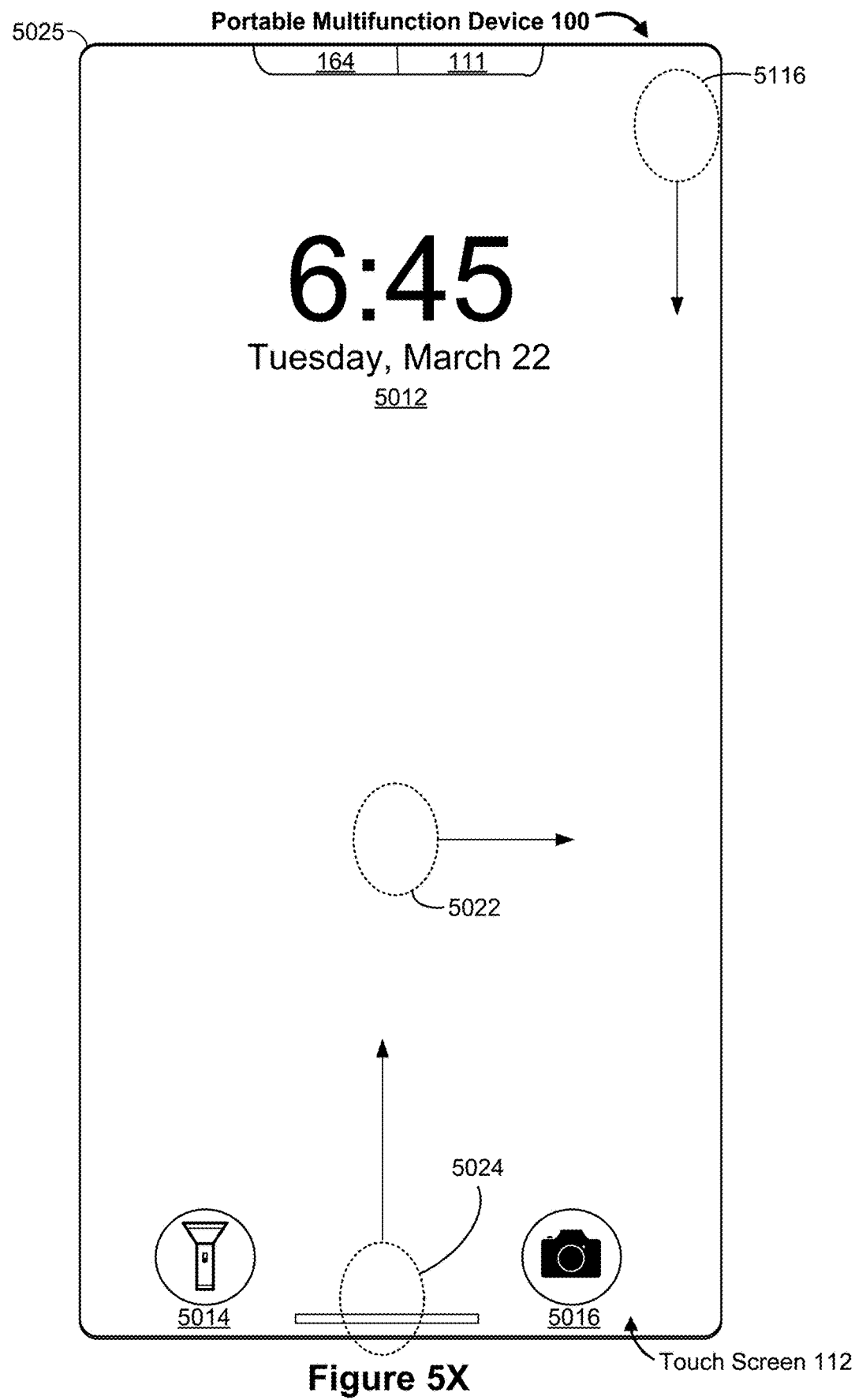
Figure 5Y:
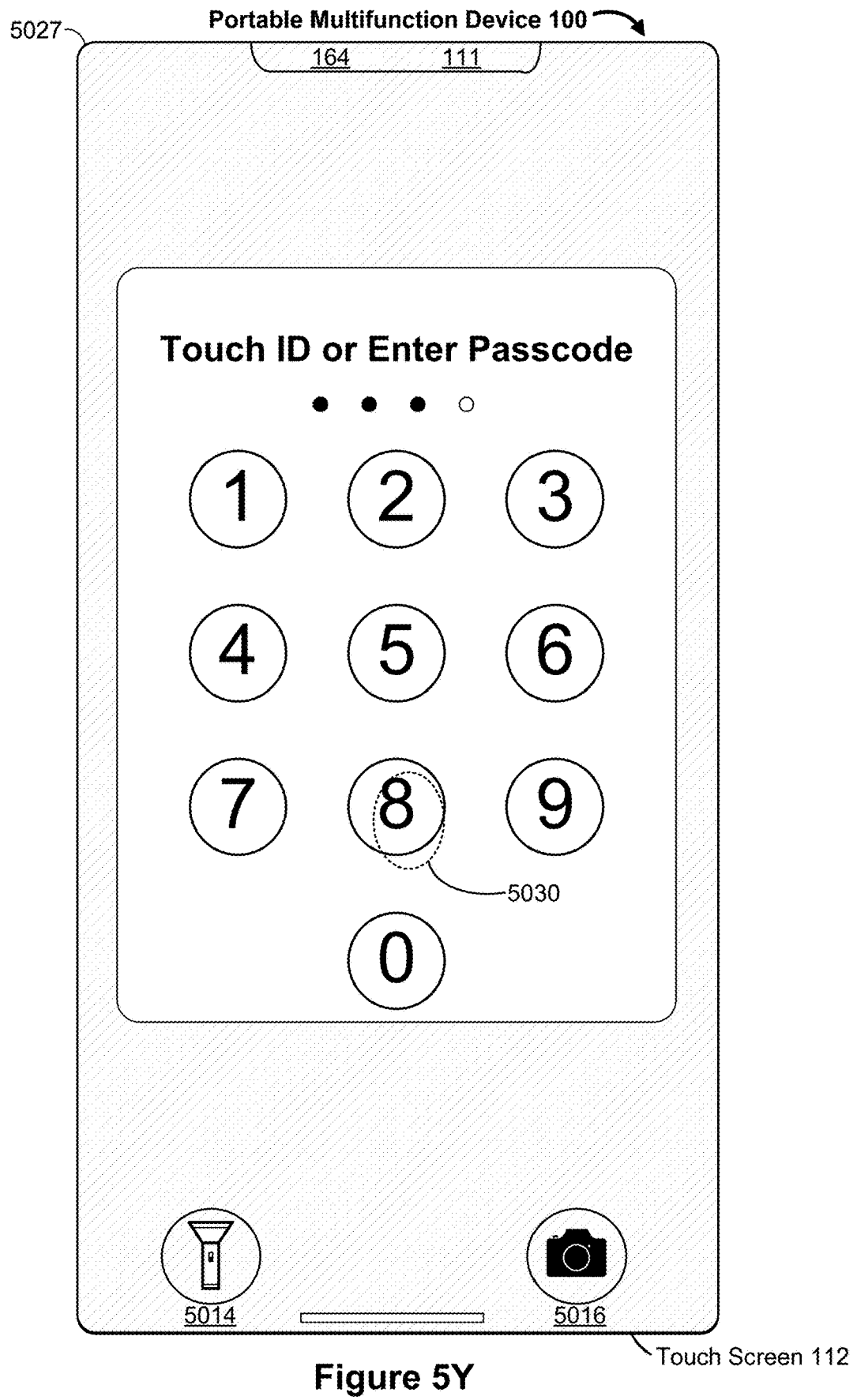
Figure 5Z:
Figure 5A:
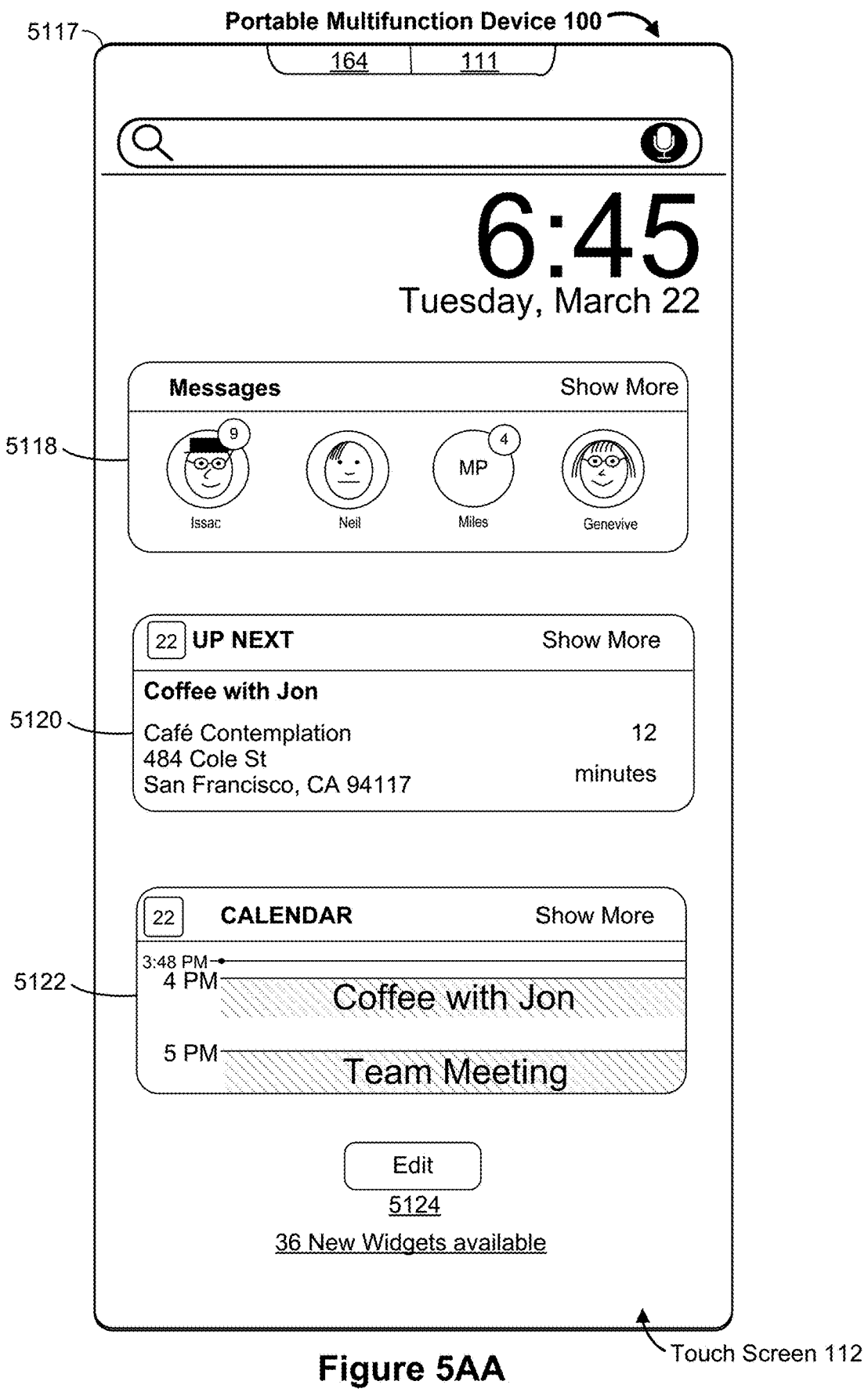
Figure 5A:
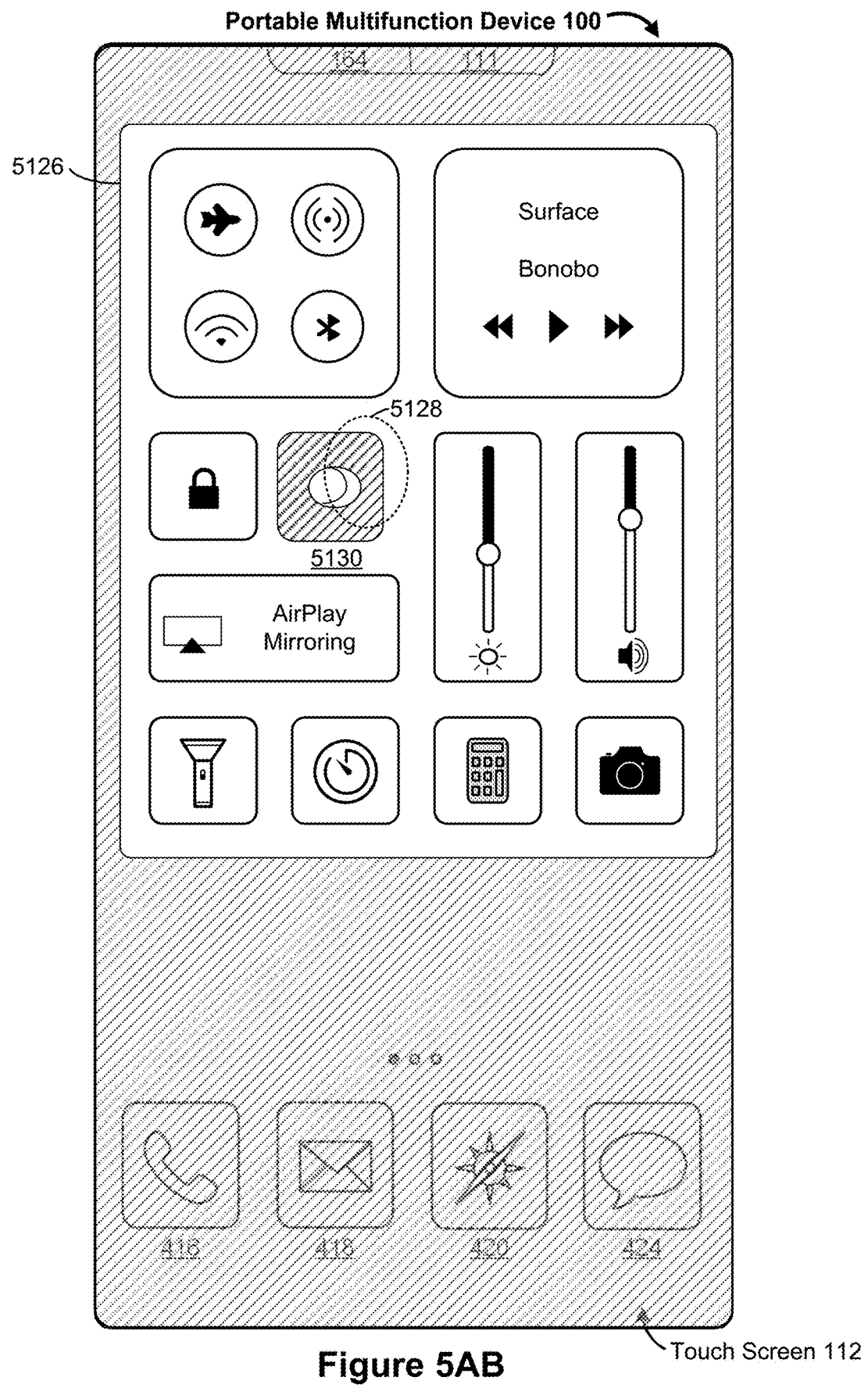
Figure 5A:
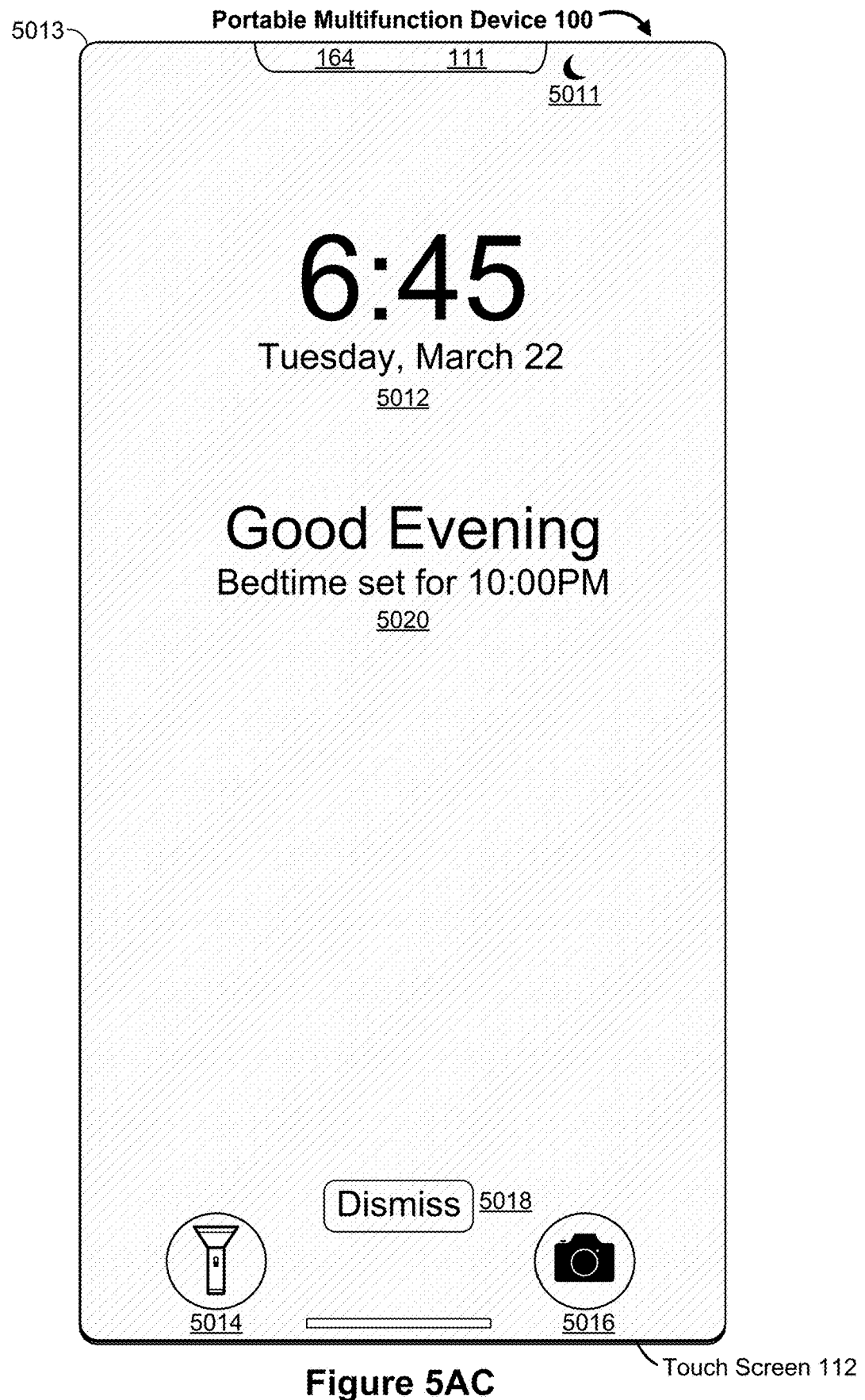
Figure 5A:
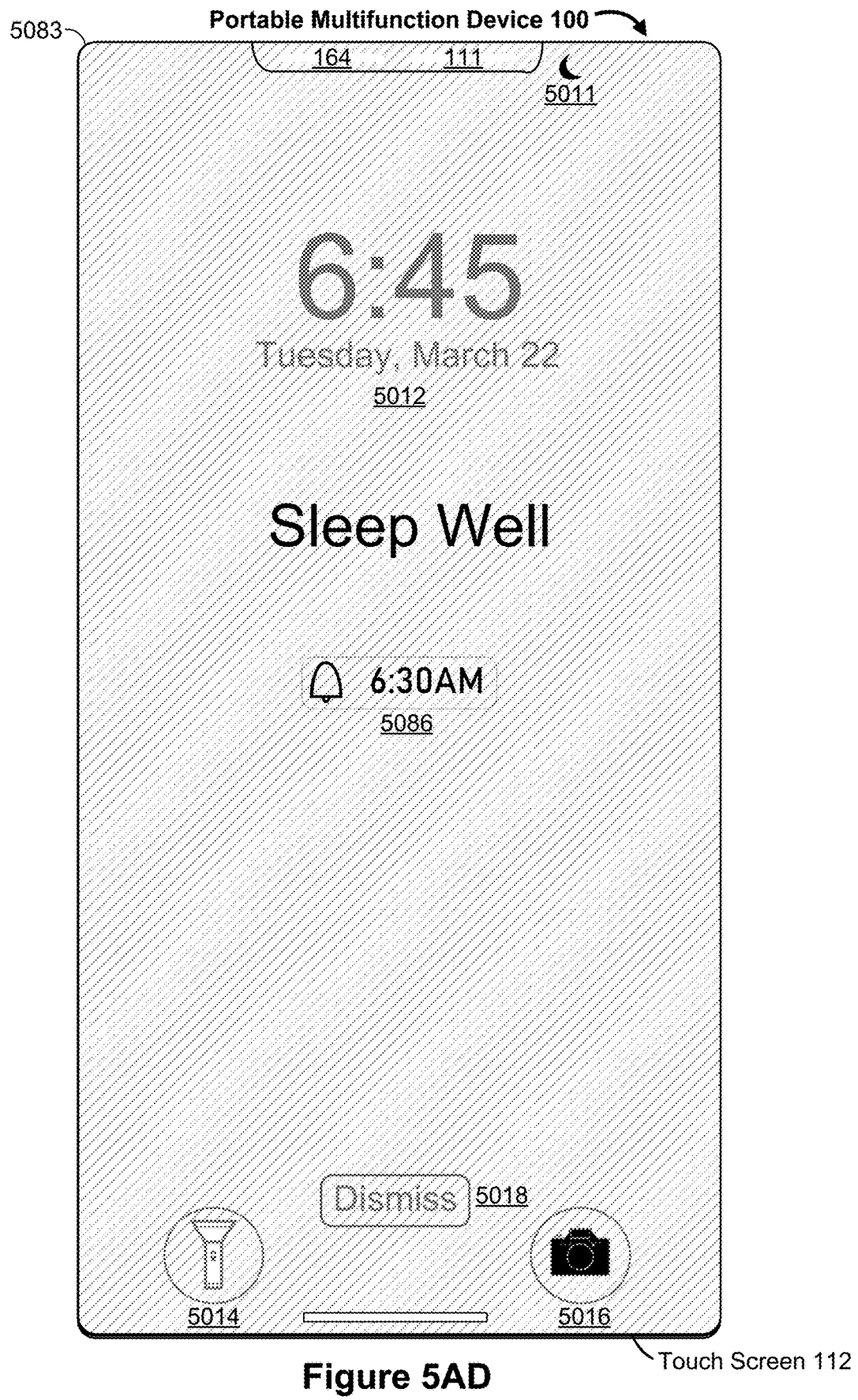
Figure 5A:
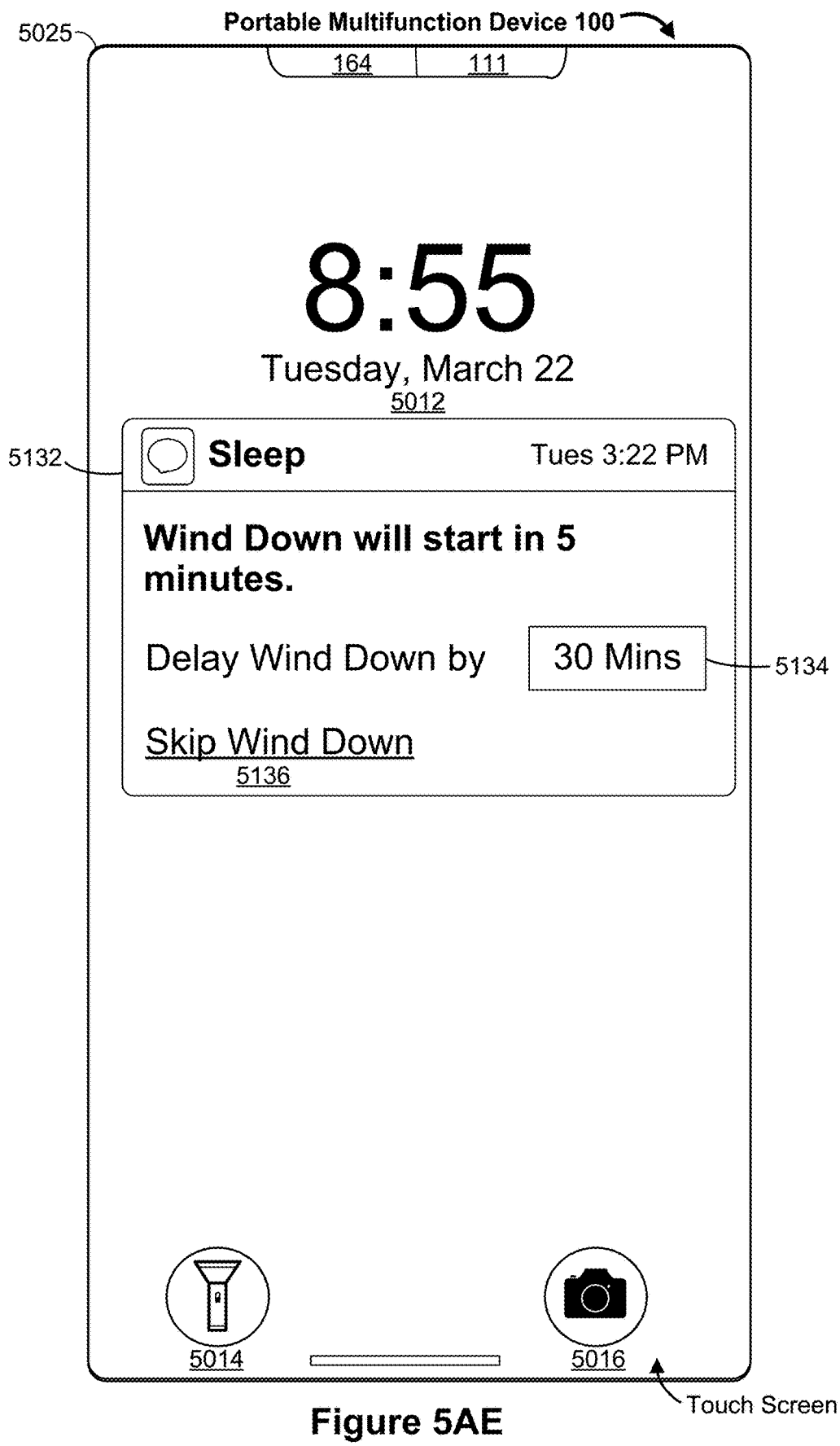
Figure 6A:
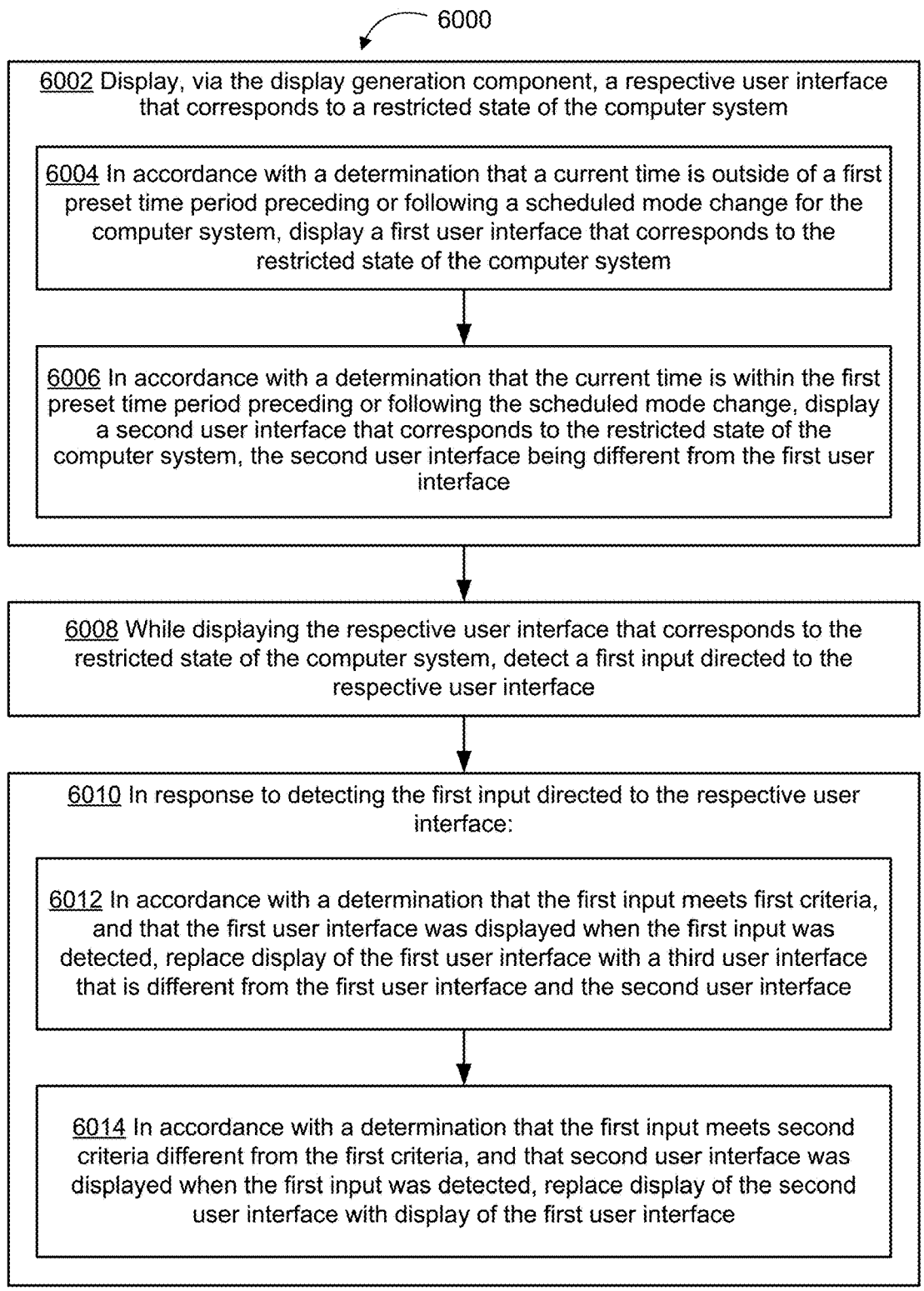

FIGS. 5X-5AB shows various user interfaces that are accessible in response to dismissal gestures on the regular wake screen user interface 5025 when the current time (e.g., 6:45 PM on Tuesday) is outside of the wind down period, the wind up period and the sleep period, in accordance with some embodiments. For example, in response to an upward edge swipe by a contact 5024, the device 100 displays an authentication user interface 5027 (FIG. 5Y). Upon entry of authentication input by a contact 5030 (FIG. 5Y), the device displays the home screen user interface 5029 (FIG. 5Z). In some embodiments, if authentication input has been obtained without active user input (e.g., through facial recognition or retina scanner, etc.), the device displays the home screen user interface 5029 or a last displayed application user interface directly upon dismissal of the regular wake screen 5025. In some embodiments, in response to a rightward swipe input by a contact 5022 detected on the regular wake screen 5025 (FIG. 5X), the device navigates to the widget screen 5117 that includes a listing of widgets corresponding to different applications (e.g., widget 5118 for the messages application, widget 5120 for the calendar application, widget 5122 for the calendar application, etc.), as shown in FIG. 5AA. In some embodiments, the widget screen 5117 is not displayed in response to the rightward swipe if detected on a wind down screen, a sleep screen, or a good morning screen. In some embodiments, additional widgets can be added to the widget user interface 5117 (e.g., via an edit button 5124). In some embodiments, in response to a downward edge swipe input by a contact 5116 detected on the upper right corner of the regular wake screen 5025 (FIG. 5X), the device displays a control panel 5126 that includes selectable options for triggering a plurality of device control functions (e.g., options for adjusting display brightness, adjusting device volume, starting AV output, locking screen orientation, turning on/off network connections, turning on/off airplane mode, turning on/off Bluetooth connection, etc.) and optionally some application functions (e.g., starting media playback, turning on flashlight, turning on camera, display alarm application, display a calculator application, etc.), as shown in FIG. 5AB. In some embodiments, the control panel 5126 includes an affordance 5130 for activating the wind down mode or the sleep mode before their scheduled start times.

FIGS. 5AB-5AC illustrate that a user input by a contact 5128 is detected on the affordance 5130, when the current time (e.g., 6:45 PM on Tuesday) is outside of the wind down period, the sleep period, and the good morning period. In response to the user input activating the affordance 5130, the device starts the wind down mode immediately, irrespective of the bedtime being set for 10:00 PM and before the scheduled start time of the wind down period (e.g., 9 PM). In some embodiments, as illustrated in FIG. 5AB, a wind down period can be started using the affordance 5130 when no wind down period is scheduled before the upcoming sleep period. In some embodiments, once the wind down period is started, it is extended until the scheduled sleep period is started. In some embodiments, the affordance 5130 is optionally used to start the sleep period as well or instead (e.g., once wind down period has already been started (e.g., according to schedule or started manually)). Allowing the wind down mode to be started manually before scheduled time allows the user to take advantage of certain features of the mode change, such as the settings designed to promote a reduced level of user interaction, dimmed display, and Do-Not-Disturb mode, before the scheduled mode change.

FIG. 5AC illustrates an exemplary wind down screen (e.g., wind down screen 5013) that is displayed in response to manual request using the control panel affordance 5130. After the wind down mode is activated manually, the wind down screen is displayed in response to user input that wakes the device during the wind down mode until the scheduled bedtime is reached. In some embodiments, a separate affordance is displayed in the control panel 5126 for activating the sleep mode ahead of the scheduled sleep time period, and in response to activation of the affordance, the device enters the sleep mode directly, optionally skipping any scheduled wind down period or terminating the wind down period before its scheduled end time, and displays the sleep screen 5083 right away. After the sleep mode is activated manually, the sleep screen 5083 is displayed (FIG. 5AD) in response to user input that wakes the device during the sleep mode until the scheduled wake time is reached. As shown in FIG. 5AD, the device 100 displays the sleep screen 5083 with a wake alarm indicator 5086 and a dismiss button 5018. In some embodiments, after a wind down mode or sleep mode has been started, the user can manually terminate the wind down mode or sleep mode by using the control panel affordance 5030 as well (e.g., toggling the state of the affordance 5030). In some embodiments, the control panel 5126 is accessible by dismissing the wind down screen 5013 or the sleep screen 5083 using the dismiss button 5018, and swipe down from the upper right corner of the display when the wake screen 5025 is displayed (e.g., as described in FIGS. 5X and 5AB). If a user is awake past bedtime and would like to exit an active wind down mode or sleep mode, the user can terminate the wind down mode and/or sleep mode manually using the affordance 5030 in the control panel 5126. In some embodiments, if the user wishes to reset the start time of the wind down or sleep mode to a later time after the wind down or sleep mode has been activated, the user can access the bedtime configuration user interface using the alarm indicator 5086 on the wind down screen or the alarm indicator 5086 on the sleep screen 5083, to reset the bedtime for the current sleep period.

FIG. 5AE illustrates an exemplary notification 5132 that alerts the user that the wind down mode is about to be started. The notification 5132 is optionally displayed a preset time period (e.g., 5 minutes, 10 minutes, etc.) before the scheduled start time of the wind down period. In some embodiments, the notification 5132 is overlaid on a regular wake screen user interface 5025, as shown in FIG. 5AE. In some embodiments, the notification 5132 includes a visual indication that the wind down period will begin shortly (e.g., in 5 minutes), and provides an option to delay the start of the scheduled wind down period (e.g., a delay button 5134, that when activated, delays the start of the wind down period by a preset amount of time (e.g., 30 minutes), and a skip button 5136, that when activated, skips the scheduled wind down period, and either (1) starts the sleep mode immediately or (2) skips the scheduled wind down period for the day and starts the sleep mode at the designated time). In some embodiments, the wind down delay time is configurable, and the user can select various amounts of time to delay the wind down period in the configuration user interface for the sleep schedule.

FIGS. 6A-6D are flowchart diagrams of a method 6000 of providing enhanced access restriction during a preset time period before and/or after a scheduled mode change, in accordance with some embodiments.

According to method 6000, in response to an input to wake a computer system from a low power state, the computer system automatically selects between a regular user interface that corresponds to a restricted state of the computer system (e.g., a regular wake screen or lock screen) and a special user interface that corresponds to the restricted state of the computer system (e.g., a wind down screen, or a good morning screen) based on a comparison of the current time with a preset time period preceding or succeeding a scheduled mode change (e.g., a sleep mode). In particular, the computer system displays the special user interface that corresponds to the restricted state of the computer system when the current time is within the preset time period preceding or succeeding the scheduled mode change, and displays the regular user interface that corresponds to the restricted state of the computer system when the current time is outside of the preset time period. The special user interface that corresponds to the restricted scheduled mode change requires a special input to be detected in order to be dismissed, and upon dismissal of the special user interface, the computer system navigates to the regular user interface that corresponds to the restricted state. Automatically displaying a user interface that corresponds to a restricted state of the computer system based on a comparison of current time with a preset time period will perform an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. In particular, automatically displaying a wind down screen in response to wake input while the current time is within a preset time period before or after a sleep period of an active sleep schedule, promotes a reduction of interaction with the computer system and distraction caused by the computer system prior to the scheduled bedtime, and helps the user to have better quality of sleep during the sleep period. This method is illustrated in FIGS. 5A-5G and 5J, 5Q, and 5U-5Z, for example, where the wind down screen 5013 and the good morning screen 5093 cannot be dismissed using a regular dismissal gesture for dismissing a regular wake screen 5025, and requires a tap gesture on the dismiss button 5018 to navigate to the regular wake screen 5025, and from the regular wake screen 5025, the user can gain access to other user interfaces of the computer system using various gestures.

The method 6000 is performed at a computer system (e.g., a handheld electronic device, a mobile phone, a tablet device, a computer, etc.) in communication with a display generation component (e.g., a display, a touch-screen display, a projector, a head-mounted display (HMD), etc.) and one or more input devices (e.g., a touch-sensitive surface (e.g., separate from a display or integrated in a touch-screen display), an accelerometer, a camera, a motion sensor, etc.). In the method 6000, the computer system displays (6002) (e.g., in response to a respective received input and/or detected event (e.g., locking the device, receiving a notification when in a low power mode (e.g., display-off state, dimmed always-on state, etc.), tapping or raising the display generation component when in the low power mode, etc.) that corresponds to a request for entering a restricted state of the computer system (e.g. a request for displaying a respective screen-lock user interface (e.g., a lock screen, a wake screen in either the locked state or the unlocked state, a coversheet user interface, etc.)), via the display generation component, a respective user interface (e.g., selectively displaying a first user interface or a second user interface) that corresponds to a restricted state (e.g., a screen-restricted state (e.g., in the restricted state, interaction with graphical user interfaces of the computer system is restricted or blocked by a lock screen, a wake screen in the authenticated state and/or the unauthenticated state, a coversheet user interface, etc.)) of the computer system. For example, the respective user interface is displayed as an initial user interface that is when the display generation component transitions from an off state, low-power always-on state, and/or dormant state (e.g., completely dark or dimmed always-on state) to a normal display-on state (e.g., a regular wake screen user interface, with device-unlocking authentication already performed, or with device-unlocking authentication not yet performed), the respective user interface is optionally a user interface that is displayed immediately after the user locks the device (e.g., by pressing on the lock button or power button of the device), and/or the respective user interface is optionally a system-level coversheet user interface that is displayed to cover any currently displayed user interface including application user interfaces and home screens in response to a predefined input, etc.). To display the respective user interface includes: the computer system, in accordance with a determination that a current time (e.g., a time at which the first input was detected, a time that the display is turned on in response to the first input, etc.) is outside of (e.g., before the start time of) a first preset time period (e.g., an extended time period (e.g., not a single point in time, but a period of time with distinct start and end time points), such as a wind down period (e.g., 1 hour, 45 minutes, etc.), a wind up period (e.g., 1 hour, 30 minutes, etc.), etc.) preceding or following (e.g., adjacent to, immediately before (e.g., having an end time that is the same as or immediately before a start time of a respective scheduled time period), immediately after (e.g., having a start time that is the same as or immediately after an end time of a respective scheduled time period), etc.) a scheduled mode change for the computer system (e.g., the scheduled mode change includes entering and remaining in a first scheduled time period (e.g., a first sleep schedule with scheduled start and end times, a first DND time period with scheduled start and end times, etc.) in which the computer system and/or the display generation component are operating with special settings (e.g., special screen lock features, darkened/reduced luminance for the display, and/or Do Not Disturb mode being turned on, etc.)), displays (6004) a first user interface (e.g., a regular screen-lock user interface, such as a wake screen that is different from a home screen that includes application icons for launching respective applications, the regular wake screen is displayed when the device switches from a low-power state to a normal display-on state outside of a wind down period before a start time of a sleep schedule or DND schedule, the same wake screen user interface is optionally displayed immediately after the user locks the device, and/or when the user provides a required input to cover the screen with the screen-lock user interface, etc.) that corresponds to the restricted state of the computer system; and in accordance with a determination that the current time is within the first preset time period (e.g., wind down period (e.g., 1 hour, 45 minutes, etc.), a wind up period (e.g., 1 hour, 30 minutes, etc.), etc.) preceding or following the scheduled mode change (e.g., the scheduled mode change includes entering and remaining in the first scheduled time period in which the computer system and/or the display generation component are operating with special settings (e.g., to promote better sleep, less distractions, etc.)), displays (6006) a second user interface (e.g., a wind down user interface that is displayed within a preset period of time before the sleep period is started, a wind up user interface that is displayed within a preset period of time after the sleep period ends, etc.) that corresponds to the restricted state (e.g., screen-locked state, screen-restricted state) of the computer system, the second user interface being different from the first user interface (e.g., the second user interface being different from the first user interface in appearance (e.g., with less luminosity, different background, different color scheme, etc.), includes different sets of user interface objects (e.g., missing some user interface objects, and adding some other user interface objects), and/or enabling different sets of user inputs and/or functions, etc.). While displaying the respective user interface (e.g., the selectively displayed first user interface or second user interface) that corresponds to the restricted state of the computer system, the computer system detects (6008) a first input directed to the respective user interface (e.g., a touch input on the touch screen display that displays the respective user interface, an in-air tap gesture detected while a gaze input is directed to the respective user interface, a swipe left, a wipe right, etc.). In response to detecting the first input directed to the respective user interface (6010): in accordance with a determination that the first input meets first criteria (e.g., criteria for dismissing a regular screen-lock user interface (e.g., a regular wake screen, coversheet user interface, lock-screen user interface, etc.), criteria for unlocking the device to display a home screen, a default application, or a last displayed application, etc.), and that the first user interface (e.g., the regular screen-lock user interface) was displayed when the first input was detected (e.g., the respective user interface is the first user interface because the current time was outside of the first preset time period), the computer system replaces (6012) display of the first user interface with a third user interface that is different from the first user interface and the second user interface (e.g., the third user interface is a user interface that is immediately displayed when the computer system exits the restricted state (e.g., a home screen user interface, or a last displayed user interface of an application prior to the display generation component going into the off, low-power, or dormant state and/or a locked state); and in accordance with a determination that the first input meets second criteria different from the first criteria (e.g., criteria to temporarily dismiss the second user interface to allow access to the user interfaces of the computer system in a manner that is available when the restricted mode is displayed with the first user interface, without exiting the restricted mode (e.g., without displaying the home screen or application user interfaces)) (e.g., the second input activates the "dismiss" button on the second user interface, the second input follows a predefined path on the touch-sensitive surface, etc.), and that second user interface was displayed when the first input was detected (e.g., the respective user interface is the second user interface because the current time was within the first preset time period), the computer system replaces (6014) display of the second user interface (e.g., wind down wake screen, wind up wake screen, etc.) with display of the first user interface (e.g., the regular screen-lock user interface). In some embodiments, the computer system remains in the restricted state but dismisses the second user interface so that the user can gain access to other user interfaces (e.g., home screen and application user interfaces) of the computer system starting from the first user interface (e.g., the regular wake user interface (e.g., in either the authenticated mode (e.g., authentication data has been received and verified) or the unauthenticated mode (e.g., authentication data has not yet been received or verified)), the lock screen user interface, etc.). In some embodiments, after the computer system dismisses the first user interface (e.g., in response to a second user input that meets the first criteria) and displays the home screen or an application user interface, when the restriction state is displayed again in response to user inputs (e.g., as a coversheet) before the computer system is locked, it is displayed with the first user interface rather than the second user interface, so an input meeting the first criteria can be used to gain access to the home screen and applications of the computer system. If a request for displaying a respective user interface corresponding to the restricted mode is received again after the computer system is locked, the restricted state is displayed with the second user interface again and the computer system only grants access to the home screen and applications when an input meeting the second criteria followed by an input meeting the first criteria are received. In some embodiments, the scheduled mode change is an operation mode of the computer system used during a sleep period of a preconfigured sleep schedule, and the first preset time period is a preconfigured wind down period that precedes a scheduled sleep period. In some embodiments, a preset time (e.g., 1 minute, 5 minutes, etc.) before the start time of the wind down period, the computer system displays an alert that notifies the user that the wind down period is about to start, and provides an interface for the user to input an instruction to delay the start of the wind down period (e.g., delay by 10 minutes, 20 minutes, etc.), or skip the wind down period entirely (e.g., to start the sleep mode right away). In some embodiments, the first user interface displays the current time, and the second user interface displays both the current time and the starting time of the scheduled mode change (e.g., the start time of the scheduled bedtime). In some embodiments, the starting time of the first preset time period is preset by the user during a configuration process (e.g., setting up the bedtime schedule and bedtime modes). In some embodiments, the preset start time of the first preset time period is overridden in response to activation of a first preset control center affordance (e.g., a bed icon with a first appearance) before the preset start time is reached, and the computer system starts the first preset time period and associated special mode (e.g., wind down mode) right away. In some embodiments, the preset start time of the scheduled mode change is overridden in response to activation of a second preset control center affordance (e.g., a bed icon with a second appearance) before the preset start time is reached, and the computer system starts the scheduled mode change (e.g., sleep mode) right away (e.g., skipping wind down). In some embodiments, an animated transition from the first user interface to the second user interface is displayed when the current time reaches the start time of the preset first time period preceding the scheduled mode change (e.g., the regular wake screen or lock screen is transformed into the wind down screen when the start time of the wind down mode is reached). In some embodiments, an animated transition from the second user interface to a user interface corresponding to the restricted mode during the schedule mode change (e.g., the sleep screen) is displayed when the current time reaches the start time of the scheduled mode change (e.g., the wind down screen is transformed into the sleep screen when the start time of the sleep mode is reached).

In some embodiments, in response to detecting the first input that is directed to the respective user interface: in accordance with a determination that the first input meets the first criteria and does not meet second criteria different from the first criteria (e.g., the first input meets the criteria for dismissing the regular screen-lock user interface, but not the criteria for dismissing the special wind down wake screen, or wind up wake screen), and that the second user interface was displayed when the first input was detected (e.g., the respective user interface is the second user interface because the current time was within the first preset time period), the computer system forgoes (6016) replacing display of the second user interface with the third user interface (e.g., the regular gesture for dismissing the regular wake screen does not dismiss the second user interface (e.g., the wind down user interface, the wind up user interface, etc.)). In some embodiments, the computer system also forgoes replacing display of the second user interface with the first user interface when the first input meets the first criteria and does not meet the second criteria. The first input that meets the first criteria but not the second criteria is ignored by the computer system when it is detected at a time that the second user interface is being displayed. In some embodiments, the first user interface (e.g., the regular wake screen or lock screen) are provided with an adjacent user interface such as a widget user interface that displays widgets corresponding to different applications, and the widget screen is displayed with in response to a leftward swipe or rightward swipe; but such widget user interface is not displayed in response to a leftward swipe or rightward swipe if the second user interface is displayed instead of the first user interface. This is illustrated in FIGS. 5C-5E, for example, where in response to detecting the first input (e.g., the swipe right gesture 5022 or the swipe up gesture 5024 in FIG. 5C), the computer system (e.g., the portable multifunction device 100) displays the second user interface (e.g., the wind down screen 5013 in FIG. 5C) and forgoes replacing display of (e.g., maintains display of the wind down screen 5013 in FIG. 5D) the second user interface with the third user interface (e.g., wake screen user interface 5025 in FIG. 5E). Forgoing replacing the display of the second user interface with the third user interface, when the second user interface was displayed and the first input meets the first criteria but not the second criteria, performs an operation (e.g., maintaining the second user interface despite the first input) when a set of conditions has been met (e.g., the first input meets the first criteria but not the second criteria) without requiring further user input. Performing an operation when a set of conditions has been met without requiring further user input controls enhances the operability of the device, which, additionally, reduces power usage and improves battery life of the device by enabling the user to use the device more quickly and efficiently.

In some embodiments, after replacing display of the second user interface with display of the first user interface (e.g., in response to detecting the input that meets the second criteria), the computer system detects (6018) a second input directed to the first user interface. In response to detecting the second input directed to the first user interface, in accordance with a determination that the second input meets the first criteria, the computer system replaces display of the first user interface with the third user interface (e.g., the third user interface is a home screen user interface, or a last displayed user interface of an application prior to the display generation component going into the display-off state and/or a locked state). In some embodiments, the restricted state of the computer system prevents display of and/or access to the home screen and application user interfaces with the display of a respective screen-lock user interface (e.g., a regular wake screen, a lock screen, a special wake screen, a special lock screen, etc.). In some embodiments, the screen-lock user interface is an initial user interface that is displayed in response to an input (e.g., user movement raising the computer system relative to the physical environment, a touch input on a touch-sensitive surface, activation of the screen ON/OFF button, etc.) or event (e.g., arrival of a notification, generation of an alert, etc.) that occurred while the display generation component was in a low-power state (e.g., a display-off state or a dimmed always-on state (e.g., the display is completely dark and dormant or has reduced function and/or luminance, due to prolonged absence of user inputs, previous activation of a screen ON/OFF button, etc.)). In response to the input or event, the computer system causes the display generation component to transition from the low-power state to a normal display-on state (e.g., switching the touch-screen display from the display-off state to a normal display-on state, or from the dimmed always on state to a normal display-on state, etc.); and selectively displays the first user interface or the second user interface in accordance with whether the current time is within or outside of the first preset time period (e.g., wind down period (e.g., 1 hour, 45 minutes, etc.), a wind up period (e.g., 1 hour, 30 minutes, etc.), etc.) preceding or following a scheduled mode change (e.g., the first scheduled time period). In some embodiments, the screen-lock user interface is a user interface that is immediately displayed when a user input that locks the computer system (e.g., a press input on a power button or lock button on the computer system) is detected. In some embodiments, the screen-lock user interface is a user interface that is a system user interface that covers any currently displayed application user interface or home screen in response to a predefined user input (e.g., a downward swipe from the top of the display, etc.). In some embodiments, the screen-lock user interface is an authentication screen that requires input of authentication information to unlock the computer system. In some embodiments, the screen-lock user interface is a user interface that can be persistently displayed in either an authenticated state or an unauthenticated state depending on whether the authentication information has already been obtained (e.g., previously via an authentication screen, or via other input authentication mechanisms (e.g., facial recognition, fingerprint recognition, passcode entry, password gesture entry, etc.)). This is shown in FIGS. 5D-5E, for example, where the portable multifunction device 100 detects the user input 5026 on the dismiss button 5018, and in response, replaces display of the wind down screen 5013 with the regular wake screen 5025. After replacing the second user interface with the first user interface, further replacing the first user interface with the third user interface, in response to detecting that the second input directed to the first user interface satisfies first criteria, performs an operation (e.g., replacing the first user interface with the third user interface) when a set of conditions has been met (e.g., the second input satisfies the first criteria) without requiring further user input. Performing an operation when a set of conditions has been met without requiring further user input controls enhances the operability of the device, which, additionally, reduces power usage and improves battery life of the device by enabling the user to use the device more quickly and efficiently.

In some embodiments, the scheduled mode change starts (6020) at a first scheduled start time and ends at a first scheduled end time that is different from the first scheduled start time, and during the scheduled mode change, the computer system operates with settings that correspond to (e.g., designed to promote or enable) a reduced level of user interactions with the computer system (e.g., displaying a simplified screen-lock user interface, locking certain user interface features, lowering screen brightness, suppressing notifications, turning on Do-Not-Disturb mode, etc.). This is illustrated in FIG. 5O, for example, where during the scheduled mode change (e.g., sleep mode), the computing device (e.g., the portable multifunction device 100) operates with settings that correspond to a reduced level of user interactions with the computer system (e.g., the simplified sleep screen 5087, which has a lower screen brightness and does not display the time). Operating the computing device with settings that correspond to a reduced level of user interactions with the computer system during the scheduled mode change performs an operation (e.g., activating the settings that corresponds to the reduced level of user interactions) when a set of conditions (e.g., during the scheduled mode change) has been met without requiring further user input. Performing an operation when a set of conditions has been met without requiring further user input controls enhances the operability of the device, which, additionally, reduces power usage and improves battery life of the device by enabling the user to use the device more quickly and efficiently.

In some embodiments, the second user interface includes (6022) one or more selectable options corresponding to preset application functions of one or more applications, wherein activation of a respective selectable option corresponding to a first preset application function of the preset application functions of the one or more applications causes performance of the first preset application function. In some embodiments, the second user interface is a wind down screen that includes user interface affordances that correspond to a set of preset application functions, including performing a preset operation of an application without breaking through the wind down screen or launching the application, or breaking through the wind down screen and launching the application, etc. In some embodiments, if an application or application operation is included in the set of actions displayed on the second user interface (e.g., through a pre-configuration process associated with the second user interface or the first preset time period), the application or application function is accessible within the first preset time period preceding or following the scheduled mode change period. In some embodiments, if an application or application operation is not included in the set of actions displayed on the second user interface, the computer system prevents access to the application or application operation unless the user provides the required inputs to dismiss the second user interface and the first user interface to gain access to the home screen. In some embodiments, the second user interface includes multiple selectable options that correspond to different application operations of the same application. For example, in some embodiments, the second user interface displays a first selectable option that corresponds to a playback function of a media playback application for playing a selected playlist, a second selectable option that corresponds to switching an output device for the media playback application from speaker to headphone, and a third option that corresponds to breaking through the screen-lock user interface and launching the media player application. This is illustrated in FIG. 5K, for example, where the second user interface (e.g., the wind down screen 5013) includes one or more selectable options (e.g., the alarm option 5054, the music option 5056, and the light option 5058) corresponding to preset application functions of one or more applications (e.g., playing a specific playlist in a music application). Causing the performance of the first preset application function in response to the activation of a respective selectable option reduces the number of inputs needed to perform an operation. Reducing the number of inputs needed to perform an operation enhances the operability of the device, and makes the user-device interface more efficient, which, additionally, reduces power usage and improves battery life of the device by enabling the user to use the device more quickly and efficiently.

In some embodiments, the second user interface includes (6024) a selectable user interface object that, when activated, causes display of an editing user interface that includes selectable options for configuring the preset application functions to be included on the second user interface. In some embodiments, the action platter that includes the user interface affordances of the preset application functions available on the wind down screen, sleep screen, and/or wind up screen also includes an "edit" button. The edit button, when activated by a tap input, causes an editing user interface to be displayed (e.g., overlaying or temporarily replacing display of the wind down screen, sleep screen, and/or wind up screen). The editing user interface optionally is the same user interface that is displayed during the on-boarding process where the user set up the wind down, bedtime, and wind up modes. In some embodiments, the editing user interface displays the currently included application functions (e.g., performing a preset application operation of a selected application, launching a selected application, etc.), and a listing of other available applications and/or application operations for the available applications. In some embodiments, the editing user interface lists the available applications in groupings that correspond to the categories of the applications (e.g., a grouping for music, a grouping for room comfort, a grouping for journaling, etc.). In some embodiments, under each application, a limited set of application functions are provided, including a first application operation, a second application operation, and an operation for launching the application. In some embodiments, under some applications, only an option for launching the application is available for selection. In some embodiments, under some applications, only options for application operations are available, and the application cannot be launched from the action platter shown on the second user interface. In some embodiments, the application operations and/or available applications provided in the editing user interface include application operations and/or applications that are intelligently recommended by the computer system based on available user data (e.g., demographic data, usage history data, etc.) and/or statistical data of average users. This is illustrated in FIGS. 5K-5L, for example, where the second user interface (e.g., the wind down screen 5013) includes a selectable user interface object (e.g., the edit button 5052) that, when activated, causes display of an editing user interface (e.g., the shortcut configuration user interface 5061) that includes selectable options for configuring the preset application functions to be included on the second user interface (e.g., the option 5074, which can be included via the plus button 5082). Causing the display of an editing user interface that includes selectable options for configuring the preset application functions to be included on the second user interface, in response to activating a selectable user interface object, reduces the number of inputs needed to perform an operation (e.g., displaying an editing user interface). Reducing the number of inputs needed to perform an operation enhances the operability of the device, and makes the user-device interface more efficient, which, additionally, reduces power usage and improves battery life of the device by enabling the user to use the device more quickly and efficiently.

In some embodiments, wherein the one or more selectable options corresponding to preset application functions of one or more applications include (6026): a first selectable option corresponding to a first preset application function of a first application, wherein the first selectable option, when selected, causes the computer system to display the first application (e.g., breaking through the second user interface, and replacing display of the second user interface with display of a user interface of the first application); and a second selectable option corresponding to a second preset application function of a second application (e.g., the same as the first application, or different from the first application), wherein the second selectable option, when selected, causes the computer system to perform a preset operation of the second application (e.g., to execute a task using functionality of the second application, without breaking through the second user interface or replacing display of the second user interface with display of a user interface of the second application). This is illustrated in FIG. 5L, for example, where the one or more selectable options (e.g., the option 5074 and 5076) include a first selectable option causing display of the first application (e.g., "Open App" option 5074) and a second selectable option causing the computer system to perform a preset operation of the second application (e.g., "Start Sleep Meditation" option 5076). Displaying different selectable options corresponding to different preset application functions of different applications reduces the number of inputs needed to perform an operation (e.g., activating a respective application function). Reducing the number of inputs needed to perform an operation enhances the operability of the device, and makes the user-device interface more efficient, which, additionally, reduces power usage and improves battery life of the device by enabling the user to use the device more quickly and efficiently.

In some embodiments, in accordance with a determination the current time is within the first preset time period of the scheduled mode change, the computer system operates (6028) the computer system with an activated Do-Not-Disturb mode of the computer system (e.g., forgoing providing at least some of the notifications and alerts at the computer system). In some embodiments, the DND mode is automatically activated by the computer system in response to the current time reaching the start time of the first preset time period preceding the scheduled mode change, and the DND mode persists through the first preset time period and the scheduled mode change, and optionally persists through another preset time period immediately succeeding the scheduled mode change, unless the DND mode or the scheduled mode change is skipped or terminated before the scheduled end time of the scheduled mode change. This is illustrated in FIGS. 5M-5O, for example, where the computer system (e.g., the portable multifunction device 100) is operated with an activated Do-Not-Disturb mode of the computer system (e.g., as represented by the DND indicator 5011). Operating the computer system with an activated Do-Not-Disturb mode of the computer system in accordance with a determination the current time is within the first preset time period of the scheduled mode change performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently.

In some embodiments, after replacing the second user interface with the third user interface, the computer system detects (6030) that the computer system has reentered the restricted state of the computer system (e.g., after going from wind down to home screen UI, screen is locked again). After the computer system has reentered the restricted state of the computer system and while the computer system is in the restricted state, the computer system receives a third input (e.g., an input to wake the display generation component of the computer system). In response to receiving the third input, in accordance with a determination that the current time is within the first preset time period, the computer system redisplays the second user interface (e.g., wind down wake screen). In some embodiments, in response to detecting the third input, in accordance with a determination that the current time is within the scheduled mode change, the computer system displays the screen-lock user interface that corresponds to the scheduled mode change (e.g., the sleep screen for the sleep mode). In some embodiments, after the computer system has dismissed the second user interface or the screen-lock user interface that corresponds to the scheduled mode change, the computer system maintains the special operation mode (e.g., wind down mode, sleep mode, DND mode, etc.) while the user interacts with the computer system. After the device is locked again, the special screen lock user interface that corresponds to the special operation mode is redisplayed and the user has to provide the predefined input again to get to the regular wake screen. This is illustrated in FIGS. 5E-5I, for example, where after replacing the second user interface (e.g., the regular wake screen 5025) with third user interface (e.g., the home screen user interface 5029), the computer system (e.g., the portable multifunction device 100) reenters the restricted state of the computer system (e.g., is locked again via the button 5006 in FIG. 5H) and in accordance with a determination that the current time is within the first preset time period (e.g., the wind down period), the computer system redisplays the second user interface (e.g., the wind down screen 5013 in FIG. 5I). Redisplaying the second user interface, in response to receiving the third input and in accordance with a determination that the current time is within the first preset time period, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently.

In some embodiments, the first preset time period preceding or following the scheduled mode change has (6032) a duration that is preselected by a user (e.g., during a configuration process that sets up the sleep schedule). In some embodiments, the scheduled mode change does not need to be preceded by the first scheduled time period if the user does not enable the first scheduled time period preceding the scheduled mode change (e.g., when the user sets a duration of zero for the first preset time period preceding the scheduled mode change (e.g., the wind down period), or does not enable the wind down mode preceding the sleep mode). This is shown in FIGS. 9X-9Y, for example, where the first preset time period preceding or following the scheduled mode change (e.g., the wind down period) has a duration that is preselected by a user (e.g., via the wind down period selector 9140, the minus button 9142, and the plus button 9144 for the peripheral device 700 in FIG. 9X, via the wind down setup user interface 9158 for the portable multifunction device 100). Allowing the user to preselect the duration of the first time period preceding or following the scheduled mode change performs an operation (e.g., displaying a respective user interface) when a set of conditions has been met (e.g., based on a comparison of current time and the scheduled mode change) without requiring further user input. Performing an operation when a set of conditions has been met without requiring further user input controls enhances the operability of the device, which, additionally, reduces power usage and improves battery life of the device by enabling the user to use the device more quickly and efficiently.

In some embodiments, the second user interface includes (6034) a selectable option that corresponds to an alarm for an end time of the scheduled mode change (e.g., the selectable option is an alarm icon with text indicating the wake alarm time for the end of the sleep mode). In the method 6000, the computer system detects a fourth input that is directed to the selectable option that corresponds to the alarm for the end time of the scheduled mode change (e.g., detecting a tap input on the alarm icon included on the wind down screen, e.g., inside the action platter shown on the wind down screen). In response to detecting the fourth input, the computer system displays a fourth user interface that includes user selectable options for modifying one or more aspects of an upcoming occurrence of the scheduled mode change (e.g., options for canceling the alarm and/or modifying the end time of the scheduled mode change for an upcoming occurrence of the schedule mode change (e.g., for tonight only, and not other future occurrences of the scheduled mode change)). In some embodiments, the scheduled mode change applies to the current day only, not the full schedule that includes repeated occurrences of the scheduled mode change. In some embodiments, activation of the selectable option that corresponds to an alarm for the end time of the scheduled mode change causes display of a user interface that is configured to accept user inputs to modify the start time of the schedule mode change as well, and optionally, user inputs to modify other aspects of the scheduled mode change (e.g., sleep goal, full sleep schedule, etc.). In some embodiments, the selectable option that corresponds to the alarm has a first appearance when it is displayed without the selectable options corresponding to application functions; and has a second appearance when it is displayed among other selectable options corresponding to application functions. This is illustrated in FIGS. 9J-9L, for example, where the second user interface (e.g., the sleep screen 5083) includes a selectable option that corresponds to an alarm for an end time of the scheduled mode change (e.g., the alarm affordance 5086) and in response to detecting a fourth input (e.g., the user input 5084, on the alarm affordance 5086), the computer system displays a fourth user interface (e.g., the alarm application user interface 9041) that includes user selectable options for modifying one or more aspects of an upcoming occurrence of the schedule mode change (e.g., the link 9048). Displaying a user interface that includes user selectable options for modifying one or more aspects of an upcoming occurrence of the scheduled mode change reduces the number of inputs needed to perform an operation (e.g., adjusting the upcoming scheduled mode change without changing the future mode change). Reducing the number of inputs needed to perform an operation enhances the operability of the device, and makes the user-device interface more efficient, which, additionally, reduces power usage and improves battery life of the device by enabling the user to use the device more quickly and efficiently.

In some embodiments, in accordance with a determination that the second user interface is displayed and that the current time corresponds to a start time of the scheduled mode change, the computer system replaces (6036) display of the second user interface with a fifth user interface (e.g., a sleep screen that is dimmed and has only the current date and no current time and no wake time indicators, and optionally reduced set of available actions) that corresponds to the restricted state (e.g., screen-restricted state), wherein the fifth user interface includes a reduced amount of user interface objects (e.g., current time, wake time are removed on the sleep screen, the alarm indicator and application functions are optionally removed on the sleep screen, etc.) as compared to the second user interface that corresponds to the restricted state. In some embodiments, the sleep screen optionally has fewer or different set of application functions made available as compared to the wind down screen. In some embodiments, the fifth user interface that corresponds to the restricted state of the computer system displayed during the scheduled mode change is a dark screen that includes only an indication that the Do-Not-Disturb mode is on. In some embodiments, the fifth user interface is displayed in placed of the second user interface when the second user interface is displayed and the start time of the schedule mode change is reached. In some embodiments, if the user has not enabled the wind down mode, or when the first preset time period is skipped, the computer system replaces display of the first user interface with the display of the fifth user interface when the start time of the scheduled mode change is reached. In some embodiments, the Do Not Disturb mode is automatically activated at the start of the first preset time period, and activated at the start of the scheduled mode change if the first preset time period is skipped or not enabled. In some embodiments, the computer system is a portable electronic device such as a mobile phone or tablet device, and the computer system has a companion device, such as a wearable device that is paired with the computer system. In some embodiments, when the schedule mode change occurs, the companion device is locked (e.g., screen-locked, such that regular input mechanisms for interacting with the companion device are disabled). In some embodiments, a special predefined input (e.g., turning the digital crown of the company device to display a regular wake screen of the companion device) is required to re-enable the regular input mechanisms for the companion device. This is illustrated in FIG. 5O, for example, where the fifth user interface (e.g., the simplified sleep screen 5087) includes a reduced amount of user interface objects (e.g., does not display the date and time element 5012) as compared to the second user interface that corresponds to the restricted state (e.g., the sleep screen 5083 shown in FIG. 5N). Replacing the second user interface with the fifth user interface that includes a reduced amount of user interface objects, in accordance with a determination that the second user interface is displayed and that the current time corresponds to a start time of the scheduled mode change, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently.

In some embodiments, replacing the second user interface with the fifth user interface includes (6038) gradually reducing luminance of the display generation component from a first luminance level to a second luminance level that is lower than the first luminance level. In some embodiments, the fifth user interface (e.g., sleep screen) is completely dark and only has a DND indicator (e.g., a dimmed moon icon) displayed on the screen. In some embodiments, the animated transition between the wind down screen and the sleep screen is triggered when the start time of the scheduled sleep mode is reached. This is illustrated in FIGS. 5N-5O, for example, where the second user interface (e.g., the sleep screen 5083) is displayed at a first luminance level, and is replaced by the fifth user interface (e.g., the simplified sleep screen 5087) displayed at a second luminance level that is lower than the first luminance level (e.g., as illustrated in the darker shading of the simplified sleep screen 5087). Gradually reducing luminance of the display generation component from the first luminance level to the second luminance level, when replacing the second user interface with the fifth user interface, provides improved visual feedback to the user (e.g., indicating a successful update of user interface). Providing improved visual feedback enhances the operability of the device and makes the user-device interface more efficient, which, additionally, reduces power usage and improves battery life of the device by enabling the user to use the device more quickly and efficiently.

In some embodiments, the first user interface and the second user interface display (6040) the current time, and the fifth user interface does not display the current time (but optionally displays the current date). In some embodiments, the first user interface and the second user interface display a current date in addition to the current time, and the fifth user interface does not display the current date or the current time. This is illustrated in FIG. 5O, for example, where the fifth user interface (e.g., the simplified sleep screen 5087) does not display the current time (e.g., does not display the date and time element 5012). Displaying the current time in the first user interface and the second user interface, but forgoing displaying the current time in the fifth user interface provides improved visual feedback to the user (e.g., allowing the user to distinguish the fifth user interface from the other user interfaces). Providing improved visual feedback enhances the operability of the device and makes the user-device interface more efficient, which, additionally, reduces power usage (e.g., fewer user interface objects are displayed) and improves battery life of the device by enabling the user to use the device more quickly and efficiently.

In some embodiments, the second user interface includes (6042) a selectable user interface object (e.g., a button, an alarm icon, etc.) that, when activated, causes a container user interface object (e.g., a pop up window, an action platter, a drop down menu, etc.) that includes one or more selectable options corresponding to preset application functions of one or more applications to be displayed, wherein the one or more selectable options corresponding to the preset application functions, when activated, cause performance of the corresponding preset application functions. For example, in some embodiments, the action platter is displayed in a collapsed state or hidden on the second user interface (e.g., the wind down screen, the wind up screen, etc.), and when the user taps on the user interface object corresponding to the hidden or collapsed action platter, the action platter is displayed showing the different application functions that are available for access from the second user interface. In some embodiments, the action platter on the sleep screen is also hidden or collapsed, and the full action platter is displayed when the user taps on the user interface object corresponding to the hidden or collapsed action platter. This is illustrated in FIGS. 5J-5K, for example, where the second user interface (e.g., the wind down screen 5013) includes the selectable user interface object (e.g., the shortcut affordance 5033) that, when activated, causes a container user interface object (e.g., the action platter 5047) that includes one or more selectable options corresponding to preset application functions of one or more applications (e.g., the alarm option 5054, the music option 5056, and the light option 5058) to be displayed. Displaying a container user interface object that includes one or more selectable options corresponding to preset application functions of one or more applications to be displayed, in response to the user activating a selectable user interface object, reduces the number of inputs needed to perform an operation (e.g., activating a preset application function of an application). Reducing the number of inputs needed to perform an operation enhances the operability of the device, and makes the user-device interface more efficient, which, additionally, reduces power usage and improves battery life of the device by enabling the user to use the device more quickly and efficiently.

In some embodiments, at a first time, in accordance with a determination that the current time corresponds to an end time of the scheduled mode change: the computer outputs (6044) an indication that the end time of the scheduled mode change has been reached (e.g., generating an audio, tactile, and/or visual output that corresponds to an alarm for the wake time); the computer system displays a first selectable option to adjust the end time of the scheduled mode change to a later time (e.g., snooze, temporarily stopping outputting the indication) and a second selectable option to stop outputting the indication without adjusting the end time of the scheduled mode change. At a second time later than the first time, the computer system detects a user input selecting a respective one of the first selectable option and the second selectable option; and in response to detecting the user input selecting the respective one of the first and second selectable options: in accordance with a determination that the first selectable option was selected: the computer system maintaining display of the fifth user interface; and after a predefined delay, the computer system outputs the indication that the adjusted end time of the scheduled mode change has been reached; and in accordance with a determination that the second selectable option was selected: the computer system displays a sixth user interface that corresponds to the restricted state of the computer system, wherein the sixth user interface is different from the fifth user interface and the second user interface (e.g., the sixth user interface is the good morning screen). In some embodiments, the sixth user interface has a higher luminance than the second user interface and the fifth user interface. In some embodiments, the second user interface has fewer user interface objects than the fifth user interface (e.g., the sleep screen) and the first user interface (e.g., the regular wake screen). In some embodiments, the sixth user interface displays notifications that were received and suppressed during the scheduled mode change (e.g., during the sleep mode) and optionally, during the preset first time period (e.g., wind down period). In some embodiments, the sixth user interface also suppresses display of notifications. In some embodiments, the sixth user interface (e.g., the good morning screen) displays the current time, if the current time was not displayed on the fifth user interface (e.g., the sleep screen). In some embodiments, if the companion device of the computer system was locked during the scheduled mode change, the companion device becomes unlocked automatically when the sixth user interface is displayed on the computer system. This is illustrated in FIGS. 5P-5Q, for example, where the alarm notification screen 5091 displays the first selectable option to adjust the end time of the scheduled mode change to a later time (e.g., the snooze button 5090) and a second selectable option to stop outputting the indication without adjusting the end time of the scheduled mode change (e.g., the dismiss button 5018). Maintaining the display of the fifth user interface or displaying the sixth user interface, in accordance with a determination that the first or the second selectable option was selected, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently.

FIGS. 7A-7J illustrate example user interfaces for generating battery charging alerts during a preset time period before the start of the scheduled mode change, in accordance with some embodiments.

The examples in FIGS. 7A-7J are given in a scenario where user interfaces are displayed on a first computer system (e.g., a portable multifunction device 100) and a second computer system (e.g., a peripheral device 700). In some embodiments, the first computer system is a portable electronic device, such as a mobile phone or tablet device, and the charging reminder is generated based on a first battery level (e.g., current battery level) of a companion device, such as a wearable device (e.g., a watch, a bracelet, etc.), that is paired with the portable electronic device, and the battery charging reminder is for increasing the first battery level above the first preset battery level (e.g., a preset threshold level for supporting the sleep mode, and different from (e.g., above) another lower threshold for a generalized charging reminder) is generated on the portable electronic device. In some embodiments, the first computer system is a wearable device, such as a watch or bracelet that is optionally paired with a portable electronic device, the first battery level is a battery level of the wearable device, and the reminder for increasing the first battery level above the first preset battery level is generated on the wearable device. In some embodiments, the first battery level is a battery level of the wearable device, and the reminder is generated on both the portable electronic device and the wearable device. In some embodiments, the first preset battery level is a preset static value (e.g., 30%, 40%, etc.) that is set irrespective of actual usage pattern of the first computer system or companion device before and/or after the start of a first preset time period. In some embodiments, the first preset battery level is a dynamic value that is established based on usage patterns and/or battery health of the first computer system or the companion device. For example, if the user consistently use the first computer system actively during the wind down period and/or sleep period, the first preset battery level is set at a higher value than if the user does not often use the first computer system actively during the wind down period and/or sleep period. In some embodiments, if the first computer system is a standalone electronic device (e.g., either the device 100 or the peripheral device 700), the first computer system optionally generates the charging reminders and/or battery status indicators based on its own battery levels.

Figure 7A:
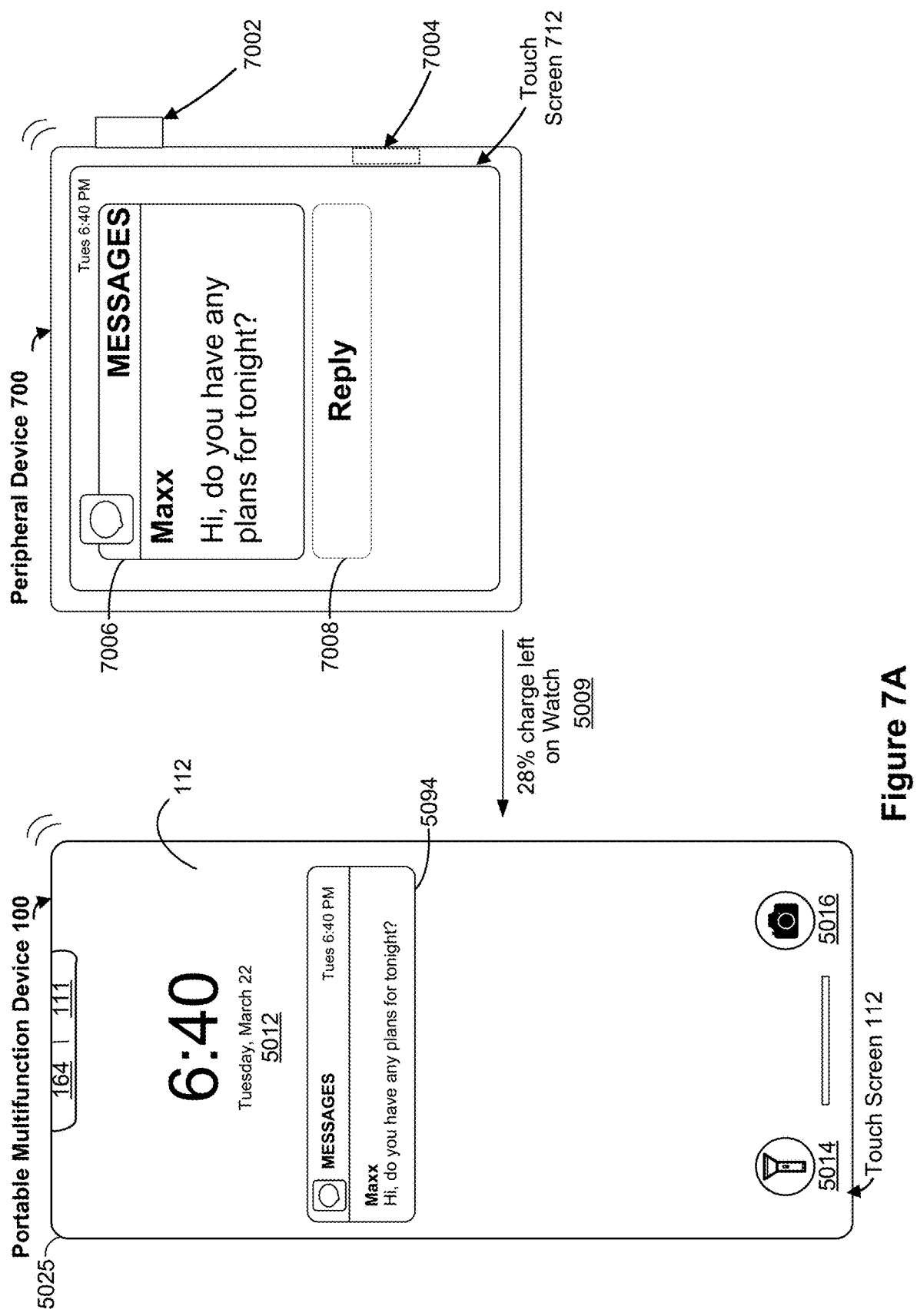
FIGS. 7A-7J illustrate example user interfaces for generating battery charging alerts during a preset time period before the start of the scheduled mode change, in accordance with some embodiments.

FIG. 7A illustrates that, before the wind down mode and sleep mode is started, the device 100 is in communication with the peripheral device 700. A notification 5094 for a new message is displayed on a regular wake screen 5025 of the device 100, and a corresponding notification 7006 is displayed on the peripheral device 700 (e.g., over a regular lock screen or restricted screen of the peripheral device 700). In some embodiments, the device 100 and the peripheral device 700 communicate regarding battery information, as shown in battery data 5009 being transmitted from the peripheral device 700 to the device 100 at a current time (e.g., 6:40 PM Tuesday) or another time proximate to the current time (e.g., interval time periods in relation to the current time such as every five minutes, etc.). In this particular example, the preset threshold battery level for supporting the sleep mode is set at 30% of full battery charge for the peripheral device. At the current time that is outside of a preset time period (e.g., the wind down period, or a period that starts fifteen minutes before the start time of the wind down period (e.g., 9:00 PM on Tuesday) and ends 10 minutes before the start time of the sleep period (e.g., 10:00 PM on Tuesday)) preceding the scheduled sleep time period (e.g., 10:00 PM on Tuesday to 6:30 AM on Wednesday), Do Not Disturb mode is not activated and regular notifications are still displayed, however, no notification or reminder is generated about charging the battery of the peripheral device (e.g., currently at 28%) above the preset threshold battery level of 30% on either the device 100 or on the peripheral device 700.

Figure 7B:
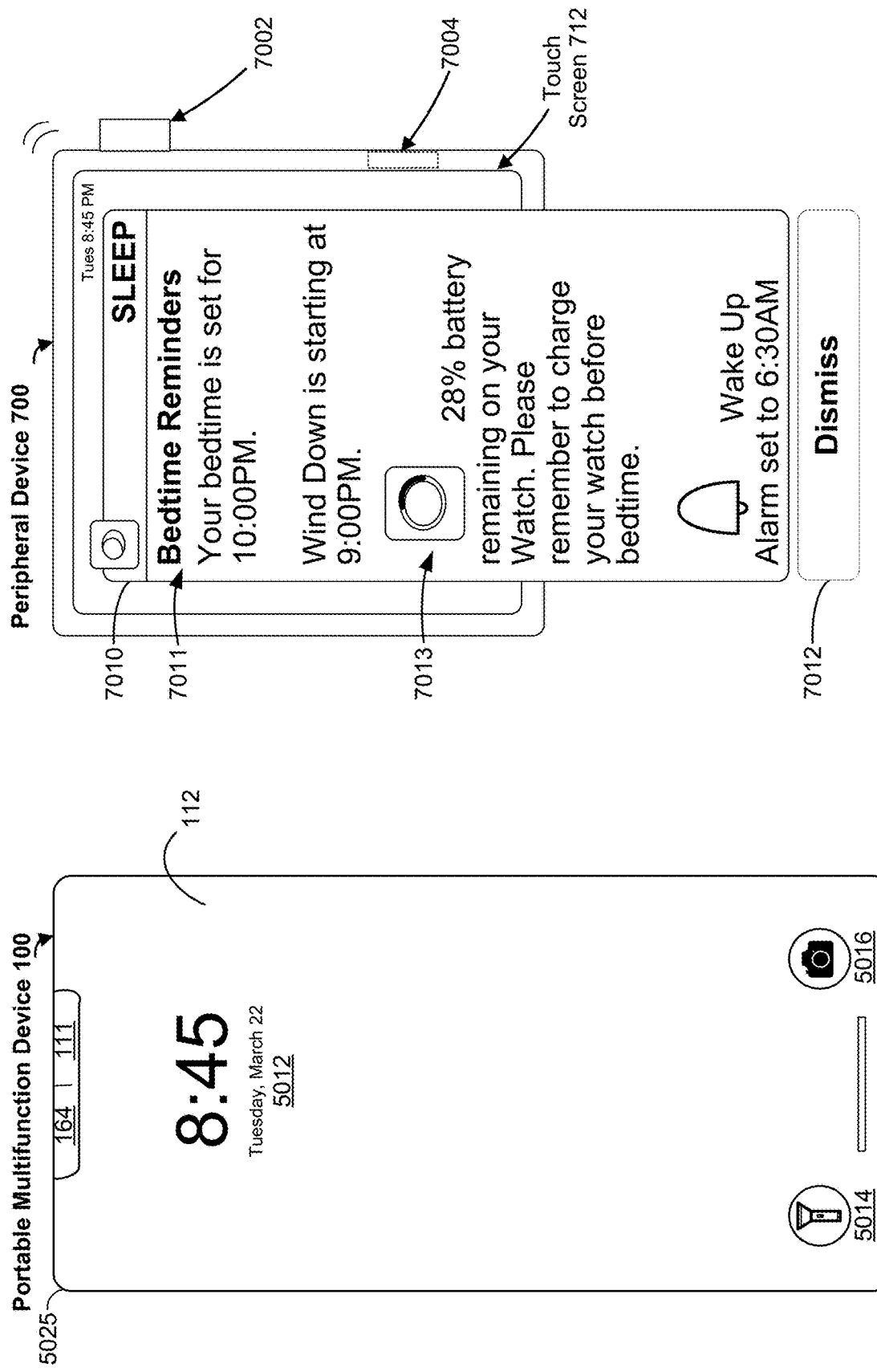

FIG. 7B illustrates that, in contrast to the example scenario shown in FIG. 7A, when the current time is within the preset time period (e.g., between 8:45 PM and 9:50 PM on Tuesday) preceding the scheduled sleep period (e.g. scheduled to start at 10:00 PM on Tuesday), a bedtime reminder notification 7010 is generated on the peripheral device 700 (and optionally on the device 100) in accordance with a determination that the first battery level (e.g., the current battery level of the peripheral device 700 at 28%) is below the preset threshold battery level (e.g., 30%) for supporting the sleep mode. In some embodiments, before the wind down mode is started, the multifunction device 100 displays a current time and date 5012 on the regular wake screen 5025 before the wind down mode is started and does not display any indication regarding the battery charge of the peripheral device 700. In some embodiments, the multifunction device 100 displays a bedtime reminder notification as well. In some embodiments, the bedtime reminder notification 7010 includes reminders 7011 of the scheduled bedtime for the upcoming sleep period, and the scheduled time for the wind down period that is coming up shortly. In some embodiments, the bedtime reminder notification 7010 includes a reminder 7013 for charging the device itself or its companion device above the current battery level (e.g., 28%) to at least the preset threshold battery level (e.g., 30%) before bedtime. In some embodiments, the bedtime reminder notification 7010 optionally includes a reminder of whether a wakeup alarm has been set for the upcoming sleep period. In some embodiment, the bedtime reminder notification 7010 includes an affordance to adjust the wake alarm setting. The bedtime reminder notification 7010 includes a dismissal button 7012 that, when activated (e.g., by a tap input), causes dismissal of the bedtime reminder notification 7010. Before the wind down period is started, the wake screen of the device 100 and the wake screen of the companion device 700 can be dismissed using the regular dismissal input, once the bedtime reminder notification 7010 is dismissed using the dismiss button 7012.

Figure 7C:
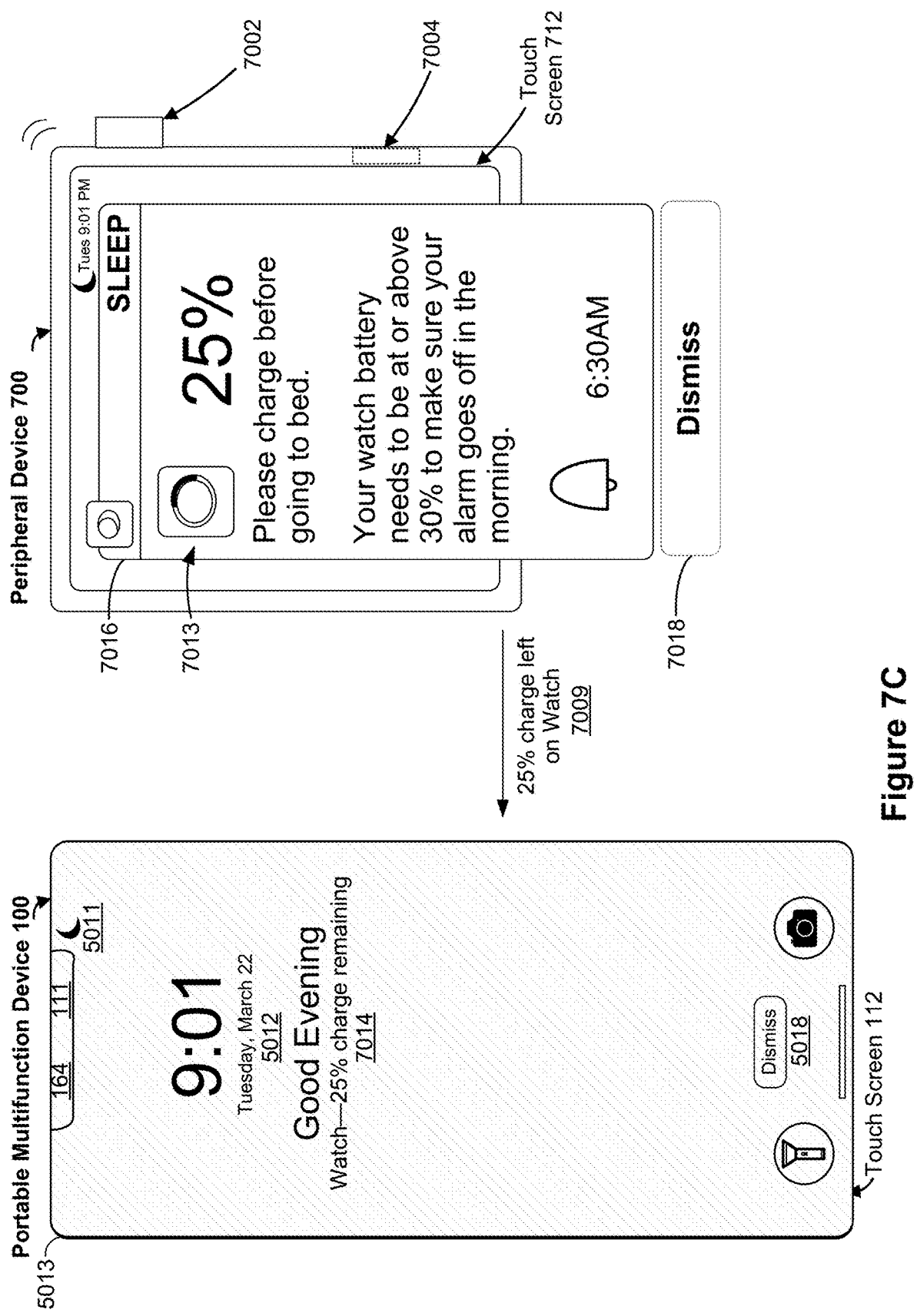

FIG. 7C illustrates that, in contrast to FIG. 7A, when the current time is within the wind down period (e.g., current time is 9:01 PM) preceding the upcoming scheduled sleep period, charging reminders are displayed on both the device 100 and the peripheral device 700. For example, in accordance with a determination that the current time is within the wind down period (e.g., 1 hour before bedtime of 10:00 PM), the device 100 displays a "good evening" message on the wind down screen 5013, wherein the good evening message includes a battery level of the peripheral device 700 (e.g., watch battery level indicator 7014). In some embodiments, the battery level indicator 7014 is shown in accordance with a determination that the first battery level (e.g., the battery level of the peripheral device 700) is below the preset threshold battery level for supporting the sleep mode (e.g., 30%). In some embodiments, if the first battery level is not below the preset threshold battery level, the battery level indicator 7014 is not displayed on the wind down screen 5013. In some embodiments, the battery level indicator 7014 is displayed alternately with the bedtime reminder 5020 (e.g., bedtime set for 10:00 PM, FIG. 5I) on the wind down screen 5013. In some embodiments, a charge reminder 7016 is displayed on the wind down screen of the peripheral device 700 as well at the start of the wind down period, in accordance with a determination that the charge level of the peripheral device (or optionally the charge level of the multifunction device 100) is below a preset threshold battery level. The charge reminder 7016 optionally specifies the current battery level 7013 of the peripheral device 700 (or optionally the charge level of the multifunction device 100) and the threshold battery level (e.g., 30%) for supporting the sleep mode. In some embodiments, the charge reminder 7016 optionally includes a wake alarm indicator that indicates the wake alarm setting for the upcoming sleep period, and a dismiss button 7018 for dismissing the charge reminder 7016. In some embodiments, the threshold battery level is set to ensure sufficient charge to last the duration of the sleep mode time period and providing the wake alarm. In some embodiments, when the charge reminder 7016 is dismissed before the start time of the sleep period is reached, the peripheral device displays its wind down screen user interface. In some embodiments, charge reminder 7016 is automatically dismissed without user input when the peripheral device is connected to a charger. In some embodiments, the battery level indicator 7014 is displayed on the wind down screen 5013 of the multifunction function device 100 for as long as the battery level of the peripheral device 700 (or its own battery level) remains below the preset threshold battery level (e.g., 30%). In some embodiments, the battery level indicator 7014 is displayed on the wind down screen 5013 of the multifunction function device 100 when the battery level of the peripheral device 700 (or its own battery level) rises above the preset threshold battery level (e.g., 30%) during the wind down period. In some embodiments, the battery level indicator 7014 ceases to be displayed on the wind down screen 5013 of the multifunction function device 100 when the current time is within a preset time period before the start time of the scheduled sleep period (e.g., 10 minutes before 10:00 PM) when there is insufficient time to charge the battery to a level above the preset threshold battery level before the sleep period is started. These features may help to reduce excess stress about charging the peripheral device right before bedtime.

Figure 7D:
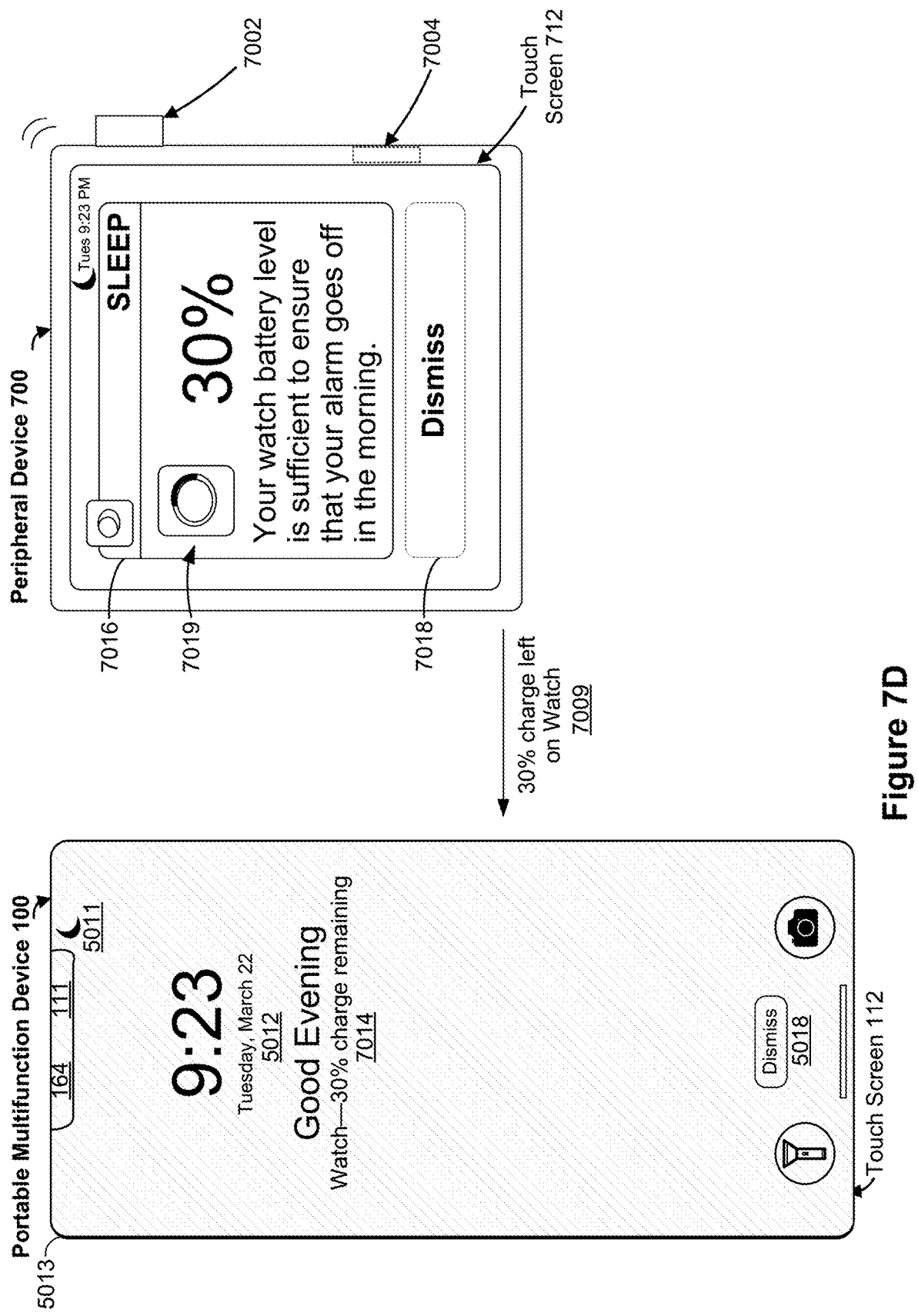
Figure 7E:
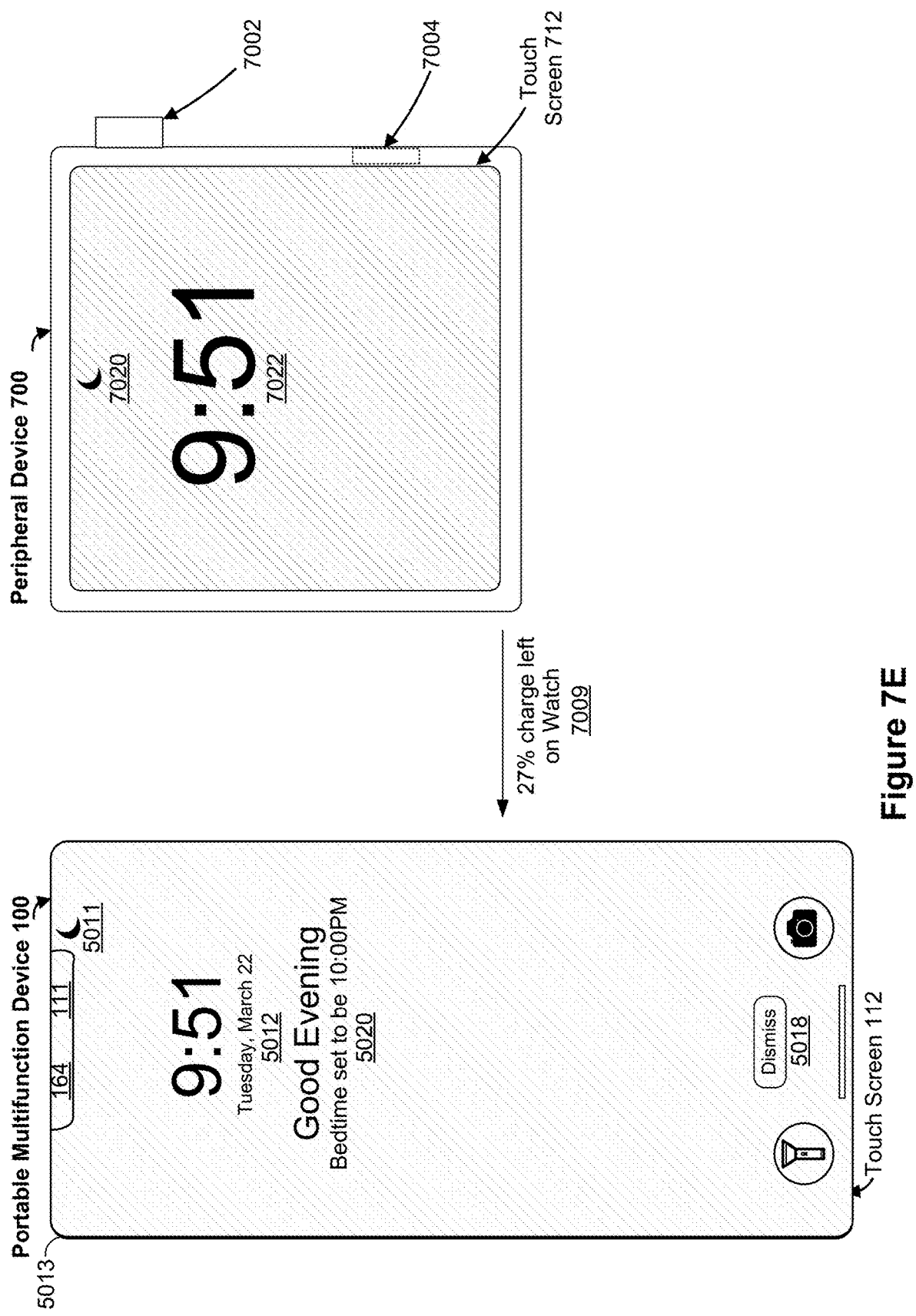

FIG. 7D illustrates that, in some embodiments, during the preset time period before the start of the scheduled sleep period (e.g., during the wind down period, or during the time 15 minutes before wind down period starts till 10 minutes before sleep period starts, etc.), if the battery level of the device for which charging reminder is displayed has increased to above the preset threshold level (e.g., 30%,) or is fully charged, the device 100 and/or peripheral device 700 displays another battery level reminder to inform the user that there is sufficient battery charge to support the upcoming sleep mode time period and optionally the wake alarm. In some embodiments, as shown in FIG. 7E, the device 100 displays a battery level indicator 7014 on the wind down screen 5013. In some embodiments, the battery level indicator 7014 indicates the battery level of the peripheral device 700 (and/or its own battery level). In some embodiments, the peripheral device displays a notification 7019 to notify the user that the peripheral device 700 (or the multifunction device 100) has been charged to a sufficient level (e.g., above the preset threshold battery level, or fully charged, etc.). In some embodiments, the notification 7019 is displayed with a dismiss button 7018. When the dismiss button is activated, the peripheral device 700 redisplays its wind down screen 7022, in accordance with some embodiments. In some embodiments, the wake screen of the peripheral device includes a time element showing the current time, and a DND indicator 7020 on a dimmed touch screen 712.

Figure 7F:
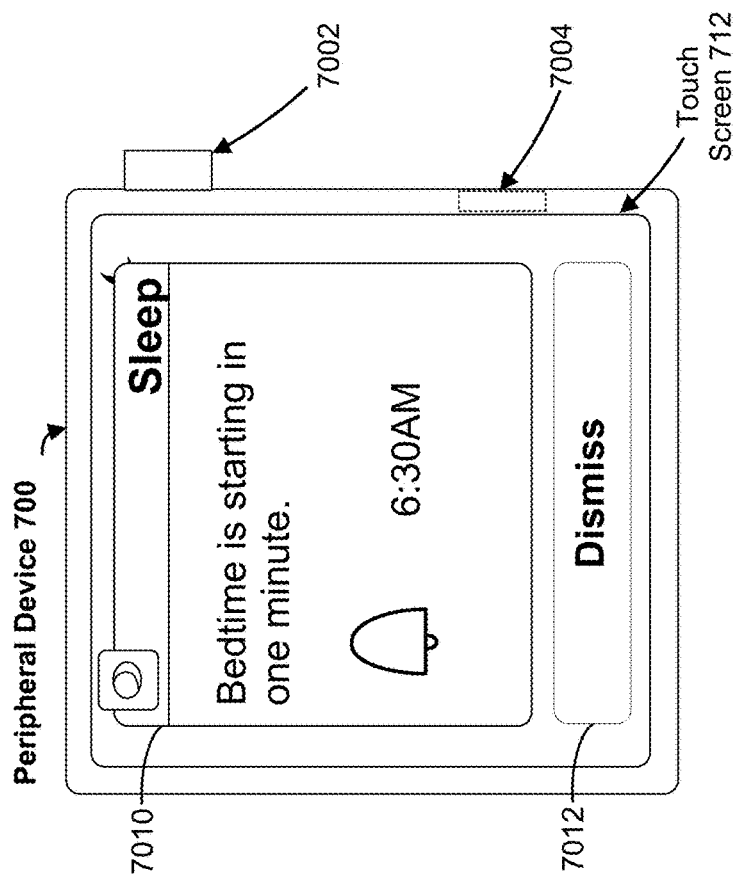
Figure 7F:
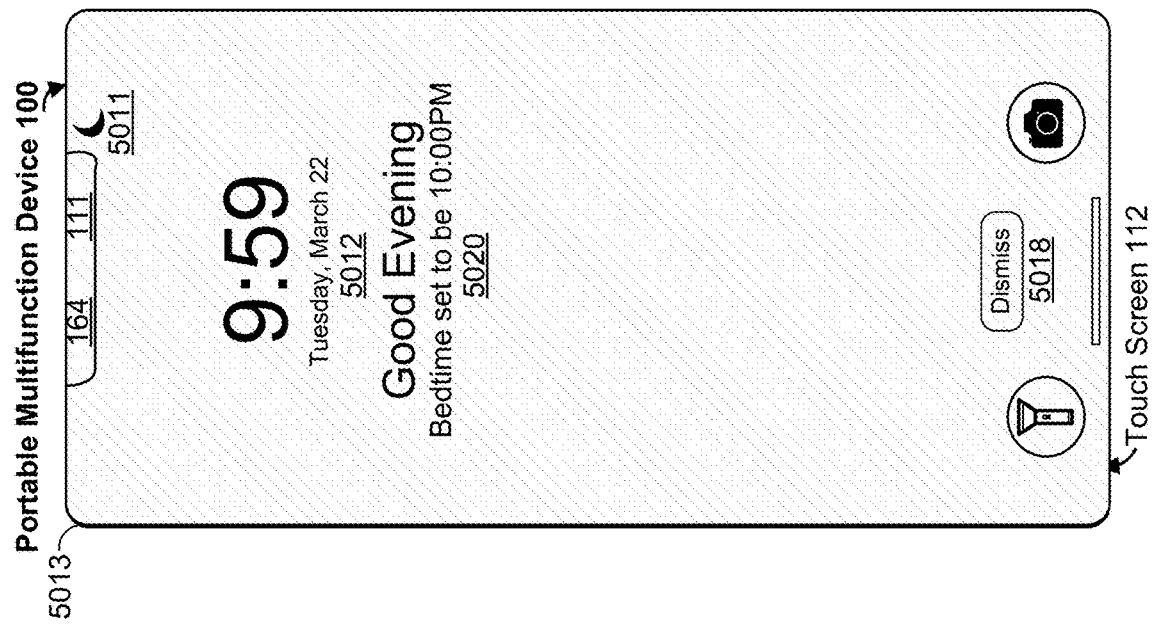

FIG. 7F illustrates user interfaces for the first computer system and the second computer system when the current time is right before (e.g., 1 minute before) the scheduled mode change (e.g., the start of the scheduled sleep period). In FIG. 7F, a bedtime reminder 7010 is generated on the peripheral device 700 that does not include battery status information for either the multifunction device 100 or the peripheral device 700 (e.g., irrespective of whether battery level of either the multifunction device 100 or the peripheral device 700 is below the present threshold level to support the sleep mode through the sleep period and generate the wake alarm). In some embodiments, the bedtime reminder is only generated on the peripheral device 700 and not on the multifunction device 100, when the current time is right before (e.g., one minute before) the start of the scheduled sleep period. In some embodiments, the bedtime reminder 7010 includes an indication of the wake alarm setting for the end of the sleep period. In some embodiments, the bedtime reminder 7010 is displayed with a dismiss button 7012. In some embodiments, the peripheral device dismisses the bedtime reminder 7010 and displays the sleep screen for the peripheral device (e.g., optionally the same as the wind down screen 5022). In some embodiments, if the bedtime reminder 7010 is not manually dismissed by an input on the dismiss button 7012, the peripheral device 700 automatically dismisses the bedtime reminder 7010 when the scheduled bedtime is reached (e.g., at 10:00 PM).

Figure 7G:
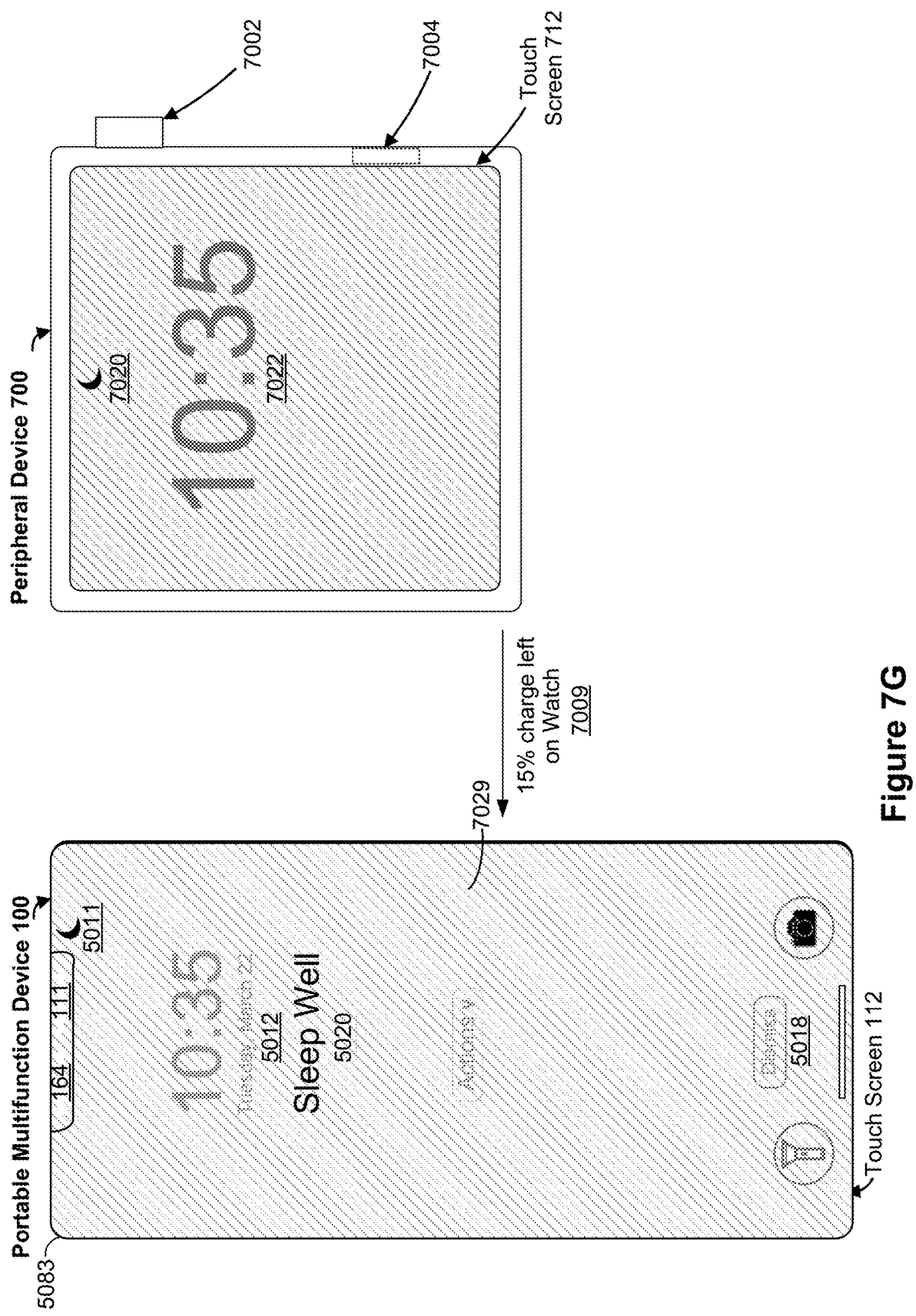

FIG. 7G illustrates the sleep screen 5083 of the device 100 and a sleep screen 7029 of the peripheral device 700 (e.g., optionally the same as the wind down screen 7022). In some embodiments, the sleep screen 5083 no longer displays the bedtime information or the alarm information for the upcoming sleep period. In some embodiments, the sleep screen 5083 has a reduced display luminosity level as compared to the wind down screen 5013 displayed during the wind down period. In some embodiments, the sleep screen 5083 includes time and date element 5012, and optionally, a shortcut or action affordance for displaying a set of application functions that are still available on the sleep screen. In some embodiments, the sleep screen 5083 includes a dismiss button for dismissing the sleep screen and navigate to a regular wake screen during the sleep period. In some embodiments, the user interface elements shown on the sleep screen 5083 have a diminished appearance as compared to their counterparts on the wind down screen 5013. In some embodiments, the sleep screen on the peripheral device 700 has the same appearance of the wake screen on the peripheral device 700. In some embodiments, the sleep screen on the peripheral device is dismissed using a preset gesture (e.g., turning the digital crown 7002 until a threshold is reached), e.g., as described with respect to FIGS. 11A-11AF and accompanying descriptions. In some embodiments, the sleep screen of the peripheral device 700 is a completely dark screen, optionally, with only the DND indicator 7020 displayed. In some embodiments, the sleep screen 7029 of the peripheral device 700 has fewer user interface objects and/or supports fewer types of inputs as compared to the regular wake screen or lock screen of the peripheral device 700, and/or as compared to the wind down screen of the peripheral device 700. In some embodiments, the sleep screens of the multifunction device 100 and the peripheral device 700 are only displayed in response to a wake input, and during a prolonged period of inactivity, the displays of the multifunction device 100 and the peripheral device are in an off state or low power always-on state that includes only the current time and/or the DND indicator 7020.

In some embodiments, as shown in FIG. 7G, when the current time is within the scheduled sleep period, even if the current battery level (e.g., 15%) of the peripheral device 700 (and optionally, the battery level of the multifunction device 100) falls below the preset threshold battery level (e.g., 30%), the peripheral device 700 and the multifunction device 100 does not display any charging reminder or alerts regarding the battery level (e.g., sleep screen is maintained, or screen is dark or in the low power mode). This behavior is distinguished from conventional low battery reminders that are displayed any time that the battery is sufficiently low (e.g., the conventional low battery threshold is set much lower than the preset threshold battery level for supporting the sleep mode and optionally the wake alarm).This is also distinguished from low battery reminders that are generated any time that the battery is low for a future scheduled event. Suppressing the reminders for increasing the battery level during the scheduled sleep period may prevent the reminder for increasing the battery level from causing unnecessary stress (e.g., keeping a user awake past a scheduled bedtime to charge the device(s)).

Figure 7H:
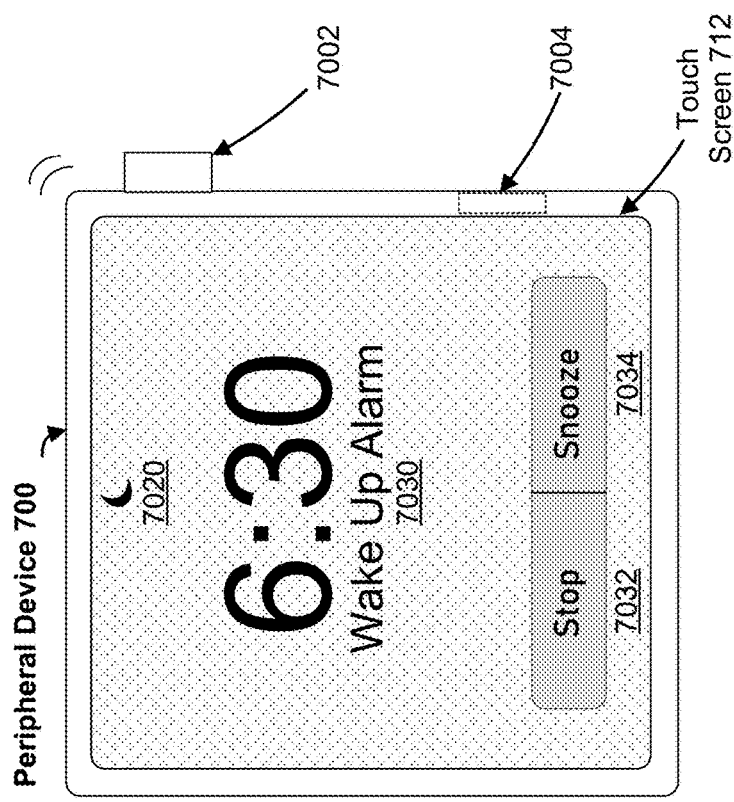
Figure 7H:
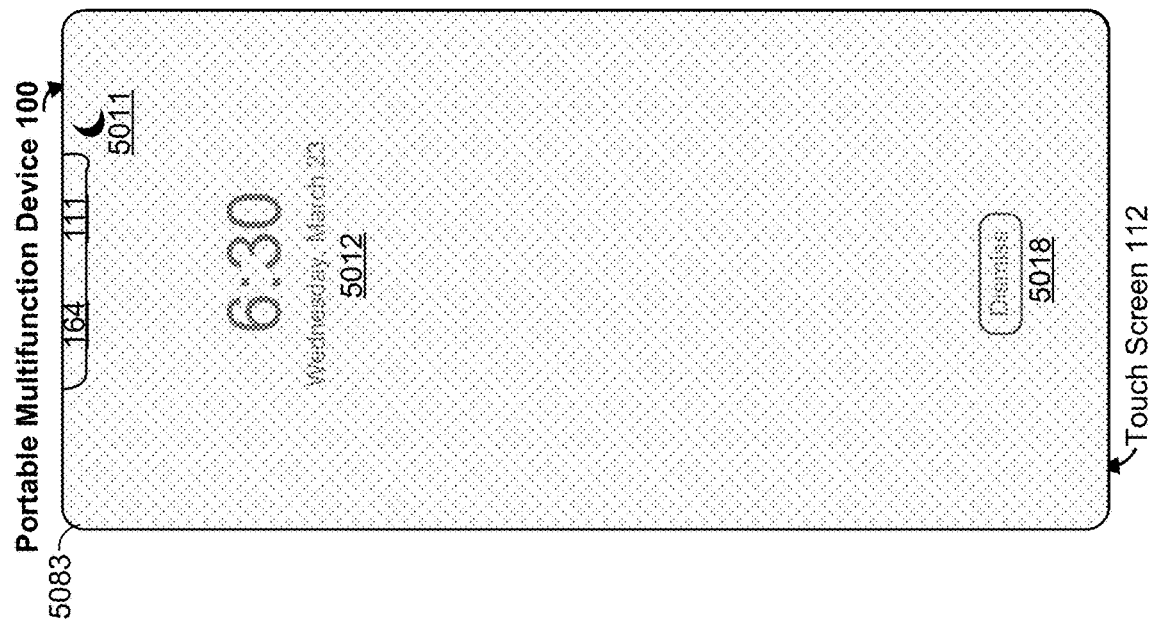

FIG. 7H illustrates generation of an alarm output when the scheduled wake time for the sleep period is reached, ending sleep mode for the device. In some embodiments, when an alarm is set for the wake time of the sleep period, the alarm goes off on the peripheral device 700 first (e.g., at exactly the scheduled wake time 6:30 AM). In some embodiments, when the wake alarm goes off on the peripheral device 700, the alarm screen 7030 is displayed in conjunction with a non-visual output, such as a tactile output and or an audio output. In some embodiments, the alarm screen 7030 includes an affordance (e.g., stop button 7032) that, when activated, causes the peripheral device 700 to stop the alarm output on the peripheral device 700, and navigate to a good morning screen 7038 (FIG. 7J) on the peripheral device 700. In some embodiments, if the good morning screen 7038 is not enabled on the peripheral device 700, the peripheral device navigates to the regular wake screen for the peripheral device 700. In some embodiments, the alarm screen also includes an affordance (e.g., a snooze button 7034) that, when activated, causes the peripheral device 700 to reset the wake time to a preset amount of time (e.g., 5 minutes, 7 minutes, etc.) after the originally scheduled end time of the sleep period, maintaining sleep mode for the device for that additional preset amount of time. In some embodiments, in response to an input dismissing the alarm output (e.g., turning the alarm off) using the stop button 7032 on the peripheral device 700, before the alarm output is generated on the multifunction device 100, the alarm output on the multifunction device 100 is canceled before it is generated. In some embodiments, in response to an input that resets the wake time to a later time using the snooze button 7034, the alarm output on the multifunction device 100 is delayed by the same amount of time before it is generated. In some embodiments, there is no delay between the alarm outputs on the multifunction device 100 and the peripheral device 100, and in such embodiments, snoozing or stopping the alarm output on either of the multifunction device 100 and the peripheral device 700 causes the alarm output on the other device to be snoozed or stopped as well (e.g., the input adjusts the end time of the sleep mode, or causes transition out of the sleep mode, which is applied to both the multifunction device 100 and the peripheral device 700).

Figure 7I:
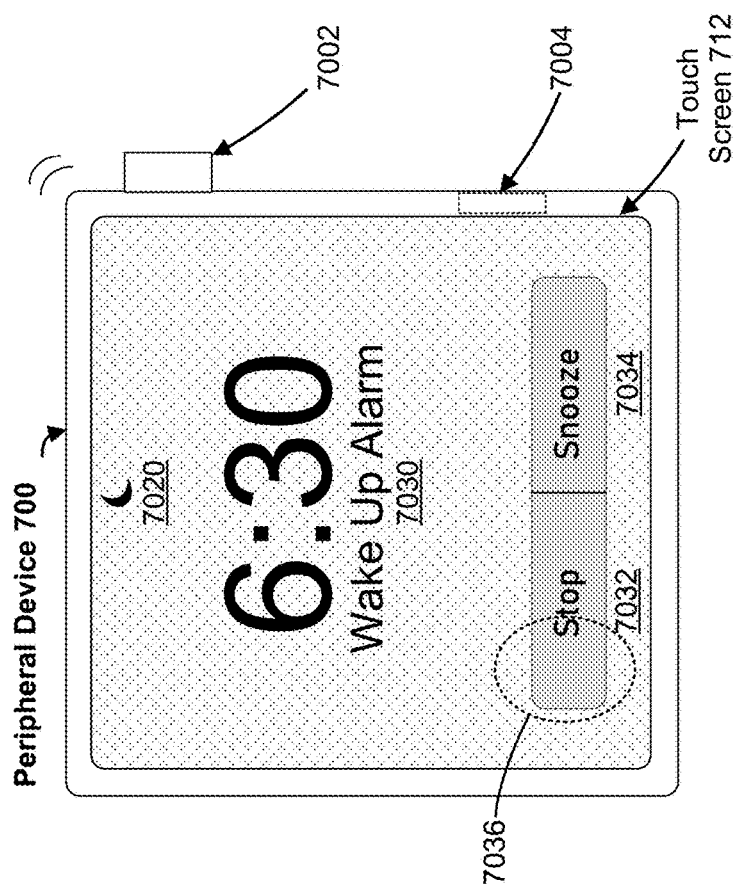
Figure 7I:
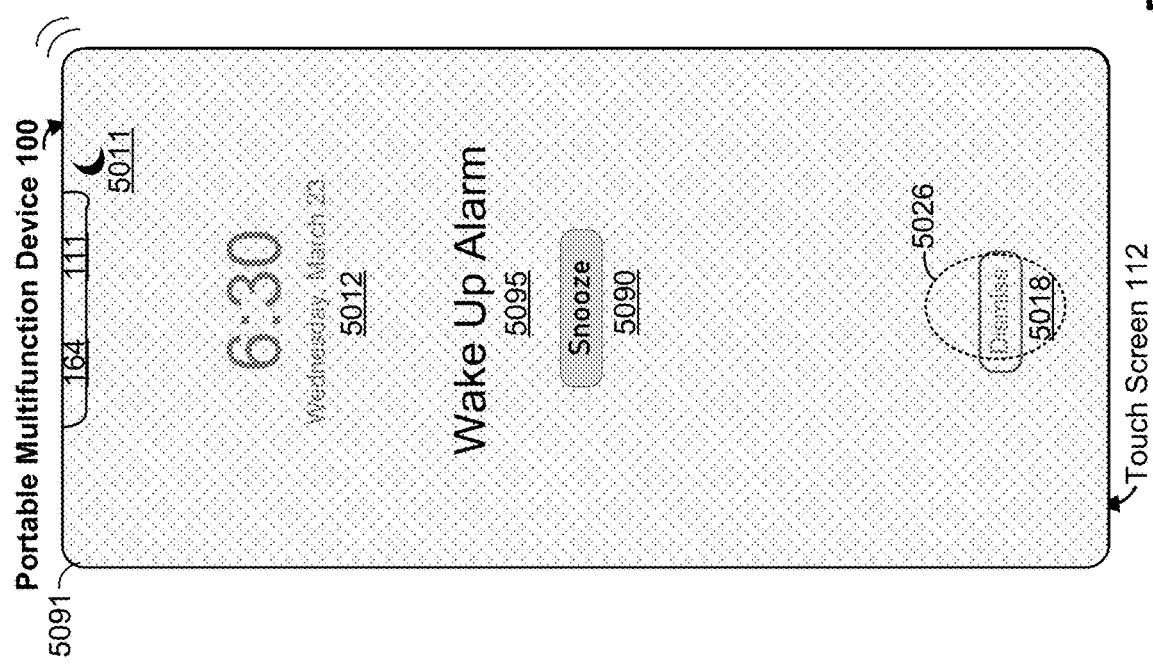

FIG. 7I shows that, in some embodiments, the alarm output on the multifunction device 100 is generated slightly after (e.g., 5 seconds, 10 seconds, etc.) the alarm output on the peripheral device 700. If the alarm output on the peripheral device 700 was not stopped or snoozed before the alarm output is generated on the multifunction device 100, both the multifunction device 100 and the peripheral device 700 generate their respective alarm output at the same time after the initial delay period (e.g., 5 seconds, 10 seconds, etc.). In some embodiments, as shown in FIG. 7I, the alarm screen 5091 is displayed at a time slightly after (e.g., 5 seconds, 10 seconds, etc.) the scheduled end time of the sleep period. The alarm screen 5091 displayed on the multifunction device 100 includes the current time and date in the time and date element 5012, alarm text 5095, a snooze button 5090 for delaying the end time of the sleep period by a preset amount of time (e.g., 5 minutes, 7 minutes, etc.), and a dismiss button 5018 for stopping the alarm output and navigate to the regular wake screen 5019 (if a good morning mode is not enabled after sleep mode) or the good morning screen 5093 (if a good morning mode is enabled after sleep mode). In some embodiments, the alarm output generated on the multifunction device 100 includes one or more tactile outputs and/or audio outputs, in conjunction with the alarm screen 5091. In some embodiments, while the alarm outputs are concurrently generated on both the multifunction device 100 and the peripheral device 700, snoozing or stopping the alarm output on either of the multifunction device 100 and the peripheral device 700 causes the alarm output on the other device to be snoozed or stopped as well.

Figure 7J:
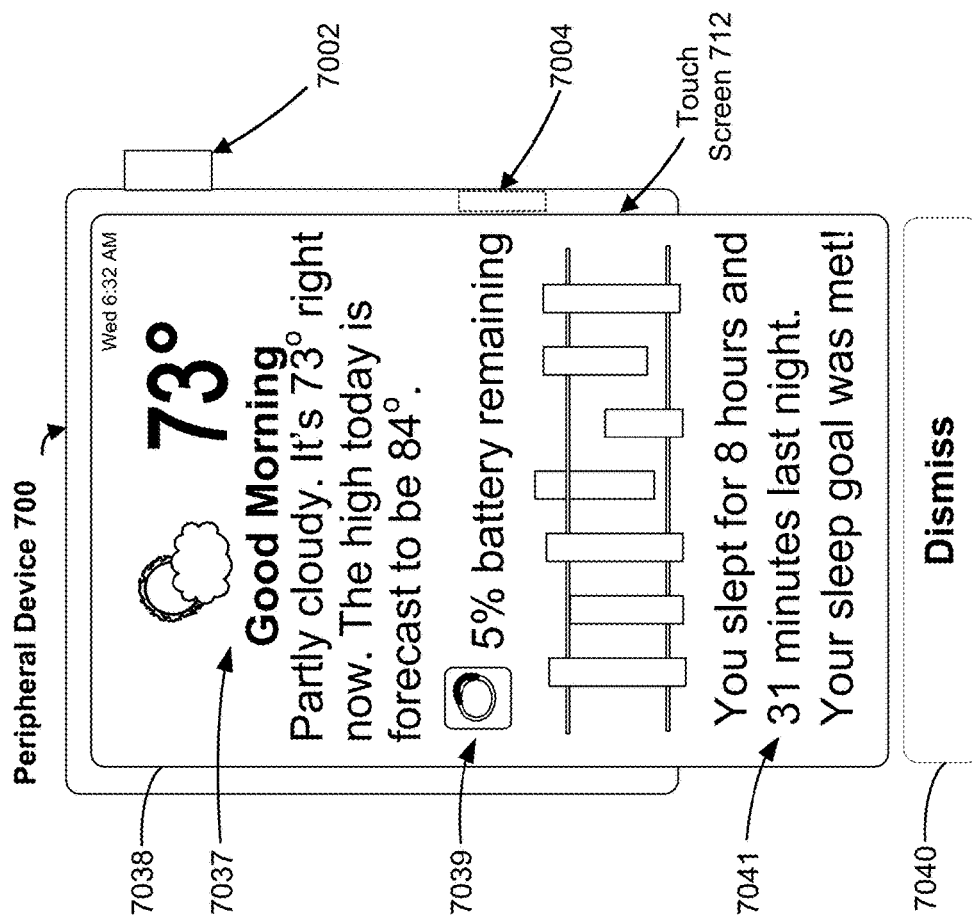
Figure 7J:
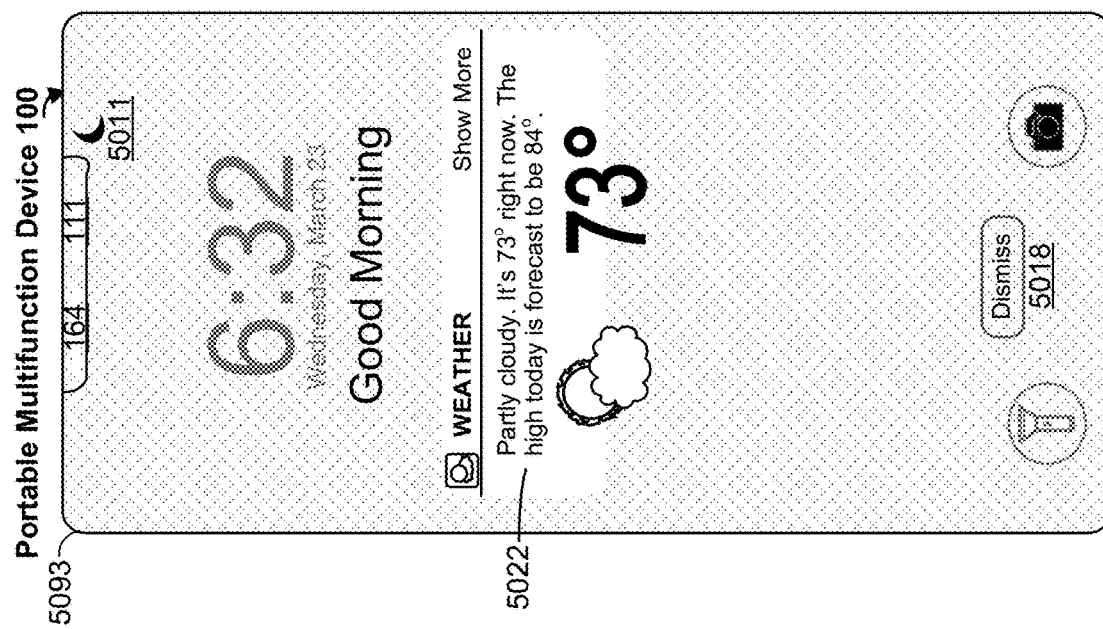

As shown in FIG. 7J, alarm output can be stopped on both the multifunction device 100 and the peripheral device 700, in response to either a tap input by contact 5026 on the dismiss button 5018 on the alarm screen 5091 of the multifunction device 100, or a tap input by a contact 7036 on the stop button 7032 on the alarm screen 7030 shown on the peripheral device 700. As a result, on the multifunction device 100, if the good morning mode (or windup mode) is enabled, the good morning screen 5093 is displayed, showing weather information 5022 and dismiss button 5018. The good morning screen 5093 will be displayed during the windup mode in response to the multifunction device 100 being woken by user input, until the windup mode is terminated at its scheduled end time, or manually terminated. In some embodiments, the windup mode is ended when the dismiss button 5018 is activated for the first time. In some embodiments, after the alarm screen 7030 of the peripheral device 700 is dismissed, the good morning screen 7038 of the peripheral device 700 is displayed during the scheduled windup period (e.g., one hour after the end time of the sleep period). In some embodiments, the good morning screen 7038 on the peripheral device 700 includes some weather information 7037 for the day, a battery status information (e.g., current battery level of the peripheral device 700 is 5%) or charge reminder 7039 for charging the battery of the peripheral device 700 (and optionally the same information and reminder for the multifunction device 100). In some embodiments, the good morning screen 7038 of the peripheral device 700 optionally displays a summary of how the user has adhered to the sleep schedule for the past several days (e.g., seven days, 10 days, two weeks, etc.) to indicate a trend or overall sleep quality of the user. In some embodiments, a summary 7041 is only generated if the user has consistently met a pre-established sleep goal for the sleep schedule. In some embodiments, the good morning screen 7038 of the peripheral device 700 displays the summary 7041 summarizing the sleep quality for the most recently completed sleep period as tracked by the peripheral device 700. In some embodiments, the good morning screen 7038 only includes the summary 7041 if the sleep goal is met during the most recently completed sleep period. In some embodiments, coaching messages about sleep are displayed on the good morning screen and are based on recorded sleep data for multiple consecutive days of the active sleep schedule that indicate satisfaction of a preset sleep goal (e.g., a "streak").

In some embodiments, if the alarm output on either one of the first or second computer system (e.g., the multifunction device 100 and the peripheral device 700) is not generated due to low battery level (or no battery) at said one of the first or second computer system, the alarm output is still generated at the other of the first or second computer system. For example, if peripheral device 700 runs out of battery during the scheduled sleep time period, the device 100 still generates the alarm output. Alternatively, if the device 100 runs out of battery during the scheduled sleep time period, the peripheral device 700 still generates the alarm output. In some embodiments, if the alarm output on the first computer system is not generated due to low battery level of the first computer system, the alarm output is generated at the second computer system without the delay. For example, if peripheral device 700 runs out of battery during the scheduled sleep time period, the device 100 generates the alarm output without a delay.

FIGS. 8A-8D are flowchart diagrams of a method 8000 of generating battery charging alerts during a preset time period before the start of the scheduled mode change, in accordance with some embodiments.

This method relates to displaying or forgoing displaying a reminder for increasing battery level, based on comparison of the current battery level with a preset battery threshold level, and the current time with the first preset period preceding a schedule mode change. Displaying or forgoing displaying the reminder for increasing battery level based on the comparisons performs an operation when a set of conditions has been met without requiring further user input improves the operation of the computer system to support its intended functions (e.g., tracking sleep during the sleep period and outputting the wake alarm without unexpectedly running out of power before doing so). This method is illustrated in FIGS. 7A-7C, for example, where the charge reminder if only generated when the battery level dropped below 30% while the current time is within a preset time period preceding the scheduled sleep period of an active sleep schedule.

The method 8000 is performed at a first computer system in communication with a first display generation component (and, in some embodiments, one or more input devices, and/or a peripheral device (e.g., a wearable device, such as a wrist band, a watch, a pin, a ring, etc.) that is coupled to the computer system (e.g., paired via a Bluetooth connection, a WiFi connection, etc., and performs operations (e.g., transmit requested information, displaying alerts and notifications, displays received information, etc.) in accordance with instructions and/or queries received from the computer system). In some embodiments, the first computer system, the first display generation component, and the one or more input devices are integrated into a single portable electronic device with a common housing, such as in a hand held device, a table device, a smart phone, etc. In some embodiments, the peripheral device is a wearable device that is paired and in communication with the portable electronic device. In some embodiments, the first computer system is a wearable device that includes a display generation component and one or more input devices. In some embodiments, the first computer system is a peripheral device (e.g., a wearable device) that is coupled to a portable electronic device. In the method 8000, in accordance with a determination that a current time is within (e.g., after the start time of and before the end time of) a first preset time period (e.g., a time range that starts at x amount of time (e.g., 1 hour, 45 minutes, etc.) before the start time of the scheduled mode change, and ends at y amount of time (e.g., 10 minutes, 5 minutes, 0 minute, etc.) before the start time of the scheduled mode change, a wind down period (e.g., 1 hour, 45 minutes, etc.), a preset time period (e.g., 90 minutes, 1 hour, etc.) etc.) preceding (e.g., having an end time that is the same as or immediately before a start time of a respective scheduled time period, having an end time that is before but not necessarily immediately before the start time of a respective scheduled time period, etc.) a scheduled mode change (e.g., a first scheduled time period (e.g., a first sleep schedule, a first DND time period, etc.)) and in accordance with a determination that a first battery level (e.g., the battery level of the first computer system itself, the battery level of a peripheral device coupled to the first computer system, etc.) is below a first preset battery level (e.g., a first fixed threshold battery level, a dynamically determined threshold batter level, etc.), the computer system displays (8002), via the first display generation component, a reminder for increasing the first battery level above the first preset battery level (e.g., a reminder for charging a peripheral device (e.g., displaying the charging reminder on the wind down wake screen of the portable electronic device, and/or the peripheral device)). In accordance with a determination that the current time is outside of (e.g., before the start time of) the first preset time period preceding the scheduled mode change (e.g., the first scheduled time period) and in accordance with a determination that the first battery level (e.g., the battery level of the computer system itself, the battery level of a peripheral device coupled to the computer system, etc.) is below the first preset battery level (e.g., a first fixed threshold battery level, a dynamically determined threshold batter level, etc.), the computer system forgoes (8004) display of the reminder for increasing the first battery level above the first preset battery level (e.g., the charging reminder is not displayed on a regular wake screen user interface, or on the wake screen user interface shown during the sleep mode, even when the battery level cannot sustain through the whole duration of the sleep mode). In some embodiments, the first computer system is a portable electronic device, such as a mobile phone or tablet device, the first battery level is a battery level of the portable electronic device, and the reminder for increasing the first battery level above the first preset battery level is generated on the portable electronic device. In some embodiments, the first computer system is a portable electronic device, such as a mobile phone or tablet device, the first battery level is a battery level of a companion device, such as a wearable device (e.g., a watch, a bracelet, etc.), that is paired with the portable electronic device, and the reminder for increasing the first battery level above the first preset battery level is generated on the portable electronic device. In some embodiments, the first computer system is a wearable device, such as a watch or bracelet that is optionally paired with a portable electronic device, the first battery level is a battery level of the wearable device, and the reminder for increasing the first battery level above the first preset battery level is generated on the wearable device. In some embodiments, the first battery level is a battery level of the wearable device, and the reminder is generated on both the portable electronic device and the wearable device. In some embodiments, the first preset battery level is a preset static value (e.g., 30%, 40%, etc.) that is set irrespective of actual usage pattern of the first computer system or companion device before and/or after the start of the first preset time period. In some embodiments, the first preset battery level is a dynamic value that is established based on usage patterns and/or battery health of the first computer system or the companion device. For example, if the user consistently use the first computer system actively during the wind down period and/or sleep period, the first preset battery level is set at a higher value than if the user does not often use the first computer system actively during the wind down period and/or sleep period.

In some embodiments, in accordance with a determination that the current time is within the scheduled mode change (e.g., within the first scheduled time period (e.g., a first sleep schedule, a first DND time period, etc.)) and in accordance with a determination that a second battery level (e.g., the battery level of the computer system itself, the battery level of a peripheral device coupled to the computer system, etc.) is below a second preset battery level (e.g., a second fixed threshold battery level, a dynamically determined threshold batter level, etc.), the computer system forgoes (8006) displaying the reminder for increasing the second battery level above the second preset battery level. This behavior is distinguished from regular low battery reminders that is displayed any time that the battery is sufficiently low (e.g., this threshold is set much lower than the first preset level), and from low battery reminders that is generated any time that the battery is low for a future scheduled event. This is illustrated in FIG. 7G, for example, where the current time is within the schedule mode change (e.g., during a sleep schedule starting at 10:00 PM) and in accordance with a determination that the second battery level (e.g., 15% battery for the peripheral device 700) is below a second preset battery level (e.g., 30%), the first computer system (e.g., the portable multifunction device 100) forgoes displaying the reminder for increasing the second battery level above the second preset battery level. Forgoing displaying the reminder for increasing the second battery level above the second preset battery level, when the current time is within the scheduled mode change, performs an operation (e.g., silencing the reminder to charge battery) when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently.

In some embodiments, a start time of the scheduled mode change is (8008) adjustable (e.g., to a second scheduled time period with a second start time and/or a second end time). In some embodiments, the first computer system detects one or more inputs that correspond to a request to adjust the start time and optionally the end time of the scheduled mode change (e.g., the input includes a tap input on the wake alarm icon on the wind down screen that leads to an alarm user interface for adjusting the sleep schedule for the current day, where additional user inputs are received to adjust the start time and/or end time of the sleep period for the current day), and in response to detecting that the one or more inputs that correspond to the request to adjust the start time of the schedule mode change: the first computer system adjusts start and end times of the first preset time period in accordance with the adjusted start time of the scheduled mode change. This is shown in FIGS. 9J-9M, for example, where activating the alarm affordance 5086 displays a user interface (e.g., the alarm application user interface 9041) for adjusting the start time of the scheduled mode change. Allowing the start time of the scheduled mode change to be adjustable reduces the number of inputs needed to perform an operation. Reducing the number of inputs needed to perform an operation enhances the operability of the device, and makes the user-device interface more efficient, which, additionally, reduces power usage and improves battery life of the device by enabling the user to use the device more quickly and efficiently.

In some embodiments, the reminder for increasing the first battery level above the first preset battery level is (8010) displayed concurrently with a reminder that the scheduled mode change is about to start. In some embodiments, the reminder for increasing the first battery level and the reminder that the scheduled mode change is about to start are displayed, via the first display generation component, in a first user interface that corresponds to a restricted state of the computer system (e.g., in the restricted state (e.g., a screen-locked state, or screen-restricted), interaction with graphical user interfaces of the computer system is restricted or blocked by a lock screen, a wake screen in the authenticated state and/or the unauthenticated state, a coversheet user interface, etc.). In some embodiments, the reminder for increasing the first battery level and the reminder that the scheduled mode change is about to start are displayed, via the first display generation component, in a notification that overlays a first user interface that corresponds to a restricted state of the computer system. This is shown in FIG. 7B, for example, where the reminder for increasing the first battery level (e.g., the (charging) reminder 7013) is displayed concurrently with the reminder that the scheduled mode change is about to start (e.g., the bedtime reminder 7011). Displaying the reminder for increasing the first battery level above the first preset battery level concurrently with the reminder that the scheduled mode change is about to start performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently.

In some embodiments, the reminder for increasing the first battery level above the first preset battery level is (8012) displayed concurrently with a reminder that the scheduled mode change is about to start on a first user interface that corresponds to a restricted state of the first computer system. In the method 8000, while displaying the first user interface that corresponds to the restricted state of the first computer system, the computer system detects a first user input directed to the first user interface. In response to detecting the first user input directed to the first user interface: in accordance with a determination that the first input meets first criteria, the computer system replaces display of the first user interface with a second user interface that corresponds to the restricted state of the first computer system (e.g., a screen-locked or screen-restricted state of the first computer system), wherein the second user interface is different from the first user interface. In some embodiments, the first user interface displays a reminder that a scheduled mode change (e.g., sleep mode) is about to start at a preset start time of the scheduled mode change. In some embodiments, the first user interface displays a reminder that a wind down period preceding the scheduled mode change is about to start at a preset start time of the wind down period. In some embodiments, the first user interface is a bedtime reminder user interface that is different from the wind down screen. In some embodiments, the first user interface is the wind down screen that is displayed during the wind down period preceding the scheduled sleep mode. In some embodiments, the first user interface displays the first battery level only when the first battery level is below the first preset battery level and does not display the first battery level when the first battery level is not below the first preset battery level. In some embodiments, the first user interface is a wind down screen and the second user interface is a regular lock screen, a wake screen that corresponds to an authenticated state, a wake screen that corresponds to an unauthenticated state. Dismissing the wind down screen using a predefined input causes display of the regular lock screen or wake screen. In some embodiments, the first user interface is a reminder screen and the second user interface is the wind down screen, and dismissal of the reminder screen using a predefined input causes display of the wind down screen, and dismissal of the wind down screen using a predefined input causes display of the regular lock screen or wake screen. Replacing the display of the first user interface with a second user interface that corresponds to the restricted state of the first computer system, in accordance with the determination that the first input meets the first criteria, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently.

In some embodiments, the reminder for increasing the first battery level and the reminder that the scheduled mode change is (8014) about to start are displayed, via the first display generation component, in a notification that overlays a first user interface that corresponds to a restricted state of the computer system. In some embodiments, the first user interface is a regular lock screen or wake screen. In some embodiments, the first user interface is a wind down screen that is displayed before the start time of the scheduled mode change. In some embodiments, the notification is dismissed in response to an input that meet the criteria for dismissing other types of notifications as well. This is shown in FIG. 7B, for example, where the reminder for increasing the first battery level (e.g., charging reminder 7013) and the reminder that the scheduled mode change is about to start (e.g., the bedtime reminder 7011) are displayed in a notification (e.g. the bedtime reminder notification 7010) that overlays a first user interface that corresponds to a restricted state of the computer system (e.g., a lock screen). Displaying the reminder for increasing the first battery level and the reminder that the scheduled mode change is about to start, in the notification that overlays the first user interface that corresponds to the restricted state of the computer system, provides improved visual feedback to the user (e.g., allowing the user to see both reminders in the same user interface). Providing improved visual feedback enhances the operability of the device and makes the user-device interface more efficient, which, additionally, reduces power usage (e.g., fewer user interface objects are displayed) and improves battery life of the device by enabling the user to use the device more quickly and efficiently.

In some embodiments, the first battery level is (8016) a battery level of a second computer system distinct from the first computer system, and wherein the first computer system displays the reminder increasing the first battery level above the first preset battery level in a user interface that corresponds to a restricted mode of the first computer system (e.g., on a wind down screen, a bedtime reminder screen that is displayed close to the start time of the wind down period, a bedtime reminder screen that is displayed close to the start time of the sleep mode (e.g., if wind down period is not enabled), etc.). In some embodiments, the first computer system is a portable electronic device, such as a mobile phone or tablet device, and the second computer system is a companion device, such as a wearable device, that is paired with the portable electronic device. In some embodiments, after the displaying the reminder, the first computer system displays the current/updated battery status of the companion device only when the companion device is being charged. This is illustrated in FIGS. 7C and 7D, for example, where the battery status of the peripheral device 700 is displayed on the wind down screen 5013 of the multifunction device 100. Displaying the reminder for increasing the first battery level of the second computer system above the first preset battery level on the first computer system performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently.

In some embodiments, at a time after displaying the reminder, in accordance with a determination that the current time is within the first preset time period preceding the scheduled mode change and in accordance with a determination that a third battery level (e.g., the current battery level of the first computer system, the current battery level of a second computer system that is paired with the first computer system, etc.) is at or above a third preset battery level (e.g., fully charged, or above the first preset battery level), the computer system displays (8018), via the display generation component, a notification of the third battery level (e.g., an indication that the device associated with the battery is sufficiently charged (e.g., fully charged, or charged to a level above the first preset battery level, etc.) to support successful completion of the scheduled mode change on the first computer system or a second computer system that is paired with the first computer system). In some embodiments, the first computer system displays a current battery level of the first computer system or a second computer system that is paired with the first computer system after the completion of the scheduled mode change (e.g., on the good morning screen), and optionally displays a prompt for the user to increase the current battery level of the first computer system or the second computer system. This is shown in FIG. 7D, for example, where a third battery level (e.g., 30% charge for the peripheral device 700) is at or above a third preset battery level (e.g., 30%) and the computer system displays a notification of the third battery level (e.g., the notification 7019). Displaying the notification of the third battery level when the battery level is at or above the third preset battery level and the current time is within the first preset time period performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently.

In some embodiments, the first computer system is (8020) paired with a second computer system, the first battery level is a battery level of the second computer system. In the method 8000: at a time after displaying the reminder, in accordance with a determination that a fourth battery level of the second computer system is at or above a fourth preset battery level (e.g., fully charged, or above the first preset battery level), the computer system displays, via the display generation component, a notification of the third battery level. For example, after the second computer system (e.g., the paired wearable device) is connected to a charger, the first computer system is used to output an alert to the user to let the user know that the second computer system is charged above a sufficient level so that the user can put the second computer system on again. In some embodiments, the notification is only displayed during certain time periods, e.g., outside of the sleep mode and outside the wind down period. In some embodiments, the notification is only displayed during the good morning period. This is shown in FIG. 7D, for example, where the fourth battery level (e.g., 30%) is at or above a fourth preset battery level (e.g., 30%) and the first computer system (e.g., the portable multifunction device 100) displays, via the display generation component (e.g., the touch screen 712 of the peripheral device 700) a notification of the battery level of the peripheral device 700 (e.g., battery level indicator 7014). Performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently.

FIGS. 9A-9AG illustrate example user interfaces for configuring one or more modes described herein, in accordance with some embodiments.

FIG. 9A illustrates an exemplary user interface for setting a sleep goal for one or more sleep schedules managed by the multifunction device 100 and optionally the peripheral device 700, in accordance with some embodiments. In some embodiments, the sleep schedule and related operation modes are managed by an application installed on the multifunction device 100 and optionally the peripheral device 700. When the application is launched without a sleep schedule having been set up, a sleep goal user interface 9001 is displayed first to prompt the user to specify a sleep goal—an amount of time that the user would like to sleep each night. This sleep goal is used to measure how a sleep period of a sleep schedule compares with the user's desired amount of sleep for each day. In some embodiments, the sleep goal user interface 9001 includes sleep goal information 9002 to explain the purpose of the sleep goal. In some embodiments, the sleep goal user interface includes a sleep goal indicator 9004. In some embodiments, the sleep goal indicator 9004 includes affordances (e.g., minus button 9006 and plus button 9008) for decreasing or increasing the sleep goal duration and an indication of the current duration of the sleep goal. In some embodiments, the sleep goal user interface 9001 provides an initial value for the sleep goal that the user can adjust. In some embodiments, the sleep goal user interface provides no initial value for the sleep goal, and the user can enter any amount this within a preset range (e.g., between 4 hours and 12 hours). In some embodiments, the sleep goal user interface 9001 includes an affordance (e.g., "next" button 9010) for confirming the specified sleep goal and navigating to the next stage of the set up process. Additional steps for establishing a sleep schedule or multiple sleep schedules and associated operation modes after establishing the sleep goal are described with respect to FIGS. 9Q-9AG and accompanying descriptions.

FIGS. 9B-9I illustrate how the multifunction device 100 (and optionally the peripheral device 700) indicate to the user that a currently adjusted sleep schedule does or does not meet the pre-established sleep goal specified by the user, in accordance with some embodiments.

Figure 9B:
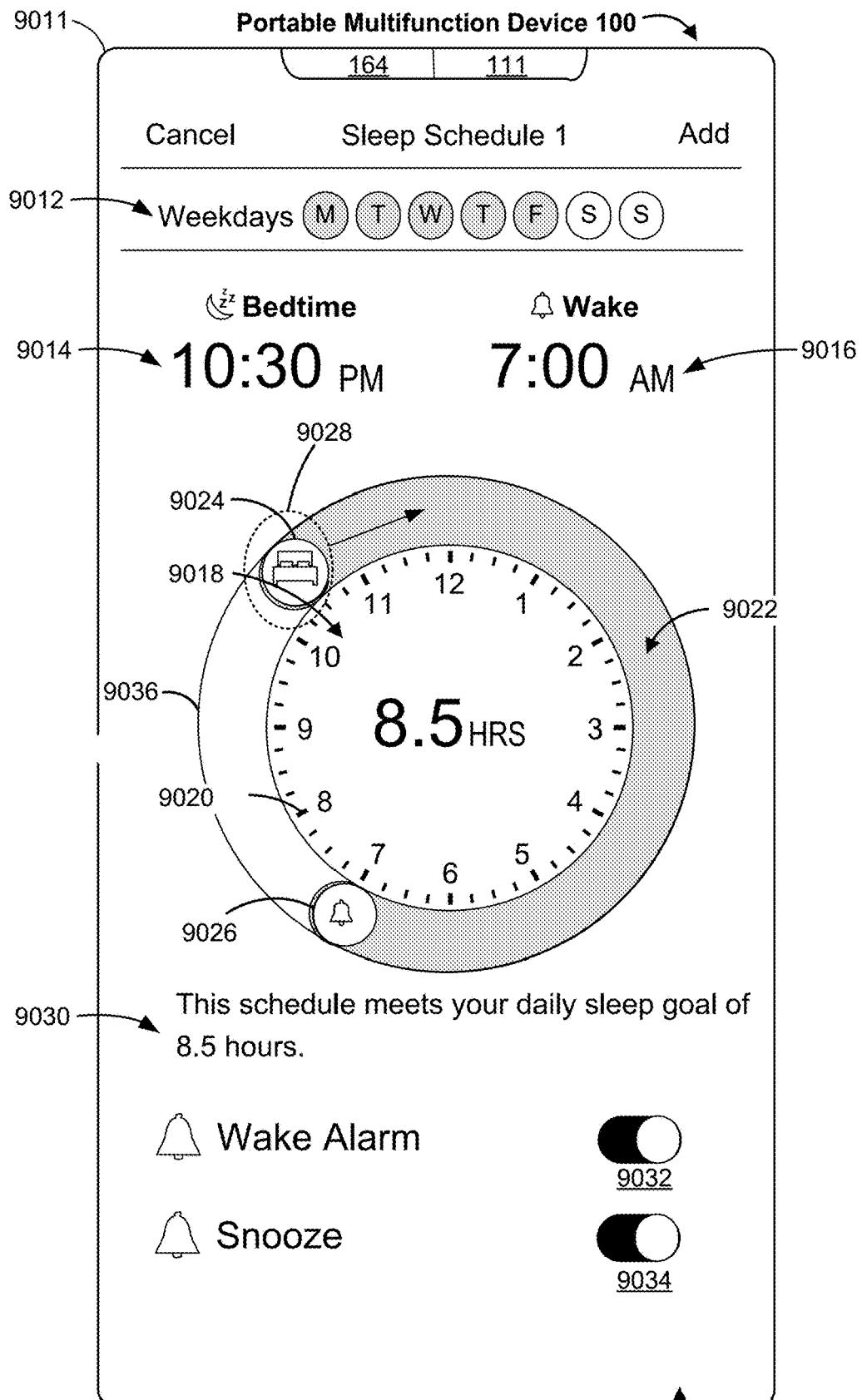

FIG. 9B illustrates an exemplary sleep schedule user interface 9011 for setting a sleep schedule (e.g., sleep schedule 1 which is used in other examples of this disclosure, or another sleep schedule for other days of the week, etc.). In some embodiments, the sleep schedule user interface 9011 includes a day selection region 9012 in which the days to which the currently specified schedule is applied are indicated and optionally are editable in response to user input. For example, currently the sleep schedule applies to all five weekdays, and does not apply to the weekend days. In some embodiments, the sleep schedule user interface 9011 includes a bedtime indicator 9014 (e.g., showing the start time of the sleep period of the current sleep schedule), a wake time indicator 9016 (e.g., showing the end time of the sleep period of the current sleep schedule), a sleep time adjuster object 9036 (e.g., a clock face 9018 with a slider channel around its periphery, other object that divides the time of a day into multiple units of time (e.g., 5 minutes increment, half hour increment, etc.) and distributes them along a slider or dial, a set of textual input fields for the start time and end time for the sleep period, etc.). In some embodiments, the sleep schedule user interface 9011 optionally includes a textual sleep goal message 9030 indicating whether the current sleep period as specified meets the pre-established sleep goal. In some embodiments, the sleep schedule user interface 9011 includes a textual object (e.g., optionally shown in the center of the clock face, or at another area (e.g., in the sleep goal message 9030, or standalone, etc.) of the sleep schedule user interface 9011) indicating the current duration of the sleep period as specified. In some embodiments, the sleep schedule user interface 9011 includes a wake alarm affordance 9032 that enables or disables the wake alarm for the current sleep schedule. In some embodiments, the sleep schedule user interface 9011 includes a snooze selection affordance 9034 that enables or disables a snooze function for an established wake alarm. In some embodiments, as shown in FIG. 9B, the sleep time adjuster object 9036 includes a first object 9024 that can be adjusted (e.g., optionally either by dragging the first object 9024 itself along or around the sleep time adjuster object 9036, or by entering a value using the bedtime indicator 9014, etc.) to set the start time of the sleep period, and the sleep time adjuster object 9036 also includes a second object 9026 that can be adjusted (e.g., optionally either by dragging the second object 9026 itself along or around the sleep time adjuster object 9036, or by entering a value using the wake time indicator 9016, etc.). In some embodiments, a sleep duration indicator 9022 is displayed (e.g., along or around the sleep time adjustor object 9036 between the first object 9024 and the second object 9026) to indicate the fraction and position of the sleep period relative to a 12-hour period (e.g., evening to morning). In some embodiments, the sleep time adjuster object includes a control to switch the 12-hour period from centered around midnight to be centered around noon (e.g., (1) centered around midnight means that the time period is from midnight to noon and (2) centered around noon means that the time period is from noon to midnight). In some embodiments, the sleep time adjuster object displays a total duration of a 24-hour period for each sleep period, and the first object and the second object indicating the bedtime and wake time of a sleep time period of a sleep schedule is configured to move along or around the sleep time adjuster object through the 24-hour period, including locations corresponding to midnight and noon on a particular day or military time (e.g., 0-23 hour). In some embodiments, the sleep time adjuster object include a 24-hour clock face that includes a 12 o'clock location at 0 degrees (e.g., at the top) and another 12 o'clock location at 180 degrees (e.g., at the bottom), and indications near the 0 degrees location and the 180 degrees location to indicate whether the 12 is midnight or noon (e.g., the indication proximate to the 0 degrees location includes a moon and the indication proximate to the 180 degrees location includes a sun). In some embodiments, as the first object 9024 is moved along or around the sleep time adjuster object 9036, the start time of the sleep period is updated according to the position of the first object 9024, as shown by the value of the bedtime indicator 9014; and as the second object 9026 is moved along or around the sleep time adjuster object 9036, the end time of the sleep period is updated according to the position of the second object 9026, as shown by the value of the wake time indicator 9016. The size of the sleep duration indicator 9022 grows and shrinks, and the total duration of the sleep period changes, in accordance with the movement of the first object 9024 and the second object 9026. In some embodiments, the sleep time adjuster object 9036 (e.g., the clock face with a slider channel around its periphery, a linear slider, a dial, etc.) includes tick marks 9020 that provide markers of unit of time along or around the sleep time adjuster object 9036. In some embodiments, the sleep duration indicator 9022 changes one or more characteristics of its appearance in accordance with the duration specified by the first object 9024 and second object 9026, and/or by the bedtime indicator 9014 (if adjustable by user input) and wake time indicator 9016 (if adjustable by user input).

In some embodiments, described in additional detail with reference to FIGS. 9C-9I below, a first display property (e.g., color, pattern, thickness, shape, luminance, opacity, and/or saturation, etc.) of the sleep duration indicator 9022 is displayed at a first value when the currently specified sleep duration is above a preset threshold duration (e.g., the sleep goal previously specified in the sleep goal user interface 9001), and switches to a second value when the currently specified sleep duration is below the preset threshold duration. In some embodiments, the change in the value of the first display property of the sleep duration indicator 9022 is a binary change that occurs when the threshold duration is crossed, and does not change further or change gradually (e.g., the value of the first display property remains constant) in accordance with further changes of the sleep duration as long as the threshold duration is not crossed by the changing sleep duration. In some embodiments, the change in the value of the first display property is accompanied by a change in the sleep goal message 9030 that textually indicates whether the threshold duration (e.g., sleep goal) is met by the currently specified sleep period. In some embodiments, in addition to the binary change that occurs when the currently specified sleep duration crosses the threshold duration, the sleep duration indicator 9022 optionally has one or more other display properties whose values are adjusted (e.g., continuously or in a plurality of small steps, etc.) in accordance with the change in the sleep duration as specified by the user's inputs irrespective of whether the sleep duration is above or below the threshold duration. For example, in some embodiments, the length of the sleep duration indicator 9022 changes continuously in accordance with the changes made to the total duration of the sleep period, irrespective of whether the duration of the sleep period as currently specified meets the specified sleep goal, however, a selected first property (e.g., color) of the sleep duration indicator switches from a first value to a second value (or from the second value back to the first value) when the duration crosses the specified sleep goal during an increase in sleep duration (or during a decrease in sleep duration). In some embodiments, other first display properties include, for example, fill option/pattern (e.g., binary values include solid vs. pattern, or cross hatches vs. grid), transparency (e.g., solid vs. 50% transparency), thickness (e.g., 1× thickness vs. 2× thickness, etc.), etc.

Figure 9C:
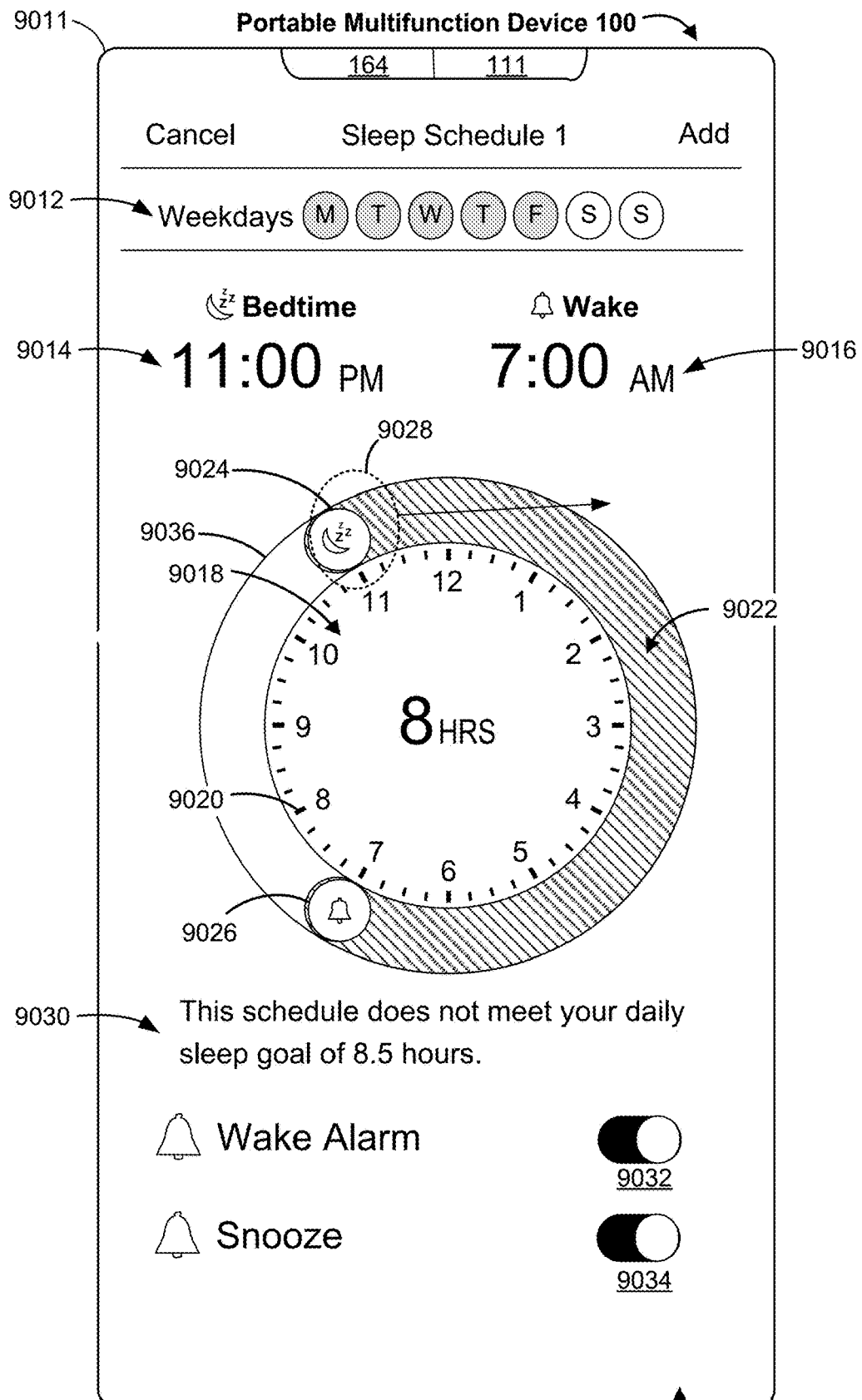
Figure 9D:
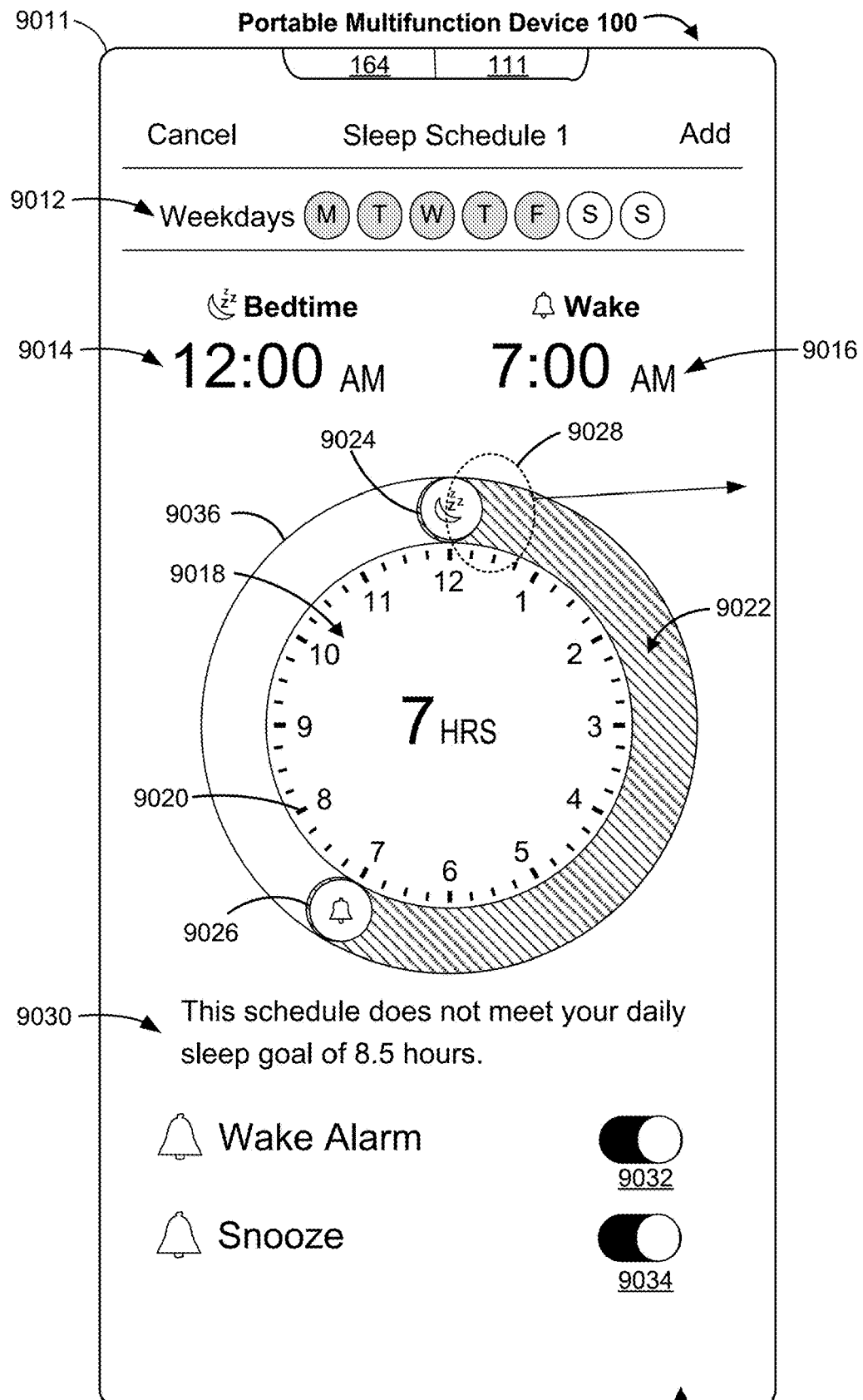
Figure 9E:
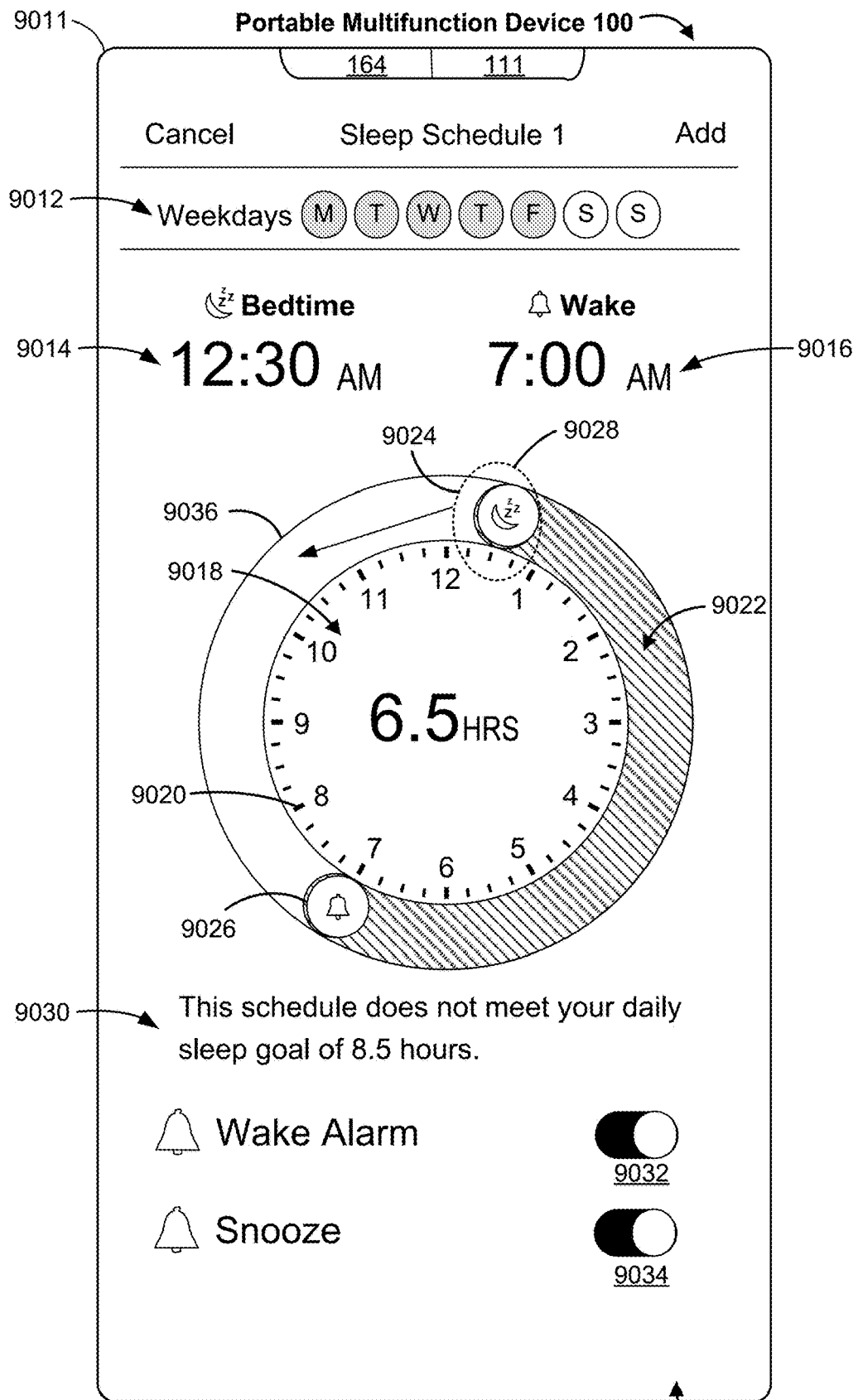

FIG. 9C illustrates a user interacting with the sleep schedule user interface 9011. The user input by contact 9028 moves the first object 9024 along the sleep time adjuster object 9036 (e.g., including the clock face 9018 and slider channel around the clock face), from 10:30 PM to 11:00 PM. The bedtime indicator 9014 is updated to show the adjusted start time of the sleep period. Since the pre-established sleep goal in this example is 8.5 hours, as soon as the sleep duration falls below the pre-established sleep goal, the first display property (e.g., color, fill option/pattern, etc.) of the sleep duration indicator 9022 switches from a first value (e.g., gray, solid filled, etc.) to a second value (e.g., red, pattern filled, etc.). In the state shown in FIG. 9C, the duration of the sleep period (e.g., 8 hours) is below the pre-established sleep goal of 8.5 hours, and the sleep duration indicator 9022 maintains the second value (e.g., red, pattern filled, etc.) for the first display property. FIG. 9D shows that, as the user input by contact 9028 continues to adjust the position of the first object 9024 along or around the sleep time adjuster object 9036, from 11:00 PM to 12:00 AM, the sleep duration has now dropped to 7 hours, remaining below the pre-established sleep goal of 8.5 hours. As a result, the value of the first display property (e.g., color, fill option/pattern, etc.) remains unchanged from that shown in FIG. 9C where the sleep duration was 8 hours and also below the sleep goal. FIG. 9E illustrates a user input by the contact 9028 moving the first object 9024 along or around the sleep time adjuster object 9036, (e.g., in a direction opposite the direction shown in FIGS. 9C and 9D). In the state shown in FIG. 9E, the sleep period is from 12:30 AM to 7:00 AM, giving rise to a sleep duration of 6.5 hours, still below the pre-established sleep goal of 8.5 hours; and accordingly, the first display property (e.g., color, pattern filled, etc.) of the sleep duration indicator 9022 is maintained at the second value (e.g., red, pattern filled, etc.).

Figure 9F:
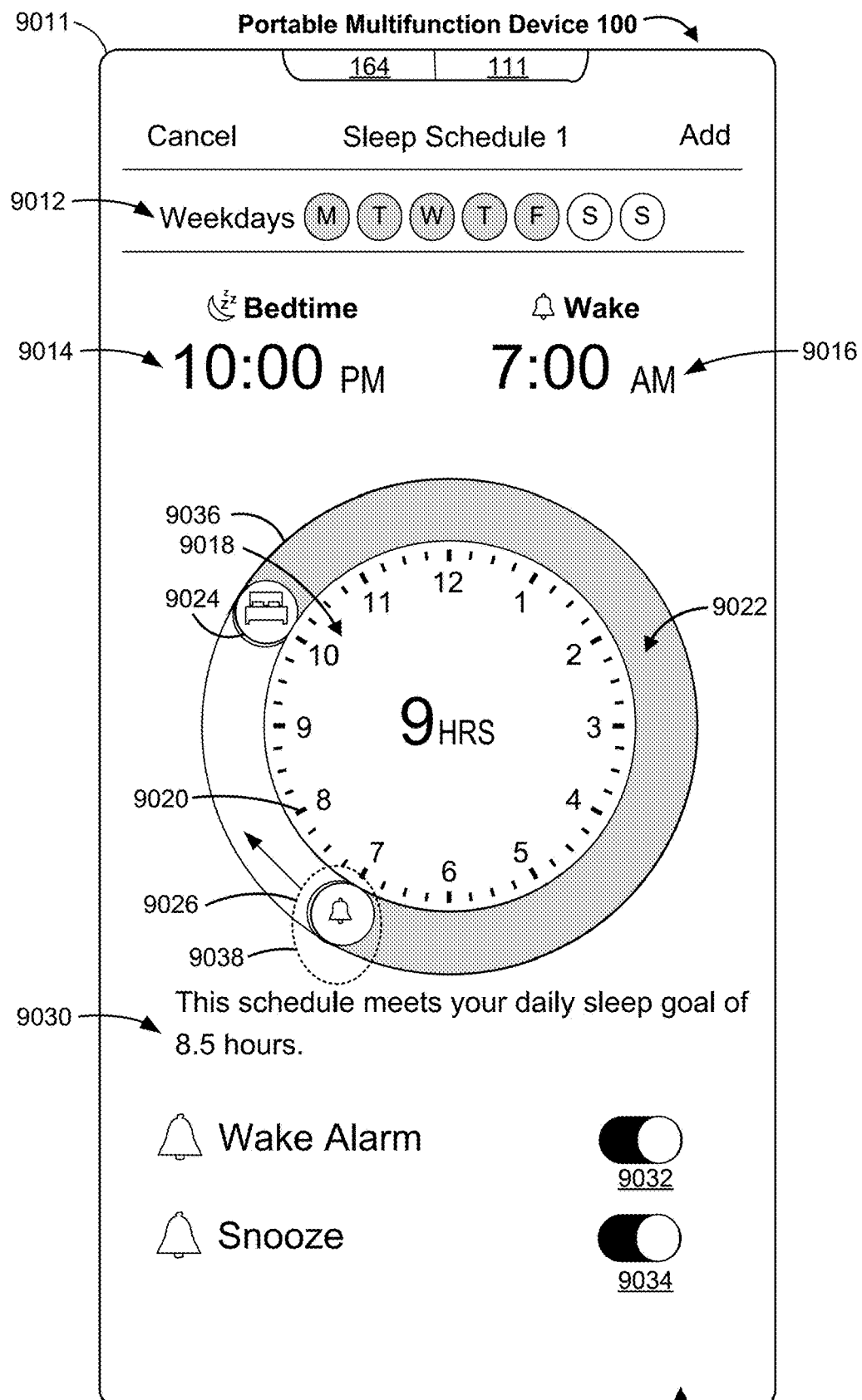

FIG. 9F shows that the first object 9024 has been moved by the user input along or around the sleep time adjuster object 9036, from a location corresponding to 12:30 AM to a location corresponding to 10:00 PM. Accordingly, the bedtime indicator 9014 displays the adjusted started time as 10:00 PM and the sleep duration is adjusted to 9 hours. Since 9 hours is greater than the pre-established sleep goal of 8.5 hours, the sleep duration indicator 9022 is displayed with the first display property at the first value (e.g., the same value as the first display property of the sleep duration indicator 9022 in FIG. 9B). The value change (e.g., switching from the second value to the first value) for the first display property (e.g., color, fill option/pattern, etc.) of the sleep duration indicator 9022 occurs when the first object 9024 is dragged across the location along or around the periphery of the clock face 9018 that corresponds to 10:30 PM.

Figure 9G:
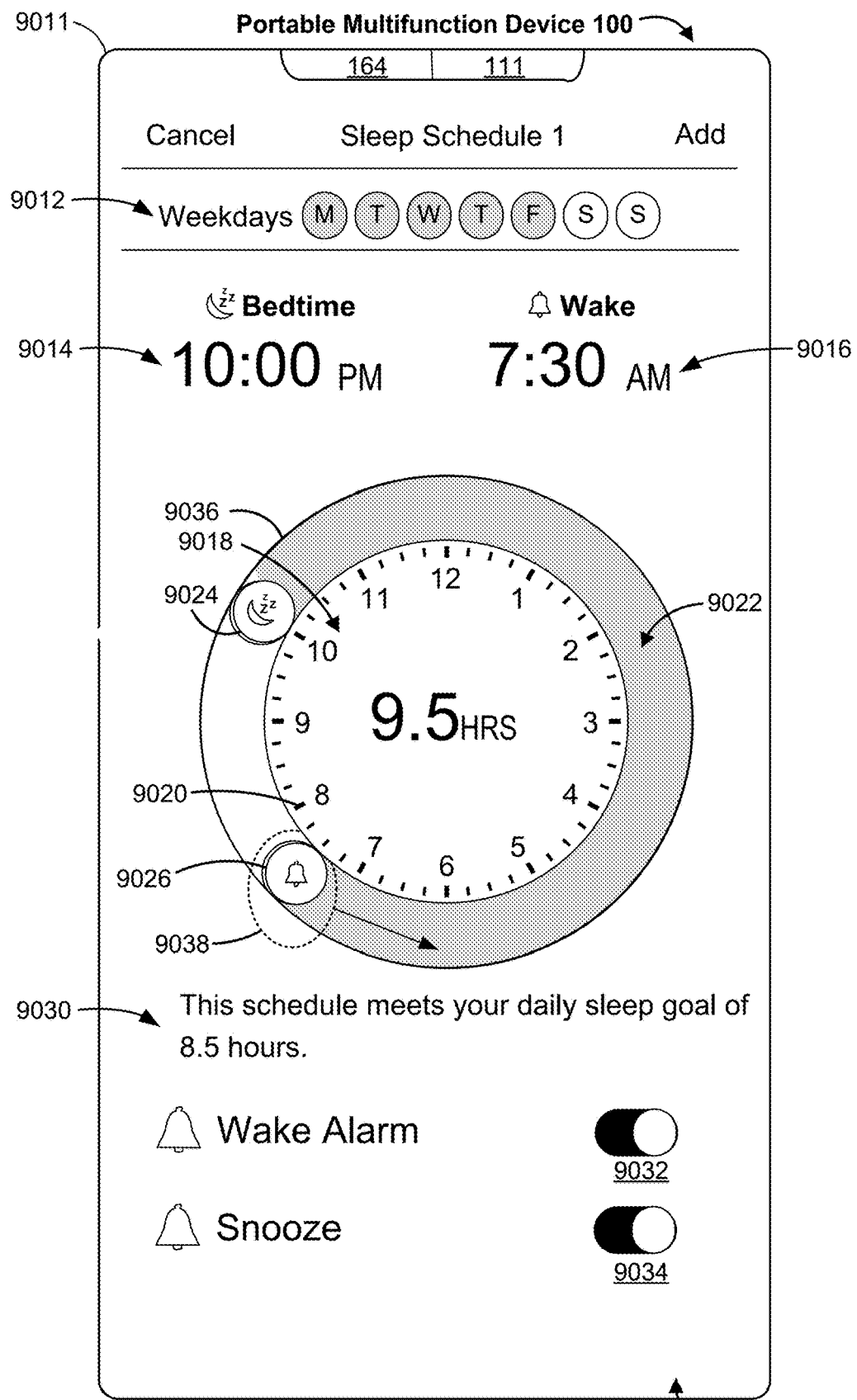

FIG. 9G illustrates that a user input by a contact 9038 can drag the second object 9026 in a clockwise direction along or around the sleep time adjuster object 9036, from 7:00 AM to 7:30 AM, increasing the sleep duration from 9 hours to 9.5 hours. Since the sleep duration remains above the pre-established sleep goal of 8.5 hours, the first display property (e.g., color, fill pattern) of the sleep duration indicator remains unchanged at the first value (e.g., gray, solid filled, etc.) (e.g., same as the state shown in FIGS. 9F and 9B).

Figure 9H:
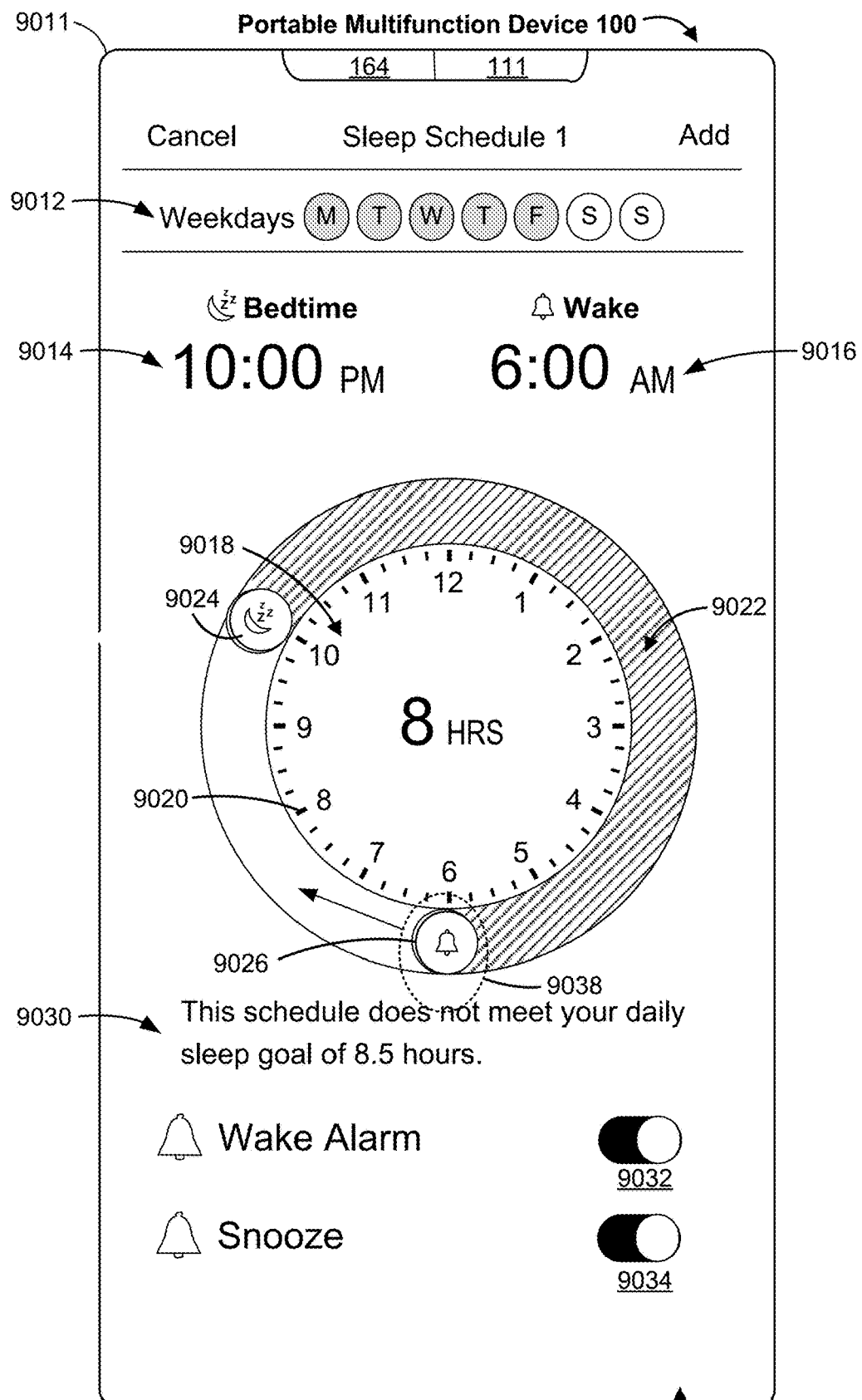

FIG. 9H illustrates that a user input by the contact 9038 can drag the second object 9026 in a counterclockwise direction along or around the sleep time adjuster object 9036, from 7:30 AM to 6:00 AM, decreasing the sleep duration from 9.5 hours to 8 hours. Since the sleep duration decreases from above the pre-established sleep goal to below the pre-established sleep goal, the value of the first display property of the sleep duration indicator 9022 switches from the first value to the second value when the second object is dragged passed the location corresponding to 6:30 AM toward 6:00 AM and remain at the second value during the further changes to the wake time made in accordance with the drag input.

Figure 9I:
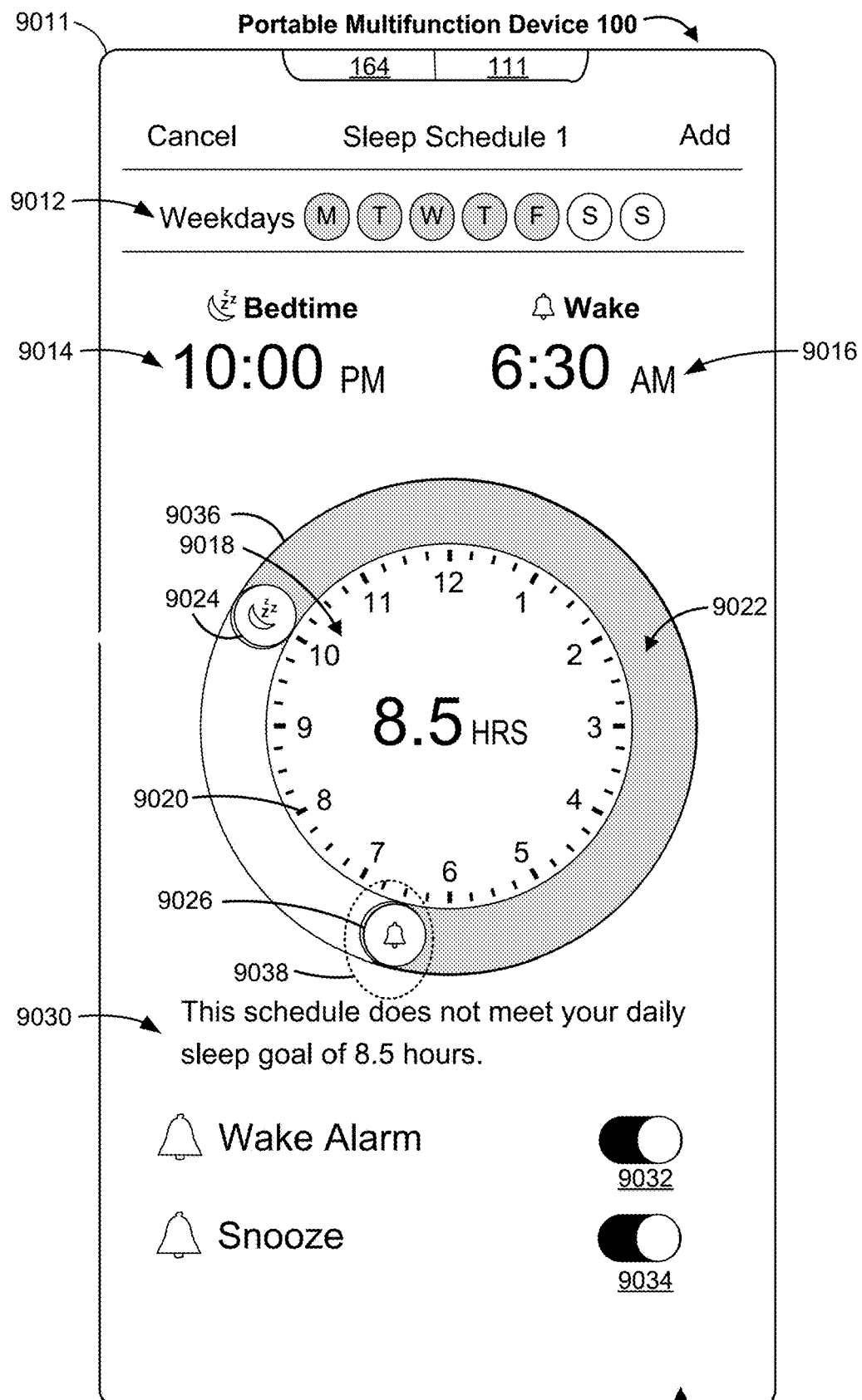
Figure 9J:
Figure 9K:
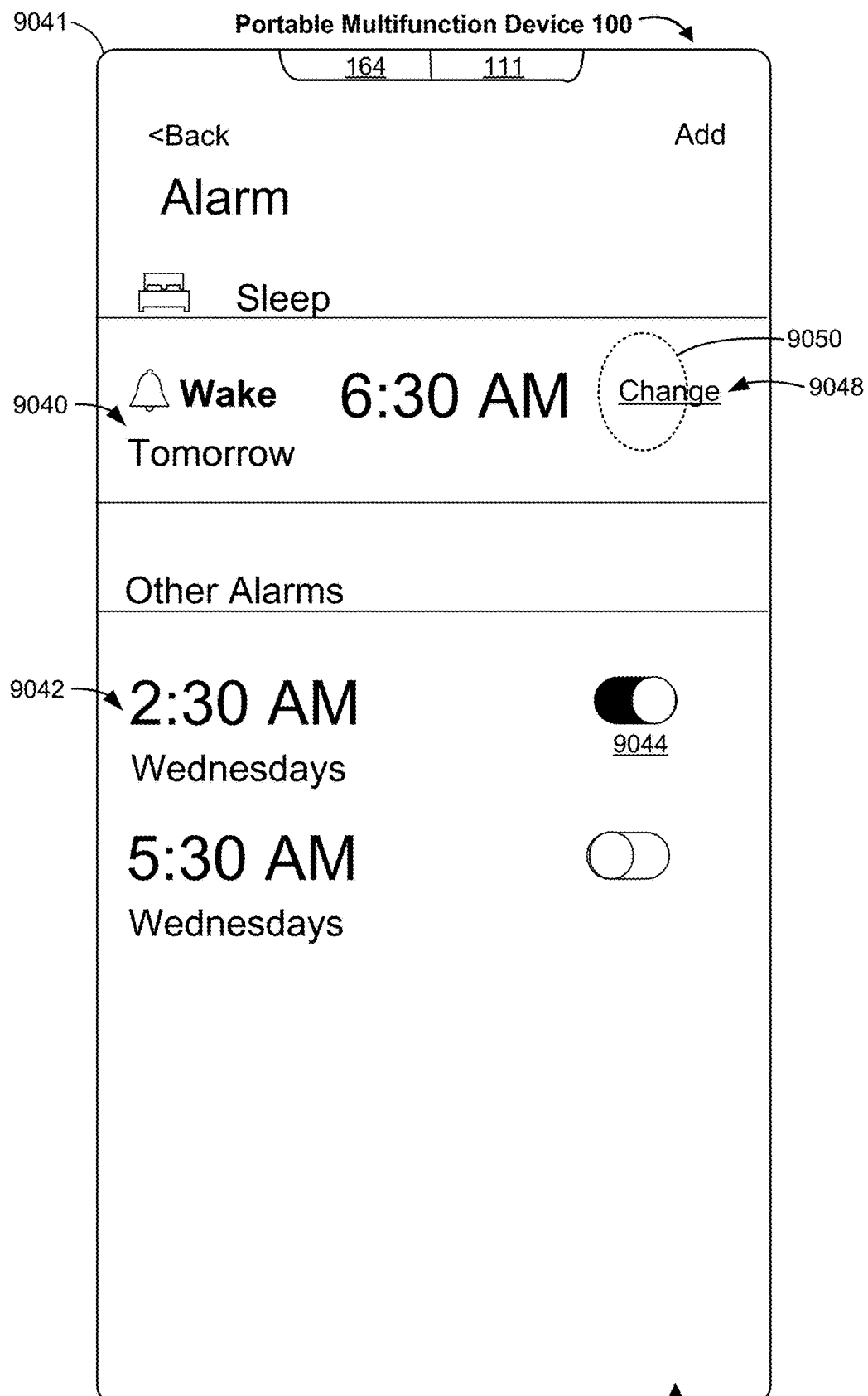
Figure 9L:
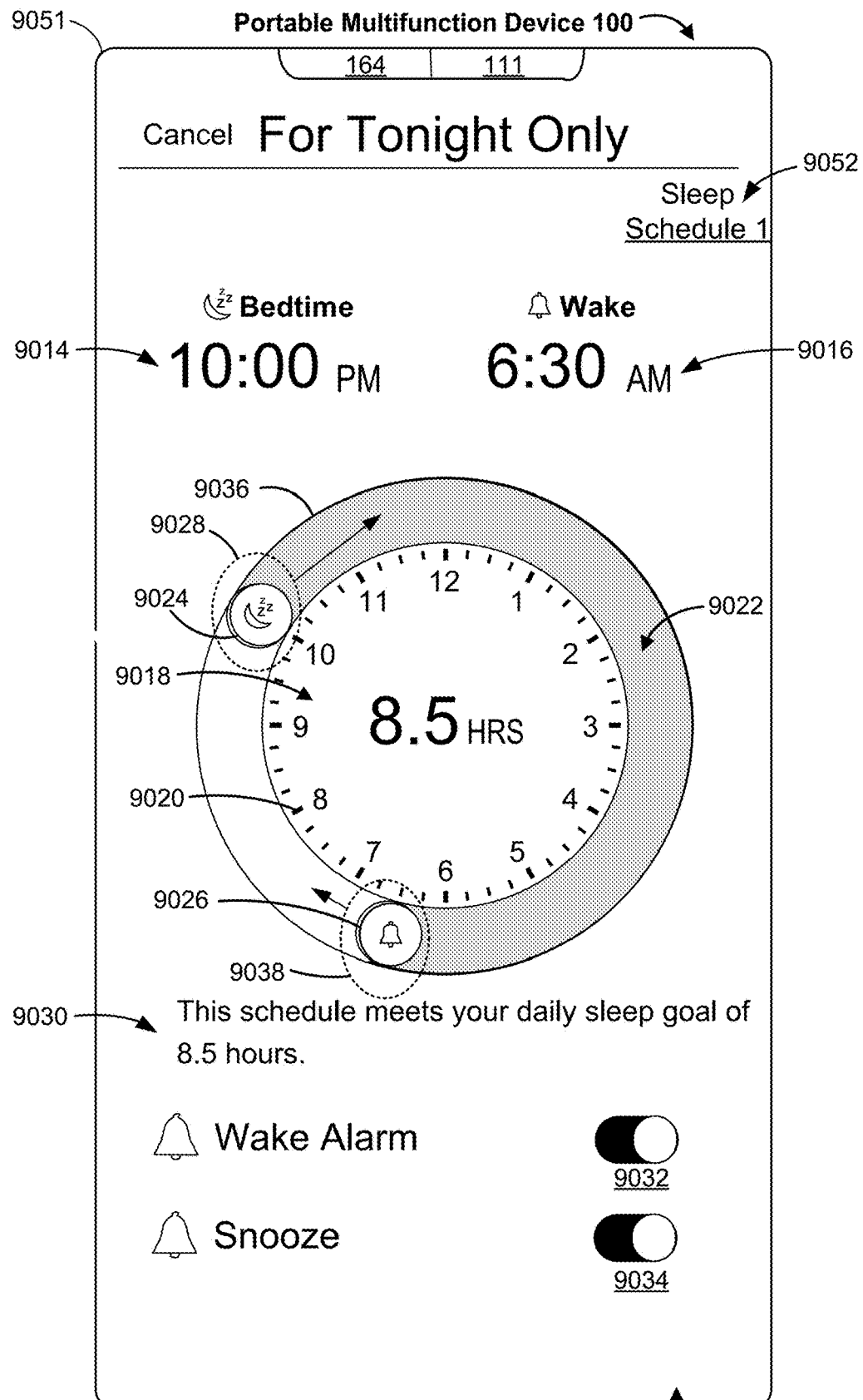

FIG. 9I illustrates a user input by the contact 9038 can drag the second object 9026 in the clockwise direction again along or around the sleep time adjuster object 9036, from 6:00 AM to 6:30 AM, increasing the sleep duration from 8 hours to 8.5 hours. Since the sleep duration reaches the pre-established sleep goal from below the sleep goal, the value of the first display property of the sleep duration indicator 9022 switches from the second value (e.g., red, pattern filled, etc.) back to the first value (e.g., gray, solid filled, etc.) when the second object reached the location corresponding to 6:30 AM.

FIGS. 9B-9I illustrate the sleep time adjuster object 9036 changing its appearance to indicate whether a sleep goal is met by the currently specified sleep period in a sleep schedule user interface 9011 for setting up a sleep schedule (e.g., sleep schedule 1) that optionally apply to multiple days (e.g., all weekdays). In some embodiments, the multifunction device 100 allows the user to only adjust the sleep schedule for an upcoming sleep period of an existing sleep schedule (e.g., for the current day). FIGS. 9J-9P illustrate exemplary user interfaces for editing the sleep period for an upcoming sleep period (e.g., during a wind down period), or using an alarm application.

FIG. 9J illustrates an exemplary sleep screen 5083 that is displayed when the device is woken at a time during the sleep period of an active sleep schedule, in accordance with some embodiments. In some embodiments, the sleep screen 5083 includes an alarm affordance 5086 that specifies the schedule wake time. In some embodiments, the wind down screen includes a similar alarm affordance 5086 if no application actions have been set up for the wind down screen 5013. In some embodiments, the alarm affordance 5054 is included in the action platter 5047 along with shortcuts for application functions, displayed (FIG. 5K) on the wind down screen 5013 or the sleep screen 5083. In some embodiments, the alarm affordances 5086 and/or 5054 can be activated (e.g., by a user input by a contact 5084), and in response an alarm application user interface 9041 is displayed (FIG. 9K) through which sleep time for the upcoming sleep period can be adjusted before the arrival of the sleep period.

In FIG. 9K, the computer system displays the alarm application user interface 9041 in accordance with some embodiments. The alarm application user interface 9041 includes a first portion (e.g., a top row) that displays the start time and the end time of the upcoming scheduled sleep period and an indication of a type of notification to be presented at the end time of the upcoming scheduled sleep period (e.g., whether wake alarm is set or not set). In some embodiments, the alarm application user interface 9041 includes a link 9048 that, when activated (e.g., by a tap input by a contact 9050), causes display of sleep time adjusting user interface 9051 through which the upcoming sleep period (e.g., tonight only) can be modified. In some embodiments, activating the link 9048 causes display of the sleep schedule user interface 9011 through which the entire sleep schedule (e.g., sleep schedule 1) including the upcoming sleep period can be modified. In some embodiments, the alarm application user interface 9041 includes one or more additional alarms (e.g., a scheduled alarm 9042) that have been set to go off (e.g., recurring alarm that goes off at 2:30 AM every Wednesday, etc.) in addition to the wake alarm of the upcoming sleep period of the multifunction device 100.

FIG. 9L illustrates an exemplary sleep time adjusting user interface 9051 through which the upcoming sleep period (e.g., tonight only) can be modified. In some embodiments, as shown in FIG. 9L, the sleep time adjusting user interface 9051 includes the sleep time adjuster object 9036 is for adjusting the start time and the end time of the sleep period that applies to the current day (e.g., through the same methods as described with reference to FIGS. 9A-9I). In such embodiments, the sleep time adjusting user interface 9051 optionally includes a full sleep schedule link 9052 for editing the whole sleep schedule to which the upcoming sleep period belongs (e.g., for future occurrences and not just for the current day).

Figure 9M:
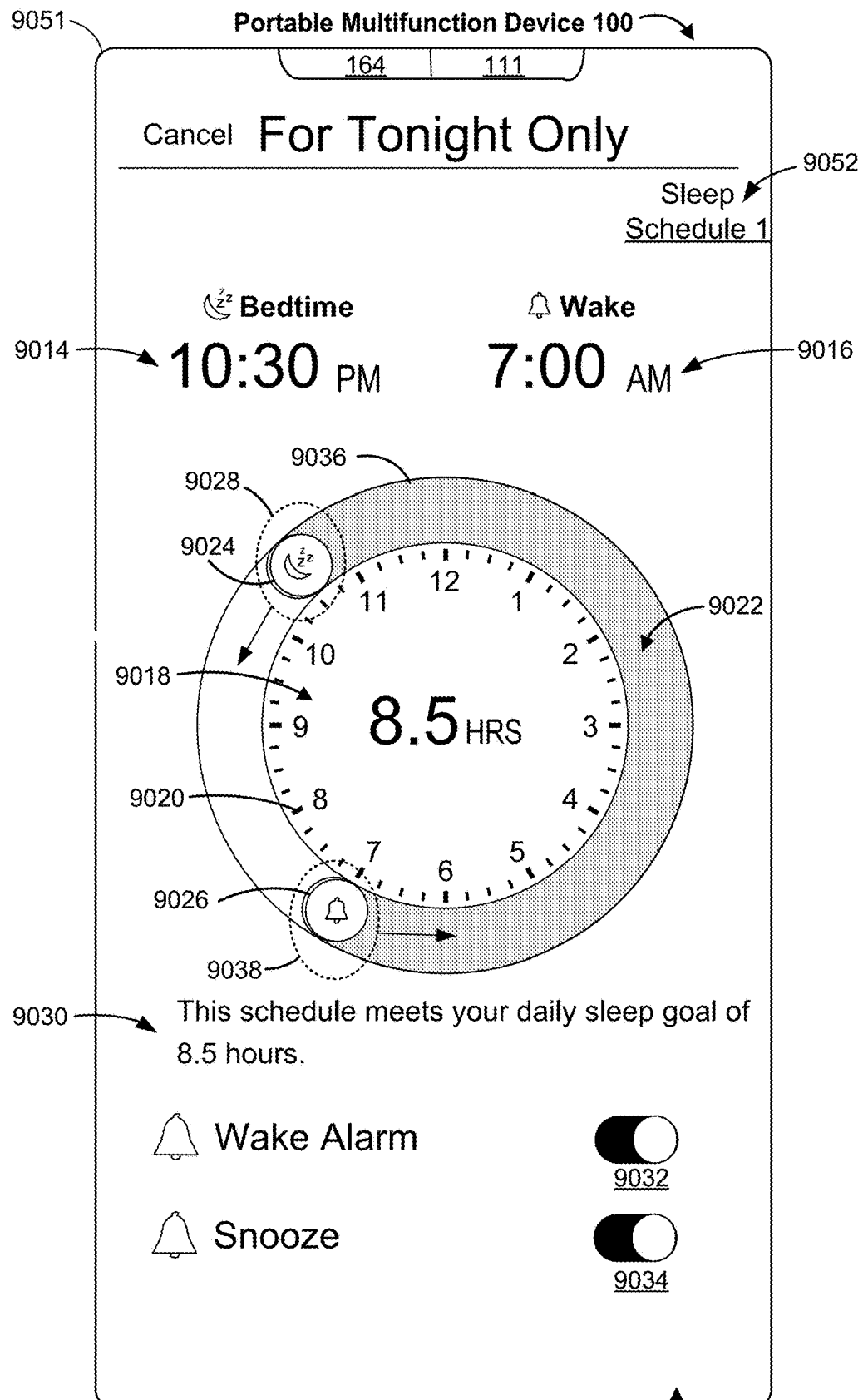

As shown in FIG. 9M, the bedtime is adjusted from 10:00 PM to 10:30 PM, while the wake time is adjusted from 6:30 AM to 7:00 AM, e.g., in response to two inputs by contact 9028 and 9038, respectively. As a result of the adjustment, the whole sleep duration indicator 9022 is shifted along or around the sleep time adjuster object 9036, and the total length of the sleep duration indicator 9022 remains unchanged at 8.5 hours. Since the total duration of the sleep period meets the pre-established sleep goal throughout the change, the first display property (e.g., color, fill option/pattern, etc.) of the sleep duration indicator 9022 remains at the second value (e.g., gray, solid filled, etc.) from the start to the end of the inputs.

Figure 9N:
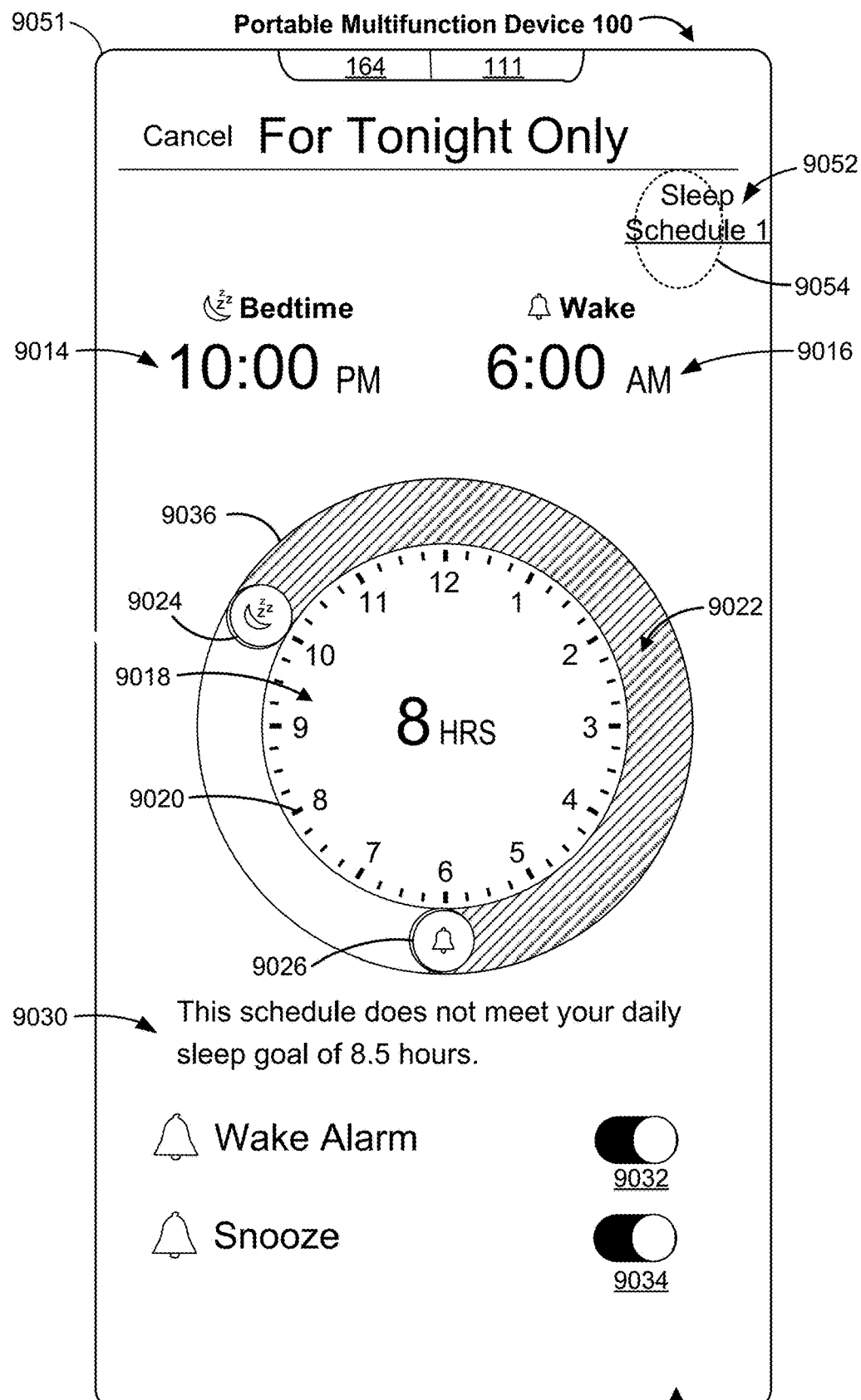

As shown in FIG. 9N, the bedtime is adjusted from 10:30 PM to 10:00 PM, while the wake time is adjusted from 6:30 AM to 7:00 AM, e.g., in response to two inputs by contact 9028 and 9038, respectively. As a result of the adjustment, the total duration of the sleep period decreases below the pre-established sleep goal of 8.5 hours to 8 hours. Since the total duration of the sleep period does not meet the pre-established sleep goal the change, the first display property (e.g., color, fill option/pattern, etc.) of the sleep duration indicator 9022 switches from the second value (e.g., gray, solid filled, etc.) to the first value (red, pattern filled) at the time when the total duration falls below the threshold duration of 8.5 hours. The change in the value of the first display property is accompanied by a change in the sleep goal message 9030 that textually indicates the threshold duration (e.g., sleep goal) is not met by the currently specified sleep period.

Figure 9O:
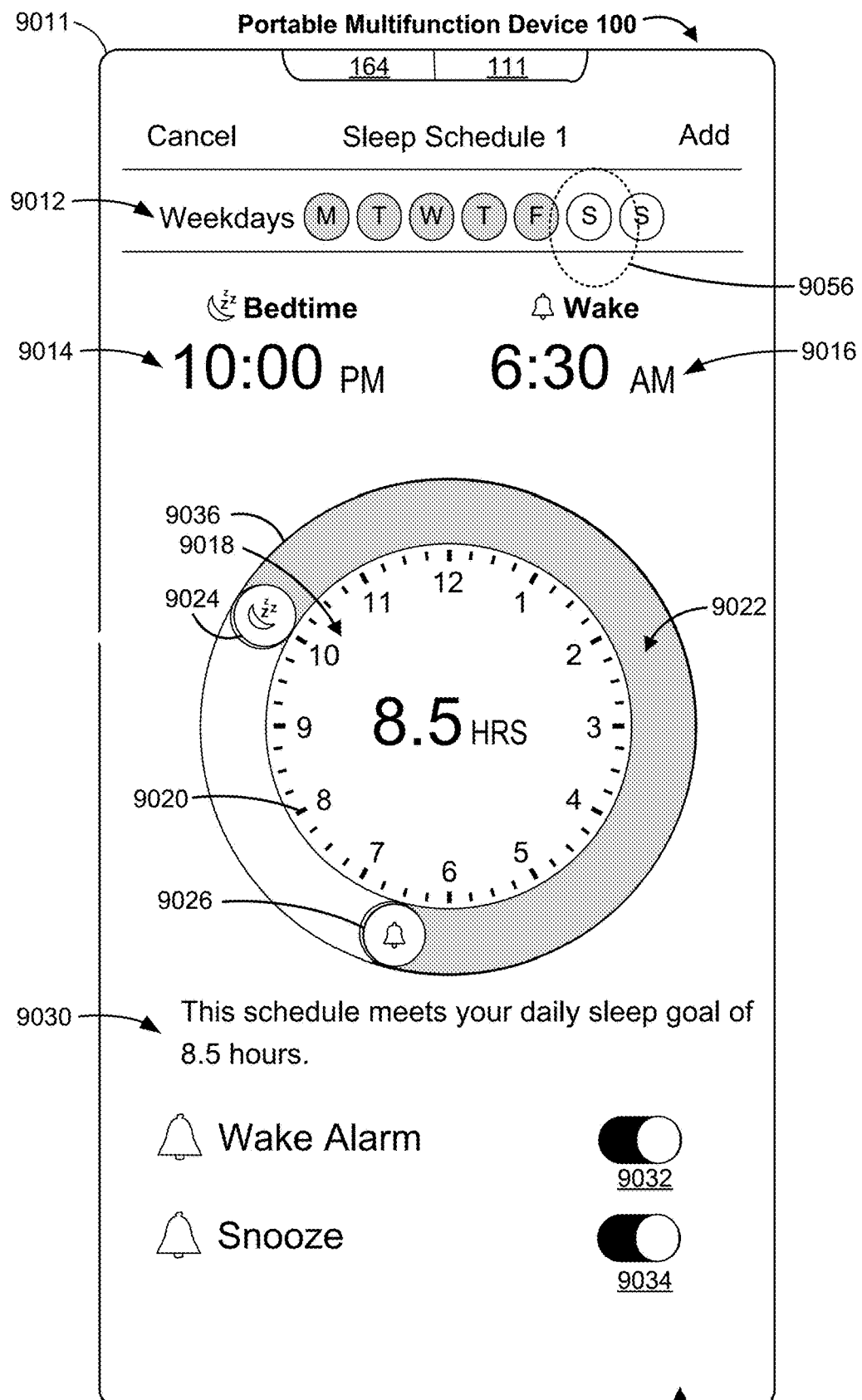

In addition, in FIG. 9N, a tap input by a contact 9054 is detected on link 9052 in the sleep time adjusting user interface 9051, and in response, as shown in FIG. 9O, the computer system displays the sleep schedule user interface 9011 that allows for editing the sleep schedule for future occurrences and not just for the current day. In addition to adjusting the bedtime 9014 and/or wake time 9016, the user may add or remove days from the current schedule (e.g., sleep schedule 1) via the day selection region 9012 in the sleep schedule user interface 9051. In FIG. 9), the current sleep period applies to five weekdays, and a user input by a contact 9056 is detected on an unselected day (e.g., Saturday) in the day selection region 9012 to add it to the current sleep schedule.

Figure 9P:
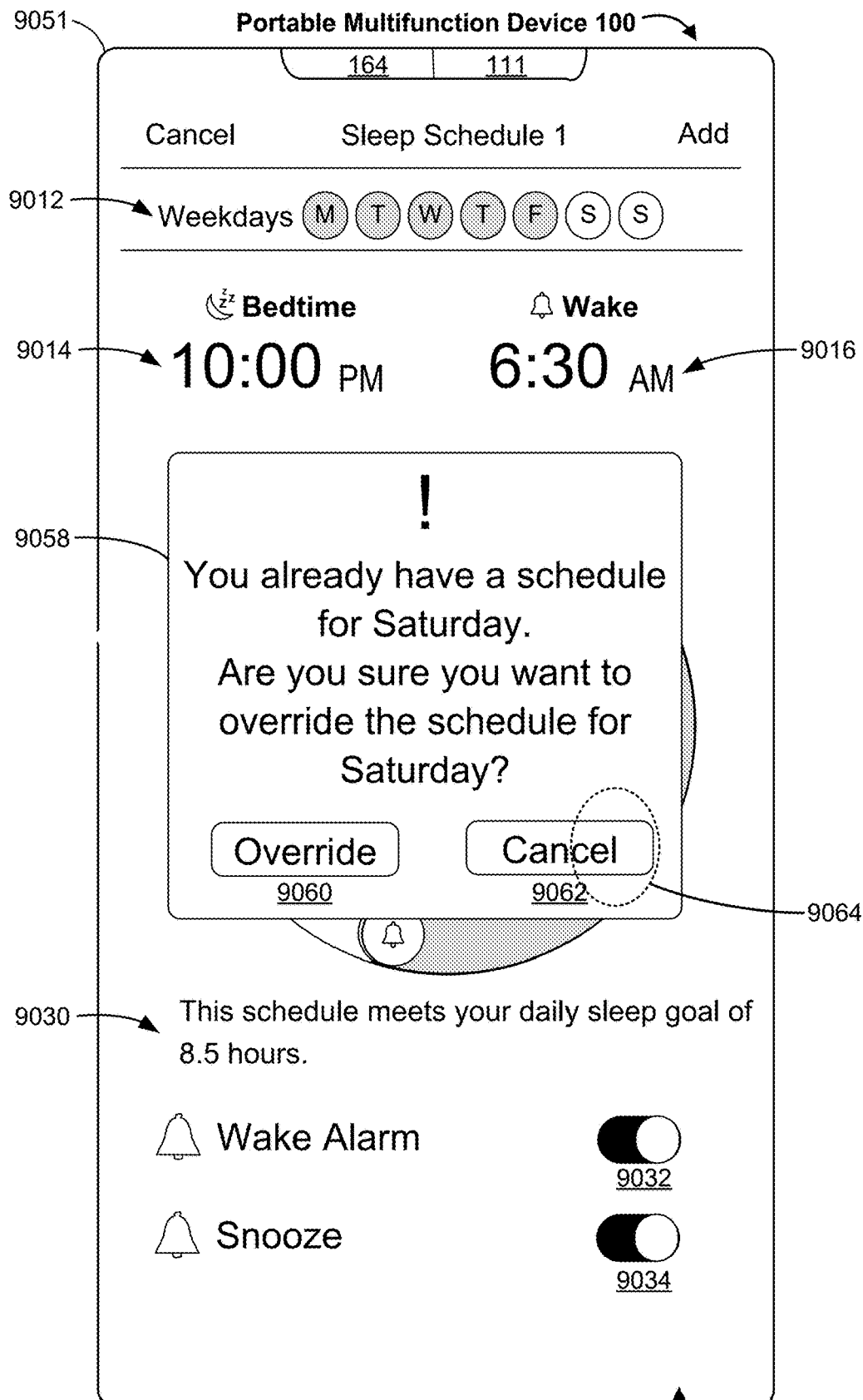

In some embodiments, in response to the modification to the current sleep schedule (e.g., adding Saturday to the sleep schedule 1), the multifunction device 100 determines whether this modification conflicts with any existing sleep schedules. In accordance with a determination that adding Saturday to the current sleep schedule does conflict with an existing sleep schedule (e.g., in this example, there is already a sleep schedule for Saturday), as shown in FIG. 9P, the multifunction device 100 displays a conflict warning 9058 that the selected day (e.g., Saturday, as selected by the user input 9056) already has a sleep schedule that has a different set of sleep schedule settings (e.g., different bedtime, wake time, duration, sleep modes, etc.) from the current sleep schedule (e.g., sleep schedule 1). In some embodiments, the conflict warning 9058 includes an affordance 9060 for confirming that the user wishes to override the existing schedule for the newly added day and proceed with the modification. In some embodiments, the conflict warning 9058 includes an affordance 9062 to cancel the modification and maintain the existing sleep schedule. In this example, an input by a contact 9064 on the cancel affordance 9062 is detected and the newly selected day (e.g., Saturday) is not added to the current sleep schedule (e.g., sleep schedule 1).

Figure 9Q:
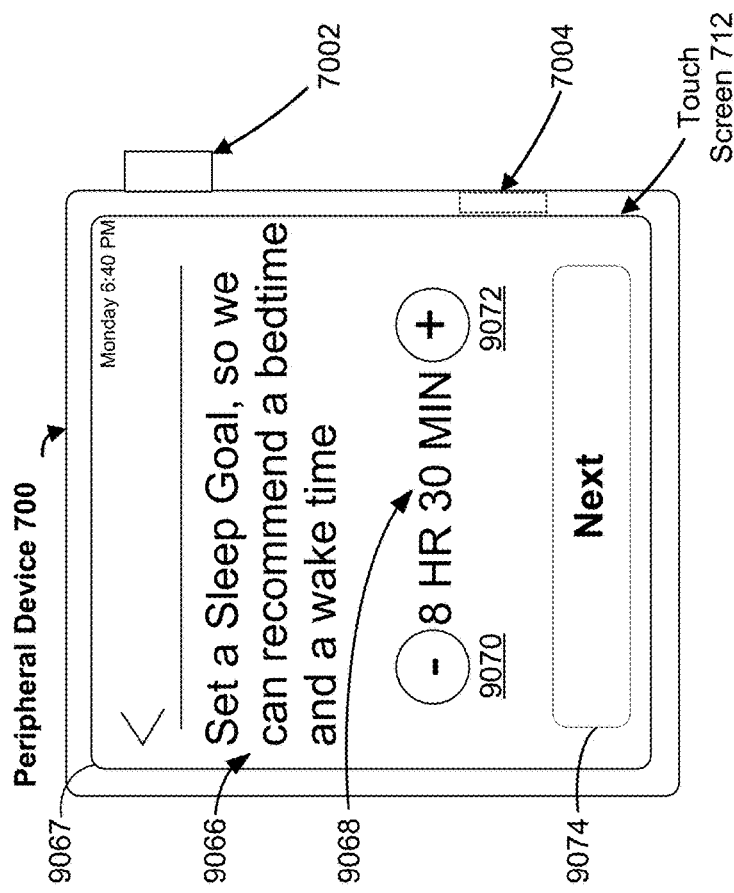
Figure 9Q:
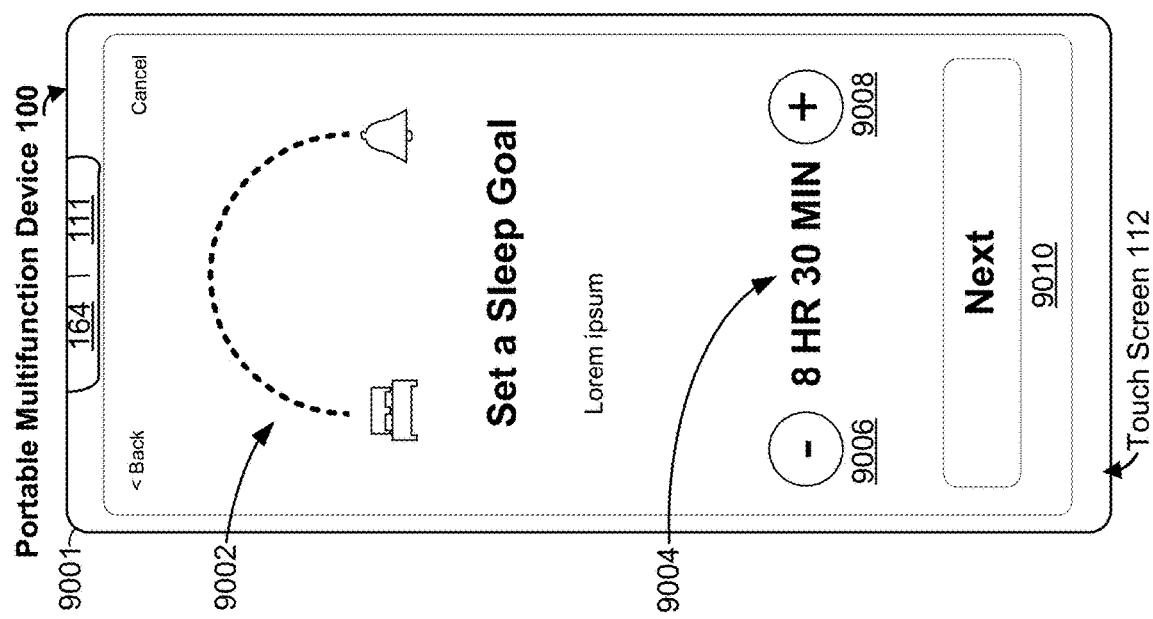

FIGS. 9Q-9AG illustrate exemplary user interfaces for setting up one or more sleep schedules and related operation modes, respectively, using a first computer system (e.g., a portable multifunction device 100) and a second computer system (e.g., a peripheral device 700) to set up sleep schedules. For ease of discussion, the user interfaces for the first computer system and the second computer system are described side by side through the set up process. In some embodiments, if the first computer system and the second computer system are paired devices, setting up the schedule on one system also sets up the schedule for the other system. There is however, no requirement that sleep schedule setup on one computer system be dependent on the computer system having a paired companion system. Each computer system can independently support its own sleep schedules as a standalone device. In some embodiments, the second computer system displays a subset, simplified version, or modified version of the user interface displayed on the first computer system. For ease of discussion, the first computer system will be described as the portable multifunction device 100 and the second computer system will be described as the peripheral device 700. In some embodiments, some of the user interfaces described in FIGS. 9Q-9AG are specific to the portable multifunction device 100 or the peripheral device 700, but not both. In some embodiments, the first and second computer systems display similar user interfaces, but presented in a different order (e.g., the portable multifunction device 100 displays a wind down user interface later in the sequence of user interfaces at a different time (or in a different position in the sequence of user interfaces) than the peripheral device 700).

FIG. 9Q illustrates exemplary sleep goal user interfaces in accordance with some embodiments. The portable multifunction device 100 displays a sleep goal user interface (e.g., the sleep goal user interface 9001 shown in FIG. 9A). The peripheral device 700 displays a corresponding sleep goal user interface 9067. Both includes user interface objects for specifying a duration of a sleep goal (e.g., affordances 9006 and 9070 for decreasing the duration, and affordances 9008 and 9072 for increasing the duration), in accordance with some embodiments. Both user interfaces include affordance (e.g., "next" buttons 9010 and 9074) for navigating to the next stage after the sleep goal is established.

Figure 9R:
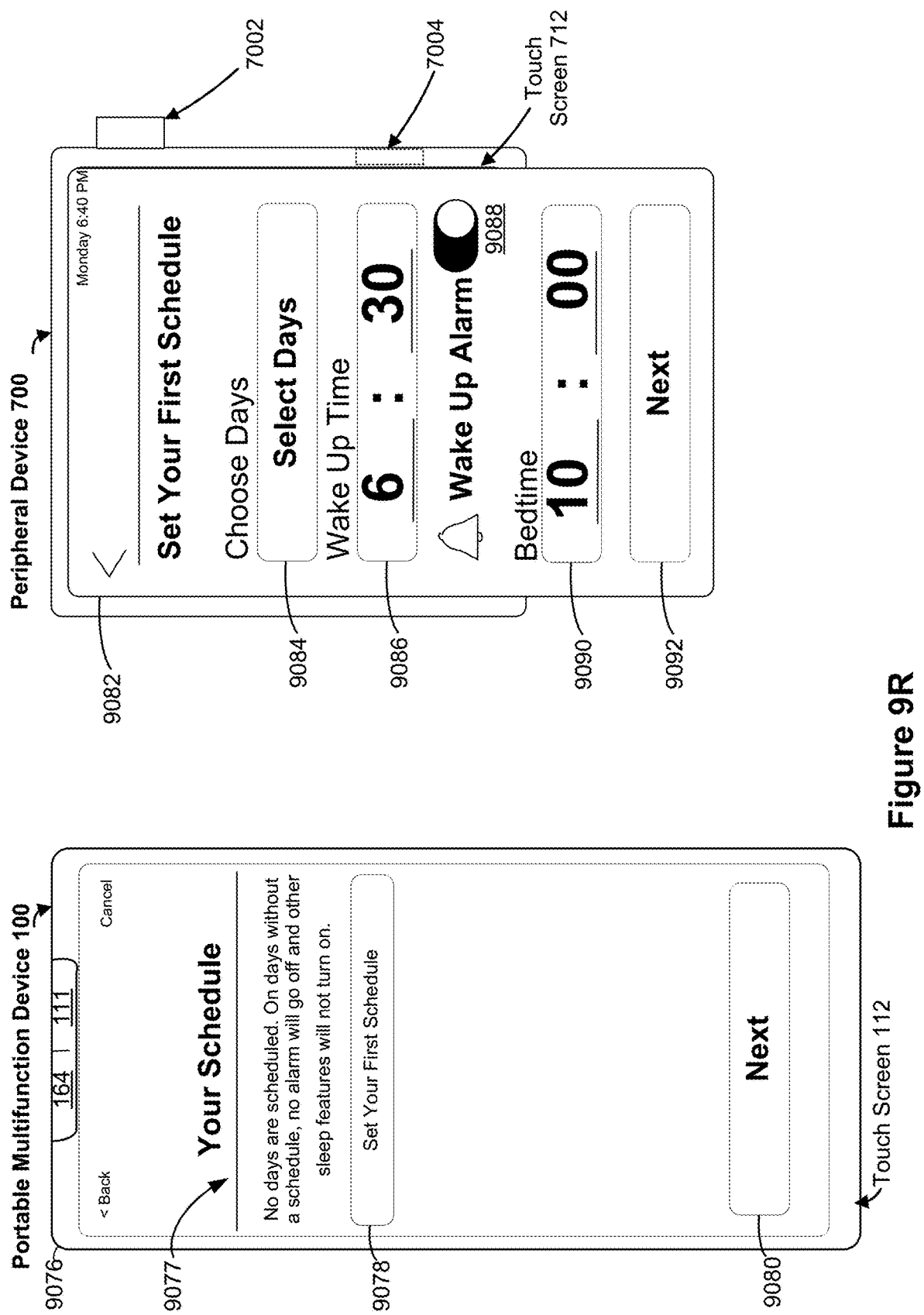
Figure 9S:
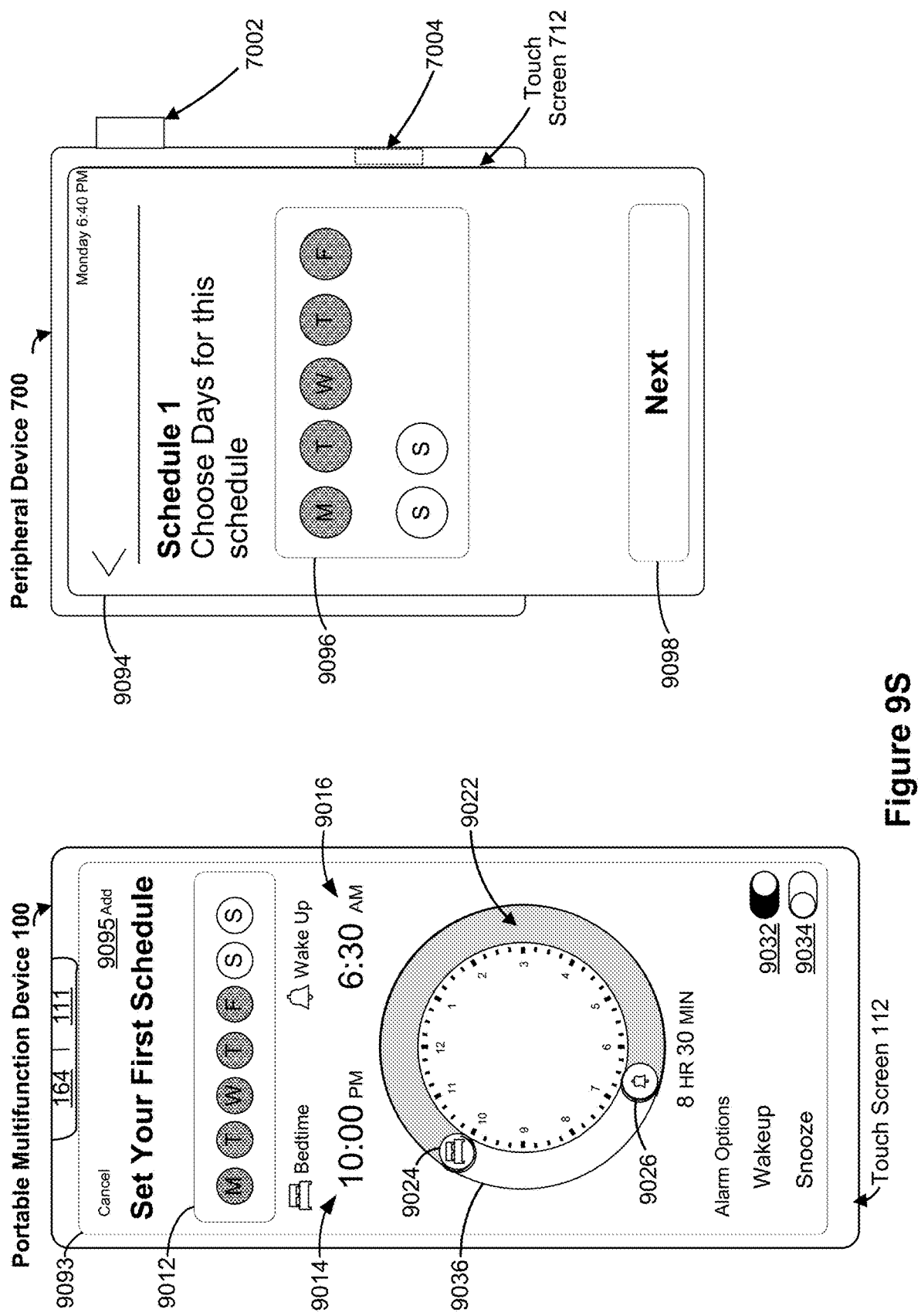

FIGS. 9R-9S illustrate exemplary sleep schedule user interfaces for setting up a first sleep schedule, in accordance with some embodiments. The portable multifunction device 100 displays a setup user interface 9076 and the peripheral device 700 displays a setup user interface 9082. In some embodiments, the portable multifunction device 100 displays background information (e.g., sleep schedule information 9077) while the peripheral device 700 does not display the background information regarding sleep schedules. The user can continue with sleep schedule setup (e.g., via either a setup button 9078 or a next button 9080 for the portable multifunction device 100 using the sleep schedule user interface 9093 as shown in FIG. 9S (e.g., selecting days using the day selector 9012, and specifying the bedtime and wake time using the sleep time adjuster object 9036, setting up wake alarm and snooze functions using control affordances 9032 and 9034, etc.). In FIG. 9R, the peripheral device 700 displays user interface object 9086 for specifying the wakeup time, a user interface object 9088 for setting a wake up alarm, a user interface object 9090 for specifying a bedtime, and an affordance 9084 for navigating to the day selector user interface 9094 (FIG. 9S). In the day selector user interface 9094, selectable representations of days of the week are displayed in a day selector 9096, and selected days are added to the sleep schedule. After the bedtime and wake time, and the days of the sleep schedule is set, the user can navigate to the next stage of the set up process using the next button 9092 or 9098. In some embodiments, as shown in FIG. 9S, the peripheral device 700 may display a subset, simplified version, or modified version of the user interface displayed on the portable multifunction device 100. For example, the portable multifunction device 100 displays a (single) sleep schedule setup user interface 9093, while the peripheral device 700 displays both the setup user interface 9082 (shown in FIG. 9R) and setup user interface 9094.

Figure 9T:
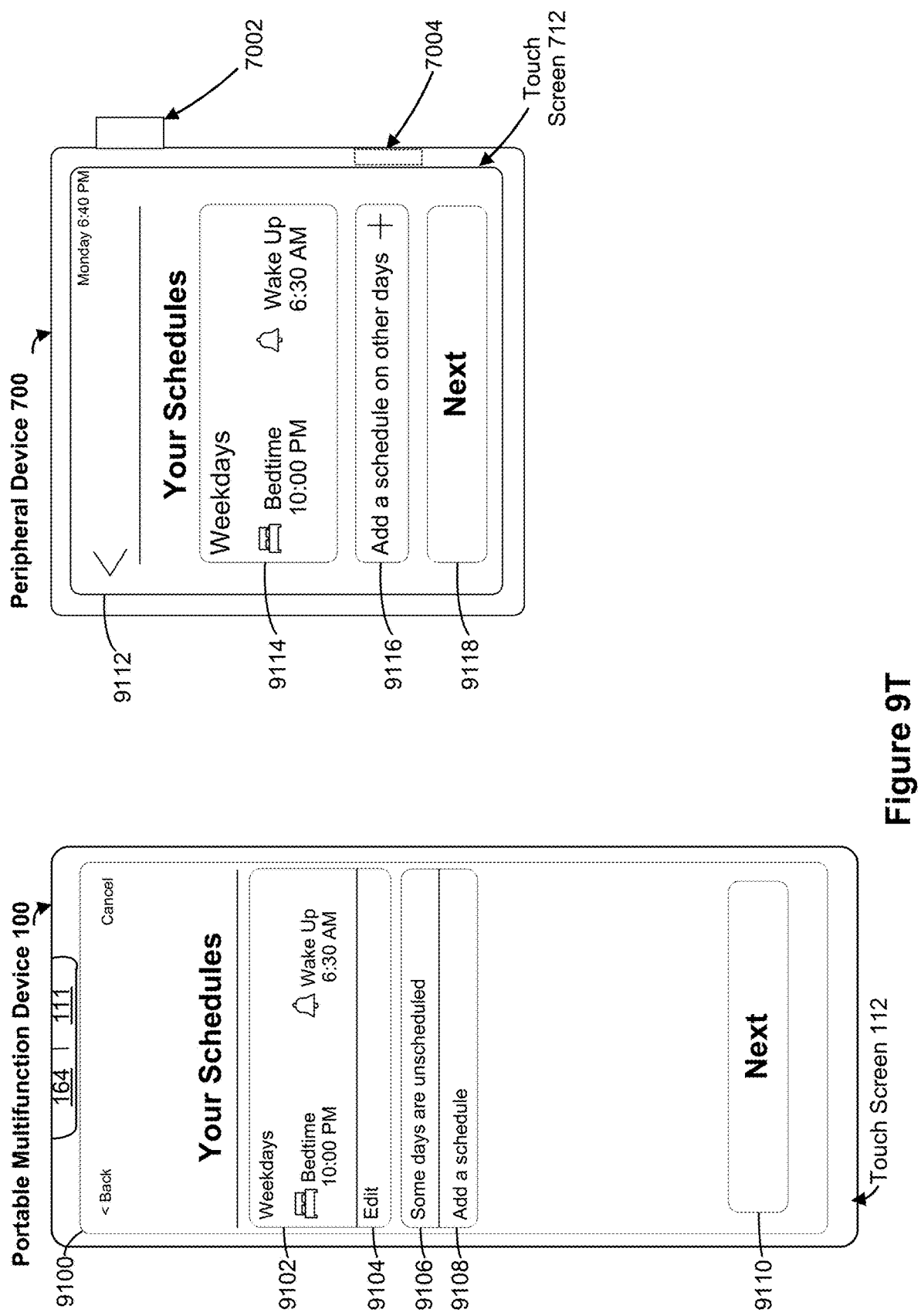

FIG. 9T illustrates exemplary schedule summary user interfaces 9100 and 9112, which are displayed as the user continues with the sleep schedule setup (e.g., via an add button 9095 for the portable multifunction device 100, via a next button 9098 for the peripheral device 700). For example, the portable multifunction device 100 displays a first schedule 9102 that displays the sleep period and alarm setting for the newly added first schedule, an edit button 9104 for editing the first schedule, a missing days notification 9106 that, when activated, displays the days that currently do not have a schedule, and an add schedule button 9108 for setting up another schedule. The peripheral device 700 similarly displays a first schedule 9114 and an add schedule button 9116 in the schedule summary user interface 9112.

Figure 9U:
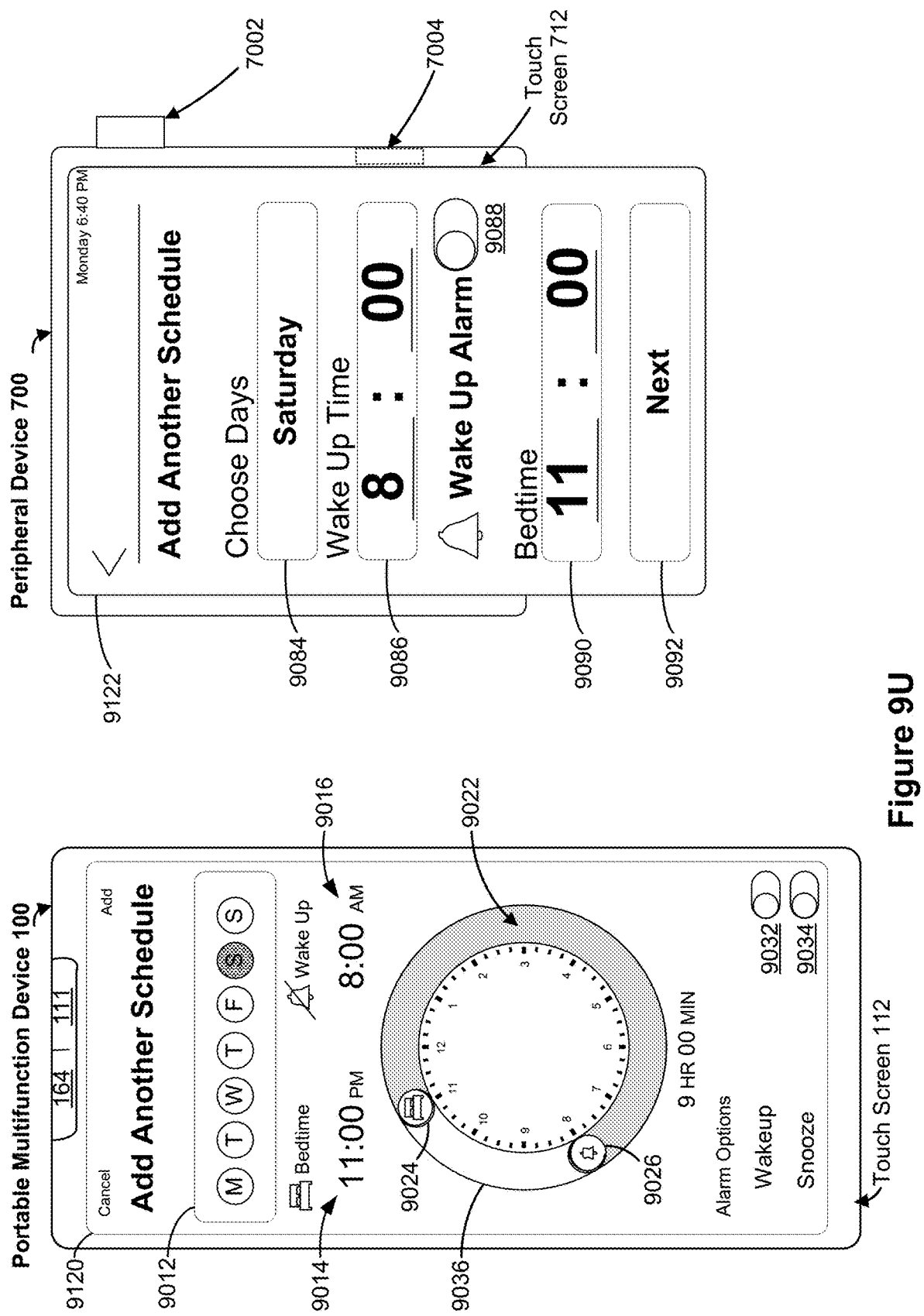

As shown in FIG. 9U, activating the add schedule button (e.g., add schedule button 9108, add schedule button 9116, FIG. 9T) causes display of a sleep schedule user interface for a new schedule (e.g., sleep schedule user interface 9120 for the portable multifunction device 100, sleep schedule user interface 9122 for the peripheral device 700). The setup user interfaces are analogous to the setup user interfaces shown in FIGS. 9R and 9S. In this example, a new schedule is set up for Saturday, with a different set of bedtime and wake time, and different alarm and snooze settings from the sleep schedule 1 that was set up earlier.

Figure 9V:
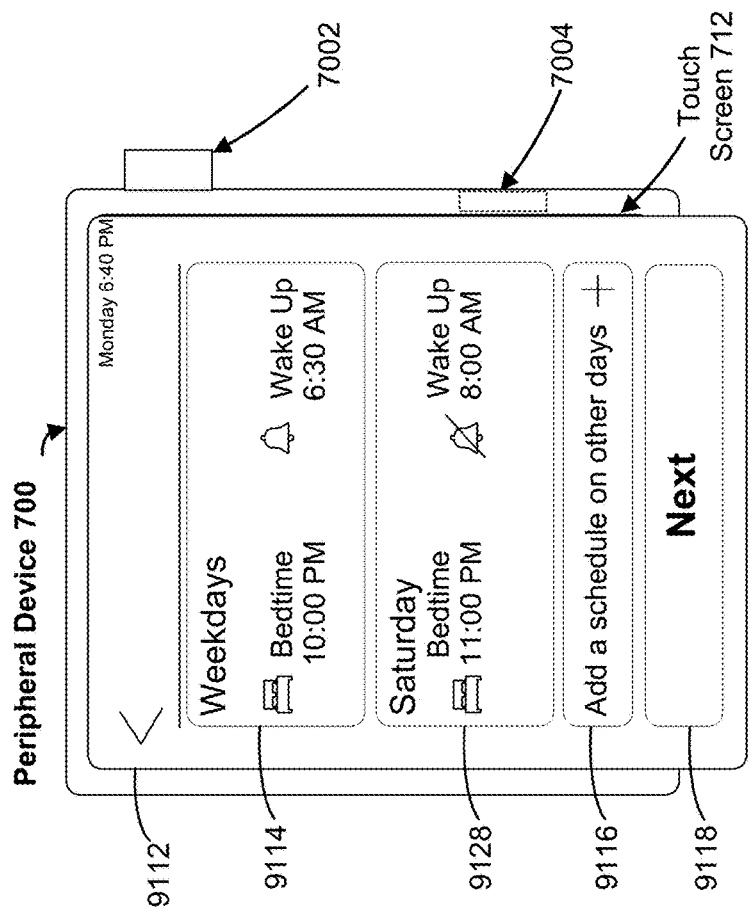
Figure 9V:
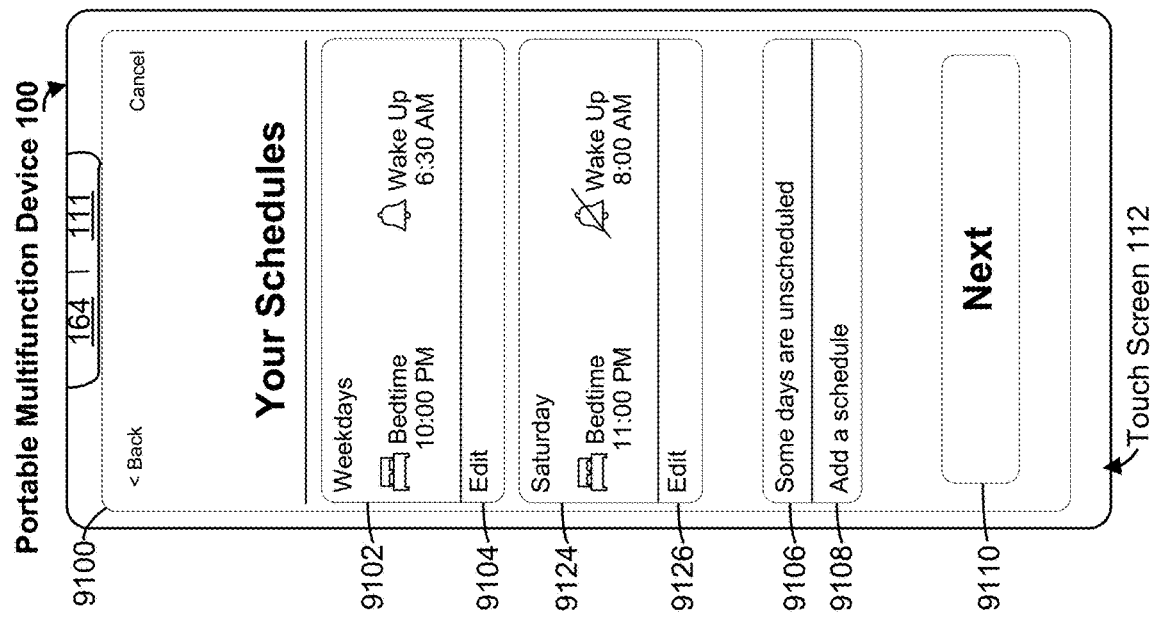

FIG. 9V illustrates the schedule summary user interface 9100 for the portable multifunction device 100 and schedule summary user interface 9112 for the peripheral device 700 after an additional schedule (e.g., as shown in FIG. 9T) has been added. The portable multifunction device 100 displays the first schedule 9102 and a second schedule 9124 (e.g., the new schedule set up in FIG. 9T). The peripheral device 700 similarly displays the first schedule 9114 and a second schedule 9128. The user interface object corresponding to the first schedule 9114 and the second schedule 9128 on the peripheral device, when activated, respectively cause display of the sleep schedule interfaces corresponding to the two schedules (e.g., sleep schedule user interface 9082 in FIG. 9R, sleep schedule user interface 9122 in FIG. 9U, respectively) where the sleep schedules can be edited. The edit buttons 9104 and 9126 displayed next to the first schedule 9102 and the second schedule 9124 respectively cause display of the sleep schedule user interfaces corresponding to the two schedules (e.g., sleep schedule user interface 9011 in FIG. 9I, sleep schedule user interface 9120 in FIG. 9U, respectively), when activated.

Figure 9W:
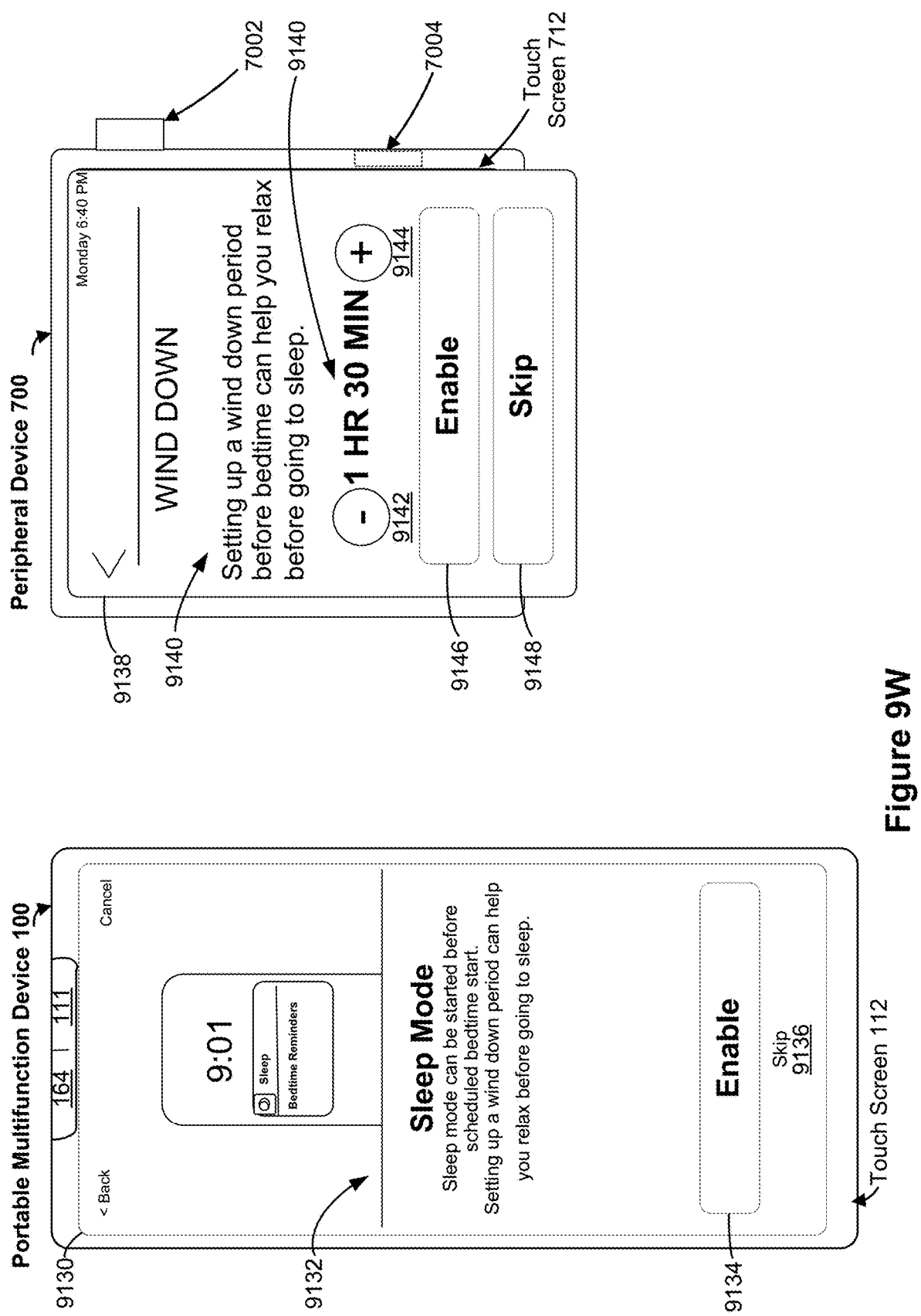
Figure 9X:
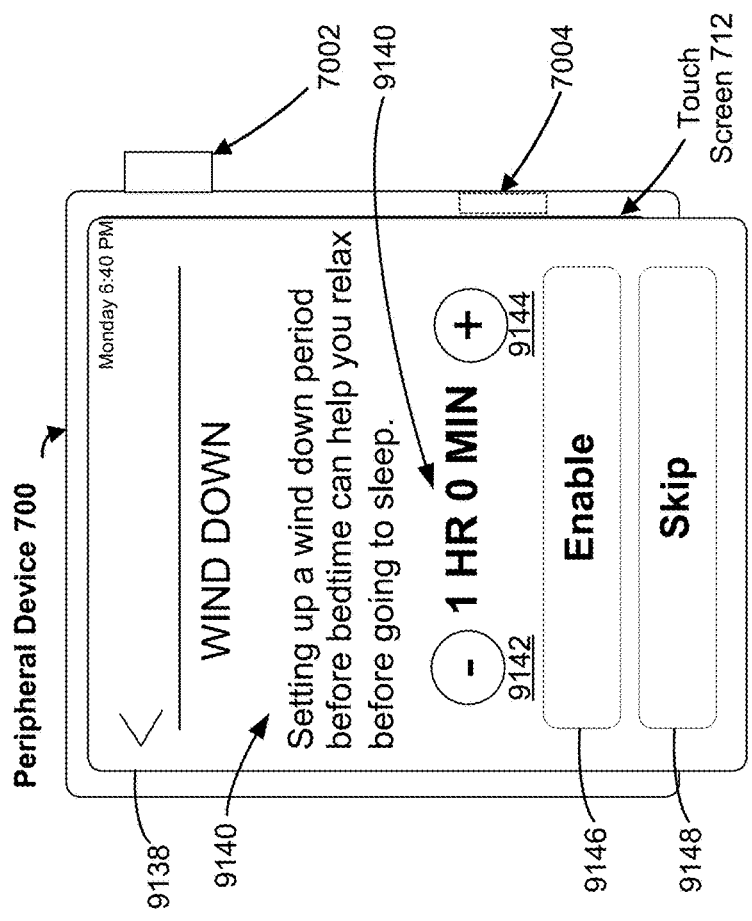
Figure 9X:
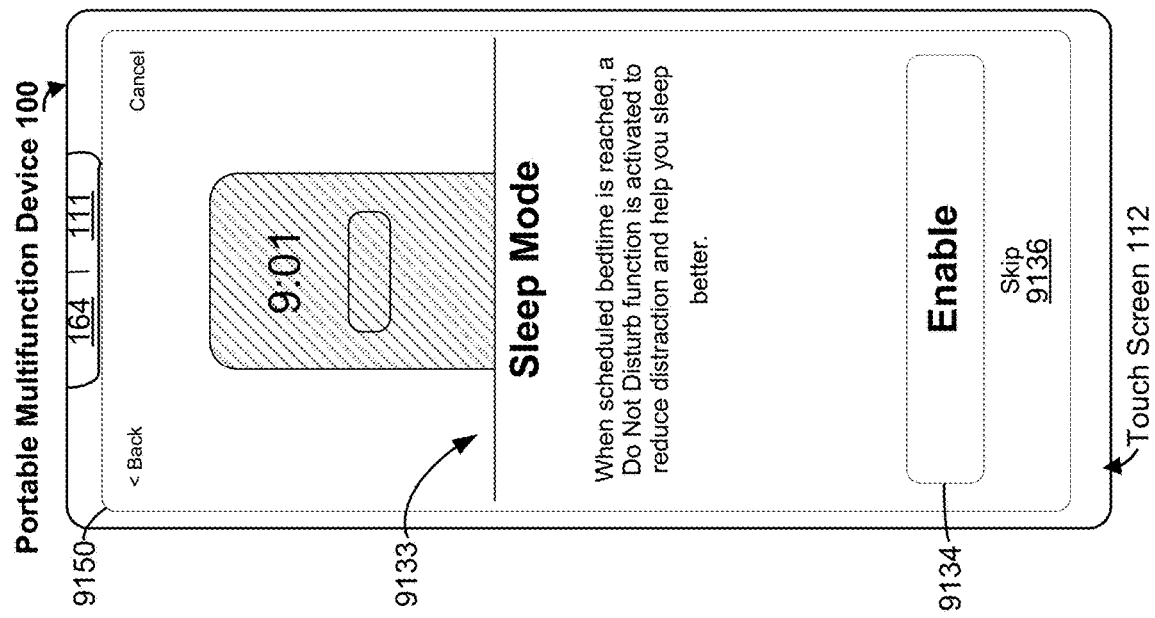
Figure 9Y:
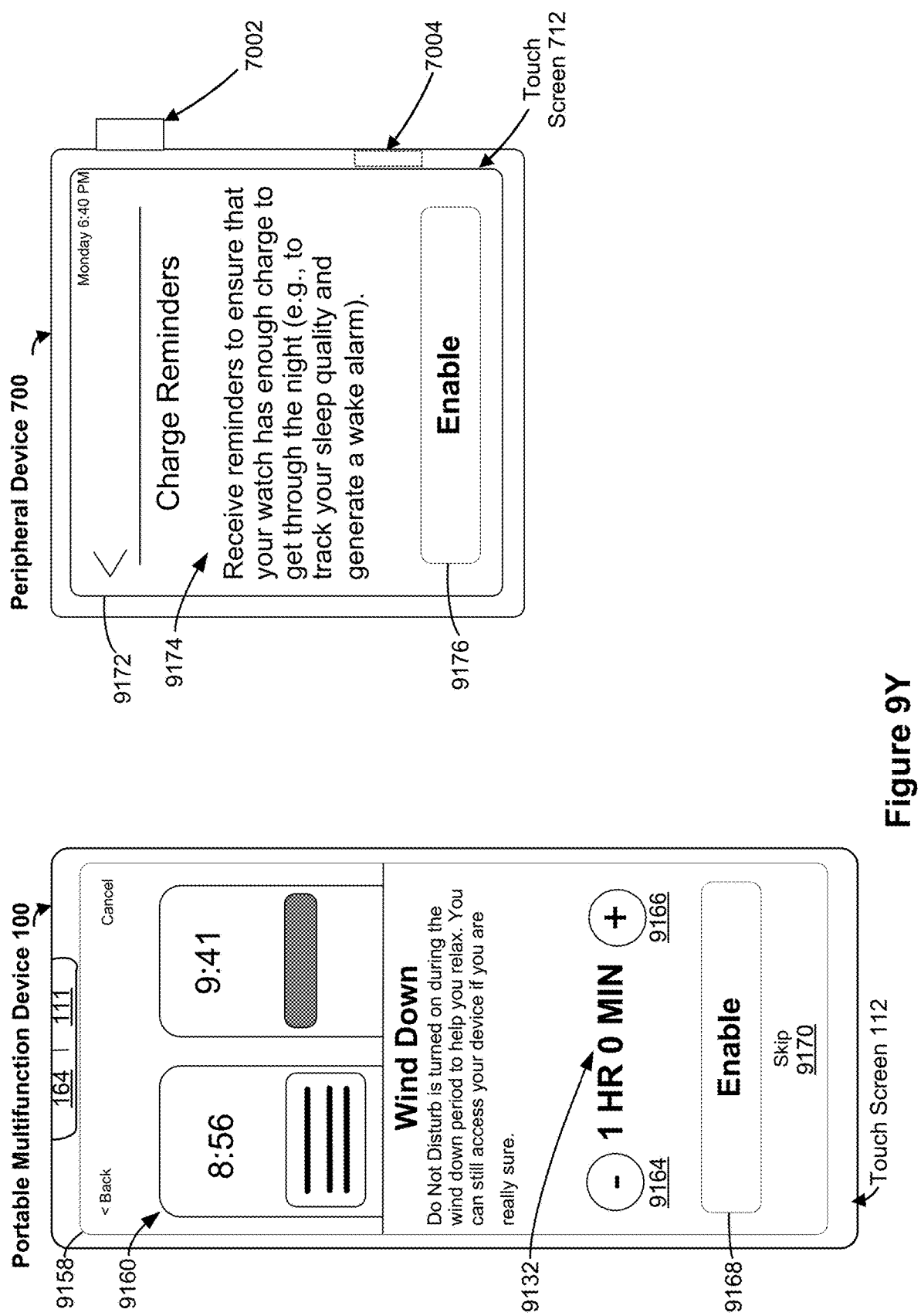

FIGS. 9W-9X illustrate that, in response to activation of the next button 9110 or 9118 in FIG. 9V, exemplary user interfaces 9130 and 9150 for setting up a sleep mode for the sleep period of current sleep schedule are displayed. The multifunction device 100 displays background information 9132 and 9133 regarding the sleep mode, an enable button 9134 for enabling the sleep mode, and a skip button 9136 for not setting up the sleep mode for the current sleep schedule. In some embodiments, the background information 9132 and additional background information 9133 alternate periodically. In some embodiments, the peripheral device 700 does not display additional background information regarding sleep mode, and sleep mode is automatically enabled for each sleep schedule that has been setup.

FIG. 9Y illustrates exemplary user interface for setting up a wind down period before the sleep period on the portable multifunction device 100 in accordance with some embodiments. FIGS. 9W-9X illustrate exemplary user interfaces for setting the wind down period before the sleep period on the peripheral device 700, in accordance with some embodiments. For example, in response to the user enabling the sleep mode using the enable button 9134 in FIG. 9W or 9X, the portable multifunction device 100 displays a wind down setup user interface 9158 which allows the user to set a wind down period 9132 (e.g., via minus button 9164 and plus button 9166) before the sleep period. The wind down period is enabled by activation of the enable button 9168 or skipped by activation of the skip button 9170. In some embodiments, the wind down set up user interface 9134 also includes background information 9160 about the wind down mode. In some embodiments, example wind down screens are shown in the background information 9160.

FIGS. 9W-9X, the peripheral device 700 displays modified background information 9139 about the wind down mode, a wind down period selector 9140 for specifying a duration of the wind down period before each sleep period of the sleep schedule, an enable button 9146 for enabling the wind down mode for the wind down period, and a skip button 9148 for not enabling wind down mode for the sleep periods of the sleep schedule. FIGS. 9W-9X show the process for specifying a duration of the wind down period during which the wind down mode is active. The wind down period can be adjusted via minus button 9142 and plus button 9144.

In FIG. 9Y, once the wind down set up has been completed (e.g., enabled by Enable button 9146, or skipped by skip button 9148 in FIG. 9X), the peripheral device 700 displays a charge reminder setup user interface 9172 (e.g., a device-specific user interface) that includes background information 9174 and an enable button 9176. Once enabled, a battery charge reminder and battery charge status will be generated on the peripheral device 700 and/or the companion multifunction device 100 during the wind down period or other preset period before the sleep period (e.g., as described with respect to FIGS. 7A-7J, for example).

Figure 9Z:
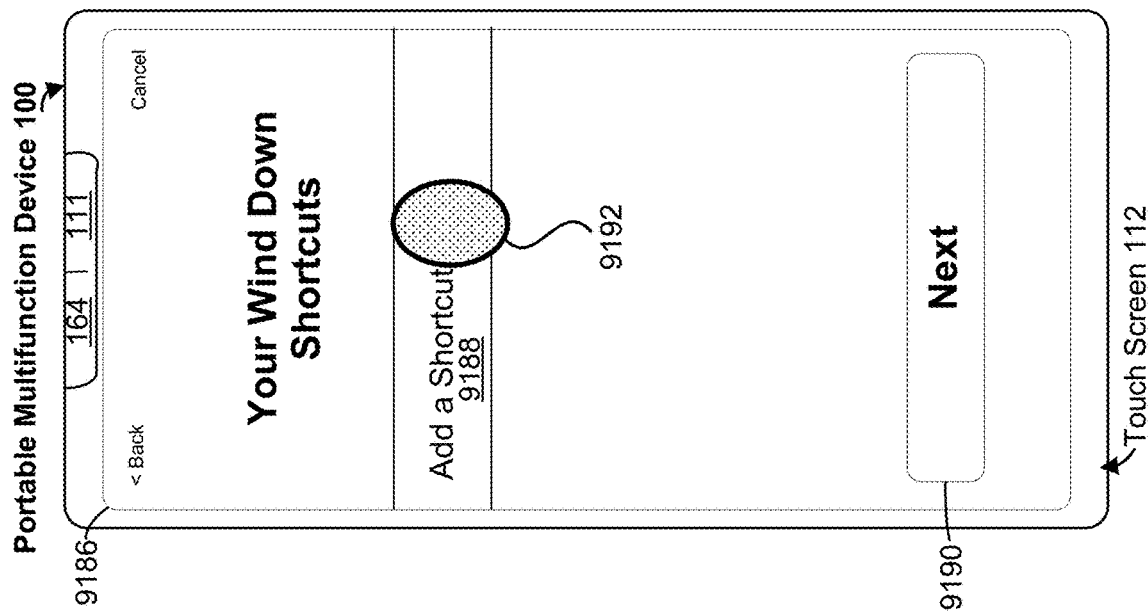
Figure 9Z:
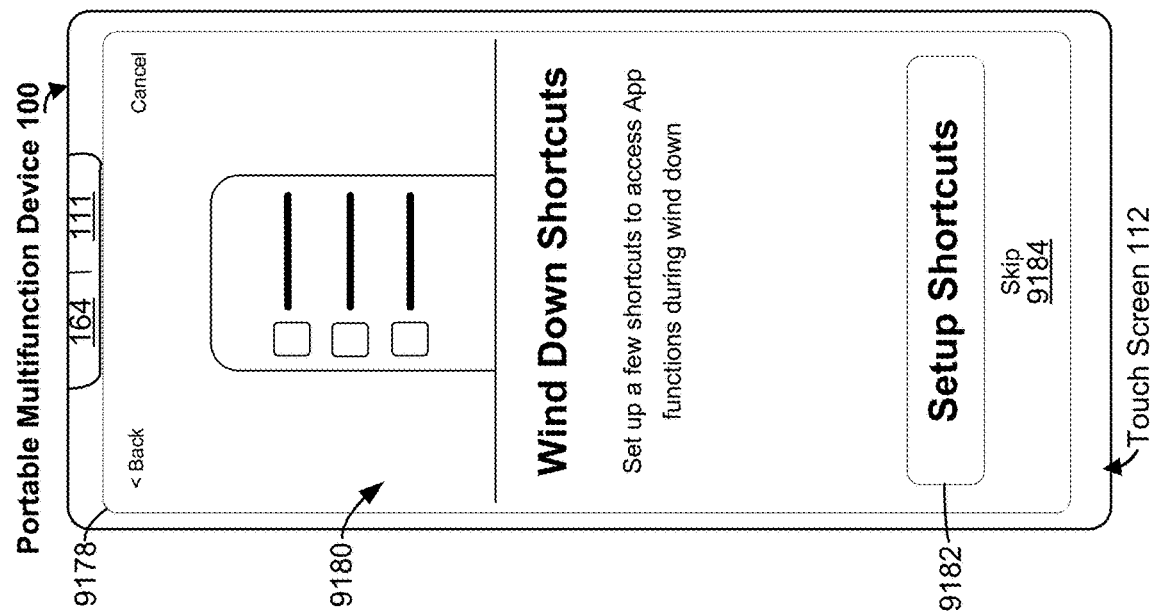
Figure 9A:
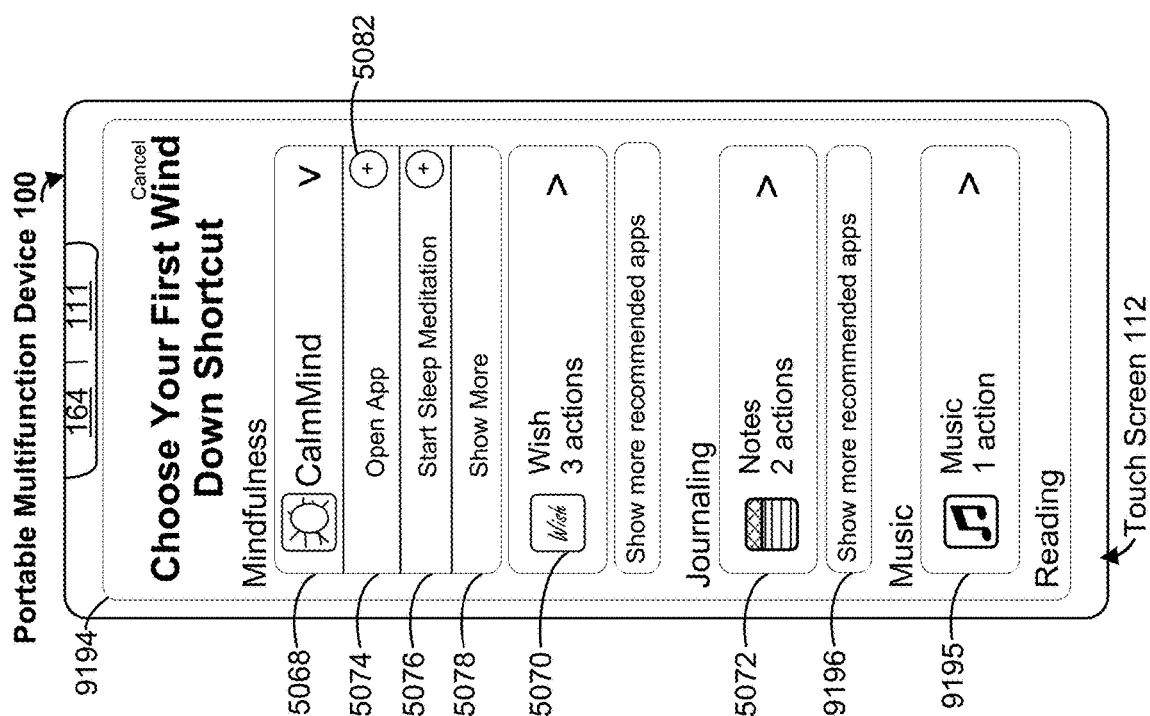
Figure 9A:
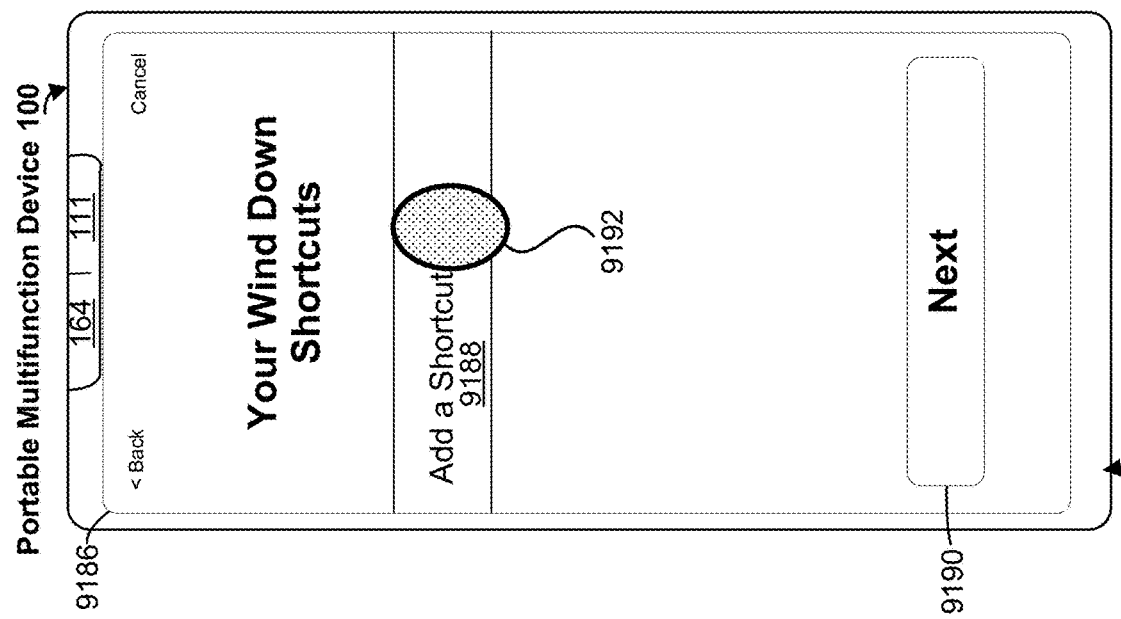
Figure 9A:
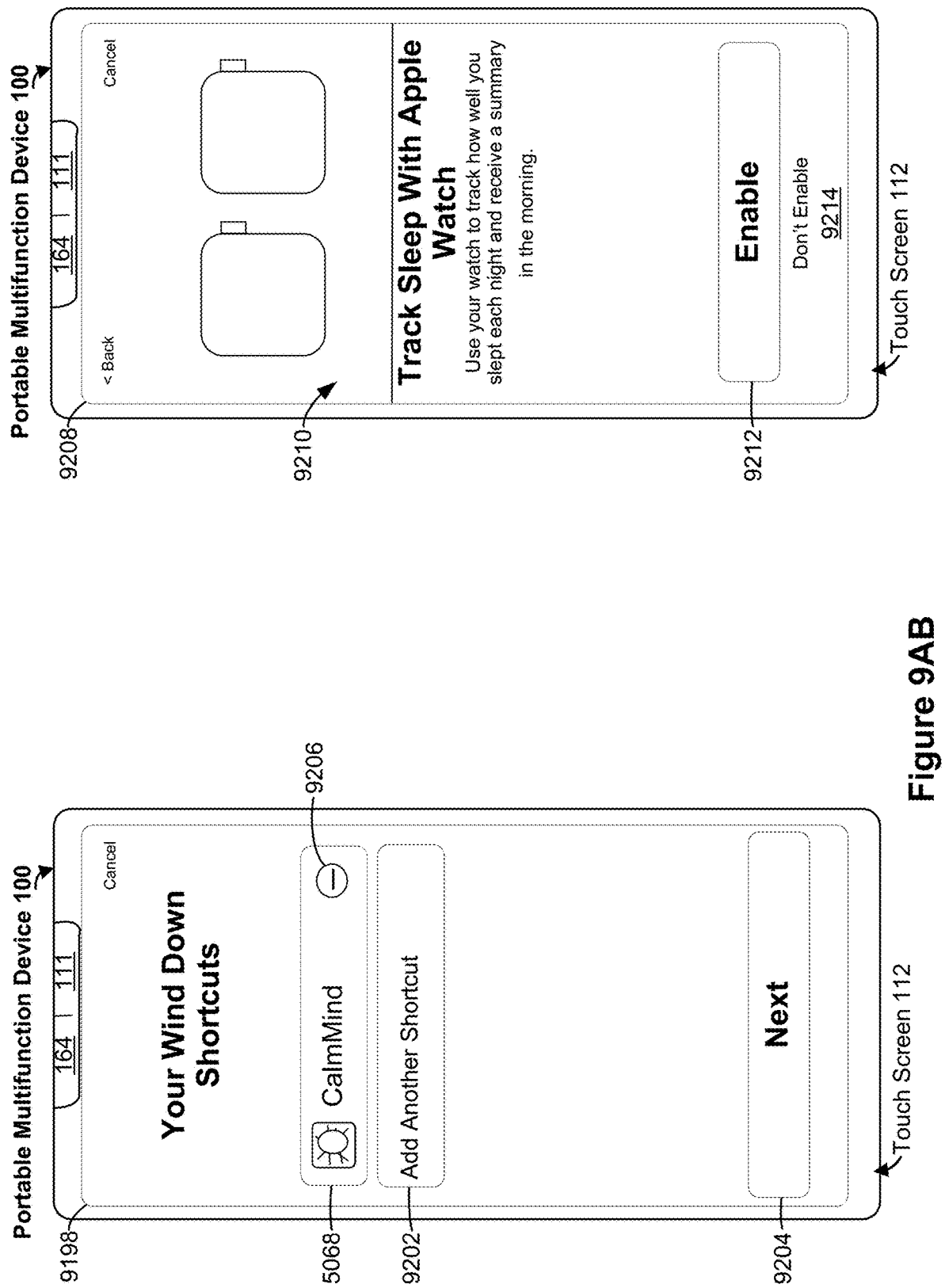
Figure 9A:
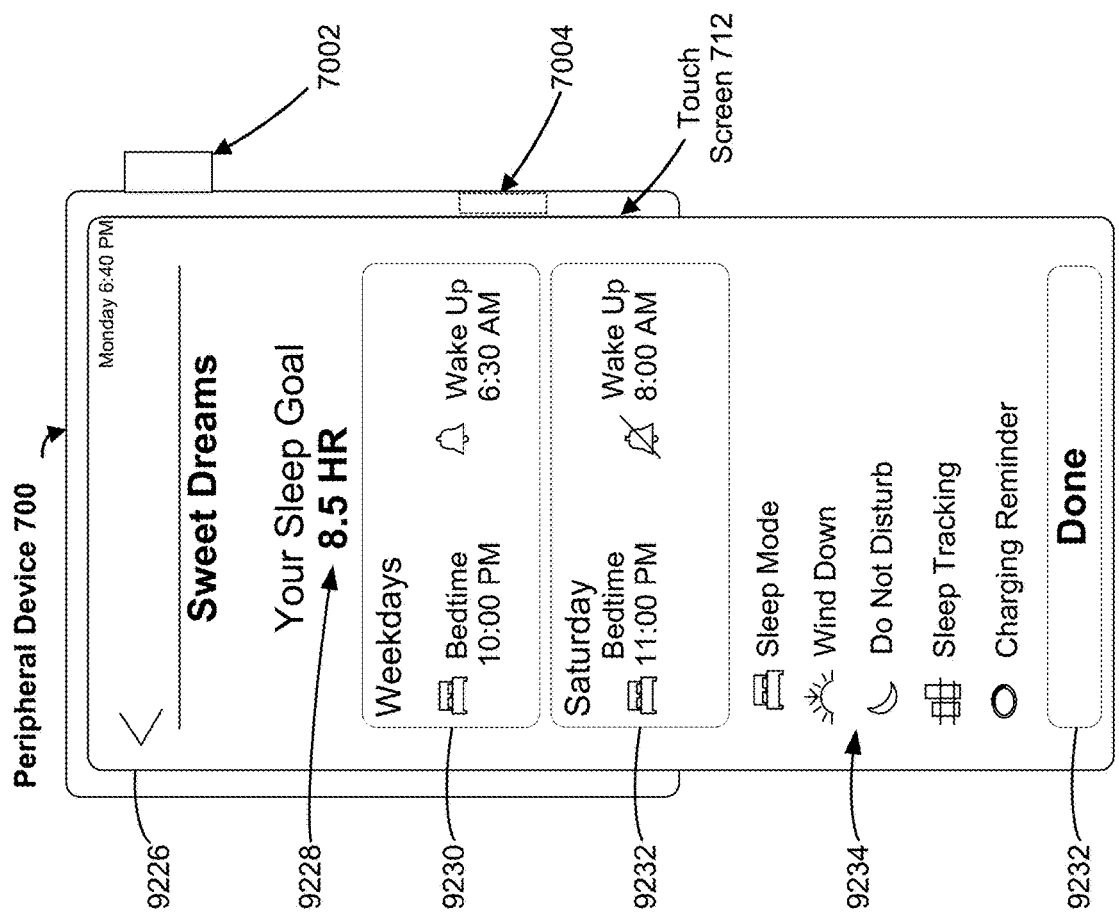
Figure 9A:
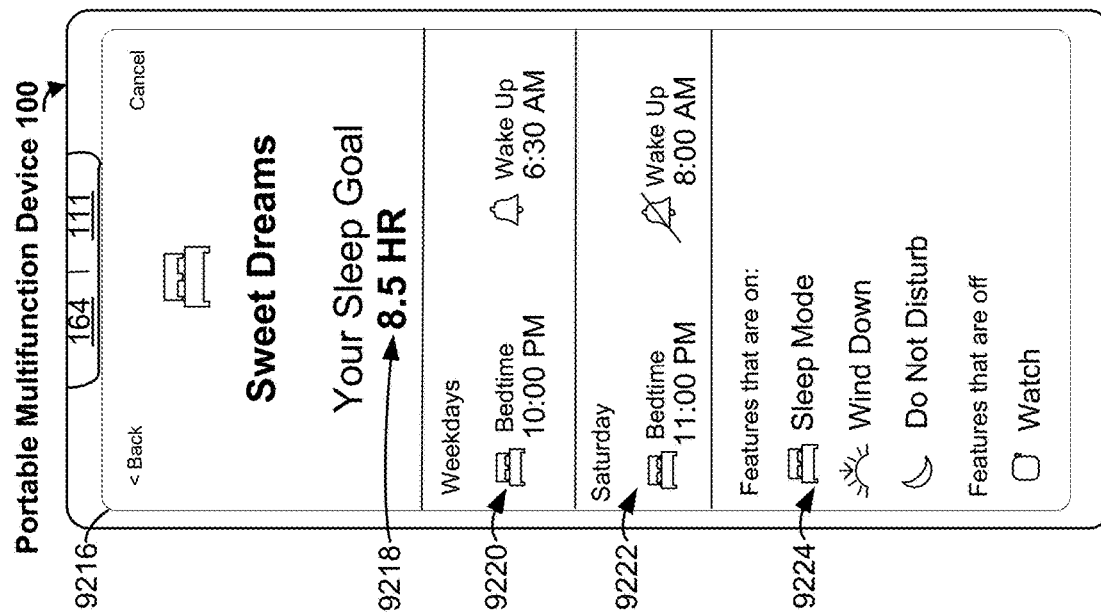
Figure 9A:
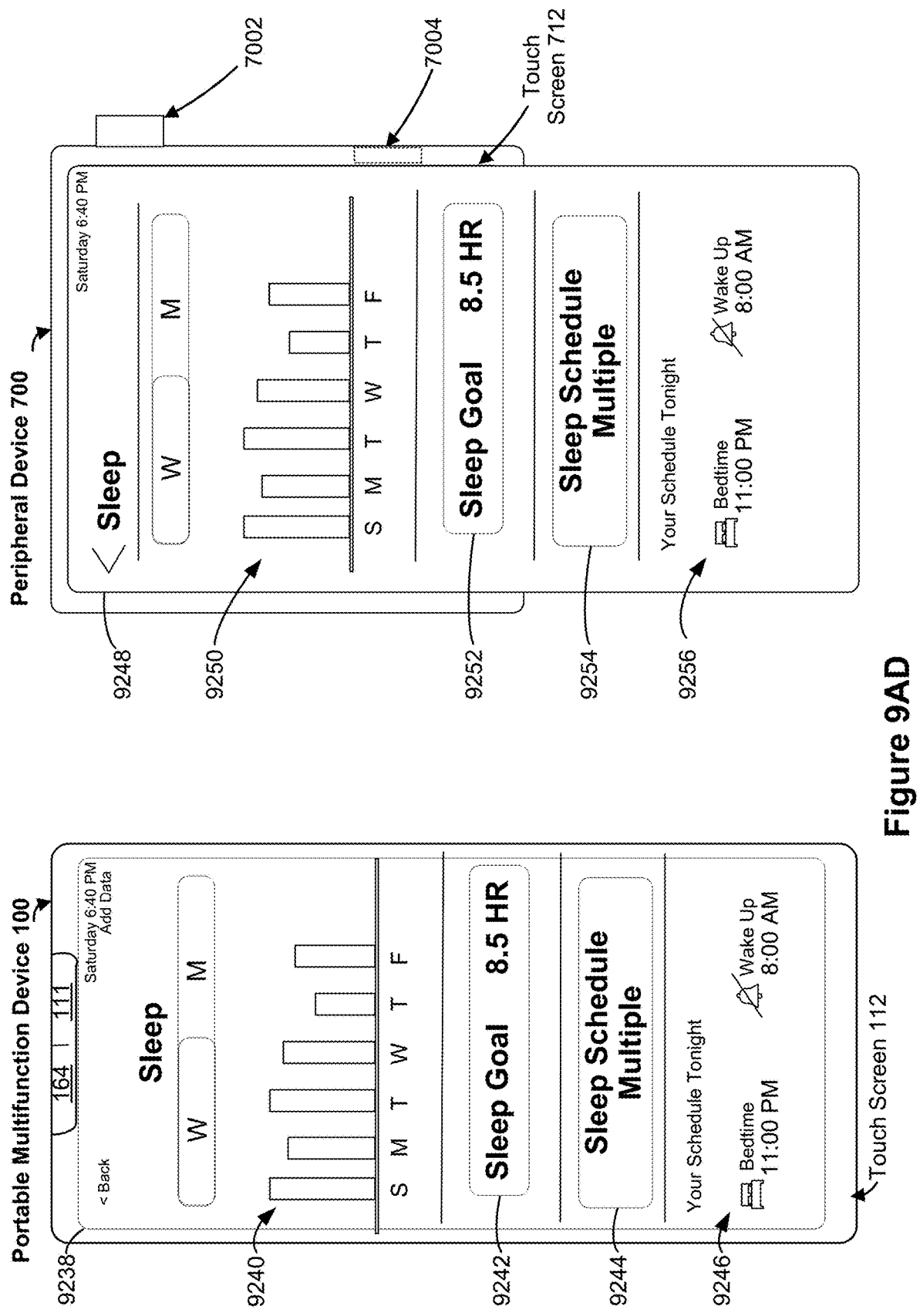
Figure 9A:
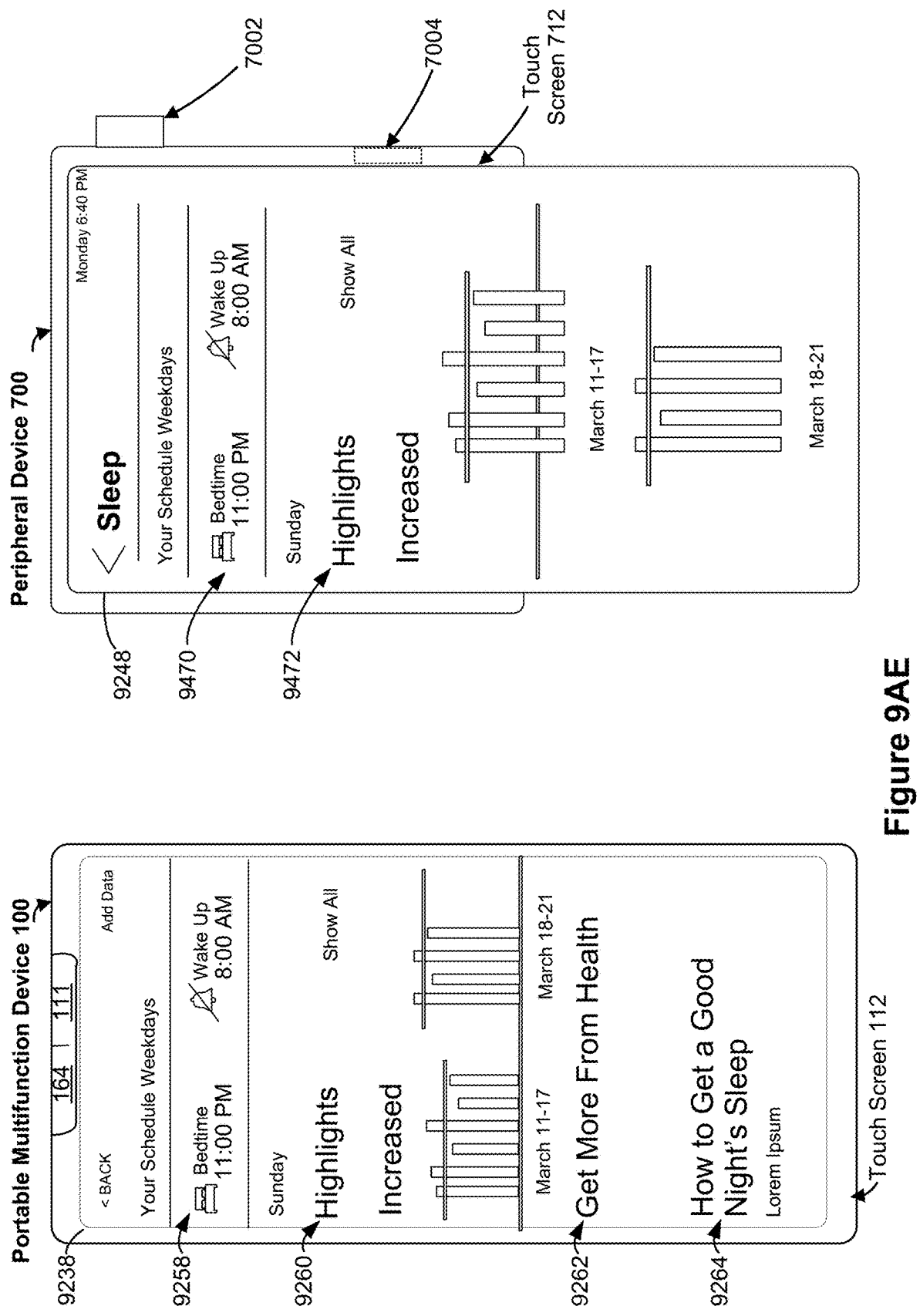
Figure 9A:
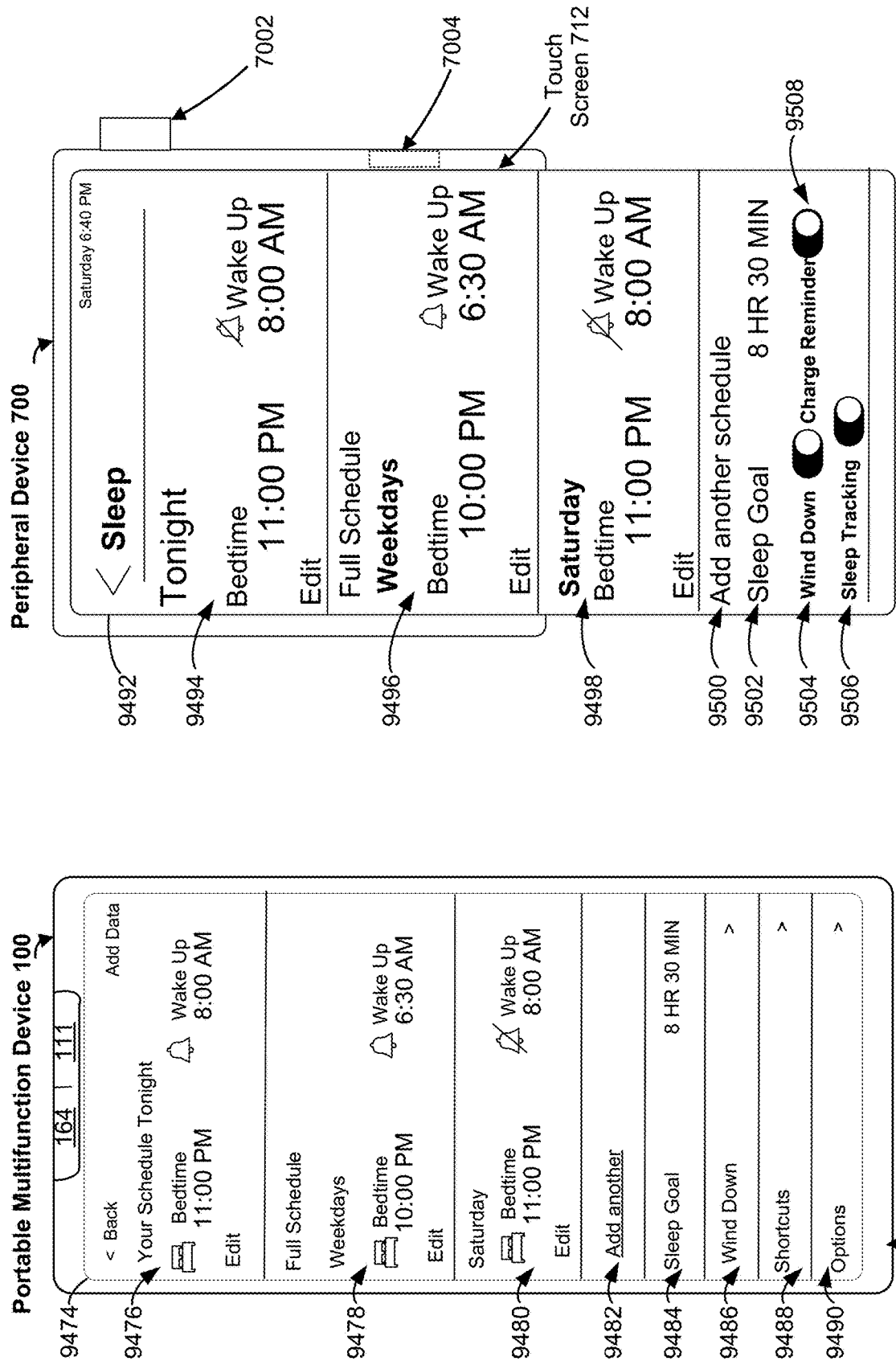
Figure 9A:
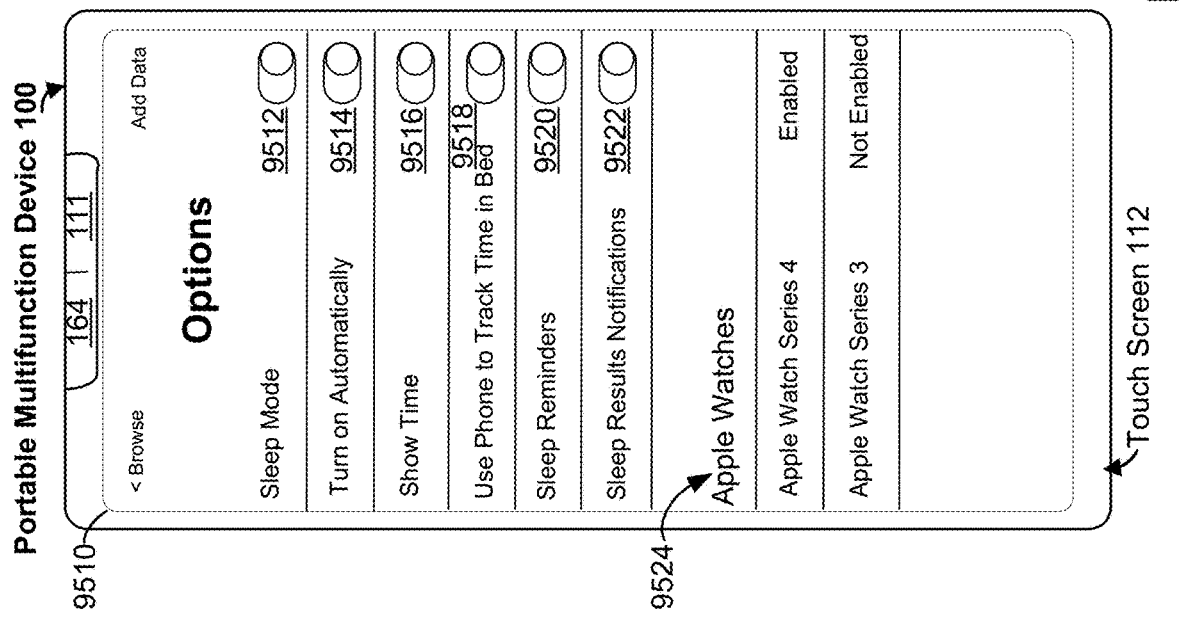

FIGS. 9Z-9AB illustrate a process for setting up a limited set of application functions that are available on the wind down screen (e.g., wind down screen 5013) and sleep screen (e.g., sleep screen 5083) without dismissing the wind down screen and sleep screen, in accordance with some embodiments. In some embodiments, the portable multifunction device 100 displays a different sequence of setup user interfaces than the device 700. In some embodiments, the portable multifunction device 100 displays a set user interfaces specific to the portable multifunction device 100, that are not displayed on the peripheral device 700. For example, the portable multifunction device 100 displays shortcut setup user interfaces 9178, 9186, 9194, and 9198, that are not displayed on peripheral device 700 (e.g., because shortcut functionality is available on the multifunction device 100 and not on the peripheral device 700). In FIG. 9Z, the user interface 9178 includes background information 9180 about shortcuts that can be set up for the wind down screen. In response to activation of the set-up button 9182, the portable multifunction device 100 displays shortcut setup user interface 9186 which includes an add shortcut button 9188, as shown in FIG. 9Z. In response to detecting a user input by a contact 9192 on the add shortcut button 9188 (FIG. 9Z), the portable multifunction device 100 displays a shortcut selection user interface 9194 (FIG. 9AA). For example, CalmMind application 5068, Wish application 5070, Notes application 5072, and Music application 9195 are displayed in separate application categories. In some embodiments, one or more functions associated with a shortcut can be selected for each application, such as an open application function 5074, or a start sleep meditation function 5076. In some embodiments, the shortcut selection user interface 9194 displays a subset of the available functions for a particular application by default. Additional functions may be displayed (e.g., by activating a show more button 5078). In some embodiments, the displayed applications include recommended applications (e.g., applications curated from a list of all available applications with shortcut functions). Additional applications can be selected (e.g., via a "show more recommended apps" button 9196). FIG. 9AB illustrates the shortcut summary user interface 9198 after an application function associated with the CalmMind application has been added. The CalmMind action shortcut 5068 is displayed in the shortcut setup user interface 9186. The user can add additional shortcuts (e.g., via the "add another shortcut" button 9202). The shortcut setup user interface 9186 and the shortcut summary user interface 9198 each includes a next button (e.g., 9190 in FIG. 9A, 9204 in FIG. 9AB) that, when activated, navigates to the next stage of the setup process.

In some embodiments, in response to activating the next button 9204 in FIG. 9AB, the portable multifunction device 100 displays a sleep tracking setup user interface 9208, in accordance with some embodiments. The sleep tracking setup user interface 9208 includes background information 9210 about using a peripheral device 700 that is paired with the multifunction device 100 to track sleep quality of the user, and enable button 9212 for enabling the sleep tracking function, and a "don't enable" button 9214 for not enabling the function.

FIG. 9AC illustrates exemplary setup summary user interfaces 9216 and 9226, in accordance with some embodiments. The portable multifunction device 100 displays a setup summary user interface 9216 that includes a sleep goal section 9218, a first schedule section 9220, a second schedule section 9222, and a feature section 9224. The peripheral device 700 displays a setup summary user interface 9226 that includes a sleep goal section 9228, a first schedule section 9230, a second schedule section 9232, and a feature section 9234. The set up summary user interfaces displays the sleep schedules that have been set up and their associated operation modes and functions. Selection of the done button 9232 concludes the set up process on the peripheral device 700.

FIGS. 9AD-9AG illustrate example user interfaces of an application that manages the sleep schedule and related sleep data on a multifunction device 100 and a peripheral device 700, in accordance with some embodiments.

FIG. 9AD illustrates exemplary sleep data user interfaces 9238 and 9248 in accordance some embodiments. The portable multifunction device 100 displays a sleep data user interface 9238 that includes historic sleep data information (e.g., presented as a graph 9240); a current sleep goal indicator 9242 which, when activated, causes display of a user interface for editing the sleep goal (e.g., user interface 9001 in FIGS. 9A and 9Q); an edit sleep schedule button 9244 that when activated displays a summary of existing sleep schedules (e.g., user interface 9474 in FIG. 9AF, or user interface 9100 in 9V, etc.), and current schedule information 9246 that includes sleep schedule that applies to the current day. The peripheral device 700 displays a sleep data user interface 9248 that includes historic sleep data information (e.g., presented as a graph 9250), a current sleep goal indicator 9252, an edit sleep schedule button 9254, and current schedule information 9256, that function similarly to their counterparts in the user interface 9238 shown on multifunction device 100. In some embodiments, the sleep data user interface 9238 and sleep data user interface 9248 optionally displays visual indications regarding satisfaction of the sleep goal for a past sleep period and/or for a past sequence of days.

FIG. 9AE illustrates additional portions of the sleep data user interfaces 9238 and 9248 after scrolling down. The sleep data user interface 9238 of the portable multifunction device 100 displays second schedule information 9258, data highlights 9260, and additional sleep resources (e.g., tips 9262 and 9264). The sleep data user interface 9248 of the peripheral device 700 displays second schedule information 9470 and data highlights 9472.

FIG. 9AF illustrates exemplary user interfaces 9474 and 9492 for editing sleep schedules that are accessible from within the sleep data user interfaces 9238 and 9248 shown in FIGS. 9AD-9AE (e.g., via edit sleep schedule button 9244, via edit sleep schedule button 9254). The portable multifunction device 100 displays a sleep schedule editing user interface 9474 that includes a current schedule for an upcoming sleep period (e.g., schedule active for the current day) section 9476, a first schedule (e.g., sleep schedule 1) section 9478, and a second schedule (e.g., sleep schedule 2) section 9478, each of which can be edited (e.g., via an edit affordance in the respective schedule section). The sleep schedule editing user interface 9474 includes an "Add Another" button 9482 for displaying a user interface for adding additional schedules, a sleep goal section 9486 for displaying the user interface for editing the current sleep goal, a shortcuts section 9488 for displaying the user interface for editing the set of application functions that are available on the wind down screen or sleep screen, and an options section 9490 for displaying settings for the sleep modes and related functions (e.g., sleep mode, wind down mode, good morning mode, alarm setting, snooze setting, sleep tracking, etc.). In some embodiments, each respective section is an affordance (e.g., a button) that can be activated to edit the respective function of the sleep mode (e.g., the sleep goal section 9484 can be activated to edit the sleep goal duration). The peripheral device 700 displays a sleep schedule editing user interface 9492 that includes current schedule (e.g., schedule active for the current day) section 9494, a first schedule (e.g., sleep schedule 1) section 9496, and a second schedule (e.g., sleep schedule 2) section 9498, each of which can be edited (e.g., via an edit affordance in the respective schedule section). The sleep schedule editing user interface 9492 includes an "add another schedule" button 9500 to add additional schedules, a sleep goal section 9502, a wind down toggle 9504 for turning on/off the wind down mode, a charge reminder toggle 9508 for turning on/off charge reminders, and a sleep tracking toggle 9506 for turning on/off sleep tracking.

FIG. 9AG illustrates an exemplary user interface for editing options associated with a sleep schedule (e.g., displayed in response to activating the options section 9490 in FIG. 9AF). The portable multifunction device 100 displays an options user interface 9510 that includes toggles 9512-9522 for various functions associated with a sleep schedule. In some embodiments, the peripheral device 700 displays a subset of these toggles in the sleep schedule editing user interface 9492 (e.g., the wind down toggle 9504, charge reminder toggle 9508, and sleep tracking toggle 9506 shown in FIG. 9AF). In FIG. 9AG, the sleep mode is enabled for the sleep periods of the active sleep schedules, which turns on Do Not Disturb mode and sleep screen functions during the sleep periods, and turns on the wind down screen during the wind down periods preceding the sleep periods. The turn on automatically function is enabled so that the sleep modes and related DND and special wake screens are automatically turned on based on the current time being within the schedule wind down period, sleep period, and wind up period. The show time function is enabled so that the sleep screen still shows the current time. If the show time function is disabled, the sleep screen only shows the current date. The use phone to track time in bed function is enabled such that sleep quality can be monitored (e.g., activity on the device is tracked to determine if the user is following the sleep schedule) using a portable multifunction device (e.g., in addition to the peripheral device or in the absence of the peripheral device). The sleep reminders function is enabled so that a notification or reminder is generated right before the wind down starts and optionally right before the sleep period starts. The sleep result notification function is enabled such that the user will receive a summary of last night's sleep in the morning via a notification. The watch section 9524 shows which, if any, peripheral devices have been set up as a companion device to implement some of the functions of the sleep mode, wind down mode, good morning mode, bedtime reminders, charging reminders, sleep tracking, and sleep coaching, etc.

FIGS. 10A-10C are flowchart diagrams of a method 10000 of providing a visual alert when a duration of a sleep time period is adjusted by a user below an established sleep goal, in accordance with some embodiments.

This method relates to displaying either the first or the second visual indication that indicates whether a duration of a first scheduled sleep period meets a preset threshold duration (e.g., a pre-established sleep goal) while adjusting the duration of the first scheduled sleep period by changing a start time and/or end of the first scheduled sleep period, where the change in visual indication is performed when a sleep goal threshold is crossed by the duration of the first scheduled sleep period. Displaying different visual indications based on the comparisons with a preset sleep goal alerts the user that the adjustment to the sleep period may be contrary to the user's intent, and alert the user to provide the required input to achieve an intended outcome. Performing an operation when a set of conditions has been met without requiring further user input controls enhances the operability of the device, which, additionally, reduces power usage and improves battery life of the device by enabling the user to use the device more quickly and efficiently.

The method 10000 is performed at a computer system (e.g., a handheld electronic device, a mobile phone, a tablet device, a computer, a wearable device, etc.) in communication with a display generation component (e.g., a display, a touch-screen display, a projector, a head-mounted display (HMD), etc.) and one or more input devices (e.g., a touch-sensitive surface (e.g., separate from a display or integrated in a touch-screen display), an accelerometer, a camera, a motion sensor, etc.). In the method 11000, the computer system displays (10002) a first user interface (e.g., a user interface displayed during the set up process for a sleep schedule for a particular day) for specifying a sleep schedule, the first user interface including one or more user interface objects (e.g., a linear slider, a circular slider, text input fields, a dial, a clock face with movable hands, etc.) that are configured to receive user inputs that specify at least one of a start time and an end time of a first scheduled sleep period for the sleep schedule (e.g., the first scheduled sleep period will be used for one or more upcoming days). The computer system receives, via the first user interface, a first user input that specifies a first time value that specifies at least one of the start time and the end time of the first scheduled sleep period for the sleep schedule (e.g., a value for the start time or end time of the scheduled sleep time for a particular day (e.g., Mondays, Tuesdays, Saturdays, Jun. 18, 2020, the current day, the next day, etc.) that is being set up). In response to receiving the first user input (10006): in accordance with a determination that a duration of the first scheduled sleep period that is determined based on the first time value is below a preset threshold duration (e.g., a user-specified sleep goal, a recommended sleep goal, etc.), the computer system displays (10008) (e.g., on the first user interface and concurrently with the one or more user interface objects that are configured to receive user inputs that specify at least one of the start time and the end time of the first scheduled time period for the sleep schedule, on a user interface that displays a visual representation of the first scheduled time period, etc.) a first visual indication that the duration of the first scheduled time period is below the preset threshold duration, wherein a first value is selected for a first display property (e.g., color, thickness, shape, luminance, opacity, and/or saturation etc.) of the first visual indication while the duration remains below the preset threshold duration (e.g., the first value is independent of changes made to the duration of the first scheduled time period in response to user inputs, as long as the duration remains below the preset threshold duration); and in accordance with a determination that the duration of the first scheduled time period that is determined based on the first time value is at or above the preset threshold duration (e.g., a user-specified sleep goal, a recommended sleep goal, etc.), the computer system displays (10010) (e.g., on the first user interface and concurrently with the one or more user interface objects that are configured to receive user inputs that specify at least one of the start time and the end time of the first scheduled time period for the sleep schedule, on a user interface that displays a visual representation of the first scheduled time period, etc.), a second visual indication that the duration of the first scheduled time period is meets the preset threshold duration, wherein a second value, different from the first value, is selected for the first display property (e.g., color, thickness, shape, luminance, opacity, and/or saturation etc.) of the second visual indication while the duration remains at or above the preset threshold duration (e.g., the second value is independent of changes made to the duration of the first scheduled time period in response to user inputs, as long as the duration remains at or above the preset threshold duration). In some embodiments, when setting up a sleep schedule, the computer system allows the user to enable a wind down period that precede the sleep period specified by the user. In some embodiments, the computer system automatically enters into a special mode that promotes reduced user activity on the computer system and/or reduce distractions caused by the computer system. For example, during the wind down period and the sleep period, the Do Not Disturb mode is turned on, so that most of the notifications are suppressed (e.g., except alarms, and sleep related notifications, etc.). In addition, in some embodiments, the wind down screen and sleep screen that correspond to the screen-restricted state of the computer system requires a special gesture to be dismissed, and when they are dismissed, the normal wake screen is displayed. In some embodiments, the wind down screen has a reduced number of user interface objects and allow access to a limited set of application functions that are preselected by the user, without dismissing the wind down screen. In some embodiments, the sleep screen has even fewer user interface objects than the wind down screen, to further reduce the distractions to the user during sleep. In some embodiments, during a set up process for the sleep schedule, the configuration user interface for the sleep mode has options to set a duration for the wind down mode that starts automatically before goodnight mode. In some embodiments, the configuration user interface also includes user interface objects for selecting the set of actions that are available on the wind down screen during the wind down, and optionally, on the sleep screen during the sleep mode. In some embodiments, the set of actions that are available include one or more system recommended application functions. In some embodiments, the configuration user interface provides a listing of recommended application actions for inclusion in the limited set of actions to be displayed on the wind down screen and/or sleep screen. In some embodiments, the set of available actions are filtered by apps installed on device. In some embodiments, the configuration user interface provides a listing of applications installed on the device that have action shortcuts and this allows the user to browse for actions from the list of applications on the device. In some embodiments, if an application has multiple actions, selecting the application in the listing shows a list of actions available to be selected for the application. If an application has only a single action, then selection of the application adds the application to the set of actions for the wind down screen and/or sleep screen.

In some embodiments, the first user interface includes (10012) one or more user interface objects that are configured to receive user inputs that specify one or more days corresponding to the first scheduled sleep period. In the method 10000: the computer system receives (10012) a second user input, via the first user interface, selecting a plurality of days for the first scheduled sleep period, wherein the first scheduled sleep period for the sleep schedule is applied (repeated) for each day of the selected plurality of days. For example, in some embodiments, the first scheduled sleep period has a start time of 10:00 PM and an end time of 8:30 AM, and the second user input selects the five weekdays to be associated with the first schedule sleep period in the sleep schedule, and the sleep mode is set up to be activated between 10:00 PM till 8:30 AM on each of the selected weekdays. This is shown in FIG. 9B, for example, where the first user interface (e.g., the sleep schedule user interface 9011) is configured to receive user inputs that specify one or more days corresponding to the first scheduled sleep period (e.g., via the day selection region 9012). Selecting the plurality of days for the first scheduled sleep period in response to the second user input reduces the number of inputs needed to perform an operation (e.g., applying the first scheduled sleep period to multiple days). Reducing the number of inputs needed to perform an operation enhances the operability of the device, and makes the user-device interface more efficient, which, additionally, reduces power usage and improves battery life of the device by enabling the user to use the device more quickly and efficiently.

In some embodiments, the computer system displays (10014) in a second user interface for modifying the first scheduled sleep period for a respective day of the selected plurality of days, wherein the second user interface includes one or more user interface objects (e.g., a linear slider, a circular slider, text input fields, a dial, a clock face with movable hands, etc.) that are configured to receive user inputs that specify at least one of the start time and the end time of the first scheduled sleep period for the respective day (e.g., the modified first scheduled sleep period will be used for the current day only). The computer system receives, via the first user interface, a third user input that specifies a second time value, different from the first time value, that specifies at least one of the start time and the end time of the first scheduled sleep period for the respective day. In response to receiving the third user input, the computer system modifies the first scheduled sleep period for the respective day of the selected plurality of days in accordance with the second time value, without modifying the first scheduled sleep period for other days of the selected plurality of days. In some embodiments, the second user interface also displays the visual indication that informs the user whether the modified sleep period meets the preset threshold duration. In some embodiments, in response to the third user input: in accordance with a determination that a duration of the modified first scheduled sleep period that is determined based on the second time value is below the preset threshold duration (e.g., a user-specified sleep goal, a recommended sleep goal, etc.), the computer system displays (e.g., on the second user interface and concurrently with the one or more user interface objects that are configured to receive user inputs that specify at least one of the start time and the end time of the first scheduled time period for the respective day, on a user interface that displays a visual representation of the first scheduled time period, etc.) the first visual indication that the duration of the modified first scheduled time period for the respective day is below the preset threshold duration, wherein the first value is selected for the first display property (e.g., color, thickness, shape, luminance, opacity, and/or saturation etc.) of the first visual indication while the duration remains below the preset threshold duration (e.g., the first value is independent of changes made to the duration of the first scheduled time period in response to user inputs, as long as the duration remains below the preset threshold duration); and in accordance with a determination that the duration of the modified first scheduled time period that is determined based on the second time value is at or above the preset threshold duration (e.g., a user-specified sleep goal, a recommended sleep goal, etc.), the computer system displays (e.g., on the second user interface and concurrently with the one or more user interface objects that are configured to receive user inputs that specify at least one of the start time and the end time of the first scheduled time period for the respective day, on a user interface that displays a visual representation of the modified first scheduled time period, etc.), the second visual indication that the duration of the modified first scheduled time period meets the preset threshold duration, wherein the second value, different from the first value, is selected for the first display property (e.g., color, thickness, shape, luminance, opacity, and/or saturation etc.) of the second visual indication while the duration remains at or above the preset threshold duration (e.g., the second value is independent of changes made to the duration of the first scheduled time period in response to user inputs, as long as the duration remains at or above the preset threshold duration). In some embodiments, the computer system further displays another visual indication that the proposed modification conflicts with an existing schedule (e.g., a sleep schedule for a different day, or another non-sleep related schedule, etc.). In some embodiments, if a user input corresponds to a request to establish a new sleep schedule for a respective day, and the computer system determines that the respective day already has an existing sleep schedule, the computer system generates a warning that the respective day already has an existing sleep schedule and requests the user to confirm that the user wishes to proceed with establishing the new sleep schedule for the respective day and override the existing schedule for the respective day. This is shown in FIG. 9U, for example, where the second user interface (e.g., the sleep schedule user interface 9120) modifies the first scheduled sleep period for a respective day (e.g., Saturday, as selected in the day selection region 9012) of the selected plurality of days. Modifying the first scheduled sleep period for the respective day of the selected plurality of days in accordance with the second time value and in response to receiving the third user input, without modifying the first scheduled sleep period for other days of the selected plurality of days, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently.

In some embodiments, the computer system is (10016) a first electronic device (e.g., the portable electronic device, such as a mobile phone or tablet device) that is communicatively coupled with (e.g., paired with, connected with, etc.) a second electronic device (e.g., a companion device such as a watch or bracelet, etc.). In the method 10000: in accordance with a determination that a current time matches (e.g., is at or within a preset threshold amount of time of) the end time of the first scheduled sleep period for the sleep schedule, the computer system provides a first alert (e.g., a first notification, a first tactile output, a first audio alert, etc.) at the first electronic device (e.g., the mobile phone or tablet device) a preset amount of time (e.g., 10 seconds, 20 seconds, etc.) after a second alert is provided at the second electronic device (e.g., watch). This is shown in FIGS. 7H-7I, for example, where the first alert is provided at the first electronic device (e.g., the portable multifunction device 100, as shown in FIG. 7I) after the second alert is provided at the second electronic device (e.g., the peripheral device 700, as shown in FIG. 7H). Providing the first alert at the first electronic device after providing the second alert at the second electronic device, in accordance with a determination that the current time matches the end time of the first scheduled sleep period, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently.

In some embodiments, the computer system displays (10018) a second user interface (e.g., user interface of an alarm app) that includes a first portion (e.g., top row) that displays: the start time and the end time of the first scheduled sleep period; and an indication of a type of notification to be presented at the end time of the first scheduled sleep period (e.g., silenced or alarm on). This is shown in FIG. 9T, for example, where the second user interface (e.g., the schedule summary user interface 9100) includes a first portion that displays the start time and the end time of the first scheduled sleep period (e.g., the first schedule 9102) and an indication of a type of notification to be presented at the end time of the first scheduled sleep period. In some embodiments, the second user interface includes one or more additional alarms that have been established for the computer system. In some embodiments, the second user interface includes a link that, when activated, causes display of the first user interface through which the sleep schedule can be modified, or display of the second user interface through which the sleep period can be modified for a particular day (e.g., the current day only). Displaying the second user interface that includes the first portion that displays the start time and end time of the first scheduled sleep period, together with the indication of the type of notification to be presented at the end of time of the first scheduled sleep period, provides improved visual feedback to the user (e.g., allowing the user see the alarm type and alarm time from a single user interface). Providing improved visual feedback enhances the operability of the device and makes the user-device interface more efficient, which, additionally, reduces power usage and improves battery life of the device by enabling the user to use the device more quickly and efficiently.

In some embodiments, the sleep schedule includes (10020) the first scheduled sleep period and a second scheduled sleep period; the first scheduled sleep period is applied to a first set of days of a week (e.g., weekdays); and the second scheduled sleep period is applied to one or more days of the week (e.g., Saturday) that is not included in the first set of days of the week; and the second user interface displays: a start time and an end time of the second scheduled sleep period; and an indication of a type of notification to be presented at the end time of the second scheduled sleep period. In some embodiments, the second user interface also displays an indication of the respective days of the week for the respective sleep schedules. This is shown in FIG. 9V, for example, where the second user interface (e.g., the schedule summary user interface 9100) includes the first scheduled sleep period (e.g., the first schedule 9102) applied to a first set of days of a week (e.g., weekdays) and the second scheduled sleep period (e.g., the second schedule 9124) applied to one or more days of the week that are not included in the first set of days of the week (e.g., Saturday). Displaying the second user interface that includes the start time and end time of the second scheduled sleep period, together with the indication of the type of notification to be presented at the end of time of the second scheduled sleep period, provides improved visual feedback to the user. Providing improved visual feedback enhances the operability of the device and makes the user-device interface more efficient, which, additionally, reduces power usage and improves battery life of the device by enabling the user to use the device more quickly and efficiently.

In some embodiments, after the first scheduled sleep period for a respective day of the sleep schedule has ended, the computer system determines (10022) whether an actual sleep duration of a user (e.g., as monitored by using the watch) meets the preset threshold duration (e.g., meets or exceeds the sleep goal). In accordance with a determination that the actual sleep duration of the user meets the preset threshold duration, the computer system displays (e.g., within a second predefined time period after the end time of the first scheduled sleep period of the respective day) a third visual indication regarding satisfaction of the preset threshold duration. In accordance with a determination that the actual sleep duration of the user does not meet the preset threshold duration, the computer system forgoes displaying a fourth visual indication regarding failure to meet the preset threshold duration (e.g., within the second predefined time period after the end time of the first scheduled sleep period). This is shown in FIG. 7J, for example, where in accordance with a determination that the actual sleep duration of the user (e.g., 8 hours and 31 minutes) meets the preset threshold duration (e.g., 8 hours and 30 minutes), the computer system displays a third visual indication regarding satisfaction of the preset threshold duration (e.g., the summary 7041). Displaying the third visual indication or the fourth visual indication, depending on whether the actual sleep duration of the user meets the preset threshold duration, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently.

FIGS. 11A-11AF illustrate example user interfaces for disabling and enabling an input mechanism of an electronic device during a scheduled restricted mode (e.g., a scheduled sleep time period), in accordance with some embodiments.

FIGS. 11A-11AF are illustrated using a peripheral device 700, however the process can be implemented using other types of computer systems, such as a multifunction device 100, a desktop computer, etc. In this example, device 700 is configured to operate in a normal mode (e.g., normal display-on state) and a low-power mode (e.g., operated with a display-off state or an always-on low power state, etc.). In addition, the device 700 also operates in a restricted mode where the screen is locked by a screen-lock user interface (e.g., a lock screen or wake screen in either the authenticated state or the unauthenticated state) so that access to the home screen and application user interfaces of installed applications are prevented until the screen-lock user interface is dismissed in response to user input. Furthermore, in some embodiments, the device 700 operates in a scheduled restricted mode (e.g., wind down mode, or sleep mode) during a preset scheduled time period (e.g., a wind down period, or sleep period), where one or more input mechanisms that are normally enabled during a regular restricted mode (e.g., when outside of the wind down period, or sleep period, and when a regular lock screen or wake screen can be displayed) are disabled in the scheduled restricted mode. As described herein, one or more input mechanisms that are enabled outside of a scheduled restricted mode are disabled during the scheduled restricted mode, and a predefined input using an enabled input mechanism is required to enable the disabled input mechanisms during the scheduled restricted mode.

FIGS. 11A-11H illustrate exemplary user interfaces for interacting with the device 700 when the device 700 is in a normal mode of operation outside of scheduled mode change (e.g., outside of a sleep period or wind down period, etc.). More specifically, FIGS. 11A-11H illustrate one or more input mechanisms of the device 700 that are enabled for operating in a normal manner.

FIG. 11A illustrates the device 700 in a low power mode (e.g., display-off state, or an always-on low power state). For example, in the low power state, the device 700 is still on and detecting input via the one or more input mechanisms, but the touch screen 712 is not illuminated or activated (or is in a dimmed, low-power always-on state). In some embodiment, the device 700 enters the low power state when a user presses a lock button (e.g., input mechanism 7002 on the device 700) or when the device 700 remains idle for a predefined amount of time (e.g., 30 seconds or a minute without the device 700 detecting an input that prevents the device 700 from entering the low-power state, such as a user input to perform operations on the device 700, or a wake input, described in further detail below).

FIG. 11A illustrates a number of inputs detected via various input mechanisms of the device 700 that causes the device 700 to transition from the low-power state to a normal operation state (e.g., with its display turned on, and/or lit-up from the low power always-on state to the normal display-on state), in accordance with some embodiments. Any one of these various wake inputs may be used independently to exit the low power always-on state or the display-off state of the device 700 when the current time is outside of the scheduled mode change (e.g., the sleep period). In some embodiments, the wake input is a tap or swipe input by a contact 11002 on the touch screen 712 of the device 700. In some embodiments, the wake input is a device raise input 11004 that moves the device 700 toward the user's face. In some embodiments, the wake input is actuation of a physical mechanism of the device 700. For example, the device 700 may include a rotatable input mechanism (e.g., a watch crown, a watch bezel, etc.), such as the input mechanism 7002 of device 700, and the wake input is an input 11006 that rotates the input mechanism 7002. In some embodiments, the device 700 includes a physical mechanism that includes a button (e.g., a mechanical button, solid state button, etc.), a switch, or toggle, etc. For example, the device 700 includes a side button 7004 configured to receive a press input 11008. In some embodiments, some of the physical mechanisms of the device 700 are configured to receive multiple types of inputs. For example, the input mechanism 7002 is a watch crown configured to receive both a rotation input and a press input (e.g., of a button on the flat surface of the crown, depressed in a similar manner to the button 7004). In some embodiments, when an input mechanism is enabled and operating in a normal mode outside of the scheduled mode change, various characteristics of the input (e.g., location, speed, direction, duration, number of occurrences, sequence, termination, etc.) are used to disambiguate the inputs for triggering different operations. In some embodiments, at least some of the input mechanisms are disabled during the scheduled mode change (e.g., during the sleep mode enabled for the sleep period), and as a result, even if an input is detected, the device 700 does not perform the normal input disambiguation based on the various characteristics of the input, and merely treats different types of inputs as a signal that some interaction with the input mechanism has occurred and optionally ignores the input or displays an alert notifying the user that the input mechanism is disabled and/or what is required to re-enable the input mechanism.

Figure 11B:
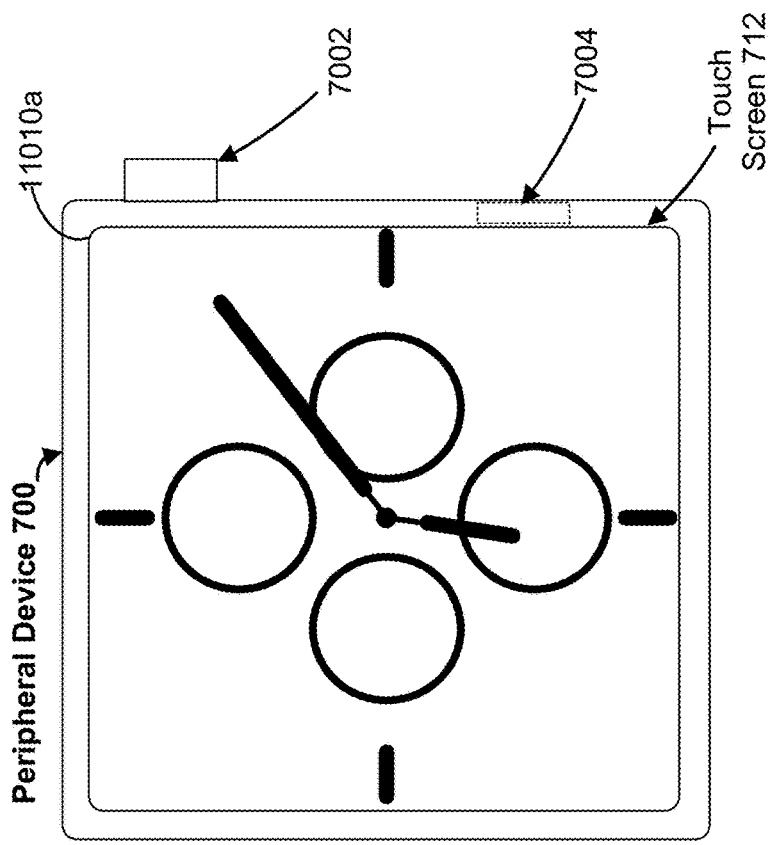
FIGS. 11A-11AF illustrate example user interfaces for disabling and enabling an input mechanism of an electronic device during a scheduled restricted mode, in accordance with some embodiments.
Figure 11A:
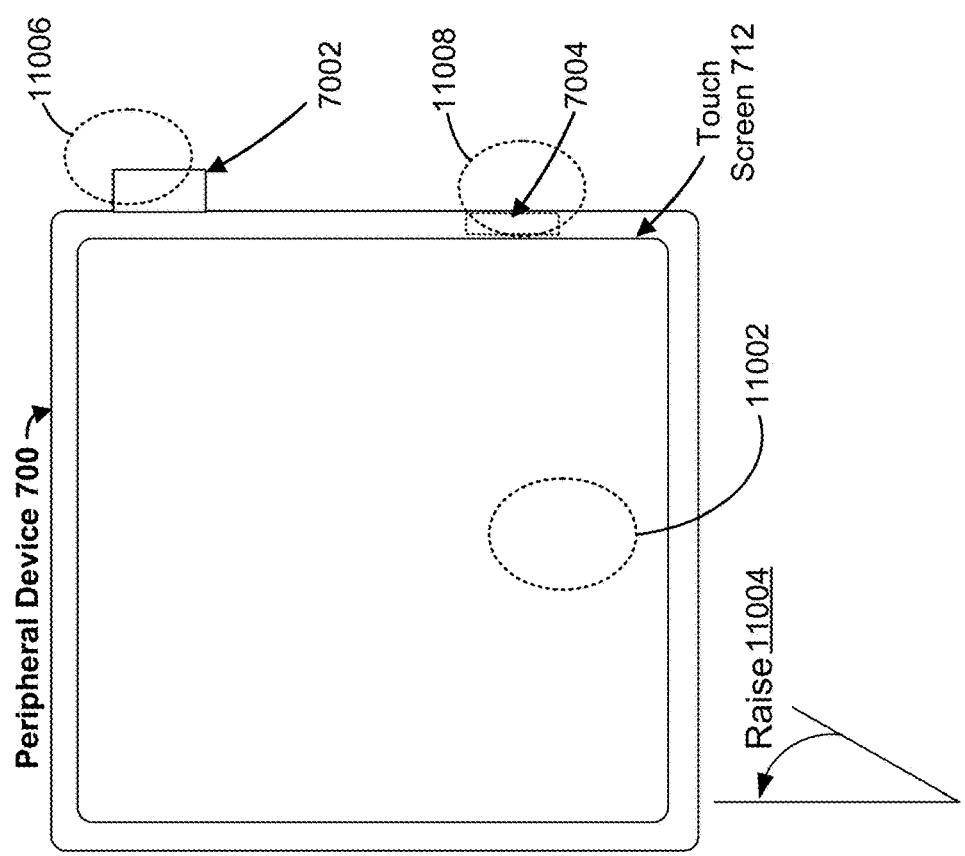

FIG. 11B illustrates an initial user interface 11010a that is displayed after the device 700 exits the low power state (e.g., the display-off state, or low-power always-on state, etc.), in response to detecting one of the wake inputs described in FIG. 11A, and in accordance with a determination that the current time is outside of the scheduled mode change (e.g., the scheduled sleep period). In some embodiments, the user interface 11010a includes a watch face (e.g., or another initial user interface that the user has preconfigured as the regular wake screen or wind down screen (e.g., if the current time is within the wind down period) for the device 700).

Figure 11D:
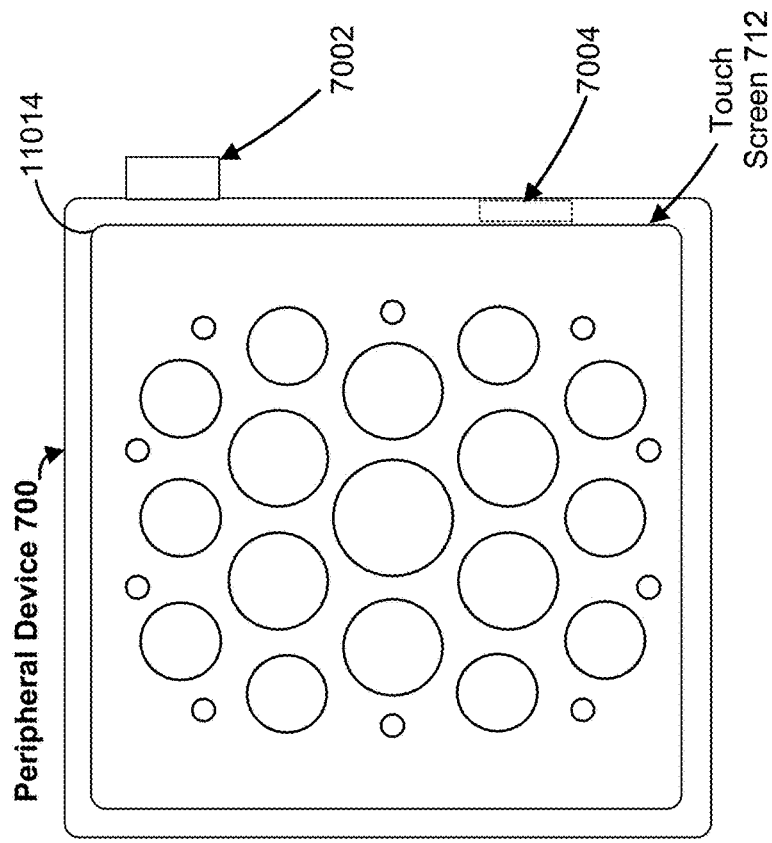
Figure 11C:
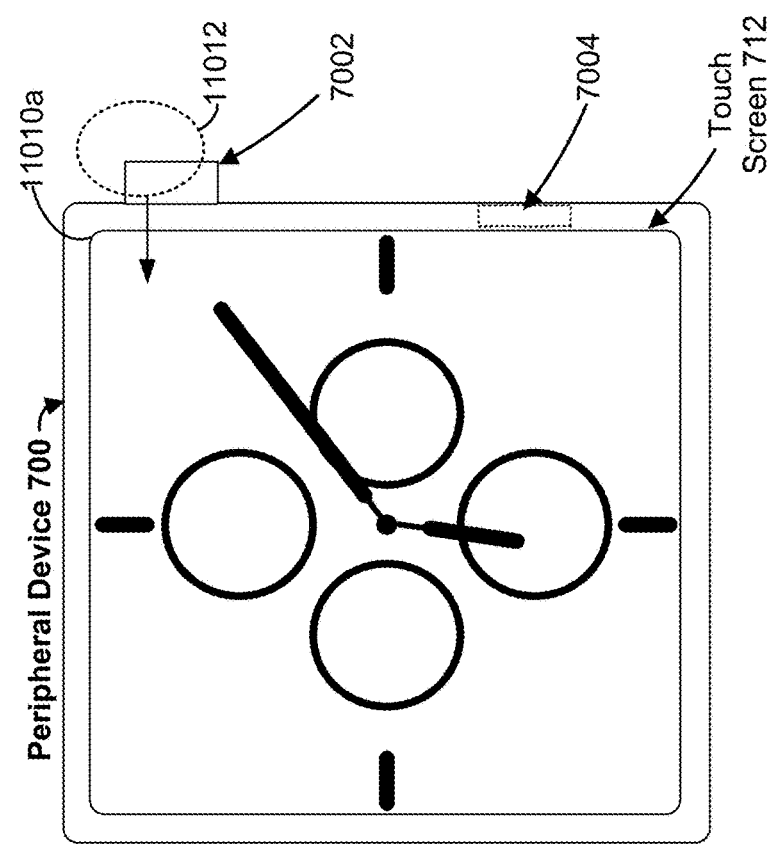

In FIG. 11C, in response to an input 11012 on the input mechanism 7002 of device 700, and in accordance with a determination that the current time is outside of the scheduled mode change (e.g., the scheduled sleep period), the device 100 displays a user interface 11014 (e.g., dismisses the user interface 11010a, or another regular wake screen, or the wind down screen), as shown in FIG. 11D. In some embodiments, the user interface 11014 is a home screen and displays various applications that can be run on the device 700. In some embodiments, the additional input 11012 is the same type of input as the input 11006. In some embodiments, the additional input 11012 is a different type of input from the input 11006. For example, the input mechanism 7002 is a watch crown (e.g., configured to rotate) and includes a physical button (e.g., on the flat surface of the crown), and the input 11006 is a rotation of the input mechanism 7002 (e.g., to wake the device 700), while the additional input 11012 is a press input on the physical button of the input mechanism 7002.

Figure 11F:
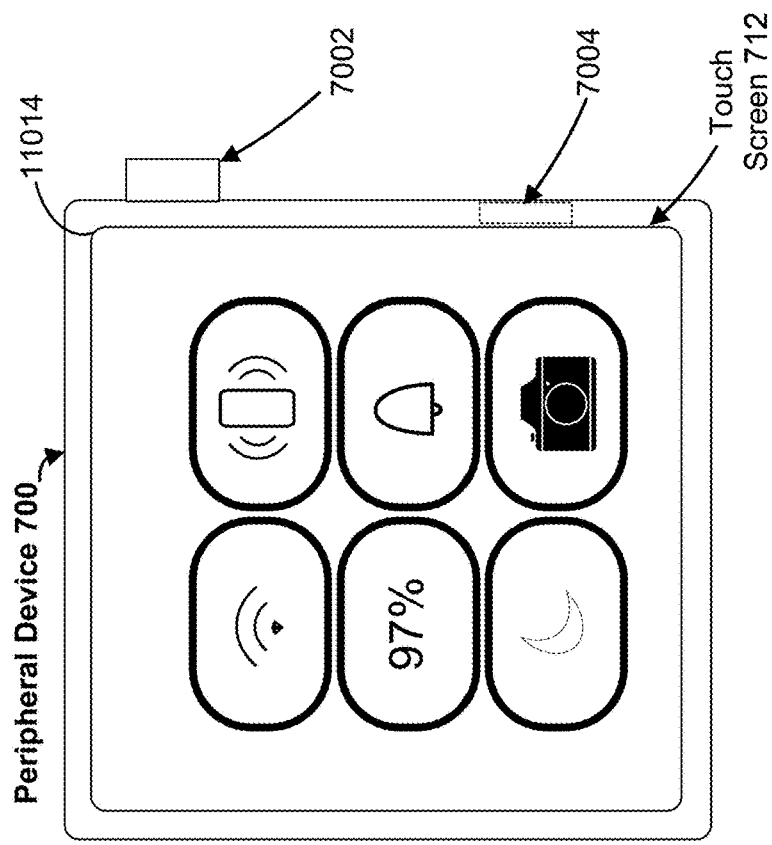
Figure 11E:
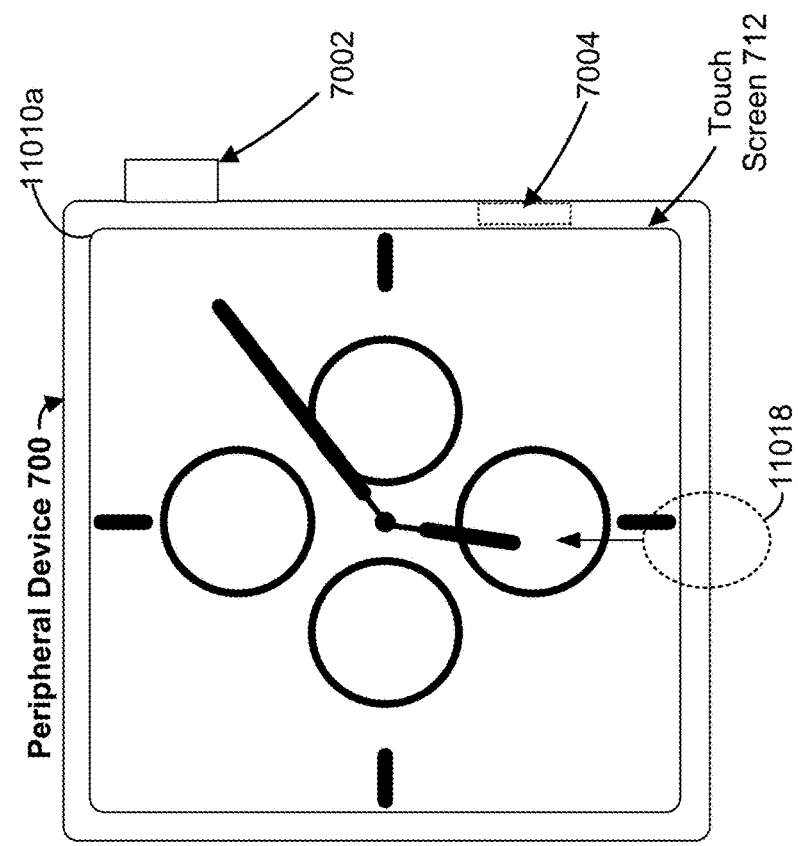
Figure 11H:
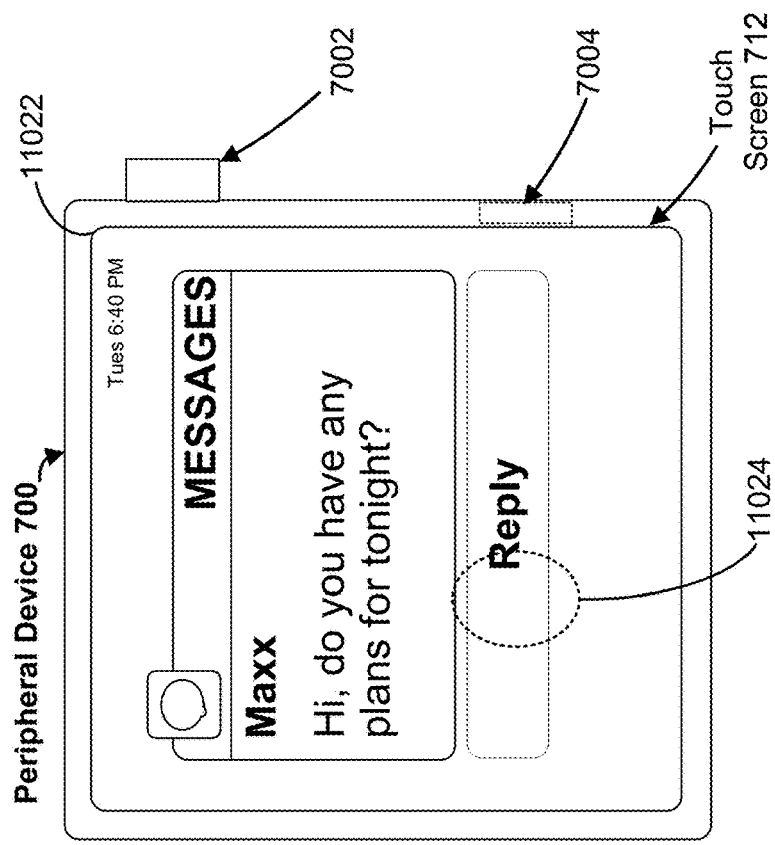

In FIG. 11E, in response to an upward swipe input by a contact 11018 on the touch screen 712 while the user interface 11010a is displayed, the device 700 displays a settings user interface 11014 for configuring various device functions (e.g., network connections, alarms, camera, DND mode, battery management, etc.) of the device 700, as shown in FIG. 11F.

Figure 11G:
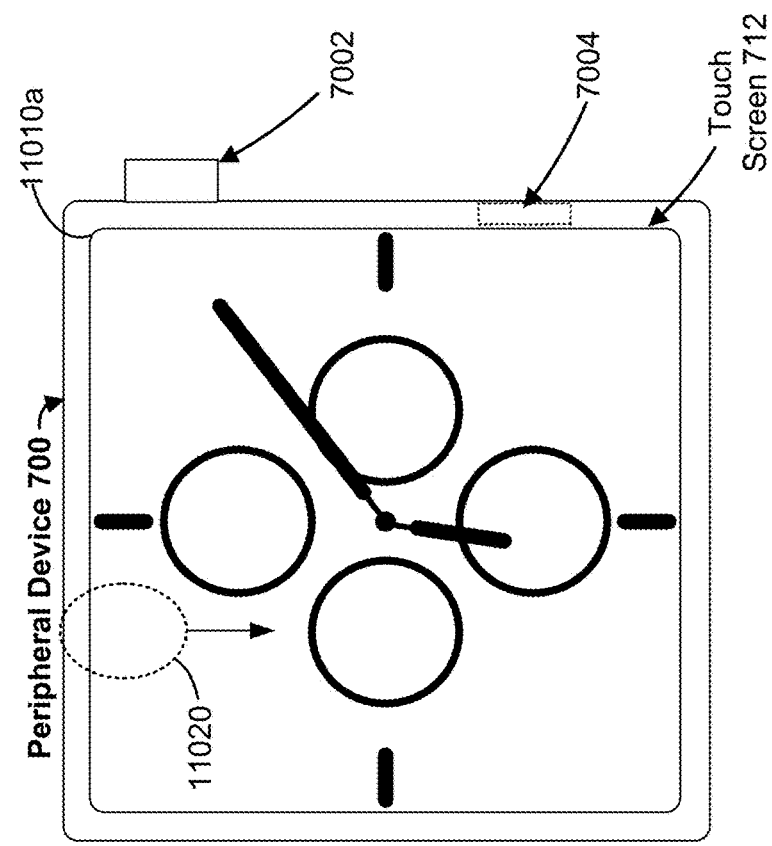

FIG. 11G is analogous to FIG. 11E, but illustrates an additional downward swipe input by a contact 11020 on the touch screen 712 of device 700. In response to the downward swipe input, the device 700 dismisses the user interface 11010a and displays a user interface 11022, illustrated in FIG. 11H, that displays missed notifications. In some embodiments, the user interface 11020 allows a user to interact with (e.g., reply to) a notification (e.g., by tapping on a reply button 11024 for a notification of a message on the touch screen 712).

Additional interactions with the device 700 are enabled using the various input mechanisms of the device 700 while the current time is outside of the sleep period and all of the input mechanisms are enabled.

FIGS. 11I-11M illustrate the operations of the device 700 when the device 700 first enters the scheduled mode change (e.g., the sleep mode, with DND turned on and screen turned off or shown with simplified user interface and reduced luminance, etc.). In some embodiments, the device 700 disables at least some of the input mechanisms while in the sleep period of the active sleep schedule.

Figure 11J:
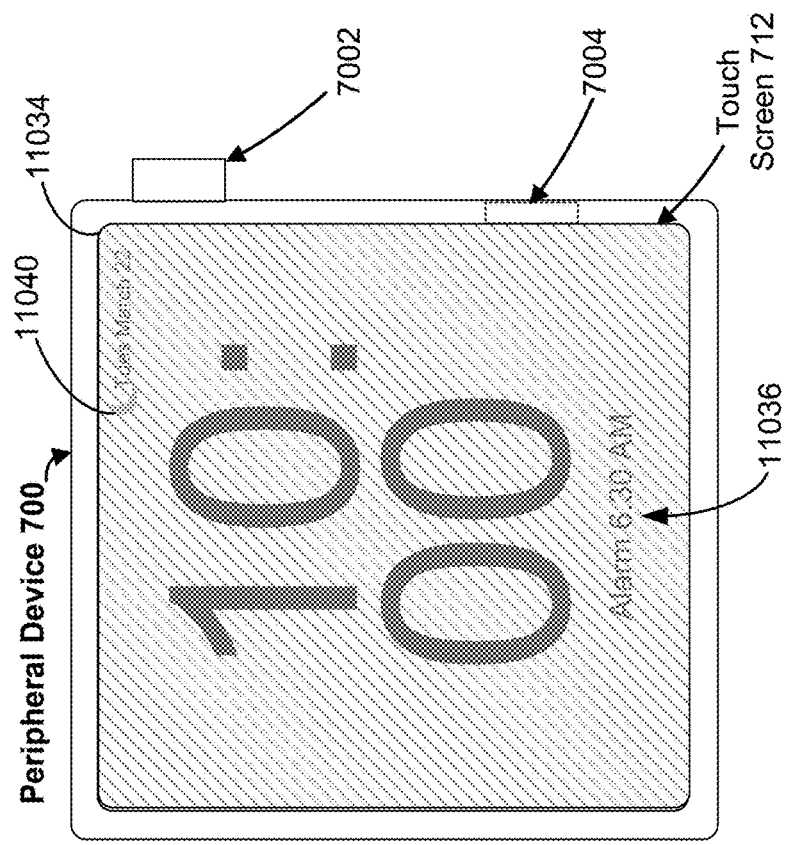
Figure 11I:
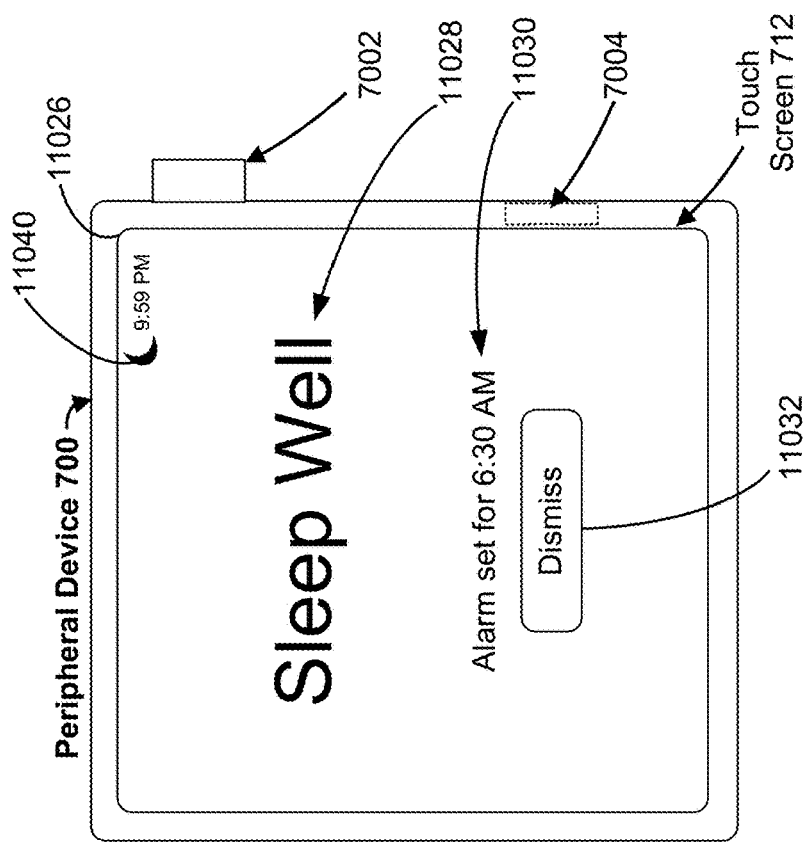

In FIG. 11I, a bedtime reminder user interface 11026 is displayed when the current time is one minute before the scheduled sleep period is started. For example, a user has scheduled a sleep time period beginning at 10:00 PM and ending at 6:30 AM. At 9:59 PM, the device 700 displays the bedtime reminder user interface 11026, which includes a "Sleep Well" message 11028, an alarm indicator 11030, and a dismiss button 11032. After bedtime reminder user interface 11026 is dismissed by a tap input on the dismiss button 11032, the device 700 enters the sleep mode, where a sleep screen is displayed and DND function is turned on, and one or more input mechanisms of the device 700 are disabled.

FIG. 11J illustrates a sleep screen 11034 of the device 700 when the device 700 after the device has entered the sleep mode and before the device 700 enters into the low-power mode. In some embodiments, the sleep screen 11034 optionally displays a digital clock (e.g., as opposed to the watch face 11010a) and an alarm status 11036 for the sleep period. In some embodiments, the sleep screen 11034 displays a DND indicator 11040 indicating that the DND mode has been started. In some embodiments, the display is dimmer when displaying the sleep screen 11034 than when displaying the bedtime reminder user interface 11026 and displaying the regular wake screen 11010a of the device 700.

Figure 11L:
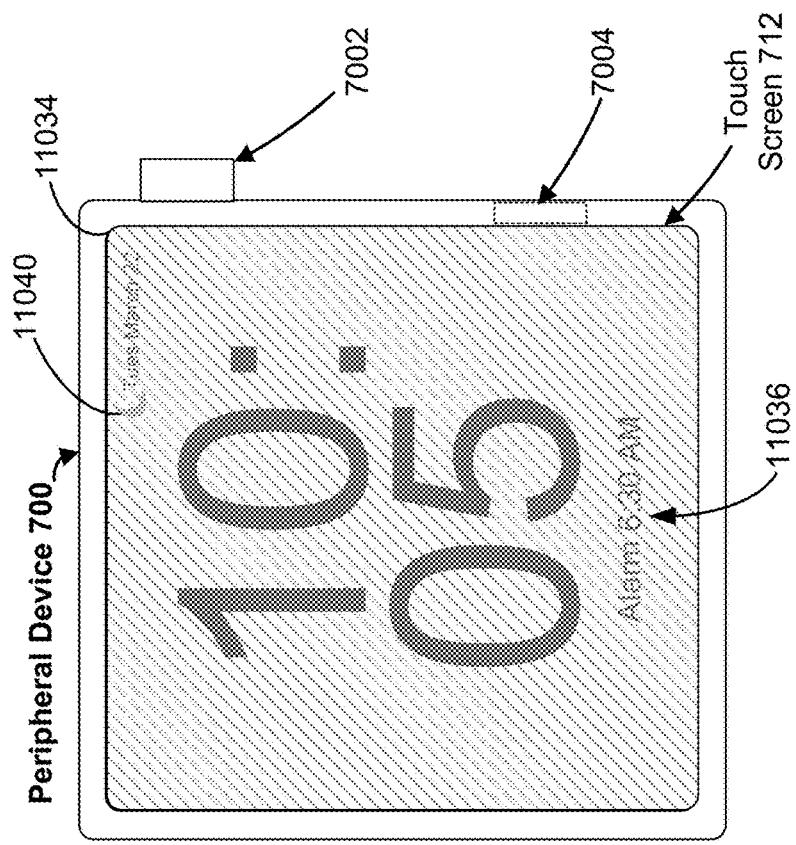
Figure 11K:
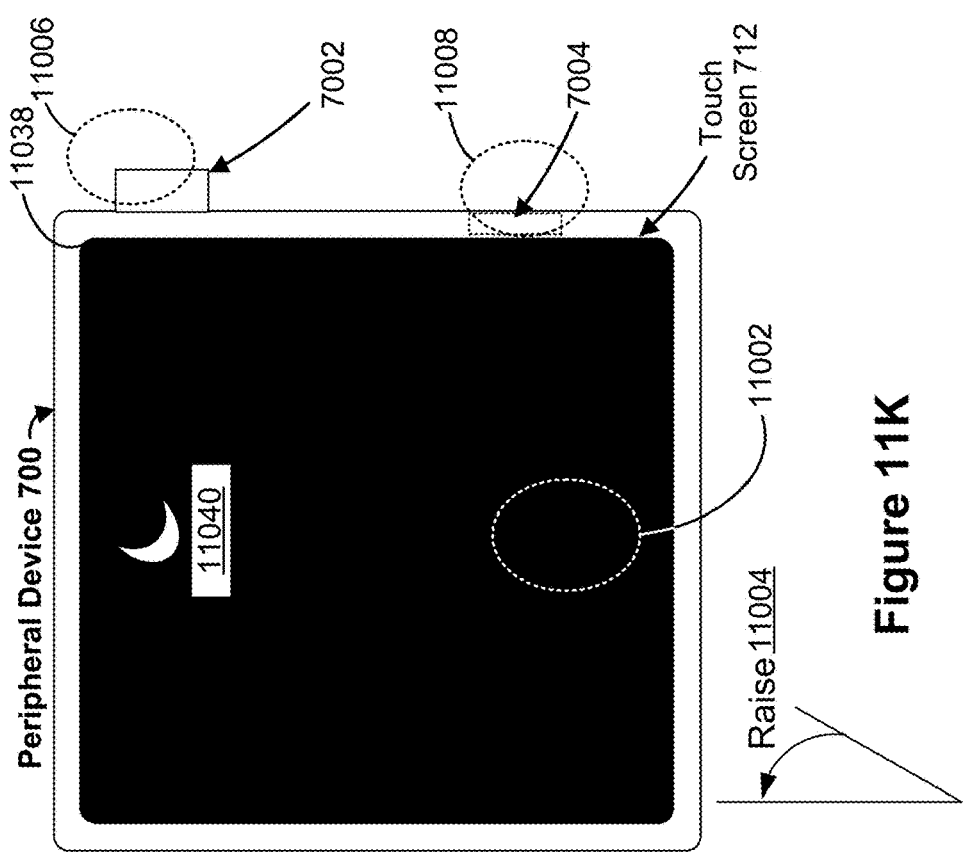

FIG. 11K illustrates a dark sleep screen 11038 that is displayed with the device 700 has entered into a low power state during the scheduled sleep period. In some embodiments, the dark sleep screen 11038 is displayed after a preset period (e.g. 30 seconds, 1 minute, etc.) of following display of the sleep screen 11034. In some embodiments, the dark sleep screen 11038 is a completely off state, where the touch screen 712 is not illuminated or active. In some embodiments, the dark sleep screen 11038 is in the low-power always-on state, not displaying any time information or user interface objects, except for the DND indicator 11040. In some embodiments, the display 712 displaying the dark sleep screen 11038 is even dimmer than the sleep screen 11034 shown in FIG. 11J.

Figure 11N:
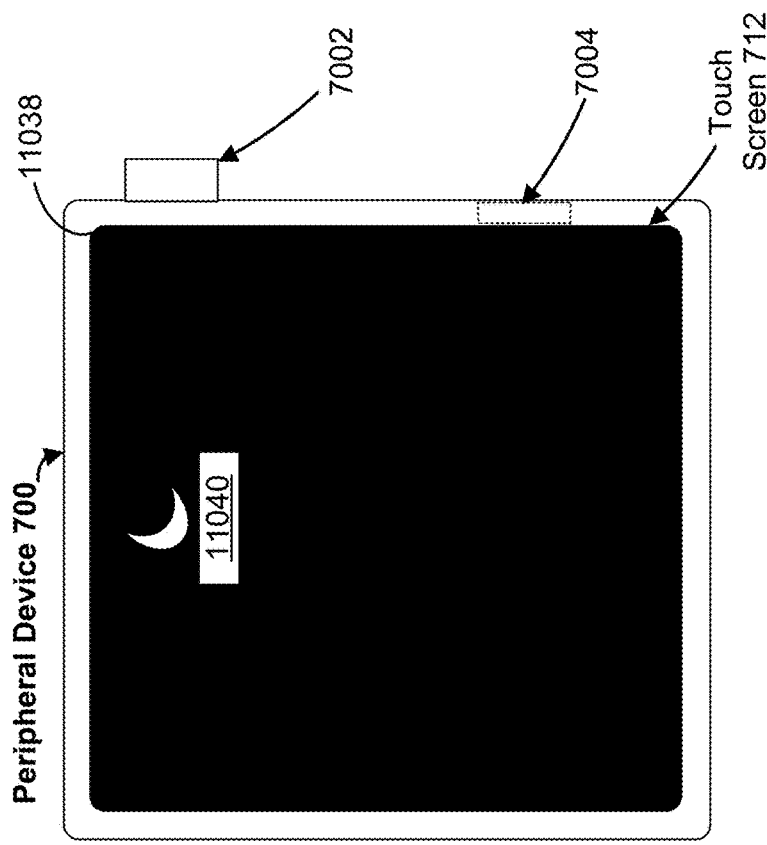

As shown in FIG. 11K, while the current time is during the sleep period and the device is operating in the sleep mode, with the display in the low-power mode, the device 700 has disabled a number of input mechanisms, including the touch-screen 712, the motion sensors to detect raising of the device, and the button 7004. In some embodiments, the press button on the input mechanism 7002 is also disabled. For example, the device 100 does not respond to any input detected on the disabled input mechanisms and/or treats different types of inputs that are normally differentiated using the disabled input mechanisms as the same type of input that triggers a fixed response. In some embodiments, the touch-sensitive display 712 wakes to the sleep screen 11034 (as shown in FIG. 11L) from the dark sleep screen 11038 (as shown in FIG. 11K) in response to any of the user inputs that normally wakes the device from the lower-power mode outside of the scheduled sleep period (e.g., tap input or swipe input by the contact 11002, raise input 11004, rotate (or press) input 11006, or press input 11008) and then returns to the dark sleep screen 11038 after a brief period of time. In some embodiments, the dark sleep screen 11034 remains unresponsive in response to user inputs (e.g., types of inputs for interacting with a regular wake screen 11010a as described in FIGS. 11C-11H) as long as the device 700 remains in the sleep mode, as shown in FIG. 11N (e.g., showing the dark sleep screen being maintained despite of the user inputs) following FIG. 11M (e.g., showing various inputs 11002, 11004, 11006, and 11008 that are detected when the dark sleep screen 11034 is displayed). In some embodiments, the touch screen 712 does not wake in response to any user input after the device 700 transitions to and remains in the sleep mode (e.g., once the dark sleep screen 11038 is displayed or once the screen is completely turned off). In some embodiments, repeated detection of the usual wake inputs cause the device 700 to transition from the dark sleep screen 11038 to the sleep screen 11042, or from a completely dark screen to the dark sleep screen 11038, during the sleep period.

FIGS. 11O-11T illustrate how to cause the device 700 to re-enable the disabled input mechanisms during the sleep mode (e.g., without exiting the sleep mode during the sleep period) in accordance with some embodiments. In some embodiments, a user input that meets a set of one or more predefined criteria allows the user to exit the mode where one or more input mechanisms are disabled. In some embodiments, the set of one or more predefined criteria (e.g., criteria that prevent accidental activation of the device 700) includes a requirement for a characteristic movement (e.g., rotation in a first direction by a first threshold number of turns, pressing consecutively a threshold number of times, etc.) of an input mechanism (e.g., a watch crown, a button, etc.) that is not disabled during the sleep mode. In some embodiments, the device 700 automatically re-enables the disabled input mechanisms once the end of the scheduled mode changes is reached (e.g., the end of the scheduled sleep time period is reached).

Figure 11M:
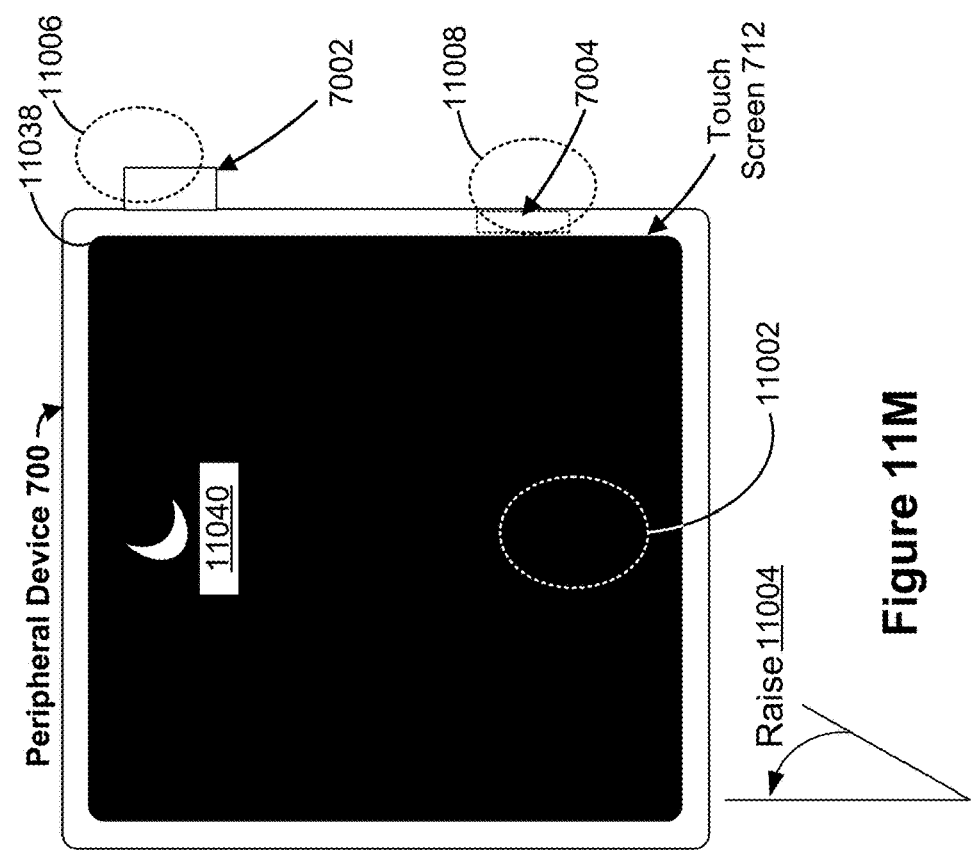
Figure 11P:
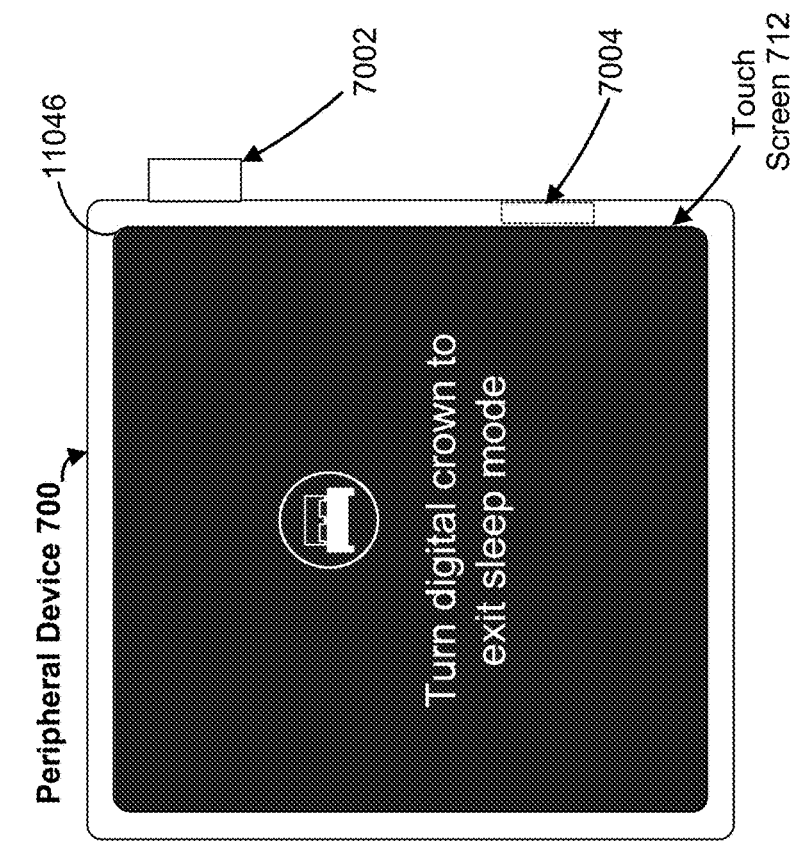
Figure 11O:
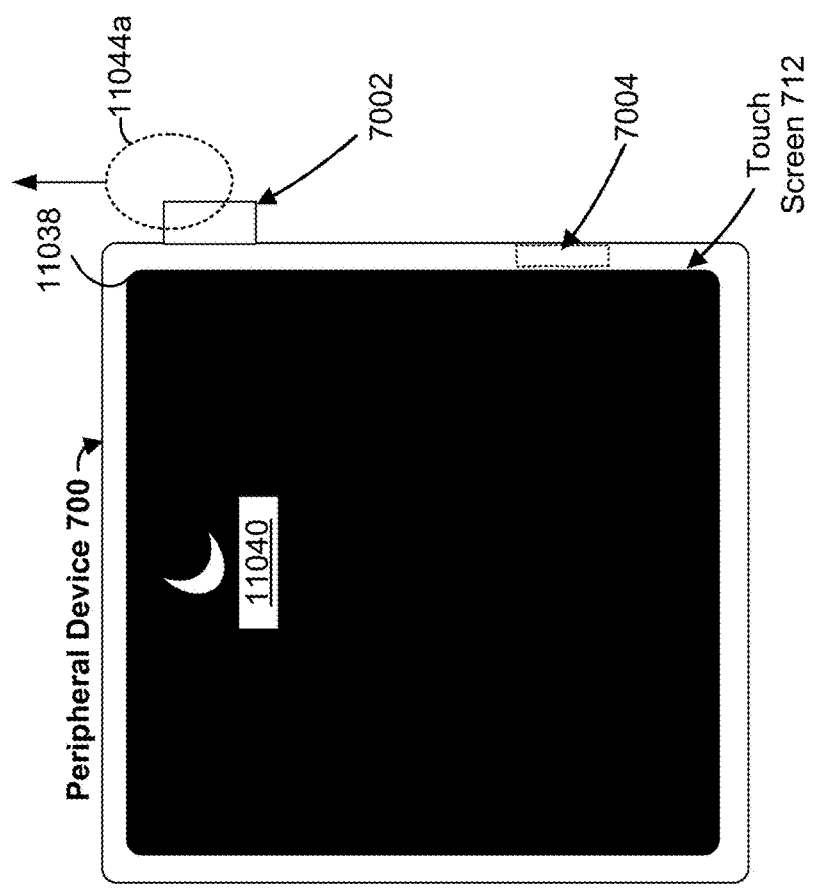
Figure 11Q:
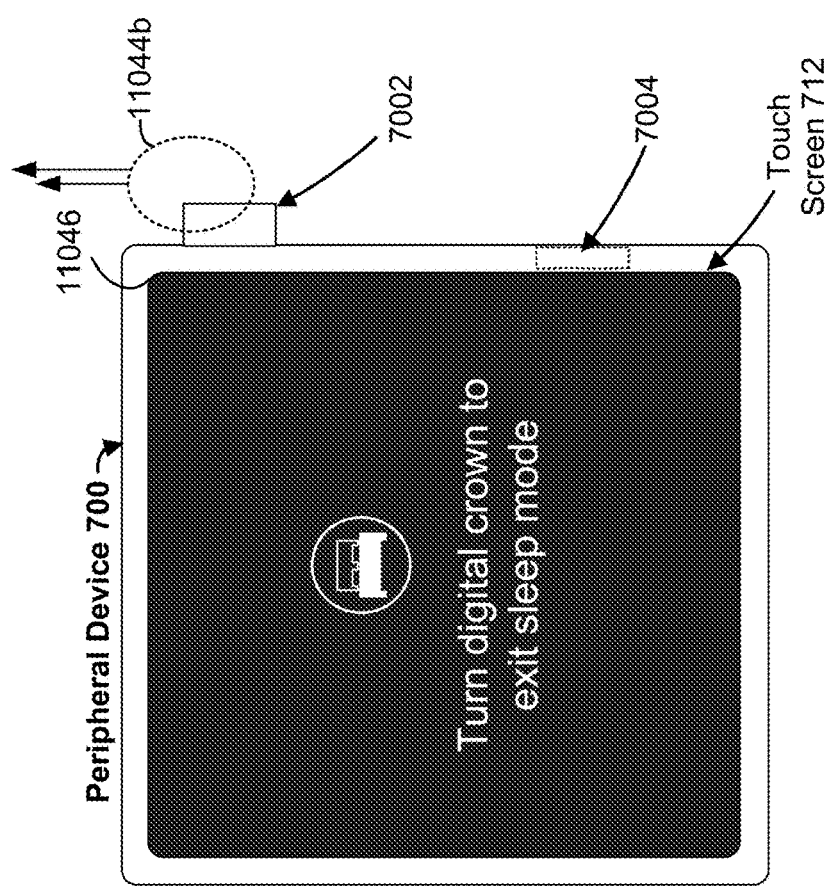
Figure 11R:
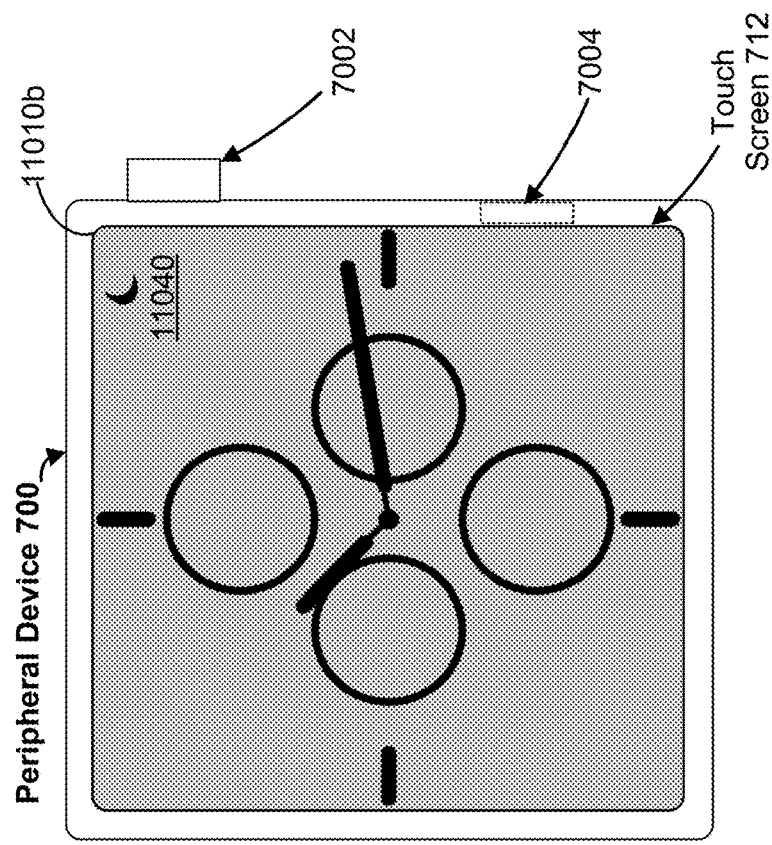
Figure 11T:
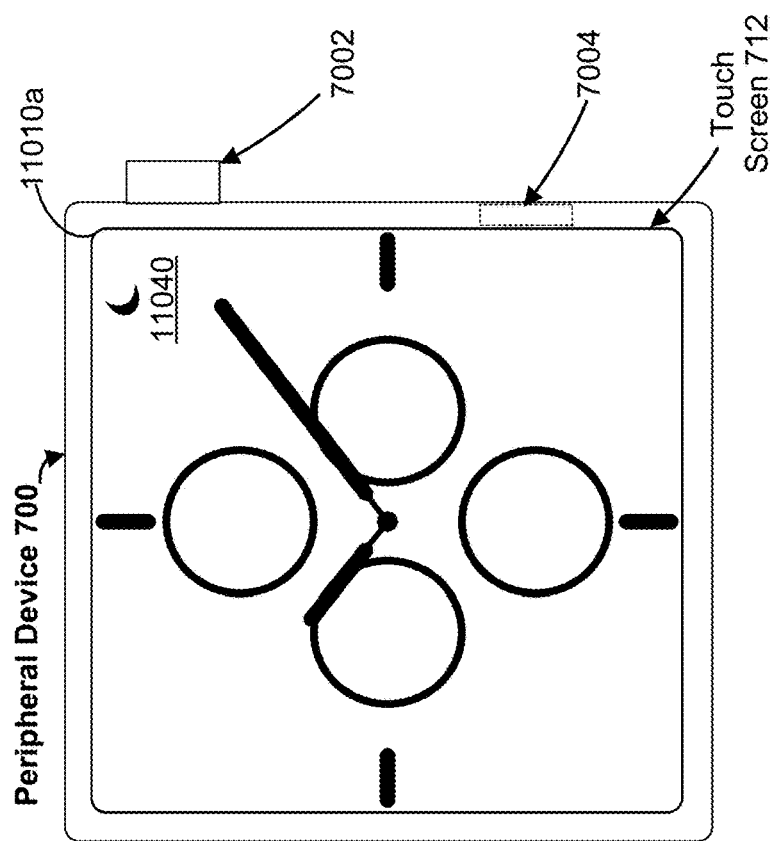
Figure 11S:
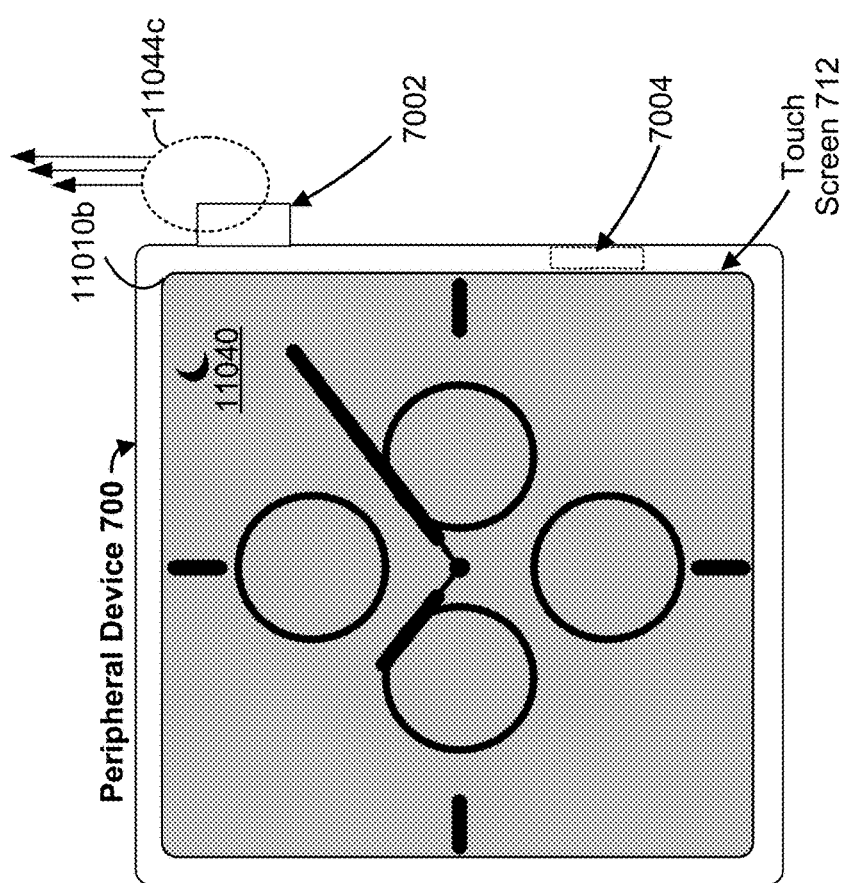

FIG. 11O illustrates that, while the dark sleep screen 11038 is displayed and the device 700 has disabled a plurality of input mechanisms that are normally used to wake the device and navigate past the wake screen user interface (e.g., the touch-screen 712, the buttons 7004 and press input on digital crown 11044a, etc.), in response to an initial input that is detected on the input mechanism that is not disabled during the sleep mode, the device 700 displays an instruction user interface 11046 in accordance with a determination that the input received by the input mechanisms that is not disabled during the sleep mode meets prompt criteria (e.g., turned in the correct direction, turned at least once, etc.) but not the criteria for enabling the disabled input mechanisms (e.g., but not enough number of turns, not fast enough, etc.). For example, in response to an initial portion 11044a of an input detected on the input mechanism 7002 that includes a partial rotation, or a rotation of one turn (as shown in FIG. 11O), the device 700 displays a prompt asking the user to keep turning the digital crown to exit the sleep mode (e.g., temporarily exit the sleep mode and re-enable the disabled input mechanisms before returning to the sleep mode, or terminate the sleep mode and re-enabled the disabled input mechanisms, etc.), as shown in FIG. 11P. The instruction user interface 11046 that provides an indication that the input mechanism 7002 is engaged optionally provides dynamic visual feedback that has a characteristic based on a current progress of the user input 11044 (e.g., speed, duration, number of repetitions, etc.). As shown in FIG. 11Q, after the instruction user interface 11046 is displayed, user input 11044 continues in accordance with the progress required for re-enabling the disabled input mechanism and waking the display to the normal display-on state. In some embodiments, as shown in FIG. 11R-11S, as the user input 11044 continues in accordance with the progress required for re-enabling the disabled input mechanisms and waking the display to the normal display-on state (e.g., showing the regular wake screen 11010a) (e.g., continued rotation of the digital crown is detected, and the number of turns and rotation speed meet the preset criteria), touch screen 712 is gradually lit-up showing a dimmed version 11010b of the regular wake screen 11010 (e.g., as shown in FIG. 11R). In FIG. 11S, as the touch-screen 712 is gradually lit-up to show a dimmed version 11010b of the regular wake screen 11010, the user input 11044 continues in accordance with the progress required for re-enabling the disabled input mechanisms and waking the display to the normal display-on state. In FIG. 11T, in accordance with a determination that the requirements are ultimately met by the user input 11044, the device displays the regular wake screen 11010a in the normal display-on state of the device 700. Once the input 11044 has met the criteria for turning on the display to the regular wake screen 11010 in the normal display-on mode, the device 700 also re-enables the disabled input mechanisms, and the user can operate the device 700 in the manner as described in FIGS. 11C-11H, and accompanying descriptions. Optionally, the device 700 terminates the sleep mode and allow the device to be woken in the manner described in FIGS. 11A-11B in accordance with some embodiments.

Figure 11V:
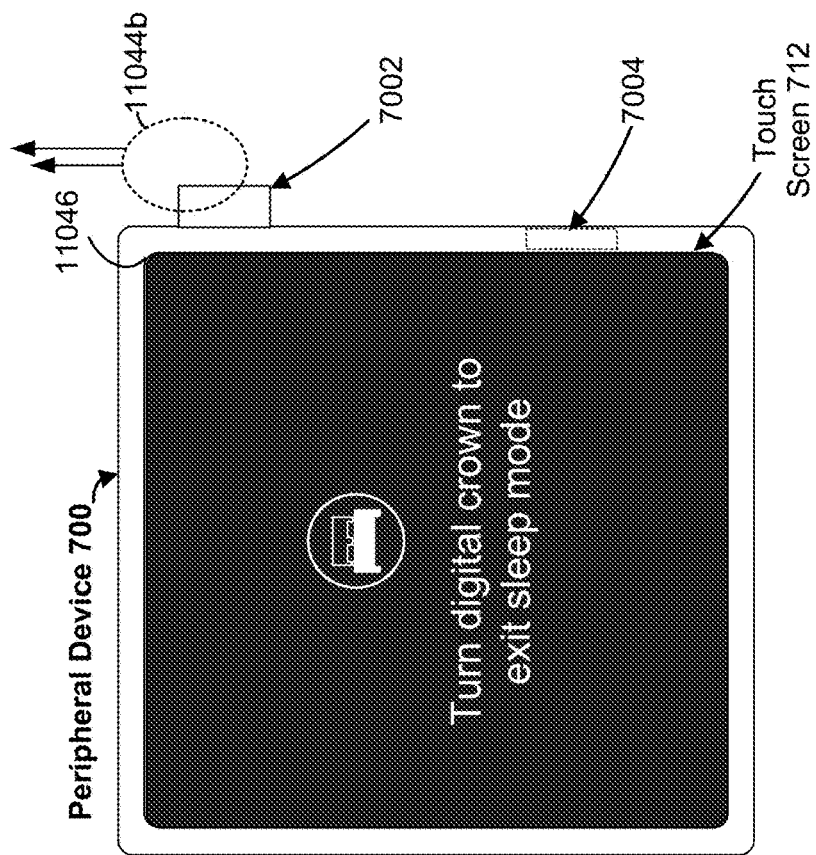
Figure 11U:
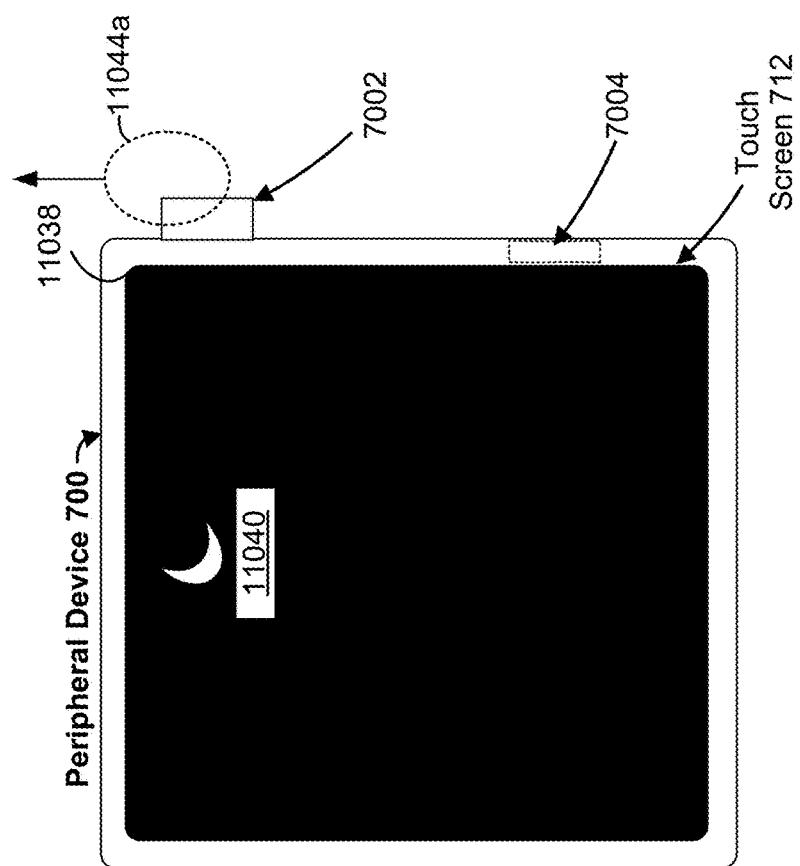
Figure 11X:
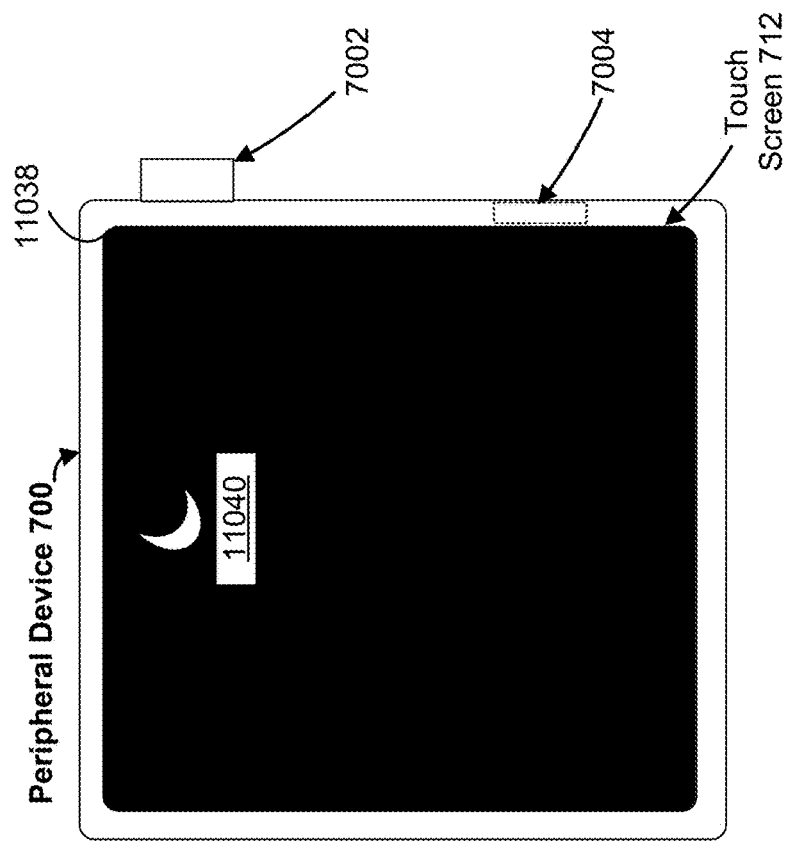
Figure 11W:
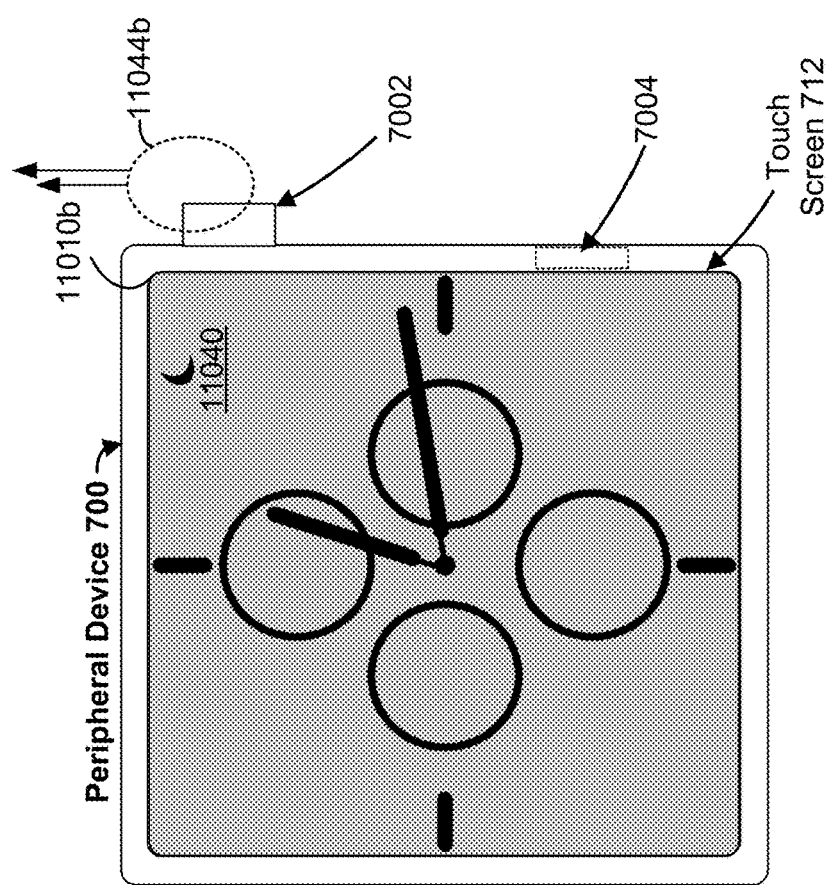

FIGS. 11U-11X illustrate that, if the input on the input mechanism 7002 does not fully meet (e.g., not enough number of turns, not fast enough, not continuous enough, etc.) the criteria for turning on the display to the normal display-on state and re-enabling the disabled input mechanisms, the device 700 returns to displaying the dark sleep screen 11046 and does not re-enable the disabled input mechanisms at the end of the input. FIGS. 11U-11W are analogous to FIGS. 11O-11R. In FIG. 11U, a user input 11044 is detected on the input mechanism 7002, while the dark sleep screen 11038 is displayed. In FIG. 11V, as the input mechanism 7002 is engaged by the input 11044 on the input mechanism 7002, the instruction user interface 11046 is displayed. In FIG. 11W, as the user input 11044 continues to progress according to the requirements for re-enabling the disabled input mechanisms and waking the display to the normal display-on state, the device displays a dimmed version 11010b of the regular wake screen. However, as shown in FIG. 11X, the input 11044 does not fully meet the criteria for exiting the mode in which the various input mechanisms are disabled and as a result, the device 700 redisplays the dark sleep screen 11038 at the termination of the input 11044, and the input mechanisms that were disabled remain disabled.

Figure 11Z:
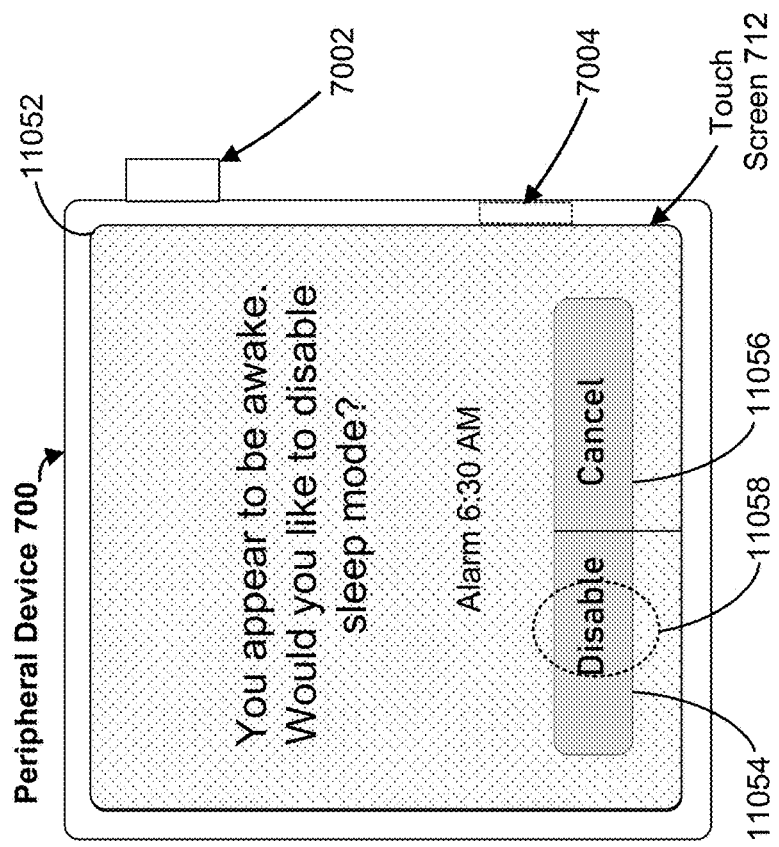
Figure 11Y:
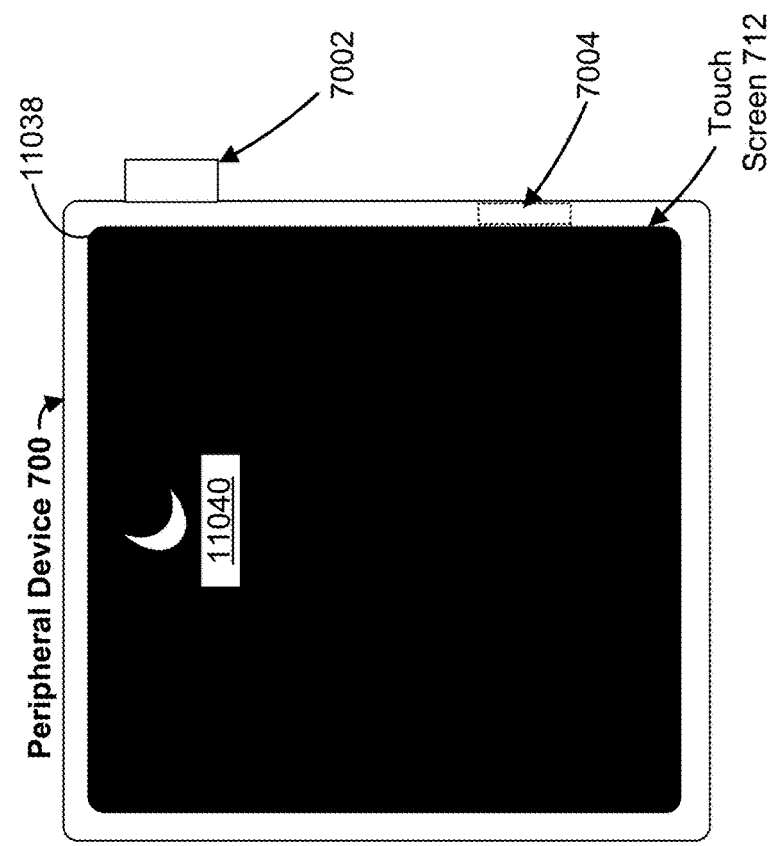
Figure 11A:
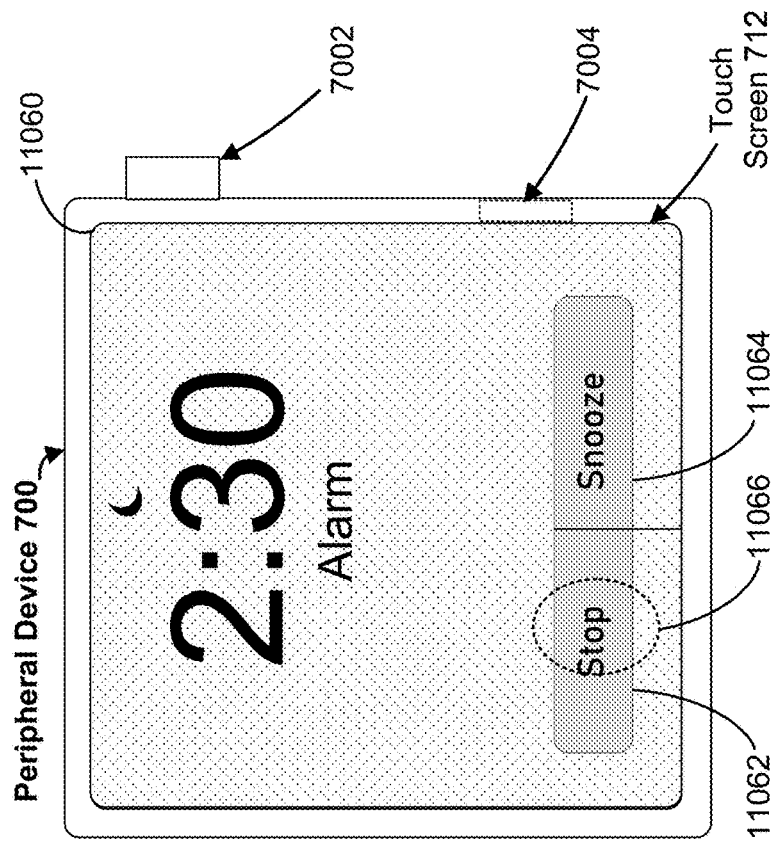
Figure 11A:
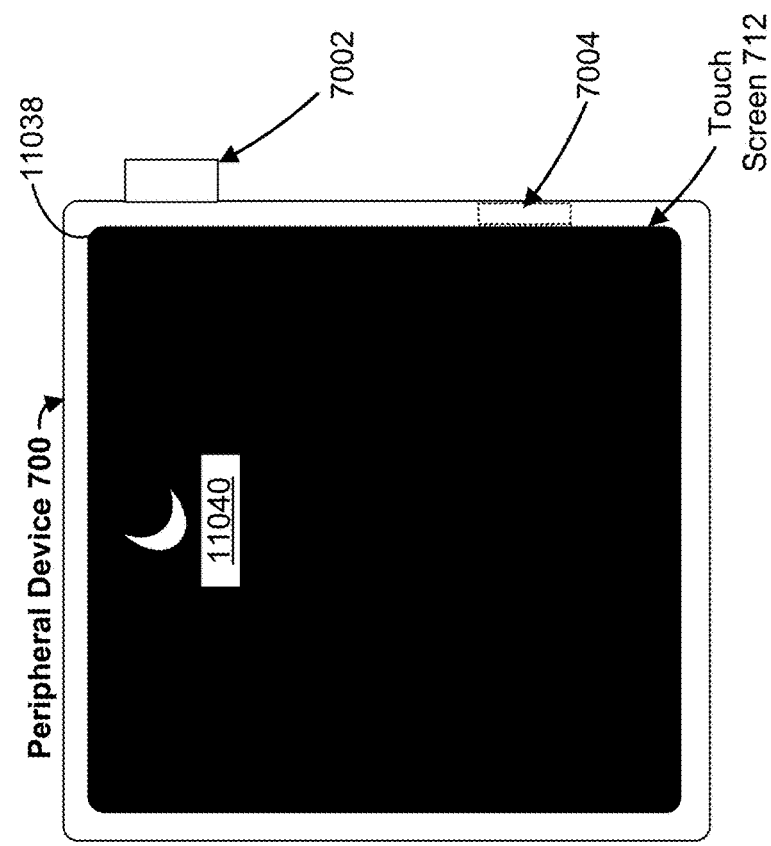
Figure 11A:
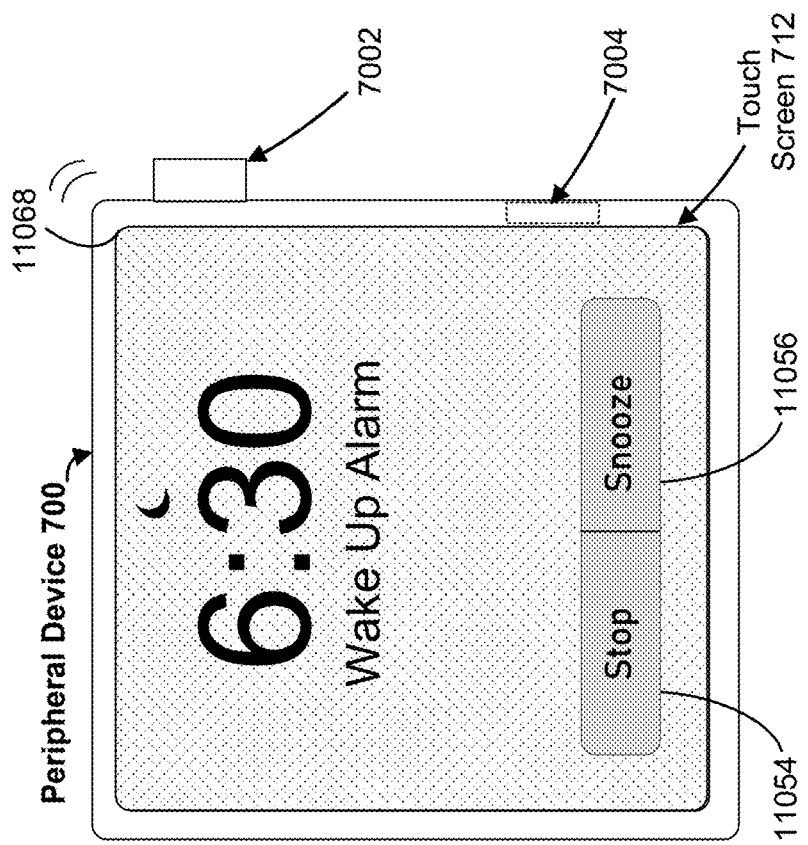
Figure 11A:
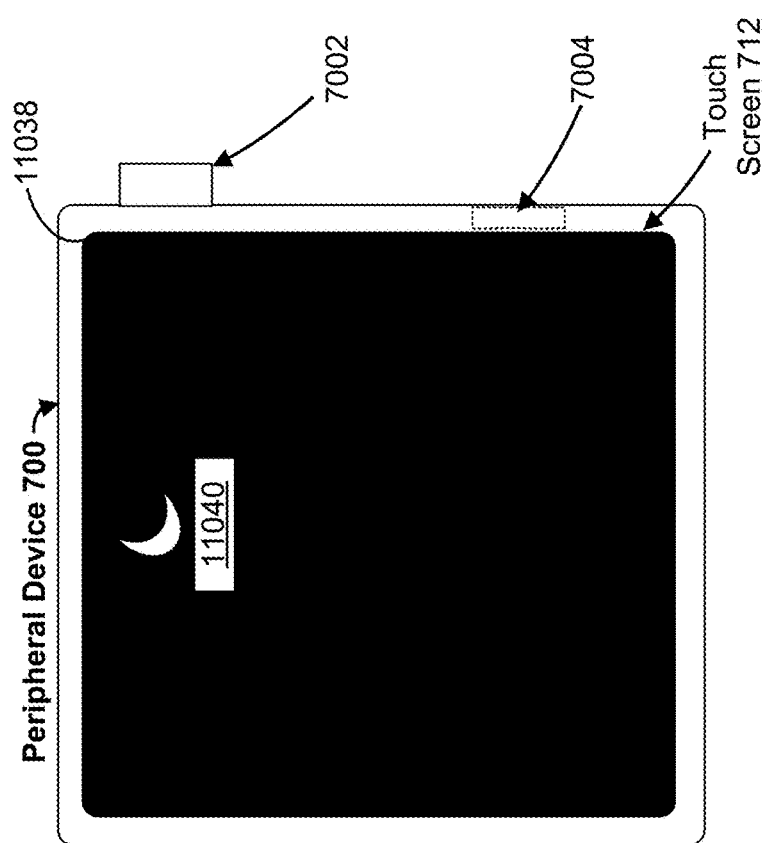
Figure 12A:
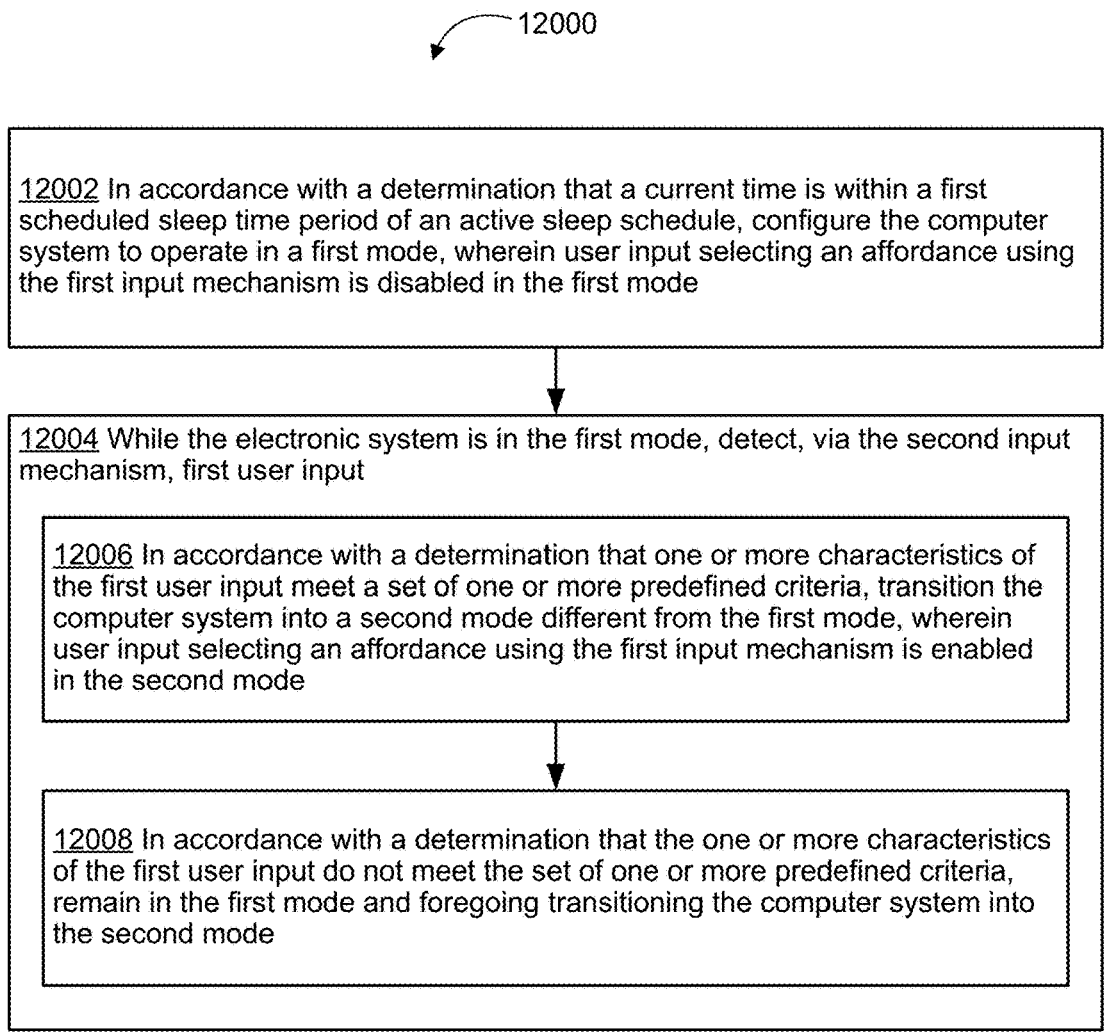

FIG. 11Y-11Z illustrate that, while in the sleep mode during the sleep period and while displaying the dark sleep screen 11038, the device 700 detects movement data that is indicative of the user being awake. In response to detecting the movement data and in accordance with a determination that the user is awake, the device 700 displays an early wake user interface 11052. In some embodiments, the early wake user interface 11052 displays a message indicating that the user appears to be awake, and prompting the user to manually terminate the sleep mode if so desired. In some embodiments, the early wake user interface 11052 includes a disable button 11054 and a cancel button 11056. In response to activation of the disable button 11054 (e.g., by a tap input by a contact 11058), the device dismisses the early wake user interface, terminates the sleep mode, and enters into the normal operation mode before the scheduled end time of the sleep period. If an alarm is set for the end of the sleep period, the alarm is canceled, in some embodiments. After exiting the sleep mode, the normal wake screen 11010a is displayed and the disabled input mechanisms are all re-enabled. If the cancel button 11056 is activated, the device 700 remains in the sleep mode and the dark sleep screen 11038 is redisplayed, and the disabled input mechanisms remain disabled until the end of the sleep period is reached and the device 700 exits the sleep mode automatically. In some embodiments, the early wake user interface 11052 is displayed in response to detecting a specific gesture. In some embodiments, the early wake user interface is displayed in response to detecting a specific gesture (e.g., a raise gesture) for a predetermined amount of time (e.g., 30 seconds). In some embodiments, the early wake user interface is displayed in response to detecting a user input that meets the set of one or more predefined criteria (e.g., the set of one or more predefined criteria described above with reference to FIGS. 11O-11T). In some embodiments, the early wake user interface 11052 is displayed in response to detecting a user input that meets a second set of one or more predefined criteria distinct (e.g., a set of one or more predefined criteria different from the set of one or more predefined criteria described above with reference to FIGS. 11O-11T).

FIGS. 11AA-11AB illustrate that, an alarm that is scheduled to go off during the sleep period of the active sleep schedule can break through the sleep mode and be displayed at the schedule alarm time, in accordance with some embodiments. While the dark sleep screen 11038 is displayed while the sleep mode is active during the scheduled sleep period (e.g., as shown in FIG. 11AA), in accordance with a determination that a preset alarm time (e.g., 2:30 AM) is reached, the device 700 replaces display of the dark sleep screen 11038 (e.g., in FIG. 11AA) with an alarm user interface 11060 and generates non-visual alarm output in conjunction with displaying the alarm user interface 11060, as shown in FIG. 11AB. Even though most notifications are suppressed during the sleep mode (e.g., due to the operation of the DND mode), preset alarms are still allowed to break through the sleep mode. In some embodiments, the alarm user interface 11060 includes a stop button 11062 and a snooze button 11064. The device 700 temporarily enables the touch screen to allow the user to input a selection of the buttons on the alarm user interface 11060/. For example, through a user input 11066 on the stop button 11062, the alarm output is stopped, and the device 700 optionally returns to sleep mode and redisplays the dark sleep screen 11038. In some embodiments, the sleep mode is terminated before its scheduled end time in response to the inputs on the alarm user interface. In some embodiments, in response to the user dismissing the alarm user interface 11060, the device enables the disabled input mechanisms for a preset time period without exiting the sleep mode.

FIGS. 11AC-11AF illustrates how the device 700 automatically exits the sleep mode and re-enables the disabled input mechanisms at the scheduled end time of the sleep period, in accordance with some embodiments. FIG. 11AC shows that the device displays the dark sleep screen 11038 prior to the scheduled end time of the sleep period. In FIG. 11AD, when the scheduled end time of the sleep period is reached, the device generates the alarm output for the wake alarm and replaces display of the dark sleep screen with display of an alarm user interface 11068. The device 700 also re-enables the disabled input mechanisms, e.g., at least the touch-screen 712, in accordance with some embodiments. In some embodiments, the alarm user interface 10068 includes a stop button 11054 and a snooze button 11056. FIG. 11AE illustrates that a user input 11058 is detected on the stop button 11054 and in response to the input, the device 700 dismisses the alarm user interface 11068 and displays the good morning screen 11070 that corresponds to a wind up period following the sleep period. In some embodiments, the good morning user interface 11070 includes a weather display component 11072 and a battery level display component 11074. In some embodiments, the good morning user interface 11070 includes other display components instead of, or in addition to, the two components shown in FIG. 11AF. The good morning user interface 11070 includes a dismiss button 11076 that, when activated, dismisses the good morning user interface 11070 and allows the user to interact with the device 700 in the normal operation mode (e.g., navigates to regular wake screen 11010*a* from which the user can interact with the device 700 using various input mechanisms that are re-enabled).

FIGS. 12A-12D are flowchart diagrams of a method 12000 of disabling and enabling an input mechanism of an electronic device during a scheduled restricted mode, in accordance with some embodiments.

This method relates to transitioning the computer system into a second mode in which the display is dark and unresponsive to normal waking inputs (e.g., various input mechanisms are disabled) or remaining in a first mode in which display can be woken using normal waking inputs, depending on whether the current time is during a sleep period of an active sleep schedule. While in the second mode during the sleep period, the disabled input mechanisms can be enabled if one or more characteristics of detected user input detected using a still-enabled input mechanism (e.g., digital crown of the watch) meet a set of one or more predefined criteria (e.g., rotation by at least a preset number of times, etc.). Transitioning the computer system into the second mode or remaining in the first mode, depending on the characteristics of the first user input prevents the computer system to be accidentally activated, promotes sleep tracking and reduce distraction from the computer system. Performing an operation when a set of conditions has been met without requiring further user input controls enhances the operability of the device, which, additionally, reduces power usage and improves battery life of the device by enabling the user to use the device more quickly and efficiently.

The method 12000 is performed at a computer system (e.g., a portable electronic device such as a mobile phone or tablet device, a wearable electronic device, such as a watch or bracelet, etc.) in communication with a first input mechanism and a second input mechanism. In some embodiments, the first input mechanism comprises a touch-sensitive display, and the second input mechanism comprises a mechanical input device, such as a dial, button, switch, etc. In some embodiments, the first input mechanism includes motion sensors and/or vibration sensors coupled to the computer system. In some embodiments, the computer system is also in communication with other input mechanisms different from the first and second input mechanisms. In accordance with a determination that a current time is within a first scheduled sleep time period of an active sleep schedule, the computer system configures (12002) the computer system to operate in a first mode (e.g., sleep mode, with DND turned on and screen turned off or shown with simplified user interface and reduced luminance, etc.), wherein user input selecting an affordance using the first input mechanism (e.g., because the touch-screen is dark and/or not displaying an activatable user interface object) is disabled in the first mode. While the electronic system is in the first mode, the computer system detects (12004), via the second input mechanism, first user input. In accordance with a determination that one or more characteristics of the first user input meet a set of one or more predefined criteria (e.g., the one or more characteristics of the input include a speed of a rotation, a duration of the rotation, a direction of the rotation, a magnitude of the rotation or a combination thereof), the computer system transitions (12006) the computer system into a second mode different from the first mode, wherein user input selecting an affordance using the first input mechanism is enabled in the second mode; and in accordance with a determination that the one or more characteristics of the first user input do not meet the set of one or more predefined criteria, the computer system remains (12008) in the first mode and foregoes transitioning the computer system into the second mode.

In some embodiments, configuring the computer system to operate in the first mode includes (12010) at least partially disabling multiple input mechanisms in communication with the computer system, except the second input mechanism. In some embodiments, the computer system is in communication with the touch sensors coupled to the display, motion sensors enclosed in the housing, and optionally, activation sensors coupled to hardware or solid state buttons on the housing. In some embodiments, in the second mode, the computer system is configured to detect and disambiguate different types of touch inputs (e.g., tap, double tap, long press, hard press, upward swipe, downward swipe, leftward swipe, rightward swipe, fast swipe, slow swipe, edge swipe from a first edge, edge swipe from a second edge, etc.) detected by the touch sensors, while in the first mode, the computer system does not perform touch gesture recognition to disambiguate the different types of touch inputs. The computer system optionally recognizes that touch inputs have been detected by the touch sensors, but do not respond to the touch inputs in different ways based on the different input types as it does in the second mode. In some embodiments, in the second mode, a single tap input wakes the display of the computer system, but in the first mode, a threshold number of touch inputs is required to wake the display to show a prompt about the required input to unlock the device. In some embodiments, motion detected by the motion sensors cause the computer system to wake the device in the second mode, but the same motion detected by the motion sensors do not wake the device when the device is in the first mode. In some embodiments, different types of inputs on the buttons on the housing of the computer system are recognized and used to cause different operations to be performed in the second mode. In the first mode, the computer system does not disambiguate the different types of inputs on the buttons, and activation of the buttons in any matter causes display of the prompt regarding the required input to unlock the device. In some embodiments, the touch-sensitive display does not wake in response to any user input after the computer system transitions to the first mode (e.g., the display remains dark unless the digital crown is turned). Partially disabling multiple input mechanisms in communication with the computer system, except the second input mechanism, when the computer system operates in the first mode, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently.

In some embodiments, configuring the computer system to operate in the first mode includes (12012) maintaining a display generation component of the computer system (e.g., a touch-sensitive display, an LED display, etc.) in an inactive or low power state while the computer system remains in the first mode. In some embodiments, the touch-sensitive display wakes to a dim low power state from a dark state in response to the first user input after the computer system transitions to the first mode, then remains dim in response to subsequent user inputs as long as the computer system remains in the first mode. In some embodiments, the touch-sensitive display does not wake in response to any user input after the computer system transitions to and remains in the first mode. In some embodiments, dimming the touch-sensitive display includes turning the touch-sensitive display off completely. In some embodiments, the low power state has reduced luminance, and simplified appearance with fewer user interface objects, as compared to the normal appearance of the display in the second mode. In some embodiments, inactive state is completely dark. In some embodiments, the low power state and the inactive state of the display in the first mode are not responsive to different types of touch gestures in different manners as it would in the second mode. This is shown in FIGS. 11M-11N, for example, where the computer system (e.g., the peripheral device 700) maintains a display generation component in an inactive or low power state (e.g., the dark state user interface 11038) while the computer system remains in the first mode (e.g., in response to detecting user inputs shown in FIG. 11M). Maintaining the display generation component of the computer system in the active or low power state while the computer system remains in the first mode performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently.

In some embodiments, the set of one or more predefined criteria (e.g., criteria that prevent accidental activation of the computer system) includes (12014) a requirement for a characteristic movement (e.g., rotation in a first direction by a first threshold number of turns, pressing consecutively a threshold number of times, etc.) of the second input mechanism (e.g., a watch crown, a button, etc.). In some embodiments, the requirement for the characteristic movement of the second input mechanism includes one or more of a required speed of the movement, a required duration of the movement, a required magnitude of the movement, a required movement pattern of the movement, a required quantity of a repeated movement, etc. This is shown in FIGS. 11O-11T, for example, where the set of one or more predefined criteria includes a requirement for a characteristic movement (e.g., rotation of the mechanism 7002 by the user input 10044a-c). Requiring the characteristic movement of the second input mechanism to meet the set of one or more predefined criteria provides improved gesture for performing an operation, which reduces the number of inputs needed to perform an operation enhances the operability of the device, which, additionally, reduces power usage and improves battery life of the device by enabling the user to use the device more quickly and efficiently.

In some embodiments, while detecting, via the second input mechanism, the first user input, in accordance with a determination that a current progress of the first user input at least partially meets the set of one or more predefined criteria (e.g., turning in the correct direction, but not yet enough number of turns; the correct type of movement, but not yet enough magnitude, etc.), the computer system outputs (12016) (e.g., displaying) an indication (e.g., static visual feedback, dynamic visual feedback that has a characteristic that is based on a current progress of the first user input (e.g., speed, duration, number of repetitions, etc.), etc.) (e.g., a haptic) that the second input mechanism is engaged on a display generation component in communication with the computer system. In some embodiments, the indication that the second input mechanism is engaged includes instructions regarding the set of the one or more predefined criteria that must be met to transition to the second state (e.g., the speed of a rotation, the direction of the rotation, the magnitude of the rotation, or a combination thereof). In some embodiments, the visual brightness of the indication scales with the characteristic of the first user input. For example, the indication optionally increases in brightness as the magnitude or number of repetitions of the rotation increases. This is shown in FIG. 11P, for example, where in accordance with a determination that a current progress of the first user input (e.g., user input 11044a) at least partially meets the set of one or more predefined criteria, (e.g., turning the second mechanism in the correct direction, but not yet reaching the required number of turns; the correct type of movement, but at a lesser magnitude, etc.), the computer system outputs an indication (e.g., the instruction user interface 11046) that the second input mechanism is engaged. Outputting an indication that the second input mechanism is engaged on the display generation component in communication with the computer system, while detecting the first input and in accordance with the determination that the current progress of the first user input at least partially meets the set of one or more predefined criteria, provides improved visual feedback to the user. Providing improved visual feedback enhances the operability of the device and makes the user-device interface more efficient, which, additionally, reduces power usage and improves battery life of the device by enabling the user to use the device more quickly and efficiently.

In some embodiments, the computer system detects (12018) termination of the first user input. In response to detecting the termination of the first user input, in accordance with a determination that the one or more characteristics of the first user input do not meet the set of one or more predefined criteria, the computer system ceases to output the indication that the second input mechanism is engaged on the display generation component (and remaining in the first mode). In some embodiments, the computer system ceases to display the indication that the second input mechanism is engaged in accordance with a determination that that the one or more characteristics of the first user input do not meet the set of one or more predefined criteria within a predetermined time period (e.g., even if the first input is ongoing or still detected). This is shown in FIGS. 11U-11X, for example, where the computer system (e.g., the peripheral device 700) detects termination of the first user input (e.g., the user input 11044) and in response, ceases to output the indication that the second input mechanism is engaged (e.g., ceasing to display the instruction user interface 11046 in FIG. 11V). Ceasing to output the indication that the second input mechanism is engaged on the display generation component, in response to detecting the termination of the first user input and in accordance with the determination that the one or more characteristics of the first user input do not meet the set of the one or more predefined criteria, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently.

In some embodiments, transitioning the computer system into the second mode (e.g., because the one or more predefined criteria have been met by the first user input (e.g., before or upon termination of the first user input)) includes (12020) outputting (e.g., displaying, on the touch-sensitive display) an indication that the computer system has transitioned into the second mode (e.g., and/or that the first user input, detected via the second input mechanism, has met the set of one or more predefined criteria) (e.g., a haptic). Outputting the indication that the computer has transitioned in the second mode as the computer system transitions into the second mode provides improved visual feedback to the user. Providing improved visual feedback enhances the operability of the device and makes the user-device interface more efficient, which, additionally, reduces power usage and improves battery life of the device by enabling the user to use the device more quickly and efficiently.

In some embodiments, in accordance with a determination that the current time is within a first scheduled sleep time period of an active sleep schedule and that one or more relocking criteria are met (e.g., no further user inputs are received during a preset period of time), the computer system transitions (12022) the computer system (back) into the first mode. During the scheduled sleep time period, the first mode is "sticky," in that the computer system will return to the first mode if relocking criteria are met. For example, if the first mode is a sleep mode, and the second mode is a normal mode of operation, then the user may transition the computer system from the sleep mode to the normal mode (e.g., by turning the watch crown). However, if relocking criteria are met (e.g., the user goes back to sleep, and so no further user inputs are received during a preset period of time) during the scheduled sleep time period, the computer system transitions back to the sleep mode. Subsequently, the user must perform another user input that meets the set of one or more predefined criteria (e.g., turning the watch crown again) in order to transition to the normal mode. Transitioning the computer system into the first mode, in accordance with the determination that the current time is within the first scheduled sleep time period of the active sleep schedule and one or more relocking criteria are met, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently.

In some embodiments, in accordance with a determination that the current time is within a preset time period preceding the first scheduled sleep time period of the active sleep schedule (e.g., the preset time period is a wind down period before the first scheduled sleep time period, the preset time period is a period of time that starts before the start of the wind down period and ends before the start of the first scheduled sleep time period (e.g., the preset time period starts 10 minutes before the start of the wind down period, and ends 10 minutes before the start of the first scheduled sleep time period), etc.), the computer system displays (12024) a reminder to charge the computer system (and/or to charge a companion device of the computer system). In some embodiments, the reminder to charge the computer system (and/or to charge a companion device of the computer system) is displayed in accordance with a determination that the charge level of the computer system (or the companion device) is below a first preset threshold value (e.g., a fixed (e.g., 30%) battery power, or a dynamically determined threshold battery level, etc.). In some embodiments, the computer system does not display the reminder to charge the computer system if the charge level drops below the first preset threshold value within a short time immediate preceding the first scheduled sleep time period of the active sleep schedule (e.g., there is a gap (e.g., 10 minutes, 20 minutes, etc.) between the preset time period preceding the first scheduled sleep time period and the first scheduled sleep time period). This prevents the reminder from creating unnecessary stress by not displaying when there is minimal time remaining to charge the computer system before the schedule sleep time. In some embodiments, at the start of the preset time period preceding the first scheduled sleep time period, the computer system displays a notification indicating that the wind down period is about to start, and optionally a reminder for the user to charge the computer system or its companion device. In some embodiments, a reminder screen is displayed instead of the notification, and the reminder screen serves as a screen-lock user interface and has to be dismissed with a predefined input in order for the wind down screen to be displayed. This is shown in FIG. 7C, for example, where the current time is within a preset time period (e.g., one hour) preceding the first scheduled sleep time period (e.g., the bedtime) and the computer system (e.g., the peripheral device 700) displays a reminder to charge the computer system (e.g., the charging reminder 7013). Displaying the reminder to charge the computer system, in accordance with the determination that the current time is within the preset time period preceding the first scheduled sleep time period of the active sleep schedule, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently.

In some embodiments, while the computer system (e.g., watch) is in the first mode, and in accordance with a determination that the current time is an end time of the first scheduled sleep time period of the active sleep schedule, the computer system generates (12026) an alarm output (e.g., an audio output, a tactile output, and/or a visual output, etc.) indicating that the end time of the first scheduled sleep time period has been reached, wherein another alarm output indicating that the end time of the first scheduled sleep time period has been reached is provided on a companion device (e.g., mobile phone or tablet device) of the computer system with a delayed relative to the alarm output generated at the computer system. In some embodiments, in response to dismissing an alarm indication (e.g., turning the alarm off), the computer system transitions into the second mode (e.g., exiting the sleep mode). This is shown in FIGS. 7H-7I, for example, where the computer system (e.g., the peripheral device 700) is in the first mode (e.g., the sleep mode) and generates an alarm output (e.g., the alarm screen 7030 in FIG. 7H) and another alarm is provided on a companion device (e.g., the portable multifunction device 100 in FIG. 7I) delayed relative to the alarm output generated at the computer system. Generating the alarm output indicating that the end of time of the first scheduled sleep time period has been reached, in accordance with the determination that the current time is the end time of the first scheduled sleep time period of the active sleep schedule and the computer system is in the first mode, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently.

In some embodiments, activating a snooze function associated with the alarm output on either one of the computer system and the companion device causes (12028) a snooze function for the other of the computer system and the companion device. This is shown in FIG. 7I, for example, where activating the snooze button 7034 on the peripheral device 700 causes a snooze function for the portable multifunction device 100. Causing the snooze function for the other of the computer system and the companion device, when activating the snooze function associated with the alarm output on either one of the computer system and the companion device, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently.

In some embodiments, dismissing the alarm output on either one of the computer system and the companion device causes (12030) dismissal of the alarm output on the other of the computer system and the companion device. This is shown in FIG. 7I-7J, for example, where activating the stop button 7032 on the peripheral device 700 causes a dismissal of the alarm output of the portable multifunction device 100. Causes the dismissal of the alarm output on the other of the computer system and the companion, when dismissing the alarm output on either one of the computer system and the companion device, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently.

In some embodiments, if the alarm output on either one of the computer system and the companion device is not generated due to low battery level at said one of the computer system and the companion device, the alarm output is (12032) still generated at the other of the computer system and the companion device. Generating the alarm output at the other of the computer system and the companion device, despite one of the computer system and the companion device is in low battery level and fails to generate an alarm output, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently.

In some embodiments, if the computer system ceases to be coupled to the companion device before the end time of the first scheduled sleep time period is reached, the alarm output is (12034) generated at the companion device without the delay. Generating the alarm output at the companion device without the delay if the computer system ceases to be coupled to the companion device before the end time of the first scheduled sleep time period is reached, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently.

In some embodiments, in accordance with a determination that the current time is after an end time of the first scheduled sleep time period of the active sleep schedule and that the computer system has transitioned into the second mode (e.g., in response to the user dismissing the alarm output that was generated in response to reaching the end of the first scheduled sleep time period, and/or in response to the user dismissing the good morning screen after dismissing the alarm output, etc.), the computer system displays (12036) a reminder for charging the computer system (e.g., displaying a current battery level and/or a reminder to charge the computer system). This is shown in FIG. 11AF, for example, where the current time is after an end time of the first scheduled sleep time period (e.g., alarm at 6:30) and the computer system (e.g., the peripheral device 700) displays a reminder for charging the computer system (e.g., the battery level display component 11074). Displaying the reminder for charging the computer system, in accordance with the determination that the current time is after the end time of the first scheduled sleep time period of the active sleep schedule and that the computer system has transitioned into the second mode, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently.

In some embodiments, in accordance with a determination that the current time is after an end time of the first scheduled sleep time period of the active sleep schedule and that the computer system has transitioned into the second mode (e.g., in response to the user dismissing the alarm output that was generated in response to reaching the end of the first scheduled sleep time period, and/or in response to the user dismissing the good morning screen after dismissing the alarm output, etc.), the computer system displays (12038) one or more notifications based on recorded sleep data for multiple consecutive days of the active sleep schedule that indicate satisfaction of a preset sleep goal. In some embodiments, the coaching notifications provide positive feedback (e.g., meeting certain sleep-related goals) only, and does not provide the notification if the sleep goals are not met on consecutive number of days. In some embodiments, the coaching notifications provide areas and suggestions for improvement. In some embodiments, the coaching notifications are based on stored data relating to the active sleep schedule (e.g., number of days a user has successfully adhered to the active sleep schedule, whether the user has consistently gone to bed on or before the scheduled sleep time period, whether the user has skipped wind down periods, etc.). This is shown in FIG. 5T, for example, where the computer system (e.g., the portable multifunction device 700) displays one or more notifications based on recorded sleep data for multiple consecutive days (e.g., the weekly summary data 5108 that describes meeting the sleep goal for five of the last seven days). Displaying the one or more notifications based on recorded sleep data for multiple consecutive days of the active sleep schedule, in accordance with the determination that the current time is after the end time of the first scheduled sleep time period and the computer system has transitioned into the second mode, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently.

In some embodiments: in accordance with a determination that the current time is after an end time of the first scheduled sleep time period of the active sleep schedule and that the computer system has transitioned into the second mode (e.g., in response to the user dismissing the alarm output that was generated in response to reaching the end of the first scheduled sleep time period, and/or in response to the user dismissing the good morning screen after dismissing the alarm output, etc.), the computer system displays (12040) one or more notifications based on recorded sleep data for the previous day that indicate satisfaction of a preset sleep goal. This is shown in FIG. 5R, for example, where the computer system (e.g., the portable multifunction device) displays one or more notifications based on recorded sleep data for the previous day that indicate satisfaction of a preset sleep goal (e.g., the notification 5098). Displaying the one or more notifications based on recorded sleep data for the previous day that indicate satisfaction of a preset sleep goal, in accordance with the determination that the current time is after the end time of the first scheduled sleep time period and that the computer system has transitioned into the second mode, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently.

In some embodiments, configuring the computer system to operate in the first mode includes (12042) maintaining a Do Not Disturb mode of the computer system and displaying, on a display generation component in communication with the computer system, a visual indicator of the Do Not Disturb mode (e.g., a DND indicator). This is shown in FIG. 11M, for example, where the computer system displays a visual indicator of the Do Not Disturb mode (e.g., the DND indicator 11040). Maintaining the Do Not Disturb mode of the computer system and displaying the visual indicator of the Do Not Disturb mode on the display generation component in communication with the computer system, when the computer system is operating in the first mode, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently.

In some embodiments, the computer system detects (12044) inputs indicative of an activity level of a user of the computer system during the first scheduled sleep time period of the active sleep schedule. In accordance with a determination that the inputs correspond to a wake state of the user, and that the current time is before an end time of the first scheduled sleep time period of the active sleep schedule, the computer system displays a user interface through which selecting an affordance using the first input mechanism is temporarily enabled, wherein the user interface provides a first affordance, when activated through the first input mechanism, preemptively cancels an alarm output (e.g., an audio output, a tactile output, and/or a visual output, etc.) scheduled to go off at the end time of the first scheduled sleep time period. In some embodiments, the computer system detects an input that activates the first affordance using the first input mechanism, and forgoes generating the alarm output when the end time of the first scheduled sleep time period is reached. In some embodiments, the computer system, in response to detecting the input that activates the first affordance using the first input mechanism, transitioning into the second mode before the end time of the first scheduled sleep time period is reached. This is shown in FIG. 11Z, for example, where the computer system (e.g., the peripheral device 700) detects inputs indicative of an activity level of a user and provides the first affordance (e.g., the early wake user interface 11052) that, when activated through the first input mechanism (e.g., the disable button 11054), preemptively cancels an alarm output scheduled to go off at the end time of the first scheduled sleep time period. Preemptively canceling the alarm output scheduled to go off at the end time of the first scheduled sleep time period, when activating the first accordance through the first input mechanism, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently.

In some embodiments, the user interface provides (12046) a second affordance, when activated through the first input mechanism, dismisses the user interface without canceling the alarm output scheduled to go off at the end time of the first scheduled sleep time period. In some embodiments, the computer system detects an input that activates the second affordance using the first input mechanism, and returns to the first mode, forgoes transitioning into the second mode before the end time of the first scheduled sleep time period. In some embodiments, the computer system generates the alarm output when the end time of the first scheduled sleep time period is reached. In some embodiments, if no input is received through the user interface within the threshold amount of time since display of the user interface, the computer system ceases to display the user interface and disables the first input mechanism. This is shown in FIG. 11Z, for example, where the second affordance (e.g., the cancel button 11056), when activated, dismisses the user interface (e.g., the early wake user interface 10052) without canceling the alarm output scheduled to go off at the end time of the first scheduled sleep time period. Dismissing the user interface without canceling the alarm output scheduled to go off at the end time of the first scheduled sleep time period, when activating the second affordance through the first input mechanism, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently.

Note that details of the processes described above with respect to each of methods 6000, 8000, 10000, and 12000 are also applicable in an analogous manner to the other methods described below/above. For example, method 6000 optionally includes one or more of the characteristics of the various methods described above with reference to method 8000, 10000, and 12000. For example, the sleep schedules, sleep periods, wind down periods, wind up periods, wake times, alarms, wind down screens, sleep screens, good morning screens, restricted modes, low-power modes, wake screens, input mechanisms, etc. share similar characteristics in the different methods 6000, 8000, 10000, 12000, in various embodiments, unless otherwise specified. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information, etc.), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

What is claimed is:

1. A method, comprising:
at a first computer system in communication with a display generation component:
in accordance with a determination that a current time is within a first preset time period preceding a scheduled mode change and in accordance with a determination that a first battery level is below a first preset battery level, displaying, via the display generation component, a reminder for increasing the first battery level above the first preset battery level;
in accordance with a determination that the current time is within a third time period that precedes the first preset time period preceding the scheduled mode change, wherein the third time period is outside of the scheduled mode change, and in accordance with a determination that the first battery level is below the first preset battery level, forgoing display of the reminder for increasing the first battery level above the first preset battery level; and
in accordance with a determination that the current time is within a second preset time period that is between the first preset time period and the scheduled mode change, in accordance with a determination that the first battery level is below the first preset battery level, and in accordance with a determination that there is insufficient time to increase the first battery level above the first preset battery level before the start of the scheduled mode change, forgoing display of the reminder for increasing the first battery level above the first preset battery level.

2. The method of claim 1, including:
in accordance with a determination that the current time is within the scheduled mode change and in accordance with a determination that a second battery level is below a second preset battery level, forgoing displaying the reminder for increasing the second battery level above the second preset battery level.

3. The method of claim 1, wherein a start time of the scheduled mode change is adjustable.

4. The method of claim 1, wherein the reminder for increasing the first battery level above the first preset battery level is displayed concurrently with a reminder that the scheduled mode change is about to start.

5. The method of claim 4, wherein the reminder for increasing the first battery level above the first preset battery level is displayed concurrently with a reminder that the scheduled mode change is about to start on a first user interface that corresponds to a restricted state of the first computer system, and the method includes:
while displaying the first user interface that corresponds to the restricted state of the first computer system, detecting a first user input directed to the first user interface; and
in response to detecting the first user input directed to the first user interface:
in accordance with a determination that the first user input meets first criteria, replacing display of the first user interface with a second user interface that corresponds to the restricted state of the first computer system, wherein the second user interface is different from the first user interface.

6. The method of claim 4, wherein the reminder for increasing the first battery level and the reminder that the scheduled mode change is about to start are displayed, via the display generation component, in a notification that overlays a first user interface that corresponds to a restricted state of the first computer system.

7. The method of claim 1, wherein the first battery level is a battery level of a second computer system distinct from the first computer system, and wherein the first computer system displays the reminder for increasing the first battery level above the first preset battery level in a user interface that corresponds to a restricted mode of the first computer system.

8. The method of claim 1, including:
at a time after displaying the reminder, in accordance with a determination that the current time is within the first preset time period preceding the scheduled mode change and in accordance with a determination that a third battery level is at or above a third preset battery level, displaying, via the display generation component, a notification of the third battery level.

9. The method of claim 1, wherein the first computer system is paired with a second computer system, the first battery level is a battery level of the second computer system, and the method includes:
at a time after displaying the reminder, in accordance with a determination that a fourth battery level of the second computer system is at or above a fourth preset battery level, displaying, via the display generation component, a notification of the fourth battery level.

10. An electronic device, comprising:
a display generation component;
one or more input devices;
one or more processors; and
memory storing one or more programs, wherein the one or more programs are configured to be executed by the one or more processors, the one or more programs including instructions for:
in accordance with a determination that a current time is within a first preset time period preceding a scheduled mode change and in accordance with a determination that a first battery level is below a first preset battery level, displaying, via the display generation component, a reminder for increasing the first battery level above the first preset battery level;
in accordance with a determination that the current time is within a third time period that precedes the first preset time period preceding the scheduled mode change, wherein the third time period is outside of the scheduled mode change, and in accordance with a determination that the first battery level is below the first preset battery level, forgoing display of the reminder for increasing the first battery level above the first preset battery level; and in accordance with a determination that the current time is within a second preset time period that is between the first preset time period and the scheduled mode change, in accordance with a determination that the first battery level is below the first preset battery level, and in accordance with a determination that there is insufficient time to increase the first battery level above the first preset battery level before the start of the scheduled mode change, forgoing display of the reminder for increasing the first battery level above the first preset battery level.

11. The electronic device of claim 10, the one or more programs including instructions for:

in accordance with a determination that the current time is within the scheduled mode change and in accordance with a determination that a second battery level is below a second preset battery level, forgoing displaying the reminder for increasing the second battery level above the second preset battery level.

12. The electronic device of claim 10, wherein a start time of the scheduled mode change is adjustable.

13. The electronic device of claim 10, wherein the reminder for increasing the first battery level above the first preset battery level is displayed concurrently with a reminder that the scheduled mode change is about to start.

14. The electronic device of claim 13, wherein the reminder for increasing the first battery level above the first preset battery level is displayed concurrently with a reminder that the scheduled mode change is about to start on a first user interface that corresponds to a restricted state of the electronic device, and the one or more programs include instructions for:

while displaying the first user interface that corresponds to the restricted state of the electronic device, detecting a first user input directed to the first user interface; and in response to detecting the first user input directed to the first user interface:

in accordance with a determination that the first user input meets first criteria, replacing display of the first user interface with a second user interface that corresponds to the restricted state of the electronic device, wherein the second user interface is different from the first user interface.

15. The electronic device of claim 13, wherein the reminder for increasing the first battery level and the reminder that the scheduled mode change is about to start are displayed, via the display generation component, in a notification that overlays a first user interface that corresponds to a restricted state of the electronic device.

16. The electronic device of claim 10, wherein the first battery level is a battery level of a second computer system distinct from the electronic device, and wherein the electronic device displays the reminder for increasing the first battery level above the first preset battery level in a user interface that corresponds to a restricted mode of the electronic device.

17. The electronic device of claim 10, the one or more programs including instructions for:

at a time after displaying the reminder, in accordance with a determination that the current time is within the first preset time period preceding the scheduled mode change and in accordance with a determination that a third battery level is at or above a third preset battery level, displaying, via the display generation component, a notification of the third battery level.

18. The electronic device of claim 10, wherein the electronic device is paired with a second computer system, the first battery level is a battery level of the second computer system, and the one or more programs include instructions for:

at a time after displaying the reminder, in accordance with a determination that a fourth battery level of the second computer system is at or above a fourth preset battery level, displaying, via the display generation component, a notification of the fourth battery level.

19. A non-transitory computer readable storage medium storing one or more programs, the one or more programs comprising instructions that, when executed by a first computer system with a display generation component, an input element, cause the first computer system to:

in accordance with a determination that a current time is within a first preset time period preceding a scheduled mode change and in accordance with a determination that a first battery level is below a first preset battery level, display, via the display generation component, a reminder for increasing the first battery level above the first preset battery level;

in accordance with a determination that the current time is within a third time period that precedes the first preset time period preceding the scheduled mode change, wherein the third time period is outside of the scheduled mode change, and in accordance with a determination that the first battery level is below the first preset battery level, forgo display of the reminder for increasing the first battery level above the first preset battery level; and in accordance with a determination that the current time is within a second preset time period that is between the first preset time period and the scheduled mode change, in accordance with a determination that the first battery level is below the first preset battery level, and in accordance with a determination that there is insufficient time to increase the first battery level above the first preset battery level before the start of the scheduled mode change, forgo display of the reminder for increasing the first battery level above the first preset battery level.

20. The non-transitory computer readable storage medium of claim 19, the one or more programs include instructions that, when executed by the first computer system, cause the first computer system to:

in accordance with a determination that the current time is within the scheduled mode change and in accordance with a determination that a second battery level is below a second preset battery level, forgo displaying the reminder for increasing the second battery level above the second preset battery level.

21. The non-transitory computer readable storage medium of claim 19, wherein a start time of the scheduled mode change is adjustable.

22. The non-transitory computer readable storage medium of claim 19, wherein the reminder for increasing the first battery level above the first preset battery level is displayed concurrently with a reminder that the scheduled mode change is about to start.

23. The non-transitory computer readable storage medium of claim 22, wherein the reminder for increasing the first battery level above the first preset battery level is displayed concurrently with a reminder that the scheduled mode change is about to start on a first user interface that corresponds to a restricted state of the first computer system, and wherein the one or more programs comprise instructions, which when executed by the first computer system, cause the first computer system to:

while displaying the first user interface that corresponds to the restricted state of the first computer system, detect a first user input directed to the first user interface; and in response to detecting the first user input directed to the first user interface:

in accordance with a determination that the first user input meets first criteria, replace display of the first user interface with a second user interface that corresponds to the restricted state of the first computer system, wherein the second user interface is different from the first user interface.

24. The non-transitory computer readable storage medium of claim 19, wherein the reminder for increasing the first battery level and the reminder that the scheduled mode change is about to start are displayed, via the display generation component, in a notification that overlays a first user interface that corresponds to a restricted state of the first computer system.

25. The non-transitory computer readable storage medium of claim 19, wherein the first battery level is a battery level of a second computer system distinct from the first computer system, and wherein the first computer system displays the reminder for increasing the first battery level above the first preset battery level in a user interface that corresponds to a restricted mode of the first computer system.

26. The non-transitory computer readable storage medium of claim 19, wherein the one or more programs comprise instructions, which when executed by the first computer system, cause the first computer system to:

at a time after displaying the reminder, in accordance with a determination that the current time is within the first preset time period preceding the scheduled mode change and in accordance with a determination that a third battery level is at or above a third preset battery level, display, via the display generation component, a notification of the third battery level.

27. The non-transitory computer readable storage medium of claim 19, wherein the first computer system is paired with a second computer system, the first battery level is a battery level of the second computer system, and wherein the one or more programs comprise instructions, which when executed by the first computer system, cause the first computer system to:

at a time after displaying the reminder, in accordance with a determination that a fourth battery level of the second computer system is at or above a fourth preset battery level, display, via the display generation component, a notification of the fourth battery level.

\* \* \* \* \*